(12) United States Patent
Kislev et al.

(10) Patent No.: US 12,665,450 B2
(45) Date of Patent: *Jun. 23, 2026

(54) ELECTRIC MACHINE WITH MULTI-PART TRAPEZOIDAL TEETH

(71) Applicant: EVR MOTORS LTD, Petah Tikva (IL)

(72) Inventors: Victor Kislev, Kfar Yona (IL); Oleg Gaspar, Tel Aviv (IL); Ruslan Shabinski, Maale Adumim (IL); Eliyahu Rozinsky, Hod Hasharon (IL)

(73) Assignee: EVR MOTORS LTD, Petah Tikva (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/382,583

(22) Filed: Oct. 23, 2023

(65) Prior Publication Data

US 2024/0048008 A1 Feb. 8, 2024

Related U.S. Application Data

(63) Continuation of application No. 18/104,426, filed on Feb. 1, 2023, now Pat. No. 11,831,202, which is a
(Continued)

(51) Int. Cl.
*H02K 1/18* (2006.01)
*H02K 1/02* (2006.01)
(Continued)

(52) U.S. Cl.
CPC .............. *H02K 1/187* (2013.01); *H02K 1/02* (2013.01); *H02K 1/14* (2013.01); *H02K 1/146* (2013.01); *H02K 1/2786* (2013.01); *H02K*

*21/22* (2013.01); *H02K 1/165* (2013.01); *H02K 1/185* (2013.01); *H02K 1/20* (2013.01); *H02K 1/2793* (2013.01);
(Continued)

(58) Field of Classification Search
CPC .......... H02K 1/165; H02K 1/265; H02K 3/12; H02K 3/527; H02K 2213/03
See application file for complete search history.

(56) References Cited

U.S. PATENT DOCUMENTS

| | | | |
|---|---|---|---|
| 2,451,633 | A | 10/1948 | Perrigo |
| 3,330,975 | A | 7/1967 | Osterwalder |

(Continued)

FOREIGN PATENT DOCUMENTS

| | | |
|---|---|---|
| CN | 103560633 A | 2/2014 |
| CN | 109245346 | 1/2019 |

(Continued)

OTHER PUBLICATIONS

Machine translation of JP-2003235183-A (Year: 2003).*
(Continued)

*Primary Examiner* — Oluseye Iwarere
*Assistant Examiner* — Minki Chang
(74) *Attorney, Agent, or Firm* — Finnegan, Henderson, Farabow, Garrett & Dunner, LLP

(57) ABSTRACT

An electric machine may include an stator and a rotatable rotor. At least one of the stator or the rotor may include a plurality of multi-part trapezoidal teeth with an electromagnetic coil disposed around each tooth.

19 Claims, 69 Drawing Sheets

Related U.S. Application Data continuation of application No. 17/882,947, filed on Aug. 8, 2022, now Pat. No. 11,594,920, which is a continuation of application No. 17/493,089, filed on Oct. 4, 2021, now Pat. No. 11,451,099, which is a continuation of application No. PCT/IB2021/058475, filed on Sep. 17, 2021.

(60) Provisional application No. 63/081,043, filed on Sep. 21, 2020.

(51) Int. Cl.

| | |
|---|---|
| H02K 1/14 | (2006.01) |
| H02K 1/2786 | (2022.01) |
| H02K 21/22 | (2006.01) |
| H02K 1/16 | (2006.01) |
| H02K 1/20 | (2006.01) |
| H02K 1/2793 | (2022.01) |
| H02K 3/12 | (2006.01) |
| H02K 3/14 | (2006.01) |
| H02K 3/28 | (2006.01) |
| H02K 3/487 | (2006.01) |
| H02K 3/493 | (2006.01) |
| H02K 3/50 | (2006.01) |
| H02K 3/52 | (2006.01) |
| H02K 5/18 | (2006.01) |
| H02K 9/19 | (2006.01) |
| H02K 9/22 | (2006.01) |

(52) U.S. Cl.

CPC ................. *H02K 3/12* (2013.01); *H02K 3/14* (2013.01); *H02K 3/28* (2013.01); *H02K 3/487* (2013.01); *H02K 3/493* (2013.01); *H02K 3/50* (2013.01); *H02K 3/525* (2013.01); *H02K 5/18* (2013.01); *H02K 9/19* (2013.01); *H02K 9/22* (2013.01); *H02K 9/227* (2021.01); *H02K 2201/03* (2013.01)

(56) References Cited

U.S. PATENT DOCUMENTS

| | | | |
|---|---|---|---|
| 3,334,252 A | 8/1967 | Gayral | |
| 4,217,513 A | 8/1980 | Kohzai et al. | |
| 4,441,043 A | 4/1984 | DeCesare | |
| 4,683,388 A | 7/1987 | DeCesare | |
| 5,089,730 A | 2/1992 | O'Connor et al. | |
| 5,345,133 A | 9/1994 | Satake | |
| 5,642,013 A | 6/1997 | Wavre | |
| 5,659,217 A | 8/1997 | Petersen | |
| 5,751,089 A | 5/1998 | Stridsberg | |
| 5,866,965 A | 2/1999 | Baronosky et al. | |
| 5,874,796 A | 2/1999 | Petersen | |
| 6,011,339 A | 1/2000 | Kawakami | |
| 6,046,520 A | 4/2000 | Betsch et al. | |
| 6,072,253 A | 6/2000 | Harpenau et al. | |
| 6,137,202 A | 10/2000 | Holmes et al. | |
| 6,211,587 B1 | 4/2001 | Enomoto | |
| 6,226,856 B1 | 5/2001 | Kazama et al. | |
| 6,472,792 B1 | 10/2002 | Jack et al. | |
| 6,812,612 B2 | 11/2004 | Schunk et al. | |
| 6,924,574 B2 | 8/2005 | Qu et al. | |
| 6,956,307 B2 | 10/2005 | Engquist et al. | |
| 6,979,919 B2 | 12/2005 | Gotmalm | |
| 7,164,220 B2 | 1/2007 | Gilmour et al. | |
| 7,173,353 B2 | 2/2007 | Lopatinsky et al. | |
| 7,218,026 B2 | 5/2007 | Murakami et al. | |
| 7,471,023 B2 | 12/2008 | Roundell | |
| 7,723,888 B2 | 5/2010 | Petek | |
| 7,737,600 B2 | 6/2010 | Endo et al. | |
| 7,847,443 B2 | 12/2010 | Farnia | |
| 7,902,712 B2 | 3/2011 | Nakamasu et al. | |
| 7,990,015 B2 | 8/2011 | Mongeau et al. | |
| 8,069,550 B2 | 12/2011 | Gadelmeier et al. | |
| 8,075,825 B2 | 12/2011 | Takahashi et al. | |
| 8,082,654 B2 | 12/2011 | Bender | |
| 8,183,724 B2 | 5/2012 | Rodriguez et al. | |
| 8,212,438 B2 | 7/2012 | Belton | |
| 8,230,580 B2 | 7/2012 | Kiyono et al. | |
| 8,250,734 B2 | 8/2012 | Fubuki et al. | |
| 8,378,534 B2 | 2/2013 | Houle et al. | |
| 8,766,506 B2 | 7/2014 | Sano et al. | |
| 8,881,362 B2 | 11/2014 | Yoshimura et al. | |
| 8,893,375 B1 | 11/2014 | Pairaktaridis | |
| 9,287,755 B2 | 3/2016 | Woolmer et al. | |
| 9,391,499 B2 | 7/2016 | Kim | |
| 9,479,036 B2 | 10/2016 | Lim et al. | |
| 9,502,951 B2 | 11/2016 | Lim et al. | |
| 9,777,770 B2 | 10/2017 | Lang et al. | |
| 10,038,349 B2 | 7/2018 | Long et al. | |
| 10,056,813 B2 | 8/2018 | Rozinsky et al. | |
| 10,288,078 B2 | 5/2019 | De Filippis | |
| 10,491,068 B2 | 11/2019 | Seo et al. | |
| 10,536,055 B2 | 1/2020 | Hanumalagutti et al. | |
| 10,566,858 B2 | 2/2020 | Takano | |
| 10,574,099 B2 | 2/2020 | Xu et al. | |
| 10,601,273 B2 | 3/2020 | Rippel et al. | |
| 10,644,555 B2 | 5/2020 | Mueller et al. | |
| 10,644,556 B2 | 5/2020 | Tamura et al. | |
| 11,062,840 B2 | 7/2021 | Dai et al. | |
| 11,088,595 B2 | 8/2021 | Suda et al. | |
| 11,177,712 B2 | 11/2021 | Lambourne et al. | |
| 11,296,572 B1 | 4/2022 | Kislev et al. | |
| 11,322,994 B2 | 5/2022 | Kislev et al. | |
| 11,336,132 B2 | 5/2022 | Kislev et al. | |
| 11,349,359 B2 | 5/2022 | Kislev et al. | |
| 11,355,985 B2 | 6/2022 | Kislev et al. | |
| 11,374,444 B2 | 6/2022 | Kislev et al. | |
| 11,451,099 B2 | 9/2022 | Kislev et al. | |
| 11,489,378 B2 | 11/2022 | Kislev et al. | |
| 11,489,379 B2 | 11/2022 | Kislev et al. | |
| 11,831,202 B2 * | 11/2023 | Kislev ..................... H02K 1/02 | |
| 2002/0053838 A1 | 5/2002 | Okuda | |
| 2002/0089239 A1 | 7/2002 | Emoto et al. | |
| 2002/0149282 A1 | 10/2002 | Heidrich | |
| 2004/0007933 A1 * | 1/2004 | Hsu ......................... H02K 1/146 |
| | | | 310/194 |
| 2005/0258705 A1 | 11/2005 | Berwald et al. | |
| 2006/0006745 A1 | 1/2006 | Lopatinsky et al. | |
| 2006/0190922 A1 | 8/2006 | Chen | |
| 2006/0208602 A1 | 9/2006 | Enomoto | |
| 2006/0244338 A1 | 11/2006 | Petersen | |
| 2007/0052305 A1 | 3/2007 | Roundell | |
| 2007/0252447 A1 | 11/2007 | Lonel | |
| 2008/0001494 A1 * | 1/2008 | Endo .................... H02K 15/022 |
| | | | 310/254.1 |
| 2008/0169720 A1 | 7/2008 | Petek | |
| 2008/0185932 A1 | 8/2008 | Jajtic et al. | |
| 2008/0197741 A1 | 8/2008 | Schunk | |
| 2009/0026875 A1 | 1/2009 | Mongeau et al. | |
| 2009/0115361 A1 | 5/2009 | Nitta | |
| 2009/0127970 A1 | 5/2009 | Tatematsu | |
| 2009/0256430 A1 | 10/2009 | Farnia | |
| 2009/0302694 A1 | 12/2009 | Asai | |
| 2010/0066198 A1 | 3/2010 | Fubuki et al. | |
| 2010/0244603 A1 | 9/2010 | El-Refaie | |
| 2010/0253176 A1 | 10/2010 | Ovrebo et al. | |
| 2011/0016701 A1 | 1/2011 | Bender | |
| 2011/0109190 A1 | 5/2011 | Aoyama et al. | |
| 2012/0007453 A1 | 1/2012 | Leiber | |
| 2012/0043844 A1 | 2/2012 | Bailey et al. | |
| 2013/0069475 A1 | 3/2013 | Ocket et al. | |
| 2013/0147291 A1 | 6/2013 | Woolmer et al. | |
| 2013/0187485 A1 | 7/2013 | Sakamoto et al. | |
| 2013/0278088 A1 | 10/2013 | Bahr | |
| 2013/0285489 A1 | 10/2013 | Lemma | |
| 2013/0328432 A1 | 12/2013 | Hoemann | |
| 2014/0117790 A1 | 5/2014 | Sakamoto et al. | |
| 2014/0125167 A1 | 5/2014 | Marvin | |
| 2014/0175920 A1 | 6/2014 | Cimatti | |
| 2014/0285048 A1 | 9/2014 | Seo | |

(56) References Cited

U.S. PATENT DOCUMENTS

| | | | |
|---|---|---|---|
| 2014/0375163 A1 | 12/2014 | Esakov et al. | |
| 2015/0048701 A1 | 2/2015 | Johnsen et al. | |
| 2015/0270756 A1* | 9/2015 | Foulsham | H02K 3/527 |
| | | | 310/43 |
| 2016/0056607 A1 | 2/2016 | Eckert | |
| 2016/0149472 A1 | 5/2016 | Pal | |
| 2016/0204661 A1 | 7/2016 | De Filippis | |
| 2016/0226321 A1 | 8/2016 | Krishnasamy | |
| 2017/0104402 A1 | 4/2017 | Dai et al. | |
| 2017/0170706 A1 | 6/2017 | Bhargava | |
| 2017/0353063 A1 | 12/2017 | Bell et al. | |
| 2018/0099657 A1 | 4/2018 | Leiber | |
| 2018/0166936 A1 | 6/2018 | Do | |
| 2018/0175707 A1 | 6/2018 | Miyama | |
| 2018/0248429 A1 | 8/2018 | Sakauchi | |
| 2018/0337572 A1 | 11/2018 | Miyama | |
| 2019/0156992 A1 | 5/2019 | Dai et al. | |
| 2019/0229569 A1 | 7/2019 | Li | |
| 2019/0229583 A1 | 7/2019 | Dextraze | |
| 2019/0260252 A1 | 8/2019 | Lambourne | |
| 2019/0260254 A1 | 8/2019 | Azar et al. | |
| 2019/0372408 A1 | 12/2019 | Taniguchi et al. | |
| 2020/0067391 A1 | 2/2020 | Sandner | |
| 2020/0076261 A1 | 3/2020 | Fritsch | |
| 2020/0119620 A1 | 4/2020 | Suda | |
| 2020/0136441 A1 | 4/2020 | Azar | |
| 2020/0153321 A1 | 5/2020 | Manabe et al. | |
| 2020/0177042 A1 | 6/2020 | Desai | |
| 2020/0274430 A1 | 8/2020 | Petersen | |
| 2020/0276896 A1 | 9/2020 | Kawamura et al. | |
| 2021/0143701 A1 | 5/2021 | Sangha | |
| 2021/0328477 A1 | 10/2021 | Tsai et al. | |
| 2022/0029509 A1 | 1/2022 | Martens et al. | |
| 2022/0094216 A1 | 3/2022 | Kislev et al. | |
| 2022/0094217 A1 | 3/2022 | Kislev et al. | |
| 2022/0094231 A1 | 3/2022 | Kislev et al. | |
| 2022/0385141 A1 | 12/2022 | Kislev et al. | |

FOREIGN PATENT DOCUMENTS

| | | | |
|---|---|---|---|
| CN | 208862675 U | 5/2019 | |
| CN | 209994171 U | 1/2020 | |
| CN | 111224502 A | 6/2020 | |
| CN | 111404290 A | 7/2020 | |
| CN | 112186915 A | 1/2021 | |
| DE | 10229333 | 1/2004 | |
| DE | 102004026453 A1 | 12/2004 | |
| DE | 10336780 A1 | 3/2005 | |
| DE | 102004034611 A1 | 2/2006 | |
| DE | 102006049420 A | 5/2007 | |
| DE | 102009008405 A1 | 8/2010 | |
| DE | 102010002696 A1 | 3/2011 | |
| DE | 102014000636 A1 | 7/2015 | |
| DE | 102016218822 A1 | 3/2018 | |
| EP | 1416619 A1 | 5/2004 | |
| EP | 1555734 A1 | 7/2005 | |
| EP | 1806822 A1 | 7/2007 | |
| EP | 1923979 A1 | 5/2008 | |
| EP | 2530688 A1 | 12/2012 | |
| FR | 3024608 A1 | 2/2016 | |
| GB | 1343413 A | 1/1974 | |
| GB | 2507072 A | 4/2014 | |
| JP | S5612827 A | 2/1981 | |
| JP | H1187165 A | 3/1999 | |
| JP | 2000041365 A | 2/2000 | |
| JP | 2000050540 A | 2/2000 | |
| JP | 2002315247 A | 10/2002 | |
| JP | 2002369418 A | 12/2002 | |
| JP | 2003235183 A * | 8/2003 | |
| JP | 2004201483 A | 7/2004 | |
| JP | 2005310566 A | 11/2005 | |
| JP | 2005319479 A | 11/2005 | |
| JP | 2006166610 A | 6/2006 | |
| JP | 2007221913 A | 8/2007 | |
| JP | 2007295740 A | 11/2007 | |
| JP | 2015167432 A | 9/2015 | |
| JP | 2016149905 A | 8/2016 | |
| JP | 2017147780 A | 8/2017 | |
| KR | 100847481 B1 | 7/2009 | |
| RU | 2696853 C2 | 2/2018 | |
| WO | WO0209256 A1 | 1/2002 | |
| WO | WO2011026795 A1 | 3/2011 | |
| WO | WO2013030108 A2 | 3/2013 | |
| WO | WO2016199486 A1 | 12/2016 | |
| WO | WO2017036354 A1 | 3/2017 | |
| WO | WO2015140970 A1 | 4/2017 | |
| WO | WO2019087358 A1 | 5/2019 | |
| WO | WO2020066208 A1 | 4/2020 | |
| WO | WO2020165435 A1 | 8/2020 | |
| WO | WO2020233936 A1 | 11/2020 | |
| WO | WO2022016950 A1 | 1/2022 | |
| WO | PCT/IB2021/058475 | 3/2022 | |
| WO | WO2022058939 | 3/2022 | |

OTHER PUBLICATIONS

International Search Report for Int'l Search Application No. PCT/IB2021/058475, dated Dec. 20, 2021 (21 pages).

Non-Final Office Action issued in U.S. Appl. No. 17/480,373, dated Jan. 6, 2022 (8 pgs.).

Non-Final Office Action issued in U.S. Appl. No. 17/480,408, dated Jan. 21, 2022 (12 pgs.).

Non-Final Office Action issued in U.S. Appl. No. 17/480,452, dated Dec. 17, 2021 (18 pgs.).

Takano et al., Core, Armature Core, and Motor, Jul. 15, 2004, JP 2004201483 (English Machine Translation) (Year 2004) ( 9 pgs.).

Li et al, A Concentrated Winding Transvers Magnetic Flux Permanent Magnet Synchronous Motor, Jul. 10, 2020, CN 111404290 (English Machine Translation) (Year 2020) (7 pgs.).

Kolehmainen Jere, Stator for Axial Flux Electric Motor, Nov. 26, 2020, WO 2020233936 English Machine Translation) (Year 2004) (10 pgs.).

Final Office Action issued in U.S. Appl. No. 17/480,452, dated Mar. 4, 2022 (27 pgs.).

Non-Final Office Action issued in U.S. Appl. No. 17/480,510 dated Jan. 26, 2022 (20 pgs.).

Drozdek et al, Inductor of Rotating Electrical Machine with Improved Magnetic Performance, Feb. 5, 2016, FR 3024608 (English Machine Translation) (Year 2016) (23 pgs.).

Non-Final Office Action issued in U.S. Appl. No. 17/480,543 dated Jan. 31, 2022 (15 pgs.).

Non-Final Office Action issued in U.S. Appl. No. 17/492,997 dated Feb. 1, 2022 (16 pgs.).

Hill, Machine Translation of DE102004026453, Dec. 2004 (Year 2004) (36 pgs.).

Non-Final Office Action issued in U.S. Appl. No. 17/493,041 dated Jan. 27, 2022 (13 pgs.).

Non-Final Office Action issued in U.S. Appl. No. 17/493,126 dated Feb. 11, 2022 (11 pgs.).

* cited by examiner

A-A

DETAIL B
(Enlarged)

A-A

DETAIL B
(Enlarged)

10F

20

300
120
100A
100B
200

10G

20

100A
100B
120
140

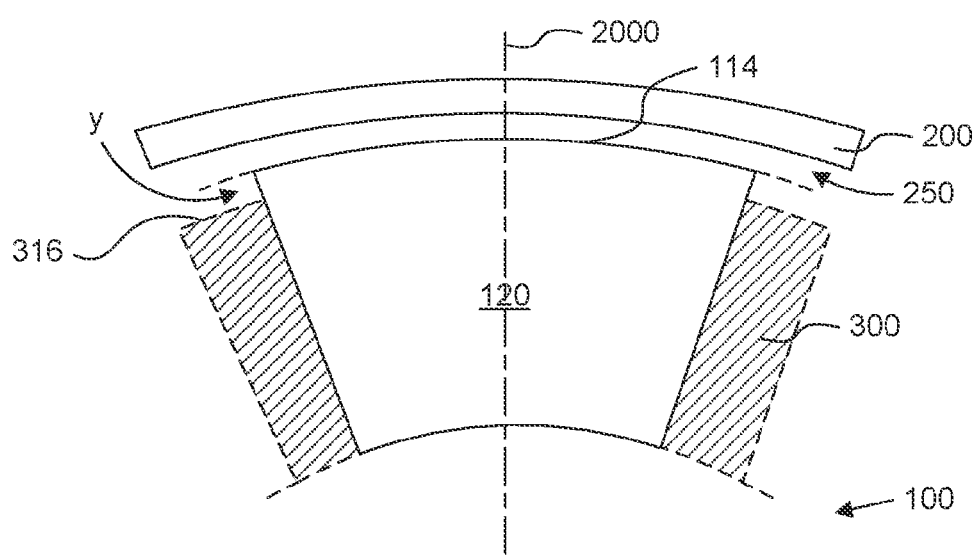
FIG. 30
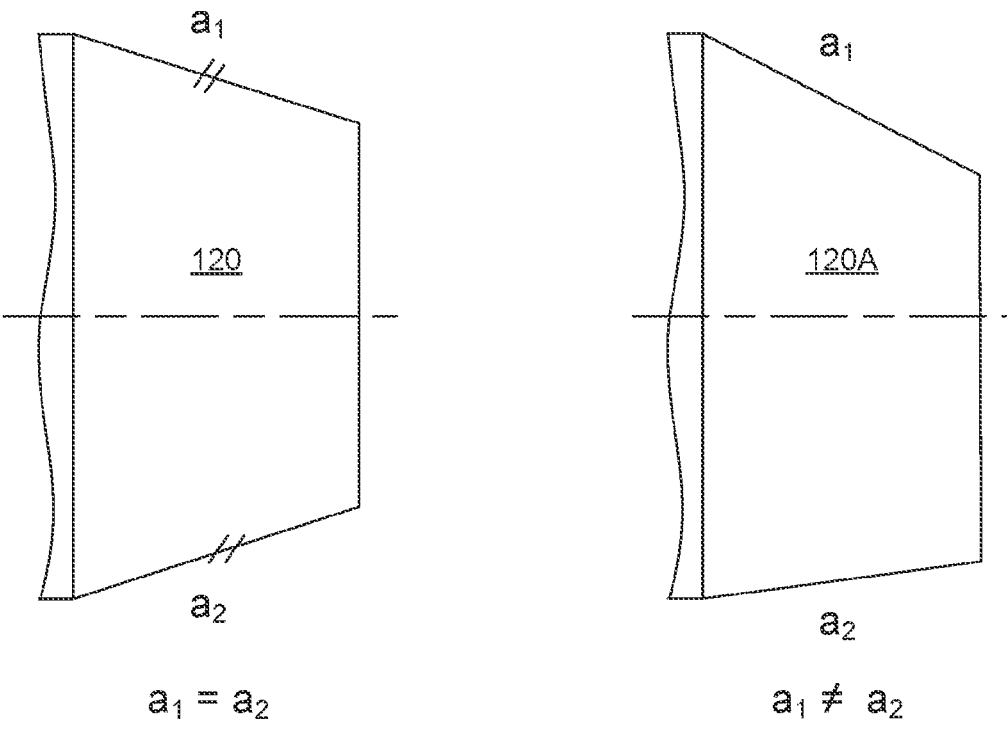
FIG. 31A        FIG. 31B

224

910

929

928

900 y    x

928

908

904

910

220

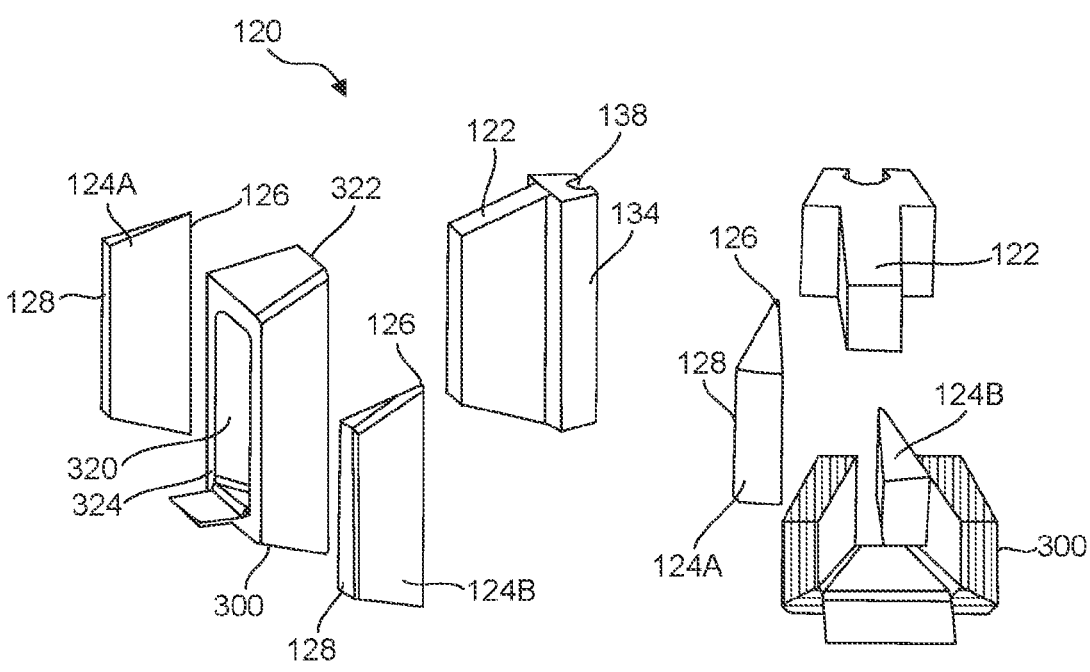
*FIG. 45A*                    *FIG. 45B*
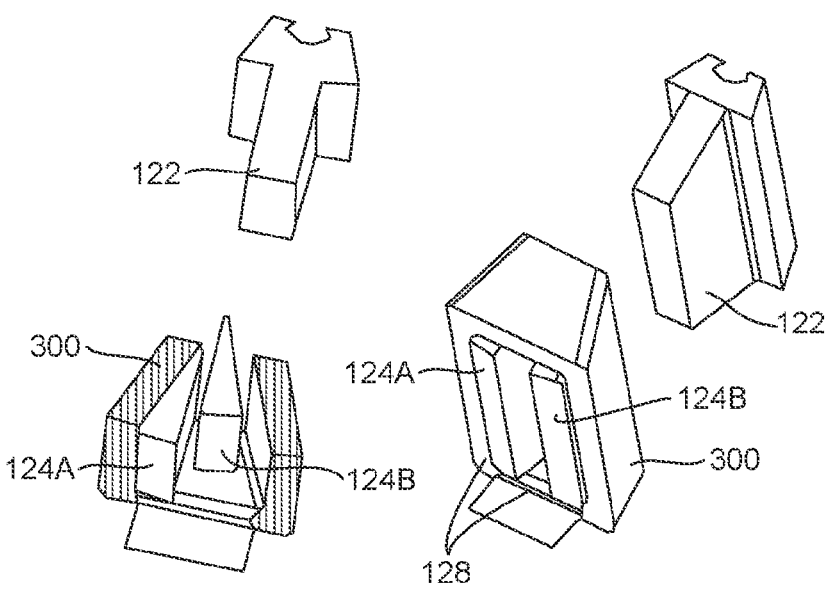
*FIG. 45C*                    *FIG. 45D*

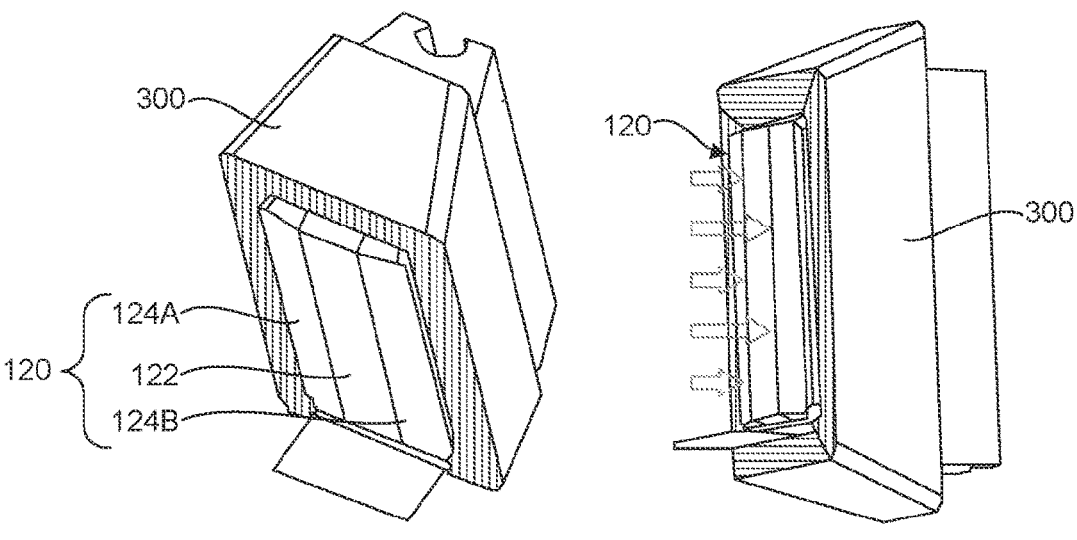
FIG. 45E          FIG. 45F
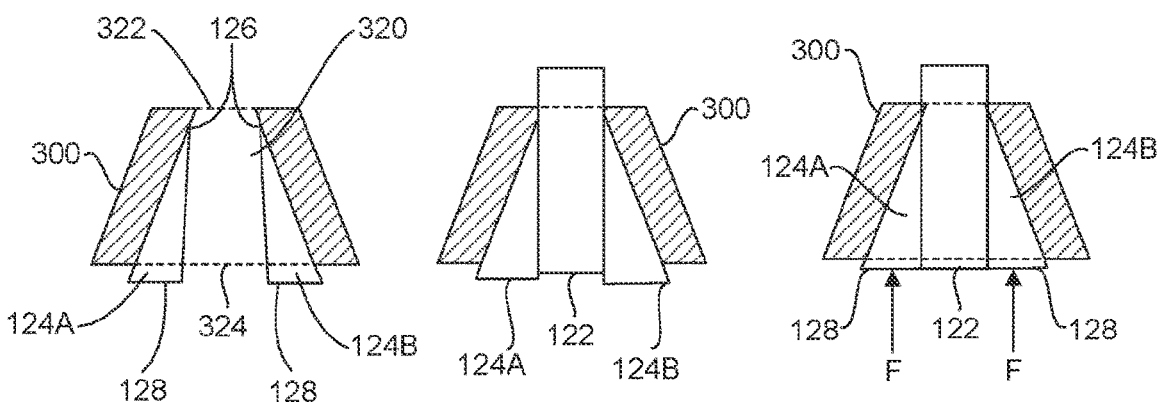
FIG. 46A        FIG. 46B        FIG. 46C

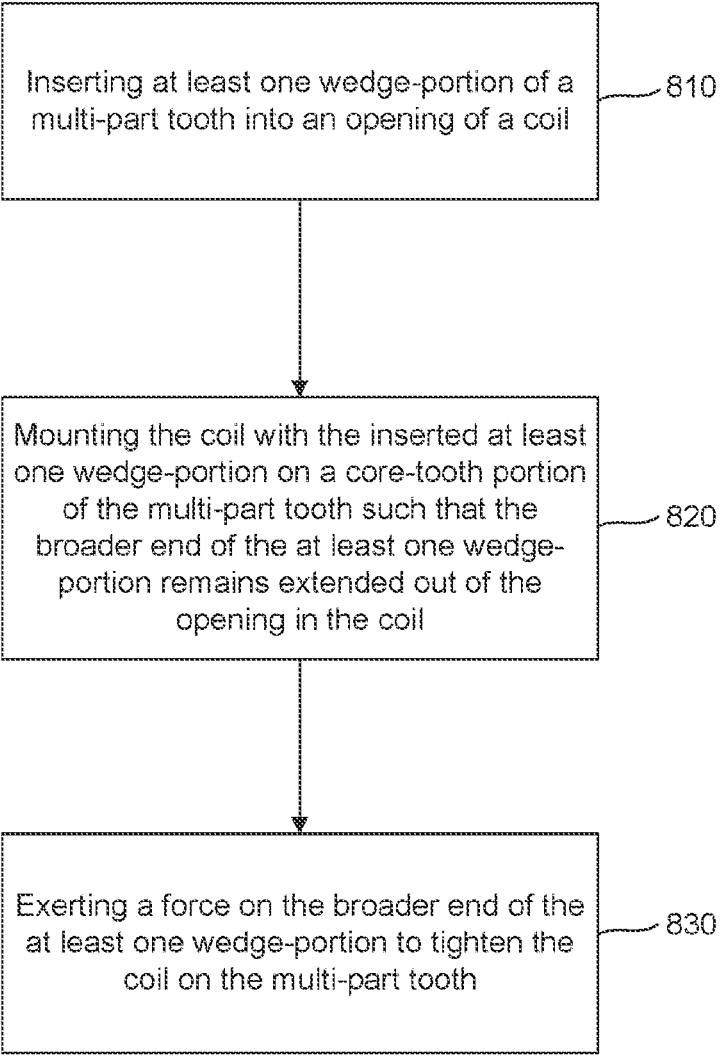

Inserting at least one wedge-portion of a multi-part tooth into an opening of a coil — 810

Mounting the coil with the inserted at least one wedge-portion on a core-tooth portion of the multi-part tooth such that the broader end of the at least one wedge-portion remains extended out of the opening in the coil — 820

Exerting a force on the broader end of the at least one wedge-portion to tighten the coil on the multi-part tooth — 830

*FIG. 47*

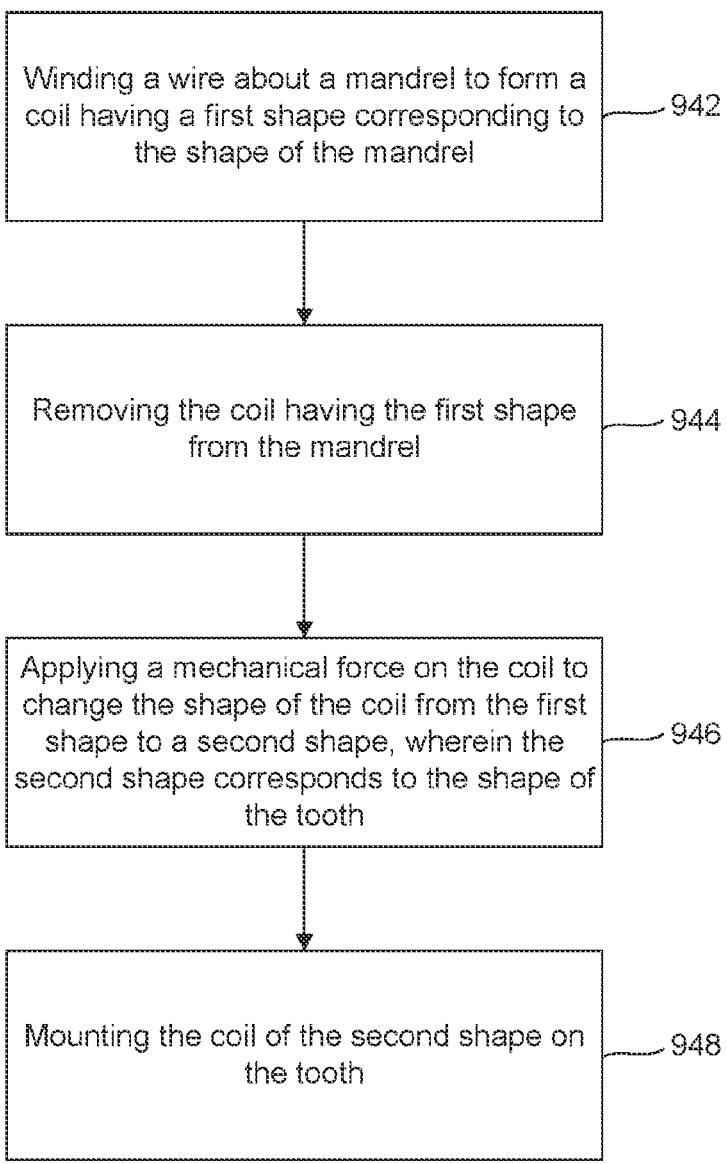

Winding a wire about a mandrel to form a coil having a first shape corresponding to the shape of the mandrel — 942

Removing the coil having the first shape from the mandrel — 944

Applying a mechanical force on the coil to change the shape of the coil from the first shape to a second shape, wherein the second shape corresponds to the shape of the tooth — 946

Mounting the coil of the second shape on the tooth — 948

*FIG. 52*

ELECTRIC MACHINE WITH MULTI-PART TRAPEZOIDAL TEETH

CROSS-REFERENCE TO RELATED APPLICATIONS

The present application is a continuation application of U.S. patent application Ser. No. 18/104,426, filed Feb. 1, 2023, which is a continuation application of U.S. patent application Ser. No. 17/882,947, filed Aug. 8, 2022 (now U.S. Pat. No. 11,594,920), which is a continuation application of U.S. patent application Ser. No. 17/493,089, filed Oct. 4, 2021 (now U.S. Pat. No. 11,451,099), which claims priority to International Application No. PCT/IB2021/058475, filed Sep. 17, 2021, which claims priority to U.S. Provisional Patent Application No. 63/081,043, filed Sep. 21, 2020, each of which is incorporated herein by reference in its entirety.

TECHNICAL FIELD

The present disclosure relates to a radial flux electric machine.

BACKGROUND

The current disclosure relates to electrical machines, and in particular to radial flux electrical machines. Electric machine (or electrical machine) is a general term for machines that rely on electromagnetic forces for its operation. The two main parts of an electric machine can be described in mechanical or electrical terms. In mechanical terms, the rotor is the rotating part, and the stator is the stationary part of an electrical machine. In electrical terms, the armature is the power-producing component and the field is the magnetic field producing component of an electrical machine. The armature can be on the rotor or the stator, and the magnetic field can be provided by either electromagnets or permanent magnets mounted on either the rotor or the stator. Electric machines are electromechanical energy converters and include, among others, electric motors, and electric generators. An electric motor converts electricity to mechanical power while an electric generator converts mechanical power to electricity. The moving part of the electric machine can be rotating (rotating electric machines) or linear (linear electric machines). Electric machines operate on the principle that electrical current generates electromagnetic flux and vice versa. In some electric machine, a rotor comprising permanent magnets is configured for rotating in an electromagnetic field generated by a plurality of electromagnets through which electricity is passed.

Electrical machines can be categorized as axial flux electric machines and radial flux electric machines. The fundamental difference between these types of machines lie in the orientation of the magnetic field in these machines. In radial flux electric machines, the working magnetic flux crosses the air gap between the stator and the rotor in the radial plane, while in axial flux electric machines, the magnetic flux crosses the air gap parallel to the axis of rotation. A large number of solutions are known aimed at reducing the stray fields of permanent magnets and windings of an electric machine, as well as increasing the concentration of the magnetic flux density in the stator and rotor cores, and strive to ensure the same values of the magnetic flux density in all parts of the core. There are also a large number of solutions aimed at providing a high fill factor for permanent magnet electric machines. Some of these solutions use complex tooth shapes to improve electric machine performance. While some of these solutions effectively uses the volume of the tooth, they do not sufficiently reduce the leakage fluxes of the electric machine. In addition, in some cases, the complex tooth shapes makes it difficult to provide a high winding fill factor for electric machines. The radial flux electric machines of the current disclosure alleviates some or all of the above-mentioned issues. A decrease in leakage fluxes and an increase in the fill factor in embodiments of electric machines of the current disclosure may allow for increased power and efficiency of electrical machines. However, the scope of the current disclosure is defined by the claims and not by the ability to solve any problem.

SUMMARY

Several embodiments of an electric machine and methods of fabricating and using an electric machine are disclosed. It is to be understood that both the foregoing general description and the following detailed description are exemplary and explanatory only. As such, the scope of the disclosure is not limited solely to the disclosed embodiments. Instead, it is intended to cover such alternatives, modifications and equivalents within the spirit and scope of the disclosed embodiments. Persons skilled in the art would understand how various changes, substitutions and alterations can be made to the disclosed embodiments without departing from the spirit and scope of the disclosure.

In one embodiment, an electric machine having a plurality of trapezoidal teeth is disclosed. The electric machine may include a plurality of electromagnetic coils. Each coil may include a non-uniform trapezoidal cavity therethrough and may be configured to contain therein one tooth of the plurality of teeth. Each tooth may be formed of multiple pieces that, when assembled together form a trapezoidal tooth.

In some embodiments, the trapezoidal shape of the multipiece tooth, in which the cross-sectional area increases in the radial direction towards the rotor, and the winding coils are shifted as close as possible to the air gap, may significantly reduce the leakage fields of the electric machine. Pre-forming a tooth with a constant cross-sectional perimeter in the radial direction leads to an increase in the fill factor of the electric machine and improves the performance, efficiency torque and power of the electric machine.

In one embodiment, a radial flux electric machine is disclosed. The electric machine may include a rotor configured to rotate about an axis of rotation and a stator. At least one of the rotor or the stator may include a plurality of teeth annularly arranged about the axis of rotation. The electric machine may also include a plurality of electromagnetic coils. Each coil of the plurality of electromagnetic coils may have a non-uniform trapezoidal cavity therethrough. Each cavity may be configured to contain therein one tooth of the plurality of teeth. Each tooth of the plurality of teeth may be formed of multiple pieces that, when assembled together correspond to a shape of the non-uniform trapezoidal cavity.

Various embodiments of the electric machine may alternatively or additionally include one or more of the following aspects: when the multiple pieces of each tooth are assembled together, an external perimeter of each tooth corresponds to an internal perimeter of the cavity of a corresponding coil; each tooth includes a core tooth-portion and at least one wedge-shaped portion; each tooth includes a core tooth-portion and at least two wedge-shaped portions disposed on opposite sides of the core portion; in a plane perpendicular to the axis of rotation, the core tooth-portion has a substantially rectangular cross-sectional shape and the at least one wedge-shaped portion has a substantially triangular cross-sectional shape; in a plane perpendicular to a radial direction, the core tooth-portion and the at least one wedge-shaped portion has a substantially rectangular cross-sectional shape; the core tooth-portion and the at least one wedge-shaped portion of each tooth are coupled together using an adhesive material; the core tooth-portion of each tooth is integrally formed with an annular ring that extends around the axis of rotation; when the multiple pieces of each tooth are assembled together, each tooth defines external surfaces having two sets of opposing faces, the opposing faces of each set of the two sets being non-parallel to each other; the opposing faces of adjacent teeth are parallel to each other; each face of the two sets of opposing faces is inclined in a radial direction; the opposing faces of one set of opposing faces converge towards each other in a radially outward direction and the opposing faces of the other set of opposing faces diverge from each other in the radially outward direction; a cross-section of each tooth in a plane perpendicular to the axis of rotation has a trapezoidal shape, and a cross-section of each tooth in a plane perpendicular to a radial direction has a rectangular shape; a perimeter of the cross-sections perpendicular to a radial direction is substantially a constant in the radial direction; an area of the cross-sections perpendicular to the radial direction varies in the radial direction; the stator includes the plurality of teeth, and the area of the cross-section perpendicular to the radial direction increases in the radial direction towards the rotor; a cross-section of each tooth in an axial plane has an isosceles trapezoidal shape; at least one piece of the multiple pieces of each tooth is formed of a soft magnetic composite (SMC); the stator includes the plurality of teeth, and wherein a first piece of the multiple pieces of each tooth is integral with and extends radially from an annular stator ring that extends around the axis of rotation, and a second piece of the multiple pieces of each tooth is non-integrally formed with the first piece; the electric machine is one of an electric motor or an electric generator.

In another embodiment, a radial flux electric machine is disclosed. The electric machine may include a rotor configured to rotate about an axis of rotation and a stator fixedly positioned proximate the rotor. At least one of the rotor or the stator may include a plurality of teeth annularly arranged about the axis of rotation. Each tooth of the plurality of teeth may extend in a radial direction such that a plurality of cross-sectional areas of each tooth in a plurality of planes perpendicular to the radial direction may vary. And perimeters of the plurality of cross-sections may be substantially the same across the plurality of perpendicular planes.

Various embodiments of the electric machine may alternatively or additionally include one or more of the following aspects: a shape of each tooth in at least one of an axial plane or a radial plane of the electric machine is a trapezoid; the shape of each tooth in at least one of an axial plane or a radial plane of the electric machine is an isosceles trapezoid; the plurality of teeth are annularly arranged on the stator; the rotor is disposed radially outwards of the stator, a width of each tooth in a radial plane increases in the radial direction towards the rotor, and a length of each tooth in an axial plane decreases in the radial direction towards the rotor; each tooth extends in the radial direction such that a cross-sectional area of each tooth in a plane perpendicular to the radial direction increases in the radial direction toward the rotor; the rotor is disposed radially inwards of the stator, and a cross-sectional area of each tooth of the plurality of teeth in a plane perpendicular to the radial direction increases in the radial direction toward the rotor; the plurality of teeth are annularly arranged on the rotor; the electric machine further includes a plurality of electromagnetic coils, and wherein each coil of the plurality of electromagnetic coils extends around a separate tooth of the plurality of teeth; each coil includes copper wire having one of a square, rectangular, or circular cross-sectional shape; the wire is multi-strand and each coil is wound in the form of a spiral in the radial direction along a tooth; each coil includes copper foil wound around a tooth such that a flat side of the foil extends over an entire length of the tooth in the radial direction; each coil includes a rib of copper foil wound in the form of a spiral in the radial direction along a tooth; each tooth includes a soft magnetic composite (SMC) material; each tooth includes multiple pieces coupled together; the multiple pieces include a core portion integrally formed with an annular ring that extends around the axis of rotation and one or more wedge portions coupled to the core portion; the one or more wedge portions include at least two wedge portions disposed on opposite sides of the core portion; the electric machine is an electric motor or an electric generator; one of the stator or the rotor includes an outer part and an inner part and wherein the stator and rotor are separated by a double air gap; the outer part and the inner part connected together by a connecting portion made of a magnetically conductive material.

In another embodiment, a radial flux electric machine is disclosed. The electric machine may include a rotor configured to rotate about an axis of rotation, a plurality of electromagnetic coils, and a stator. The stator may include an annular stator ring extending about the axis of rotation and a plurality of multi-part teeth circumferentially arranged on the stator ring. Each multi-part tooth of the plurality of multi-part teeth may include a core tooth-portion integrally formed with the stator ring and at least one additional tooth-portion separate from the stator ring. Each coil of the plurality of electromagnetic coils may be mounted on a different multi-part tooth of the plurality of multi-part teeth such that each coil surrounds a corresponding core tooth-portion of the multi-part tooth with a gap between the coil and the core tooth-portion. The at least one additional tooth-portion may be disposed in the gap.

Various embodiments of the electric machine may alternatively or additionally include one or more of the following aspects: the core tooth-portion each multi-part teeth is formed of a soft magnetic composite (SMC); the annular stator ring is formed of a soft magnetic composite (SMC); the annular stator ring includes two mirror-symmetric halves coupled together along a plane of symmetry perpendicular to the axis of rotation; the two mirror-symmetric halves are attached together along the plane of symmetry using an adhesive material; the annular stator ring includes multiple axially stacked annular rings, at wherein at least two of the stacked annular rings are made of a soft magnetic composite (SMC); the core tooth-portion of each multi-part tooth extends outward in a radial direction from the annular stator ring; a cross-sectional of each of the core tooth-portion and the at least one additional tooth-portion along a plane perpendicular to the radial direction has a substantially rectangular shape; a cross-section of the core tooth-portion along a plane perpendicular to the axis of rotation has a substantially rectangular shape; a cross-section of the at least one additional tooth-portion along the plane perpendicular to the axis of rotation has a substantially triangular shape; a cross-sectional of each tooth of the plurality of multi-part teeth along the plane perpendicular to the axis of rotation has a substantially trapezoidal shape; the at least one additional tooth-portion includes a pair of additional tooth-portions arranged symmetrically on opposite sides of the core tooth-portion; the core tooth-portion and the at least one additional tooth-portion of each tooth of the plurality of multi-part teeth are coupled together using an adhesive material; a difference between coefficients of thermal expansion of materials of the core tooth-portion, the at least one additional tooth-portion, and the adhesive material is less than about 20%; the at least one additional tooth-portion of each multi-part tooth is wedged between an internal surface of a coil of the plurality of electromagnetic coils and an external surface of the core tooth-portion; a coil of the plurality of electromagnetic coils surrounds the core tooth-portion of each tooth such that at least two gaps are formed between an inner surface of the coil and opposite sides of the core tooth-portion, and wherein the at least one additional tooth-portion includes at least two additional tooth-portions disposed in a different gap of the at least two gaps; a cross-section of each multi-part tooth of the plurality of multi-part teeth in a plane perpendicular to a radial direction has a rectangular shape; a perimeter of the cross-section is substantially a constant in the radial direction; an area of the cross-section varies in the radial direction; the electric machine is an electric motor or an electric generator.

In another embodiment, a radial flux electric machine is disclosed. The electric machine may include a rotor configured to rotate about an axis of rotation, a plurality of electromagnetic coils, and a stator. The stator may have an annular stator ring and a plurality of core tooth-portions extending in a radial direction. The annular stator ring and the plurality of core tooth-portions may be integrally formed of a Soft Magnetic Composite (SMC). The SMC may include one or more isotropic ferromagnetic materials, a magnetic saturation induction of greater than or equal to about 1.6 Tesla, and an electrical resistivity greater than 10 micro-ohm/m.

Various embodiments of the electric machine may alternatively or additionally include one or more of the following aspects: the stator includes a plurality of multi-part teeth symmetrically arranged on the annular stator ring, wherein each tooth of the plurality of multi-part teeth includes one of the plurality of core tooth-portions and at least one additional tooth-portion non-integrally formed with the one of the plurality of core tooth portions; a pair of additional tooth-portions are arranged on opposite sides of an associated core tooth-portion; a cross-section of the core tooth-portion of each tooth along a plane perpendicular to the axis of rotation has a substantially rectangular shape, and a cross-section of each additional tooth portion of the at least one additional tooth-portions along the plane perpendicular to the axis of rotation has a substantially triangular shape; a cross-section of each of the core tooth-portions and the at least one additional tooth-portions along a plane perpendicular to the radial direction has a substantially rectangular shape; a cross-section of each tooth of the plurality of multi-part teeth in a plane perpendicular to the axis of rotation has a trapezoidal shape; a cross-section of each tooth of the plurality of multi-part teeth in a plane perpendicular to the radial direction has a substantially rectangular shape, and a perimeter of the cross-section is substantially a constant in the radial direction, and an area of the cross-section varies in the radial direction; the rotor is disposed radially outwards of the stator to form an air gap between the rotor and the stator, and the area of the cross-section increases in the radial direction toward the air gap; each tooth of the plurality of multi-part teeth defines external surfaces having two sets of opposing faces, the opposing faces of each set of the two sets being non-parallel to each other, and adjacent side faces of adjacent teeth being parallel to each other; each face of the two sets of opposing faces is inclined in a radial direction; the opposing faces of one set of opposing faces converge towards each other in a radially outward direction and the opposing faces of the other set of opposing faces diverge from each other in the radially outward direction; the at least one additional tooth-portions is formed of the SMC; at least one additional tooth-portion is formed of an isotropic material other than SMC; the annular stator ring includes two mirror-symmetric bodies coupled together along a plane of symmetry perpendicular to the axis of rotation; the two mirror-symmetric bodies are attached together along the plane of symmetry using an adhesive material, wherein a difference between coefficients of thermal expansion of the SMC and the adhesive material is less than about 20%; the magnetic saturation induction of the SMC is greater than or equal to about 2.4 Tesla; the magnetic saturation induction of the SMC is greater than or equal to about 2.5 Tesla; the resistivity of the SMC is greater than about 100 micro-ohm/m; the electric machine is an electric motor; the electric machine is an electric generator.

In another embodiment, a radial flux electric machine is disclosed. The electric machine may include an inner stator and an outer rotor configured to rotate about the stator. The outer rotor may include a rotor base and a plurality of annularly arranged permanent magnets axially extending from the rotor base parallel to an axis of rotation of the rotor. A cylindrical core may extend from the rotor base encircling the plurality of permanent magnets. The core may be formed of a Soft Magnetic Composite (SMC). A sleeve may encircle the rotor. The sleeve may support the cylindrical core and the cylindrical core may support the plurality of permanent magnets. The cylindrical core may be positioned radially between the sleeve and the plurality of permanent magnets.

Various embodiments of the electric machine may alternatively or additionally include one or more of the following aspects: at least one of the sleeve or the rotor base is made of non-magnetic material; the non-magnetic material is a composite material including at least one of carbon fiber, glass fiber, or aramid fiber; the non-magnetic material includes at least one of stainless steel or aluminum; the sleeve is made of a magnetic material; the magnetic material includes a soft magnetic material including laminated electrical steel sheets; the magnetic material is a solid body made of steel; the sleeve includes stiffening ribs disposed on recesses formed on an external surface of the cylindrical core; the cylindrical core extends from a first end coupled to the rotor base to a second end, wherein the sleeve includes a balancing ring located at the second end of the cylindrical core, and wherein the balancing ring is configured to provide dynamic balancing of the rotor; the sleeve extends over the balancing ring; the balancing ring is formed of a non-magnetic material; the plurality of permanent magnets are arranged on the rotor base in a substantially circular pattern around the axis of rotation; the plurality of permanent magnets are arranged on the rotor base such that the magnetic axis of each permanent magnet of the plurality of permanent magnets intersect at the axis of rotation; the rotor base is formed of aluminum or steel; the rotor base includes air vents configured to direct airflow along the axis of rotation when the rotor base rotates; the rotor base is integral with the sleeve and the balancing ring; the plurality of permanent magnets are attached to the cylindrical core using an adhesive, and wherein a difference between coefficients of thermal expansion of materials of the plurality of permanent magnets, the cylindrical core, and the adhesive is less than about 20%; the sleeve is integral with the rotor base to form a single piece; the cylindrical core and the sleeve both have a non-uniform radial thickness about the axis of rotation, and wherein thicker regions of the sleeve are located adjacent to a center of each permanent magnet; and the electric machine is one of electric motor or an electric generator.

In some embodiments, a method of assembling a coil on an irregular-shaped multi-part tooth of an electric machine is disclosed. The method may include inserting at least one wedge-portion of the multi-part tooth into an opening of the coil such that a broader end of the at least one wedge-portion extends out of the opening in the coil. The method may also include mounting the coil with the inserted at least one wedge-portion on a core tooth-portion of the multi-part tooth such that the broader end of the at least one wedge-portion remains extended out of the opening in the coil, exerting a force on the broader end of the at least one wedge-portion to tighten the coil on the multi-part tooth.

Various embodiments of the disclosed method may alternatively or additionally include one or more of the following aspects: exerting a force on the broader end of the at least one wedge-portion includes pushing the broader end of the at least one wedge-portion into the opening in the coil; the opening in the coil extends from a first end to a second end, wherein inserting the at least one wedge-portion includes inserting the at least one wedge-portion into the opening such that the broader end extends out of the second end of the opening, and exerting the force includes pushing the broader end towards the first end of the opening; the opening in the coil extends from a first end to a second end, wherein a width of the opening at the first end differs from the width of the opening at the second end, and wherein a length of the opening at the first end differs from a height of the opening at the second end; a shape of the opening at the first end and the second end is rectangular; a perimeter of the opening at the first end is substantially the same as the perimeter of the opening at the second end; an area of the opening at the first end varies from the area of the opening at the second end; an area of the opening increases from the first end to the second end; inserting the at least one wedge-portion into the opening of the coil includes inserting at least two wedge-portions into the opening; mounting the coil includes mounting the coil on the core tooth-portion such that the core tooth-portion is disposed between the at least two wedge-portions; using an adhesive material to attach the at least two wedge-portions and the core tooth-portion of the multi-part tooth together; the multi-part tooth is a part of a stator of the electric machine; the core tooth-portion of the multi-part tooth is one of a plurality of core tooth-portions symmetrically arranged on an annular stator ring that extends around a central axis, and wherein the core tooth-portion extends outward in a radial direction from the annular stator ring; the plurality of core tooth-portions are integrally formed with the annular stator ring; in a plane perpendicular to the central axis, the core tooth-portion has a substantially rectangular cross-sectional shape and the at least one wedge-portion has a substantially triangular cross-sectional shape; in a plane perpendicular to the radial direction, the core tooth-portion and the at least one wedge-portion have a substantially rectangular cross-sectional shape; the coil includes a winding of a copper wire around the opening, the wire having one of a square, rectangular, or circular cross-sectional shape; the coil includes a winding of a copper stranded wire in a spiral around the opening; the electric machine is an electric motor; and the electric machine is an electric generator.

In some embodiments, a method of fabricating a coil for mounting on a tooth of a stator or a rotor of an electric machine is disclosed. The method may include winding a wire about a mandrel to form a coil having a first shape corresponding to the shape of the mandrel, removing the coil having the first shape from the mandrel, and applying a mechanical force on the coil to change the shape of the coil from the first shape to a second shape. The second shape may correspond to the shape of the tooth. The method may also include mounting the coil of the second shape on the tooth.

Various embodiments of the disclosed method may alternatively or additionally include one or more of the following aspects: the wire is formed of a plurality of strands of an electrical conductor; the wire is formed by twisting together an electrical conductor or made in the form of a Litz wire; the wire has a circular cross-sectional shape; the wire has one of a square or a rectangular cross-sectional shape; the first shape is a cylindrical shape or any shape with a substantially constant perimeter; the second shape is a trapezoidal shape; winding the wire about the mandrel includes winding the wire about the mandrel in a spiral pattern to form coil having an internal cavity extending from a first end to a second end; applying a mechanical force on the coil includes selectively increasing a size of the cavity at one of the first end or the second end; applying a mechanical force on the coil includes changing a shape of the internal cavity; changing the shape of the internal cavity includes changing a cross-sectional shape of the internal cavity along a plane perpendicular to a central axis of the internal cavity from a circular shape to a rectangular shape; a width and a length of the rectangular shape both vary from the first end to the second end; a perimeter of the rectangular shape is substantially a constant from the first end to the second end and an area of the rectangular shape varies from the first end to the second end; the area of the rectangular shape increases from the first end to the second end; changing the shape of the internal cavity includes changing a 3-dimensional shape of the inner cavity from a cylindrical shape to a trapezoidal shape; applying a mechanical force on the coil includes inserting a second mandrel into the internal cavity of the coil to change a shape of the first end of the internal cavity compared to a shape of the second end of the internal cavity; applying a mechanical force on the coil includes applying a first mechanical force to increase a dimension of the internal cavity at one of the first end or the second end and a second mechanical force to decrease a dimension of the internal cavity at the other of the first end or the second end; the first mechanical force acts towards a central axis of the internal cavity and the second mechanical force acts away from the central axis; applying a mechanical force on the coil includes stretching the wire of the coil that defines at least one of the first end or the second end of the internal cavity; the wire is made of copper.

In one embodiment, an electric machine is disclosed. The electric machine may include a rotor configured to rotate about an axis of rotation, a stator having a plurality of teeth annularly arranged on a stator core about the axis of rotation, a plurality of electromagnetic coils, and a base plate. Each coil of the plurality of electromagnetic coils may be mounted on a separate tooth of the plurality of teeth, and the base plate may be located adjacent to the plurality of electromagnetic coils and the stator core. The base plate may be in thermal contact with the plurality of electromagnetic coils and the stator core such that as the plurality of electromagnetic coils and the stator core heat during operation, the base plate is configured to serve as a common heat sink for the plurality of electromagnetic coils and the stator core.

Various embodiments of the disclosed electric machine may alternatively or additionally include one or more of the following aspects: each coil of the plurality of electromagnetic coils is in contact with the base plate directly or through a thermally-conductive material disposed therebetween; the stator core is in contact with the base plate directly or through a thermally-conductive material disposed therebetween; further include a motor housing thermally connected to the base plate to enable heat generated by the plurality of electromagnetic coils and stator core to be dissipated through the base plate and the motor housing; the base plate includes a first side and a second side opposite the first side, wherein the plurality of electromagnetic coils and the stator core are in thermal contact with the first side of the base plate and the motor housing is in thermal contact with the second side of the base plate; the second side of the base plate includes cooling fins that extend therefrom; the cooling fins include a plurality of pins; the base plate includes a cylindrical hub portion extending around the axis of rotation; the stator core includes an annular stator ring that extends around the cylindrical hub portion of the base plate; an inner annular surface of the annular stator ring is in contact with an outer annular surface of the cylindrical hub portion of the base plate directly or through a thermally-conductive material disposed therebetween; the stator core includes an annular stator ring that extends around the axis of rotation and each tooth of the plurality of teeth includes a core tooth-portion integral with the annular stator ring; each tooth of the plurality of teeth further includes one or more additional tooth-portions non-integrally formed with the core tooth-portion; a pair of additional tooth-portions includes tooth-portions arranged on opposite sides of the core tooth-portion; when all the tooth parts are assembled together, each tooth defines external surfaces having two sets of opposing faces, the opposing faces of each set of the two sets being non-parallel to each other, and wherein each face of the two sets of opposing faces is inclined in a radial direction; opposing faces of adjacent teeth are substantially parallel to each other; a cross-section of each tooth in a plane perpendicular to the radial direction has a rectangular shape, and wherein a perimeter of the cross-section is substantially a constant in the radial direction and an area of the cross-section varies in the radial direction; the base plate is formed of aluminum; the base plate includes air vents configured to direct air to the plurality of electromagnetic coils when the rotor rotates; the electric machine is an electric motor; the electric machine is an electric generator.

In yet another embodiment, an electric machine is disclosed. The electric machine may include a rotor configured to rotate about an axis of rotation, a stator having a stator core and a plurality of teeth annularly arranged on the stator core about the axis of rotation, a plurality of electromagnetic coils, and a base plate. Each coil of the plurality of electromagnetic coils may be mounted on a separate tooth of the plurality of teeth. The base plate may be located adjacent to the plurality of electromagnetic coils and the stator core. The base plate may have a first side and an opposing second side. The first side may be in thermal contact with the plurality of electromagnetic coils and the stator core. A liquid-coolant channel may be defined on the second side of the base plate such that as the coils and the stator core heats during operation, the base plate is configured to transfer the heat to a liquid coolant in the liquid-coolant channel to dissipate heat from the plurality of electromagnetic coils and the stator core.

Various embodiments of the disclosed electric machine may alternatively or additionally include one or more of the following aspects: each coil of the plurality of electromagnetic coils is in contact with the base plate directly or through a thermally-conductive material disposed therebetween; the stator core is in contact with the base plate directly or through a thermally-conductive material disposed therebetween; further include a motor housing thermally connected to the base plate to enable heat generated by the plurality of electromagnetic coils and stator core to be dissipated through the base plate and the motor housing; the base plate includes a first side and a second side opposite the first side, wherein the plurality of electromagnetic coils and the stator core are in thermal contact with the first side of the base plate and the motor housing is in thermal contact with the second side of the base plate; a wall of the liquid-coolant channel is a portion of the second side of the base plate directly opposite a portion of the first side of the base plate that is in thermal contact with the plurality of electromagnetic coils; the liquid-coolant channel extends around the axis of rotation and an annular region on the second side of the base plate serves as a wall of the liquid-coolant channel; the annular region on the second side of the base plate includes a plurality of fins that extend into the liquid-coolant channel; the plurality of fins is arranged about the axis of rotation; further include a coolant inlet configured to direct the coolant into the liquid-coolant channel and a coolant outlet configured to direct the coolant out of the liquid-coolant channel; the base plate includes a cylindrical hub portion extending around the axis of rotation and the stator core includes an annular stator ring that extends around the cylindrical hub portion of the base plate, and the liquid-coolant channel passes through the cylindrical hub portion along the axis of rotation; an inner annular surface of the annular stator ring is in contact with an outer annular surface of the cylindrical hub portion of the base plate directly or through a thermally-conductive material disposed therebetween; each tooth of the plurality of teeth includes a core tooth-portion integrally formed with the annular stator ring and at least one additional tooth-portion non-integrally formed with the core tooth-portion; the annular stator ring and the core tooth-portion are formed of a Soft Magnetic Composite (SMC); when the core tooth-portion and at least one additional tooth-portion are assembled together, each tooth defines external surfaces having two sets of opposing faces, the opposing faces of each set of the two sets being non-parallel to each other, and wherein each face of the two sets of opposing faces is inclined in a radial direction; opposing faces of adjacent teeth are parallel to each other; a cross-section of each tooth in a plane perpendicular to the radial direction has a trapezoidal shape, and wherein a perimeter of the cross-section is substantially a constant in the radial direction and an area of the cross-section varies in the radial direction; the base plate is formed of aluminum; the electric machine is an electric motor; the electric machine is an electric generator.

BRIEF DESCRIPTION OF THE DRAWINGS

The accompanying drawings, which are incorporated in and constitute a part of this disclosure, illustrate exemplary embodiments and, together with the description, are used to explain the disclosed principles. In these drawings, where appropriate, reference numerals illustrating like structures, components, materials, and/or elements in different figures are labeled similarly. It is understood that various combinations of the structures, components, and/or elements, other than those specifically shown, are contemplated and are within the scope of the present disclosure.

For simplicity and clarity of illustration, the figures depict the general structure of the various described embodiments. Details of well-known components or features may be omitted to avoid obscuring other features, since these omitted features are well-known to those of ordinary skill in the art. Further, elements in the figures are not necessarily drawn to scale. The dimensions of some features may be exaggerated relative to other features to improve understanding of the exemplary embodiments. One skilled in the art would appreciate that the features in the figures are not necessarily drawn to scale and, unless indicated otherwise, should not be viewed as representing proportional relationships between different features in a figure. Additionally, even if it is not specifically mentioned, aspects described with reference to one embodiment or figure may also be applicable to, and may be used with, other embodiments or figures.

FIGS. 28A-31B illustrate geometric features of an exemplary tooth;

FIGS. 45A-45F are schematic illustrations of an exemplary method of installing a coil on a multi-part tooth in an electric machine of the current disclosure;

FIGS. 46A-46C are simplified schematic illustrations of an exemplary method of installing a coil on a multi-part tooth in an electric machine of the current disclosure;

FIG. 47 is a flow chart of an exemplary method of installing a coil on a multi-part tooth in an electric machine of the current disclosure.

FIG. 52 is a flow chart of an exemplary method of forming a coil of an electric machine of the current disclosure.

DETAILED DESCRIPTION

It should be noted that all relative terms such as "about," "substantially," "approximately," etc. are used to indicate a possible variation of up to 15% (unless noted otherwise or another variation is specified). For example, the cross-sectional area of a first region described in this disclosure as being substantially equal to, or substantially the same as, the cross-sectional area of a second region covers a variation in cross-sectional area of up to 15% in its ambit. Similarly, a dimension substantially equal "t" units (width, length, etc.) covers a variation of up to 15%. Additionally, a dimension described as being between a range (e.g., X-Y, X to Y, etc.) includes the two boundaries. That is, a dimension between X-Y can be any dimension between X−15% to X+15%. Unless indicated otherwise, all terms relating to the shape of an object or area refers to approximate shapes. For example, a cross-sectional shape described as being square (rectangular, trapezoidal, etc.) does not necessarily refer to an exact square (unless it is described as being such). Instead, slight variations in the described shape (e.g., resulting from manufacturing processes, tolerances, etc.) are also covered. For example, the corners of cross-sectional area described as being square may have rounded (or chamfered) corners, variations in corner angle of up to 15%, variations in parallelism between the opposite sides of 15%, etc.

Unless defined otherwise, all terms of art, notations and other scientific terms or terminology used herein have the same meaning as is commonly understood by one of ordinary skill in the art to which this disclosure belongs. Some of the components, structures, and/or processes described or referenced herein are well understood and commonly employed using conventional methodology by those skilled in the art. Therefore, these components, structures, and processes will not be described in detail. All patents, applications, published applications and other publications referred to herein are incorporated by reference in their entirety. If a definition or description set forth in this disclosure is contrary to, or otherwise inconsistent with, a definition and/or description in these references, the definition and/or description set forth in this disclosure prevails over those in the references that are incorporated by reference. None of the references described or referenced herein is admitted as prior art to the current disclosure.

Figure 1:
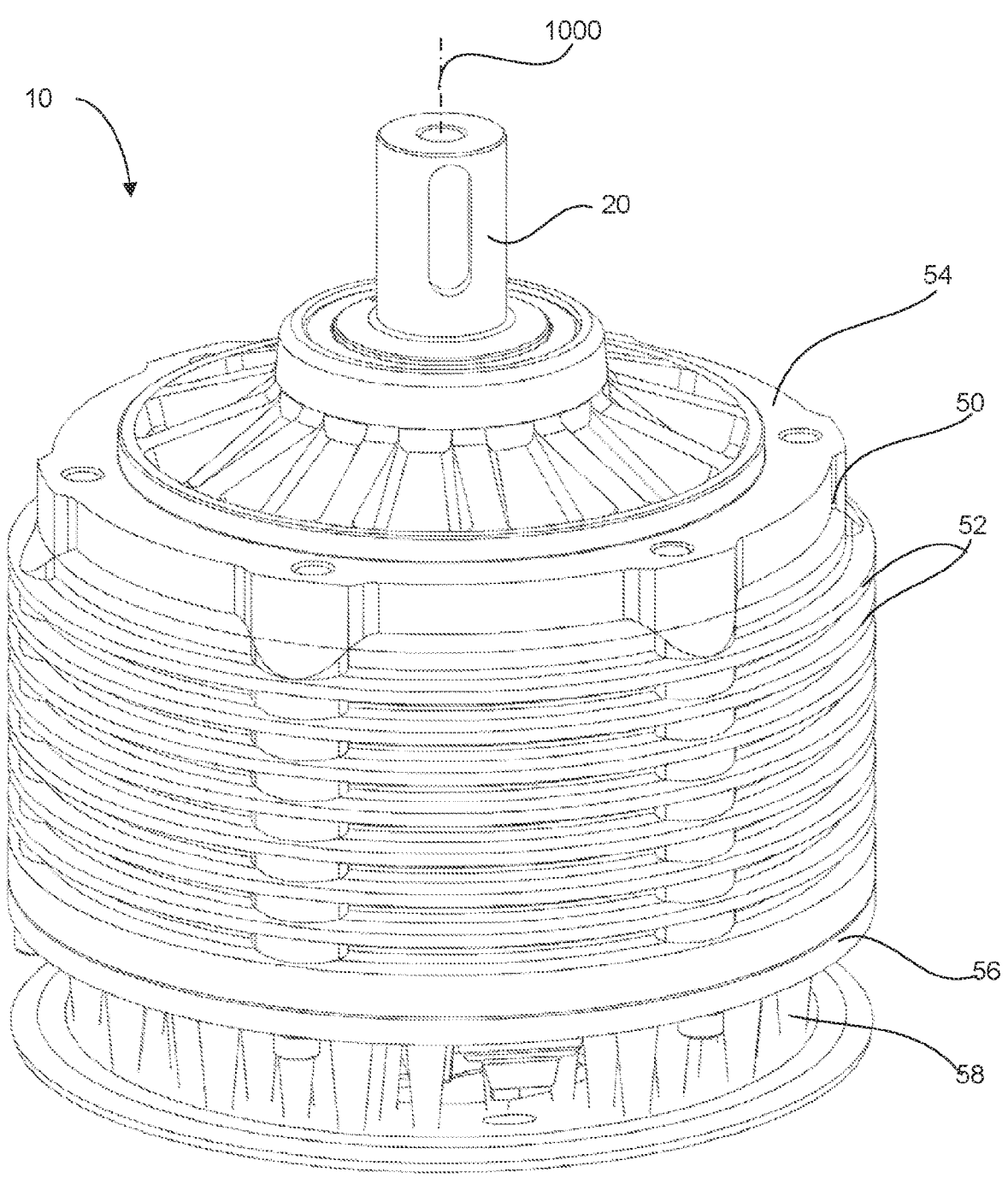
FIG. 1 illustrates a perspective view of one embodiment of an exemplary electric machine consistent with the current disclosure.

Various embodiments of the current disclosure include a radial flux electric machine. As used herein, an electric machine (or electrical machine) is a device that operates based on electromagnetic forces. In general, any type of electromechanical energy converter that operates on, or generates, electricity is an electric machine. Although not required, in some embodiments, the electric machine may be an electric motor or an electric generator. During operation, an electric machine generates magnetic flux. In a radial flux electric machine, at least some portions of the generated magnetic flux extends perpendicular to the axis of rotation of the machine. Electric machines include a stator and a rotor separated by an air gap. In a radial flux electric machine, the working (or main) magnetic flux may extend between the rotor and the stator through the air gap in the radial plane. FIG. 1 illustrates an exemplary radial flux electric machine 10 of the current disclosure. Internal details of electric machine 10 will be described with reference to FIGS. 2 and 3. Electric machine 10 illustrated in FIG. 1 may be an air-cooled system with a housing 50. External ribs 52 may be positioned on the surface of the housing 50 between an end shield 54 and a stator base plate 56. As illustrated in FIG. 1, the base plate 56 may include a plurality of pins 58 extending therefrom. The ribs 52 and pins 58 may assist in transferring the heat generated by the electric machine 10 during operation to the surrounding air. In the discussion below, electric machine 10 in the form of an electric motor will be described. However, the description is equally applicable to other types of electric machines, such as, for example, an electric generator. When electric machine 10 operates, its shaft 20 rotates.

Figure 2:
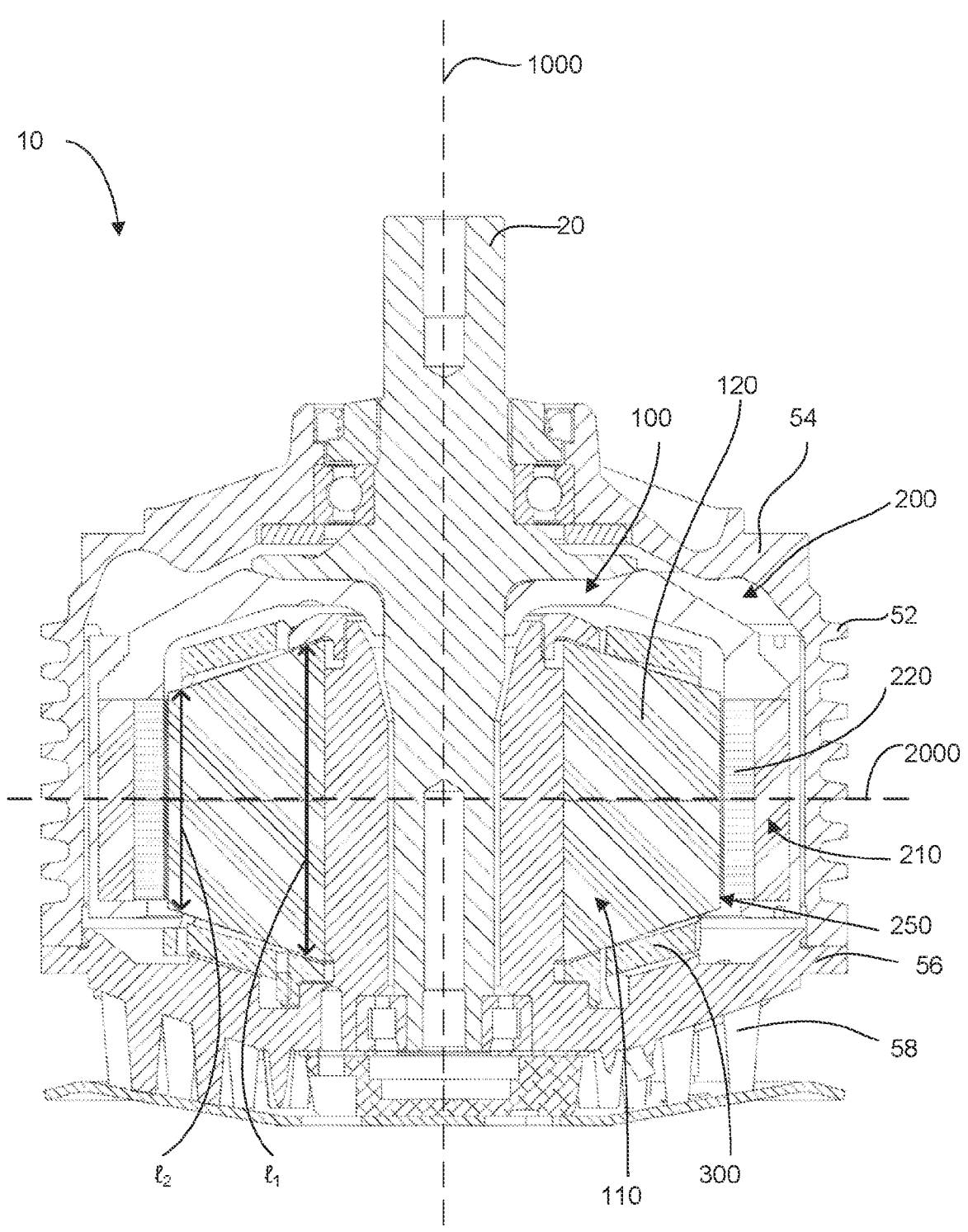
FIG. 2 is a cross-sectional view of the electric machine of FIG. 1 in an axial plane.
Figure 3:
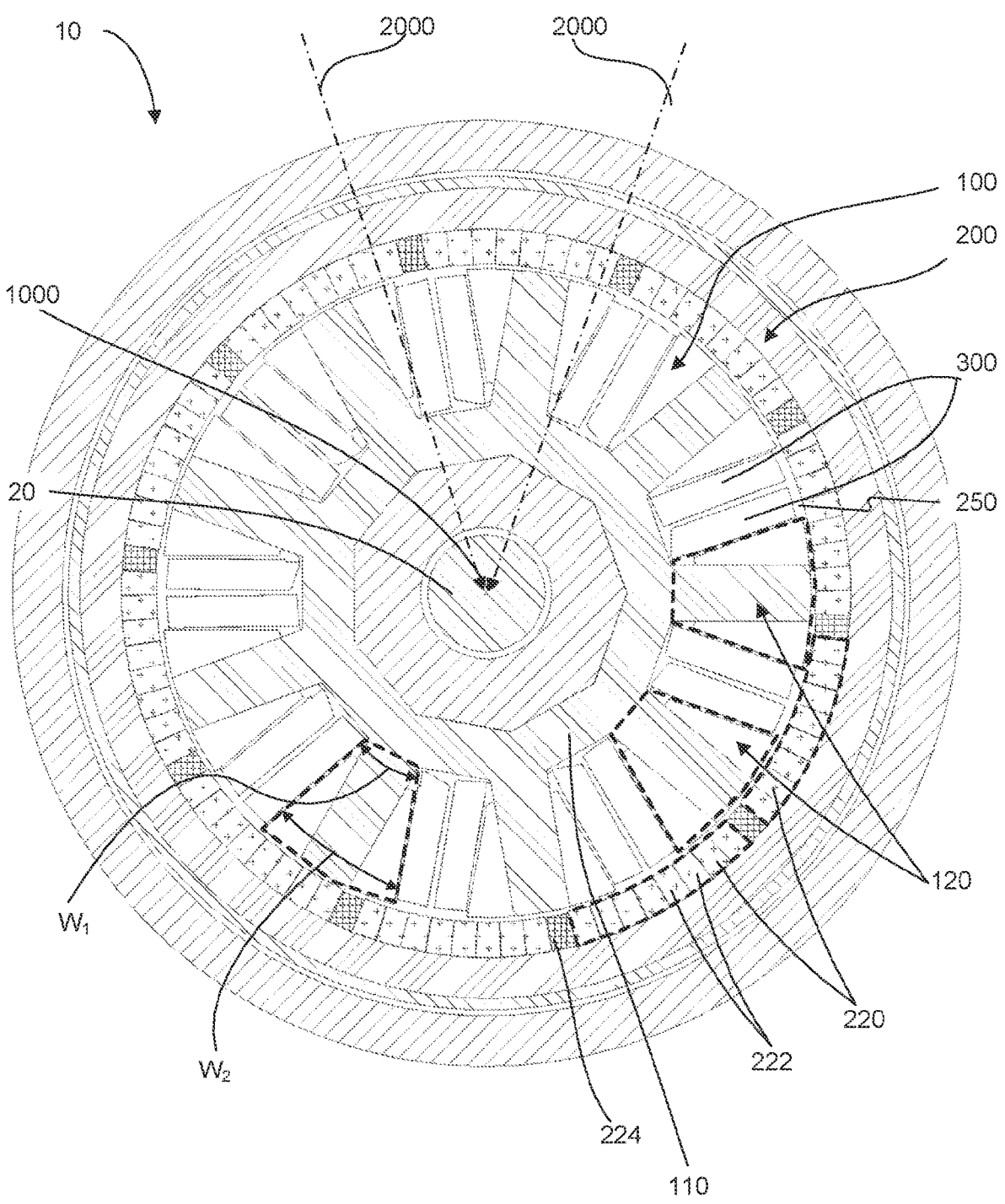
FIG. 3 illustrates a cross-sectional view of the electric machine of FIG. 1 in a radial plane.

Electric machines of the current disclosure may include a rotor configured to rotate about an axis of rotation and a stator. As used herein, a stator is any stationary or fixed part, component, or assembly (of components) of the electric machine, and the rotor is a part, component, or assembly that is configured to move with respect to the stator. In some embodiments, the rotor may be configured to rotate about an axis of rotation relative to the stator. The rotor is coupled to a shaft (rotor shaft) that rotates with the rotor. The axis about which the rotor (and the shaft) rotates is referred to as the "axis of rotation." FIG. 2 illustrates a cross-sectional view of electric machine 10 (of FIG. 1) along an axial plane of the machine 10, and FIG. 3 illustrates a cross-sectional view of machine 10 along a radial plane of machine 10. Axial plane refers to an imaginary plane that that the axis of rotation of the machine lies in (or is a part of). In other words, every point of the axis of rotation of the machine lines in the axial plane. In FIG. 2, the axis of rotation 1000 of machine 10 lies in the axial plane, and the axial plane bisects the machine 10 into two symmetric halves. Radial plane refers to a plane that extends perpendicular to the axis of rotation. The axis of rotation 1000 extends perpendicular (e.g., into and out of the paper) to the radial plane.

In the discussion below, reference will be made to FIGS. 2 and 3. Electric machine 10 includes a rotor 200 and a stator 100. The rotor 200 is configured to rotate about the axis of rotation 1000 with respect to the stator 100. The stator 100 includes a stator core 110 comprising a plurality of teeth 120, and the rotor 200 includes a rotor core 210 comprising a plurality of permanent magnets 220. Electromagnetic coils 300 are mounted on the teeth 120 of the stator 100. The rotor 200 is connected to the shaft 20 that is configured to rotate about the axis of rotation 1000. When electric power is provided to the coils 300, a magnetic field is generated. Based on the generated magnetic field, magnetic flux flows between the rotor 200 and the stator 100, thereby providing a rotary force to the rotor. Electric machine 10 may be used as a power source in any application. For example, in an electric vehicle, the electric machine 10 may drive the wheels of the electric vehicle.

In electric machines of the current disclosure, at least one of the rotor and/or the stator may include a plurality of teeth annularly arranged about the axis of rotation. As used herein, teeth refers to projections that protrude from a body. The teeth may include a series of substantially similar projections that protrude from the body. For example, in embodiments where the rotor includes teeth, a series of substantially similar projections that protrude from a body or a core of the rotor comprise the teeth. And in embodiments where the stator includes teeth, a series of substantially similar projections that protrude from a body or core of the stator comprise the teeth. In a radial flux electric machine, the teeth protrude in the radial plane. In other words, the teeth line in the radial plane and protrude (inward or outward) in the radial direction. Each projection forms a tooth. Typically, the projections (or teeth) are configured or shaped to direct a substantial portion of the magnetic flux between the stator and the rotor. With reference to FIGS. 2 and 3, in electric machine 10, the stator 100 includes a plurality of teeth 120 arranged annularly and symmetrically about the axis of rotation 1000 on a core 110 of the stator 100. As will be explained in more detail later, each tooth 120 includes multiple pieces or parts that are arranged together to form a composite or a multi-part tooth 120. The outline of three teeth 120 are shown using dashed lines in FIG. 3. As will be described in more detail later, each tooth 120 may have a trapezoidal cross-sectional shape in both the axial plane (see FIG. 2) and the radial plane (see FIG. 3).

As can be seen in FIG. 3, the rotor 200 is separated from the stator 100 by an air gap 250. In some embodiments, as described previously, depending on the configuration of the rotor 200 and the stator 100, multiple air gaps may separate the rotor 200 and the stator 100. In the exemplary embodiment illustrated in FIGS. 2 and 3, the stator 100 includes nine teeth 120 and the rotor 200 includes ten permanent magnets 220 (identified using dashed lines in FIG. 3). However, this is only exemplary. In general, any number of teeth 120 and permanent magnets 220 may be provided. As best seen in FIG. 3, each permanent magnet 220 may include multiple permanent magnet segments 222 coupled together in the form of an arc about the axis of rotation 1000. Any number of segments 222 may be included in each permanent magnet 220. In some embodiments, all permanent magnets 220 may include the same number of segments 222. In some embodiments, the multiple segments 222 may be attached together (e.g., by an adhesive material) to form a permanent magnet 220. Any type of permanent magnet may be used. In some embodiments, the permanent magnets 220 may include one or more of ferrites, alnico, samarium cobalt, or a neodymium alloy. In some embodiments, each permanent magnet 220 may be coated with an electrically non-conductive material. In some embodiments, adjacent permanent magnets 220 may be separated from each other by spacers 224. The spacers 224 may be made of an electrically non-conductive material and may be attached to the adjacent permanent magnets 220 by an adhesive material (e.g., glue). In some embodiments, the spacers 224 may be eliminated and adjacent permanent magnets 220 may be separated from each other by a space or a gap.

The electric machines of the current disclosure may include a plurality of electromagnetic coils. An electromagnetic coil (or an electric coil) may include one or more turns of an electrical conductor that generates a magnetic field when an electric current is passed through the conductor (e.g., in electric motors), or generates a voltage across the conductor when a magnetic field passes over the coil. In some embodiments, the turns of electrical conductor may be configured or shaped like a coil, loop, twist, curl, or a spiral. In some embodiments, an electromagnetic coil may be an electrical conductor that contains a series of conductive wires configured to be wrapped around a ferromagnetic core. In general, electromagnetic coils of the current disclosure may be associated with the stator or the rotor of the electric machine. That is, in some embodiments, the plurality of coils may be coupled to (e.g., mounted, installed, wound on, etc.) the rotor and in other embodiments, the plurality of coils may be coupled to the stator. In the exemplary embodiment of electric machine 10 illustrated in FIGS. 2 and 3, a plurality of electromagnetic coils 300 are coupled to the stator 100. It should also be noted that the configuration of the electric machine 10 illustrated in FIGS. 2 and 3 is only exemplary.

In the electric machine 10 of FIGS. 2 and 3, a single rotor 200 is positioned radially outwards a single stator 100. However, this configuration is only exemplary, and electric machines of the current disclosure may have other configurations. FIGS. 8A-8E are schematic illustrations of exemplary configurations of electric machines of the current disclosure showing the layout of the stator 100 relative to the rotor 200. In each case, the rotor 200 is connected to a shaft 20 that rotates about the axis of rotation 1000, and includes a plurality of permanent magnet segments 220 arranged annularly about the axis of rotation 1000. And the stator includes a plurality of teeth 120 arranged annularly about the axis of rotation 1000. Each tooth 120 comprises multiple parts and has a trapezoidal cross-sectional shape in both the axial and radial planes (as in FIGS. 2, 3). And coils 300 are mounted on one or more of the teeth 120.

Figure 8A:
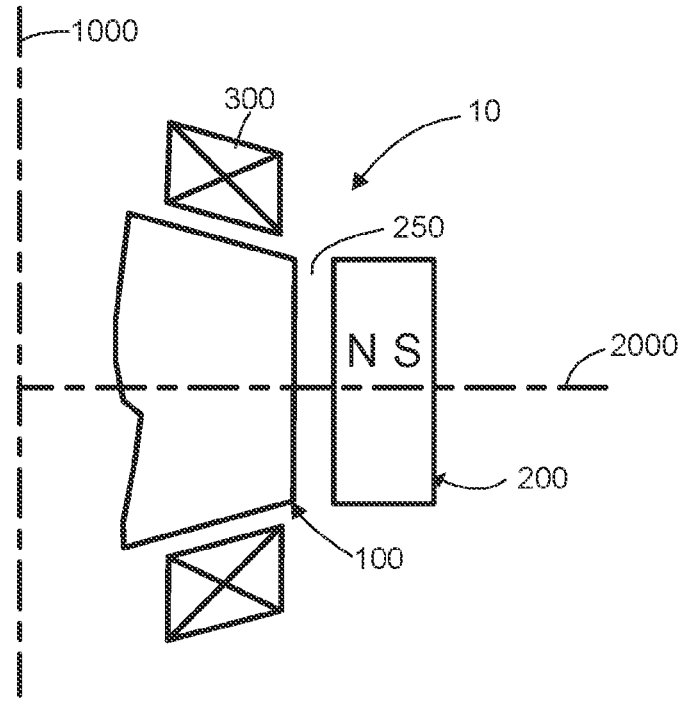
FIGS. 8A-8E are schematic illustrations of exemplary electric machines consistent with the current disclosure.
Figure 8B:
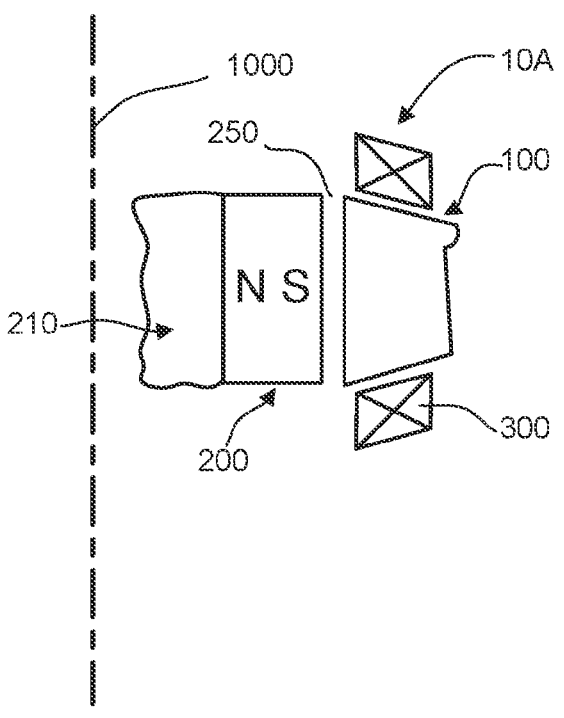
Figure 8C:
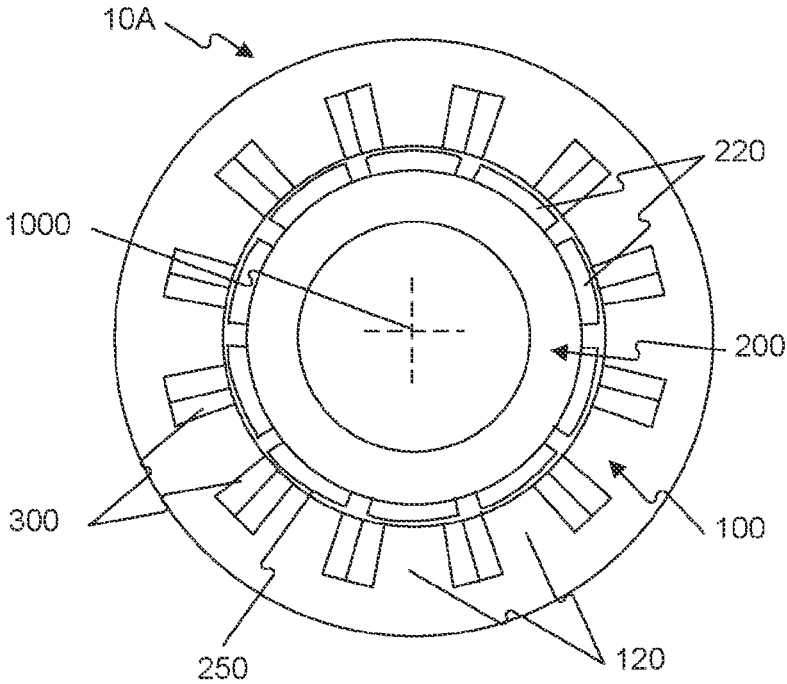

FIG. 8A schematically illustrates the electric machine 10 of FIGS. 2 and 3 where the rotor 200 is positioned outside the stator 100. In such an embodiment, a width of each tooth 120 in the radial plane increases in the radial direction (see FIG. 3) towards the air gap 250 (and the rotor 200), and a length of each tooth 120 in an axial plane decreases in the radial direction towards the air gap 250 (see FIG. 2). That is, with reference to FIGS. 2 and 3, $l_1>l_2$ and $w_1<w_2$. In electric machine 10A of FIG. 8B, the rotor 200 is positioned radially inwards of the stator 100. That is, in contrast with electric machine 10 of FIG. 8A, the rotor 200 of machine 10A is positioned closer to the axis of rotation 1000 than its stator 100. FIG. 8C illustrates a cross-sectional view of electric machine 10A (of FIG. 8B) in the radial plane. In electric machine 10A of FIGS. 8B and 8C, the width of the stator tooth 120 in the radial plane (see FIG. 8C) decreases in a radially inward direction towards the rotor 200 and the air gap 250, and its length in the axial plane (view illustrated in FIG. 8B) increases in the radially inward direction towards the rotor 200.

Figure 8D:
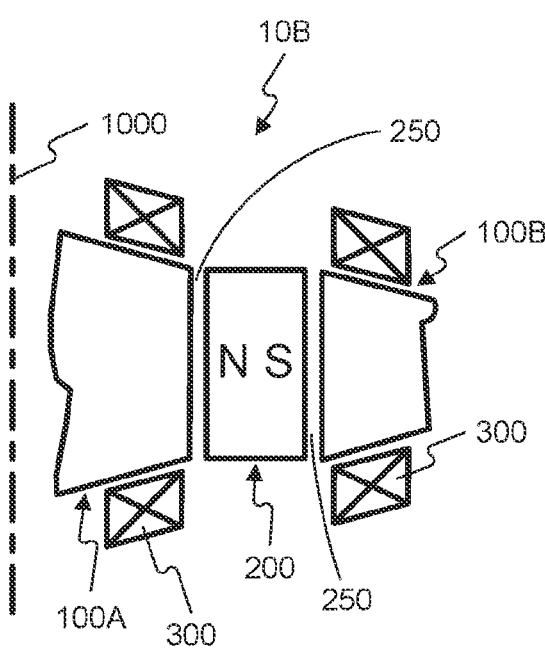

Electric machine 10B of FIG. 8D includes two stators 100A, 100B positioned on opposite sides of the rotor 200. Both the inner and the outer stator 100A, 100B include a plurality or multi-part teeth 120 annularly arranged about the axis of rotation 1000. In electric machine 10B, the width of each tooth 120 (in the radial plane) of the inner stator 100A increases in the radially outward direction toward the rotor 200 (and air gap 250), and the width of each tooth 120 of the outer stator 100B decreases in the radially inward direction toward the rotor 200 (and air gap 250). Conversely, as shown in FIG. 8D, the length of each tooth 120 (in the axial plane) of the inner stator 100A decreases in the radially outward direction toward the rotor 200, and the length of the teeth 120 (in the axial plane) of the outer stator 100B increases in the radially inward direction toward the rotor 200. In other words, if the width of a tooth 120 decreases in one direction its length increases in that same direction, and vice versa.

Figure 8E:
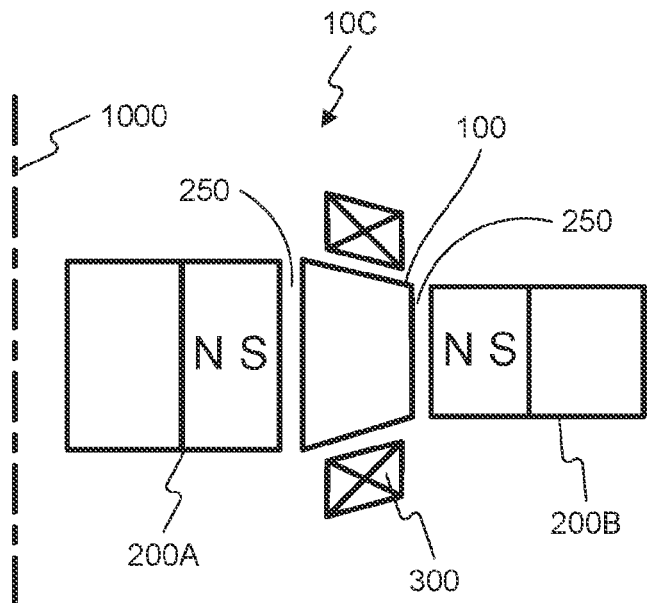

Electric machine 10C of FIG. 8E includes two rotors 200A, 200B positioned on opposite sides of the stator 100. In such a configuration, the width of the stator tooth 120 (in the radial plane) increases in a radially outward direction towards the outer rotor 200B and decreases in a radially inward direction towards the inner rotor 200A. Conversely, as evident from FIG. 8E, the length of the stator tooth 120 (in the axial plane) decreases in a radial outward direction toward the outer rotor 200B and increases in a radially inward direction toward the inner rotor 200A. The cross-sectional area of each tooth 120 may increase in the radially outward direction. In electric machines 10-10C (of FIGS. 8A-8E), a coil 300 is mounted on each tooth 120 such that it is positioned close to the air gap 250 between the stator and the rotor.

Figure 9:
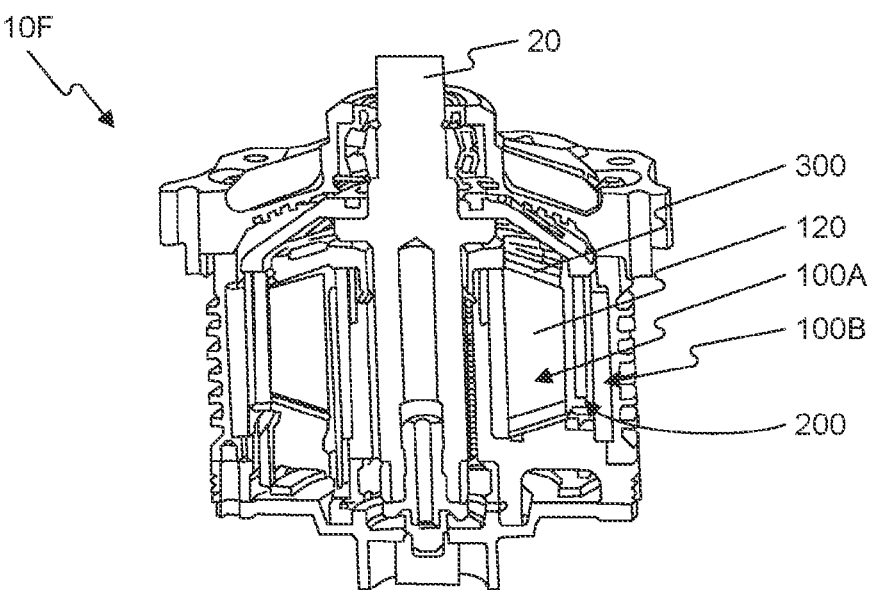
FIGS. 9-10 illustrate other exemplary electric machine consistent with the current disclosure.

FIG. 9 illustrates an exemplary electric machine 10F which includes an inner stator 100A and an outer stator 100B positioned on radially opposite sides of the rotor 200. Each of the inner and outer stators 100A, 100B are separated from the rotor 200 by an air gap 250 (not visible in FIG. 9). That is, electric machine 10F is a double air gap electric machine. A coil 300 is mounted on the inner stator 100A. Unlike the double stator electric machine 10B of FIG. 8D, in electric machine 10F of FIG. 9, a coil 300 is not mounted on the outer stator 100B. Instead, a coil 300 is only mounted on the teeth 120 of the inner stator 100A.

Figure 10:
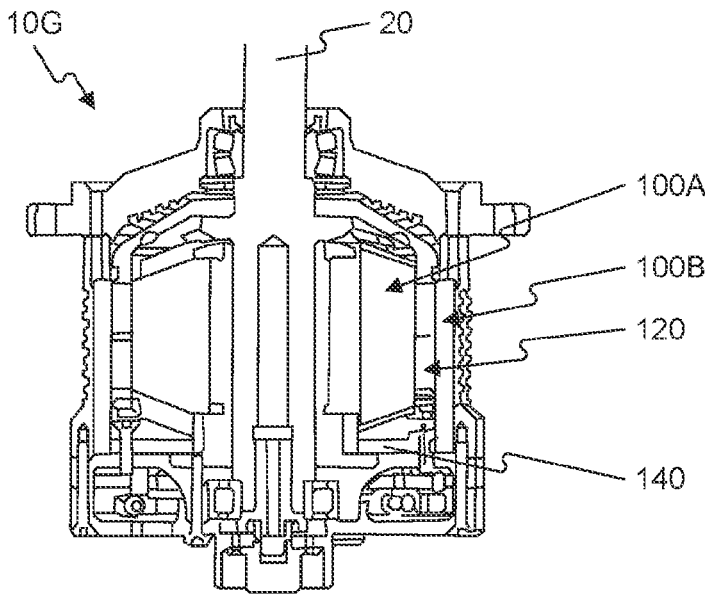
Figure 11:
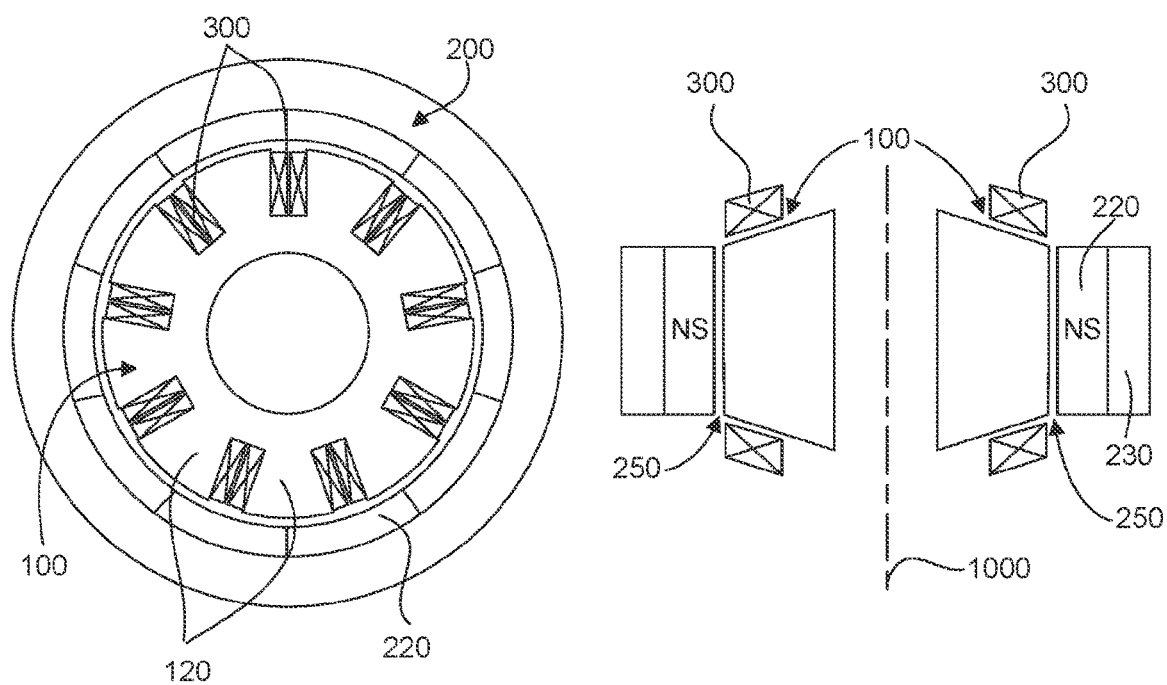
FIGS. 11-22 are schematic illustrations of further exemplary electric machines of the current disclosure.

FIG. 10 illustrates an exemplary double stator electrical machine 10G which differs from an electrical machine 10F (of FIG. 9) in that the inner and outer stators 100A, 100B are connected by a magnetically conducting bridge 140. Bridge 140 may be made of any suitable material, such as, for example, laminated steel, SMC, etc. SMC may provide isotropic magnetic properties (i.e., the ability to conduct magnetic flux the same in all directions) to the bridge 140. It should be noted that the configurations of electric machines discussed above are only exemplary. Many other variations are possible. Each of these variations of electric machines include multi-part teeth 120 having a trapezoidal cross-sectional shape in the radial and axial planes with coils 300 mounted on one or more teeth 120, as will be discussed in more detail later.

FIGS. 11-22 are schematic illustrations of some exemplary variations of radial flux electric machines of the current disclosure having multi-part teeth 120 with a trapezoidal cross-sectional shape in the radial and axial planes. In these figures, a cross-sectional representation of the electric machine in the axial plane is shown on the left side and a cross-sectional representation of the electric machine in the radial plane is shown on the right side. For the sake of brevity, only aspects of each electric machine that are different from other described embodiments will be described below. In the electric machine of FIG. 11, the rotor 200 is mounted radially outside the stator 100. A plurality of multi-part teeth 120 are assembled and arranged in the form of a ring on the stator 100. Coils 300 extend around each tooth 120. In the rotor 200, the permanent magnets 220 are annularly arranged in slots formed a drum 230 of the rotor 200 to form an air gap 250 between the stator 100 and the rotor 200.

Figure 12:
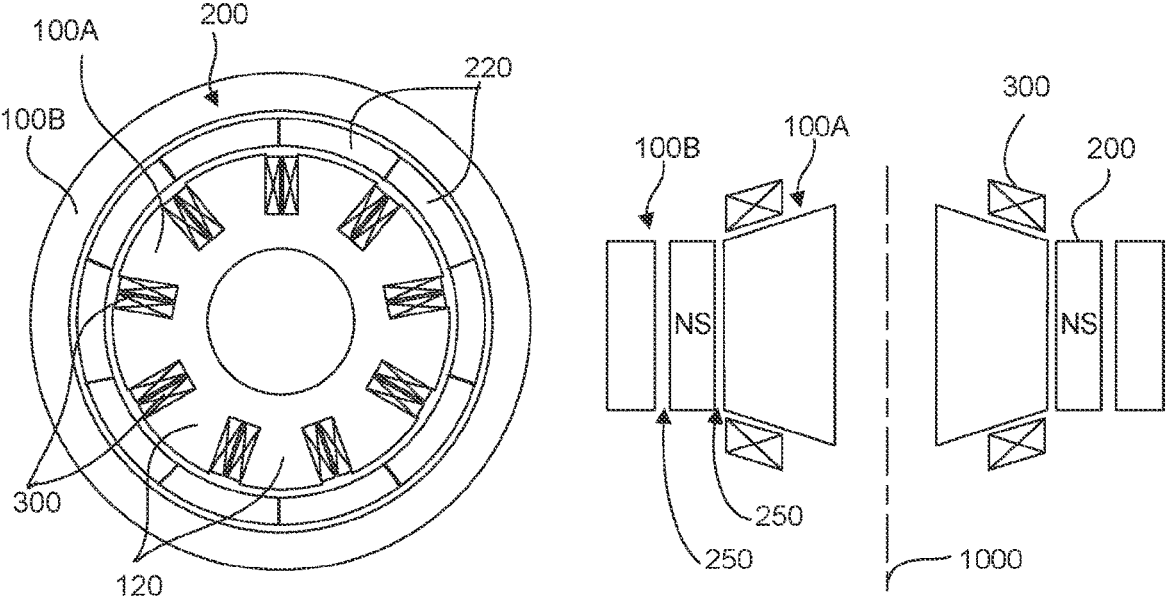

In the electric machine of FIG. 12, the rotor 200 is installed radially between an inner and an outer stator 100A, 100B. The inner stator 100A is made in the form of a ring and contains trapezoidal teeth 120. As will be explained later (with reference to FIGS. 23A-23K), in the electric machines of FIGS. 11 and 12, each tooth 120 is formed of a core tooth-portion 122 formed integrally with an annular part 130 of the stator core 110 and one or more additional wedge-shaped tooth-portions 124A-124F assembled together to form a trapezoidal tooth 120. The rotor 200 is configured to rotate between the inner and outer stators 100A, 100B with air gaps 250 formed between each of the inner and outer stators 100A, 100B and the rotor 200. Electric machines with two air gaps (e.g., FIGS. 12, 13, etc.) are referred to as double air gap electric machines.

Figure 13:
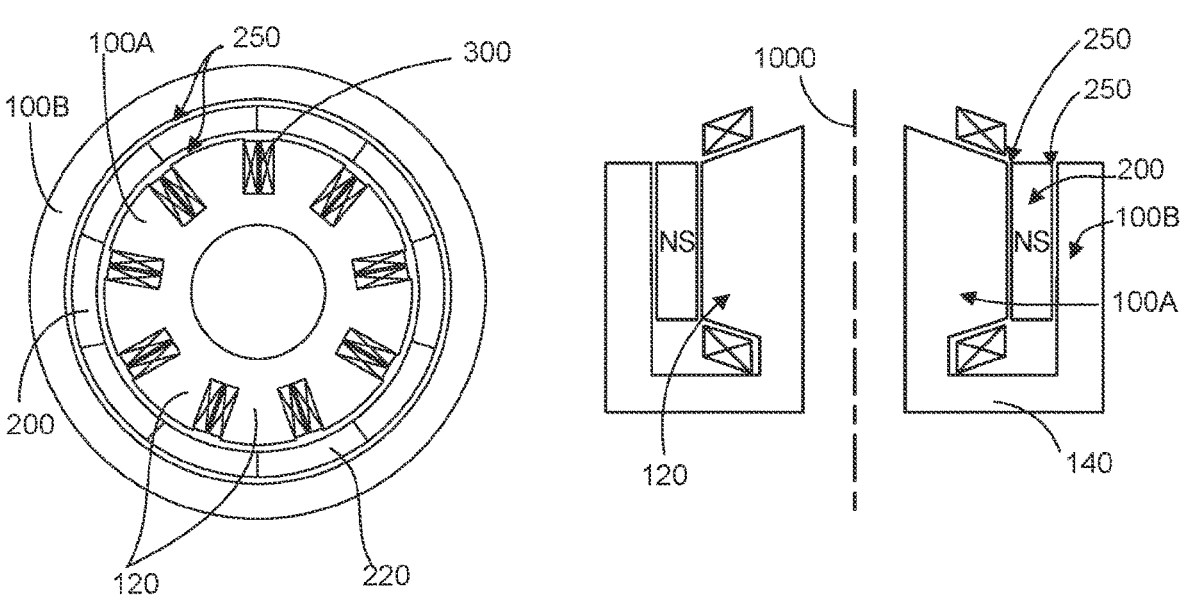
Figure 14:
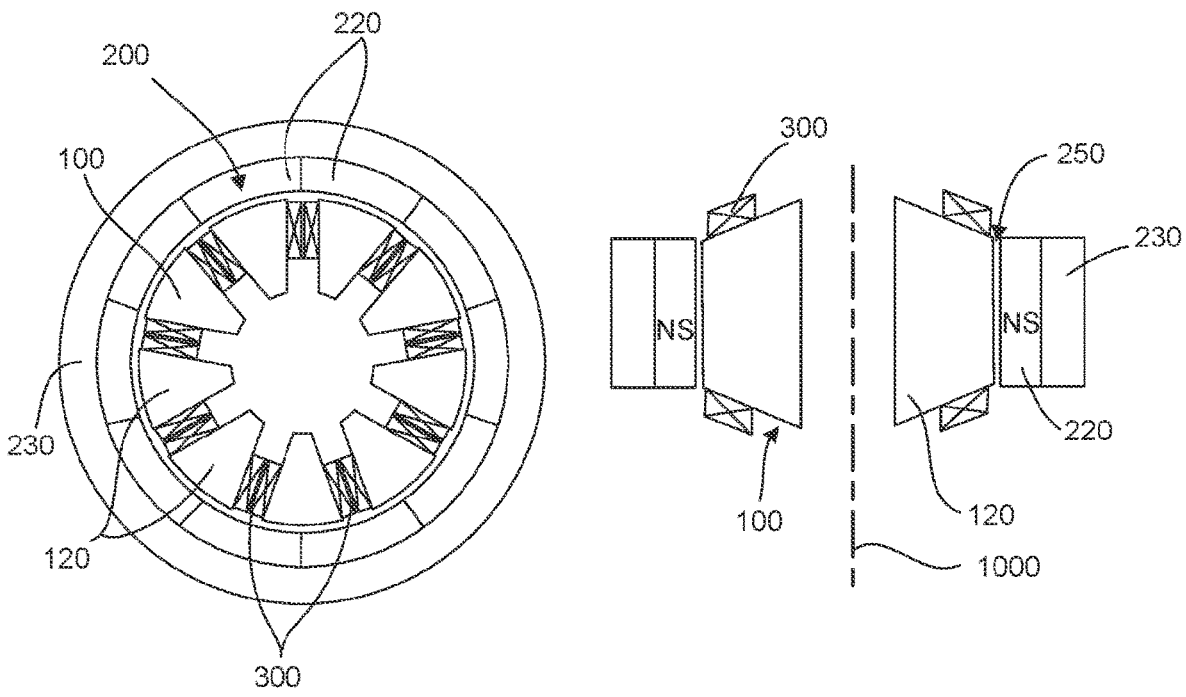

In the electric machine of FIG. 13, as in the embodiment of FIG. 12, the rotor 200 is installed between the inner and outer stators 100A, 100B, and the inner stator 100A is made in the form of a ring and includes a plurality of multi-part teeth 120. The inner and outer stators 100A, 100B are connected by a magnetically conductive bridge 140. The electric machine of FIG. 14 is similar to the electric machine of FIG. 11, except that its teeth 120 are formed separate parts that are assembled on the stator 100 (see, e.g., FIGS. 23L-23N, 24A-24D). That is, in the embodiment of FIG. 14, as will be described with reference to FIGS. 23L-23N, each tooth 120 may be formed of multiple parts that are separate from the stator core 110.

Figure 15:
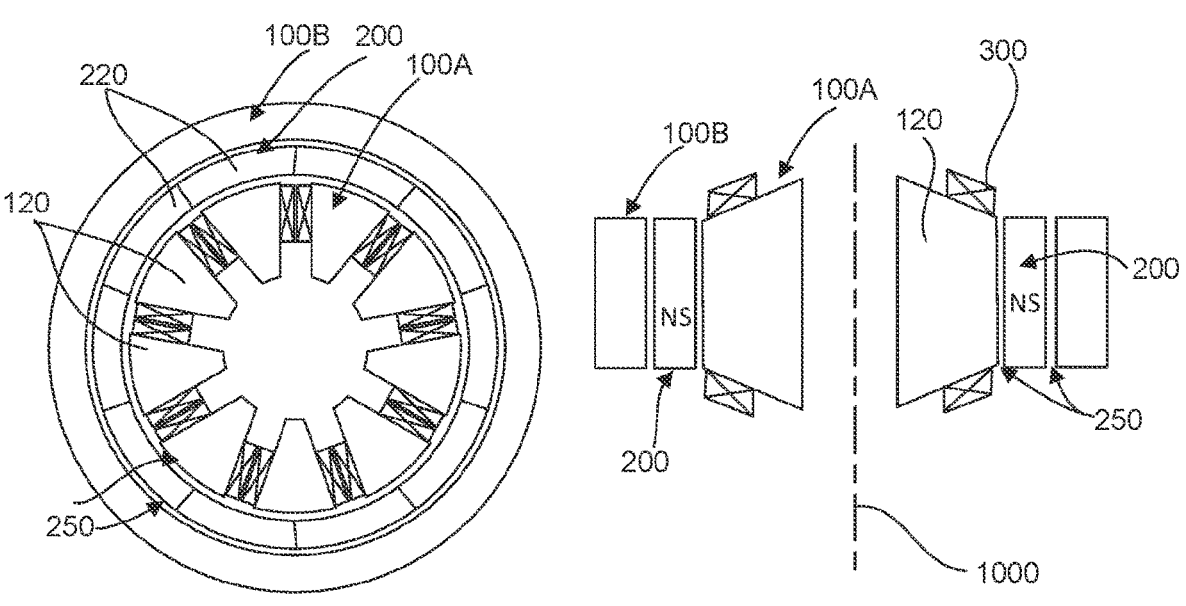
Figure 16:
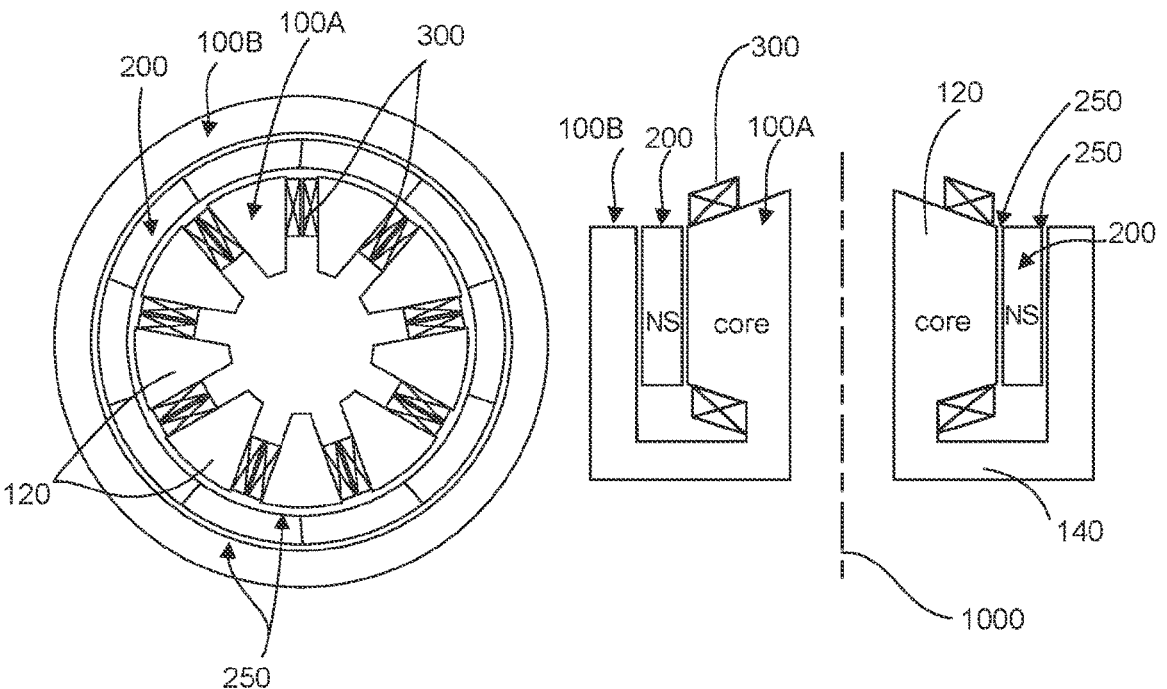
Figure 17:
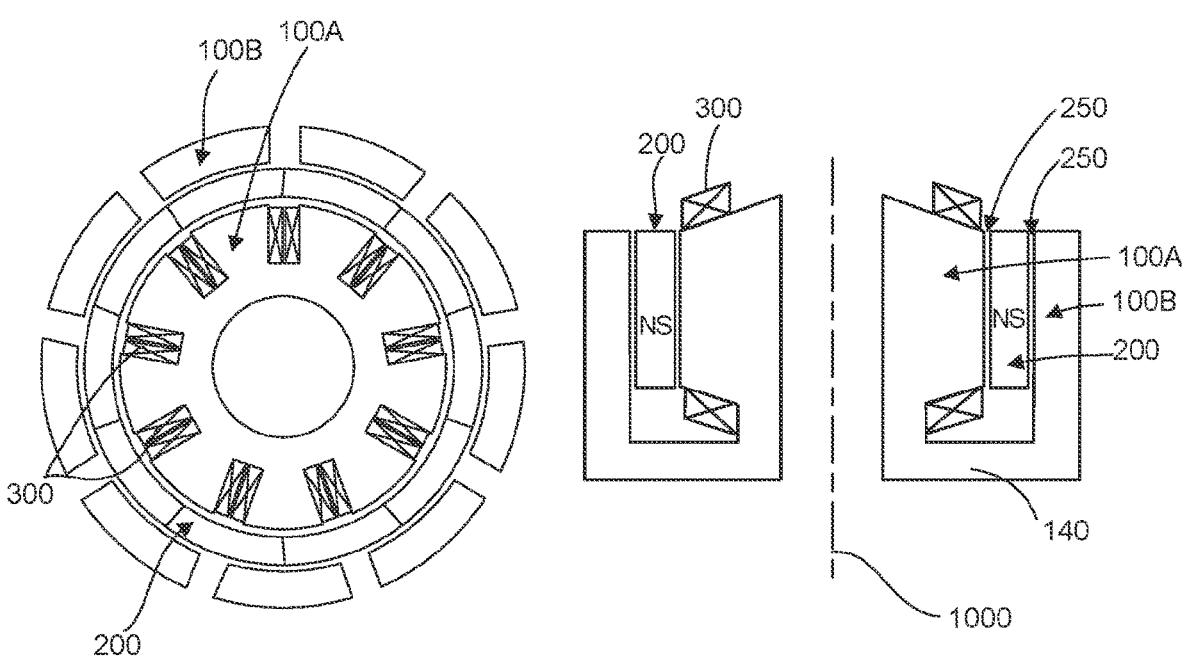
Figure 18:
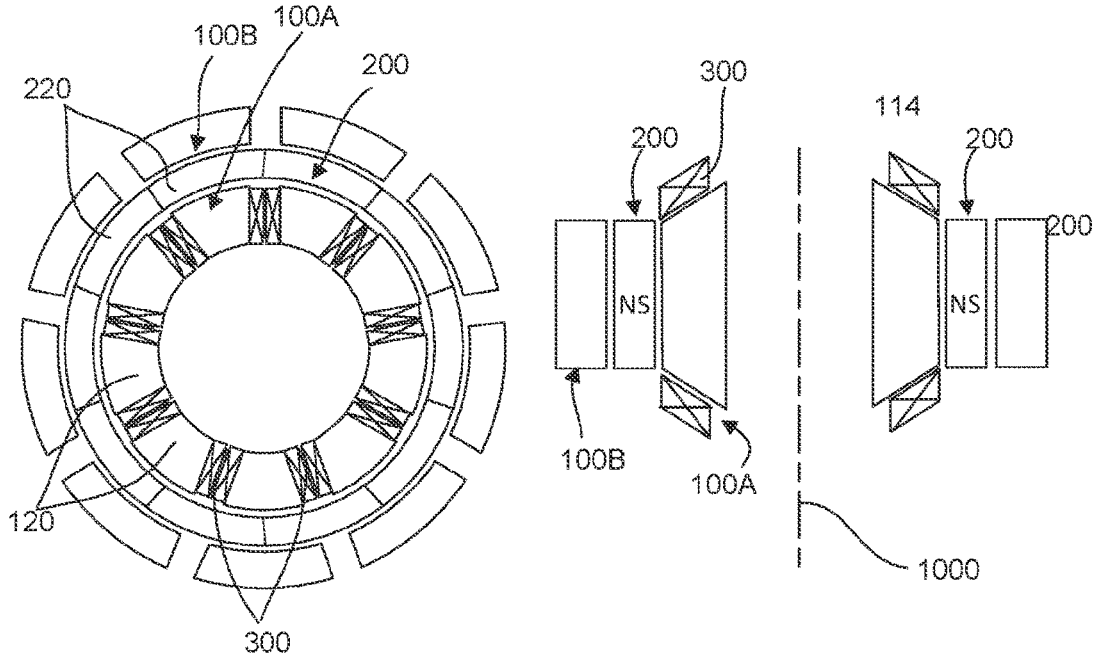

FIG. 15 illustrates an electric machine where the rotor 200 is installed between inner and outer stators 100A, 100B, and the teeth 120 are separate from the stator 100 (as explained with reference to FIG. 14). The electric machine of FIG. 16 is similar to the electric machine of FIG. 15 except that a bridge 140 connects the inner and outer stators 100A, 100B. In the electric machine of FIG. 17, the rotor 200 is installed between inner and outer stators 100A, 100B that are connected together by a bridge 140. The inner stator 100A includes multi-part trapezoidal teeth 120 similar to that in the electric machine of FIG. 12, and the outer stator 100A is made of separate arc-shaped segments arranged in a ring. The electric machine of FIG. 18 is similar to the electric machine of FIG. 17 except that its teeth 120 on the inner stator 100A are similar to that in the electric machine of FIG. 14.

Figure 19:
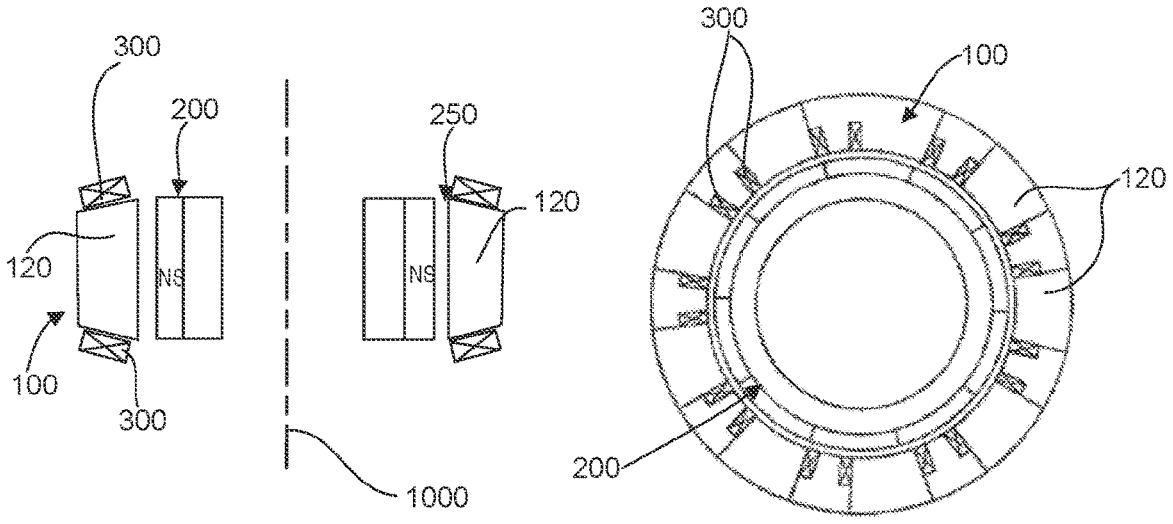
Figure 20:
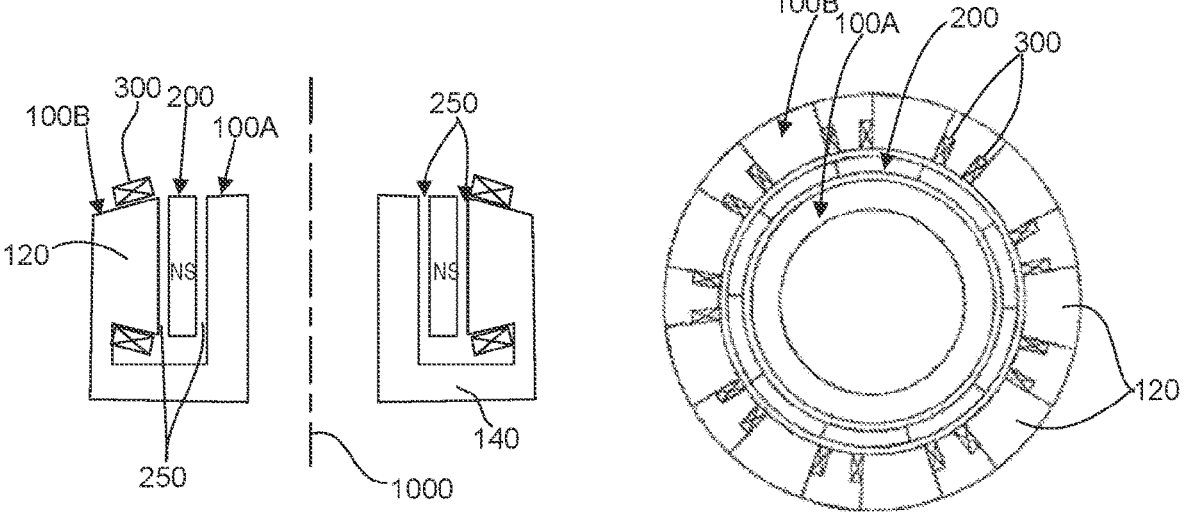
Figure 21:
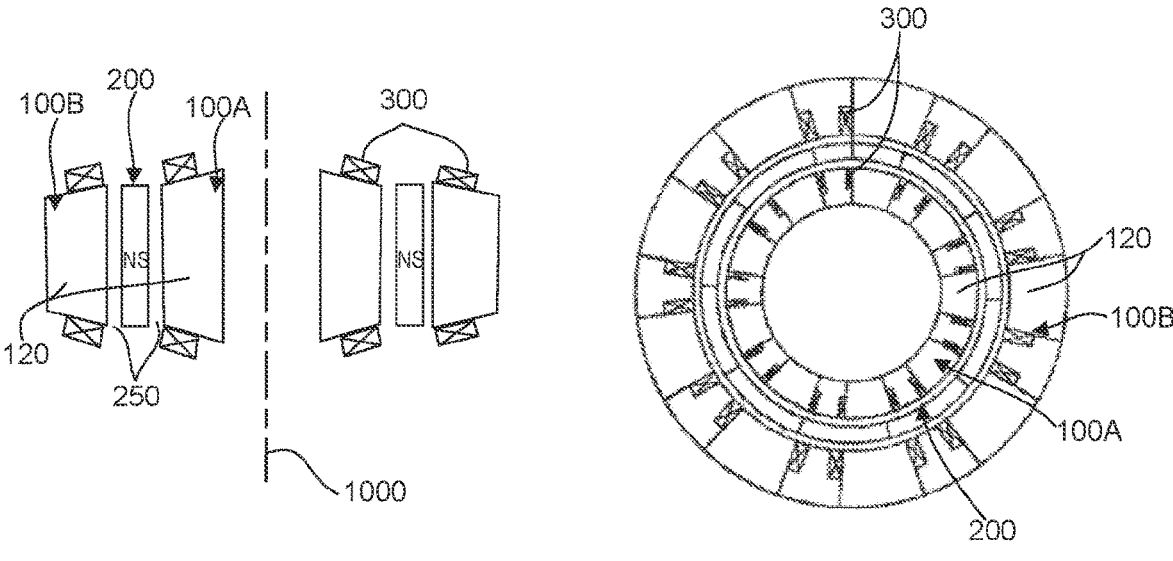
Figure 22:
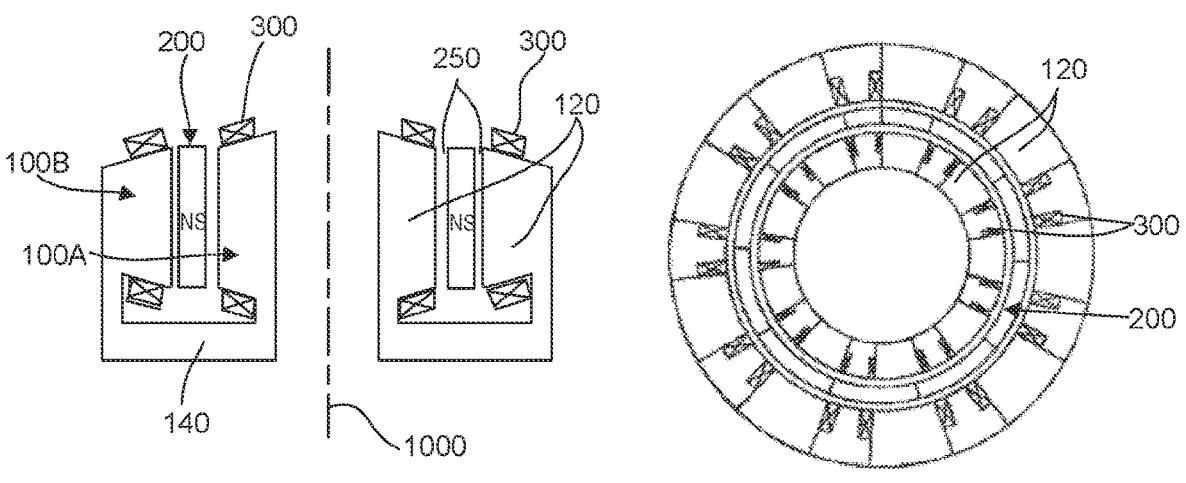

In electric machine of FIG. 19, the rotor 200 is mounted inside the stator 100, and the stator teeth 120 are assembled on the outer stator 100 made in the form of a ring. In the electric machine of FIG. 20, the rotor 200 is installed between the inner and outer stators 100A, 100B that are connected together by a bridge 140. The outer stator 100B, made in the form of a ring and includes teeth 120 with coils 300 mounted thereon. In the electric machine of FIG. 21, the rotor 200 is installed between the inner and outer stators 100A, 100B. Both the inner and outer stators 100A, 100B are made in the form of rings and includes trapezoidal teeth 120 with coils 300 mounted thereon. The electric machine of FIG. 22 is similar to the electric machine of FIG. 21 except that the inner and outer stators 100A, 100B are connected by a bridge 140.

The above described embodiments of electric machines are only exemplary. There may be many variations to the above-described embodiments. Since a person skilled in the art would be able to recognize these variations based on the above disclosure, these variations are not discussed further herein. Furthermore, although the teeth 120 are described as being part of the stator 100 in the above described embodiments of electric machines, this is not a limitation. That is, in some embodiments, the teeth 120 may alternatively or additionally be part of the rotor 200. For the sake of brevity, in the discussion below, exemplary aspects of the current disclosure will be discussed with reference to the configuration of electric machine 10 illustrated in FIGS. 2 and 3. It should be emphasized that this discussion applies equally to other configurations of electric machines (such as, for example, the configurations discussed above).

Figure 4A:
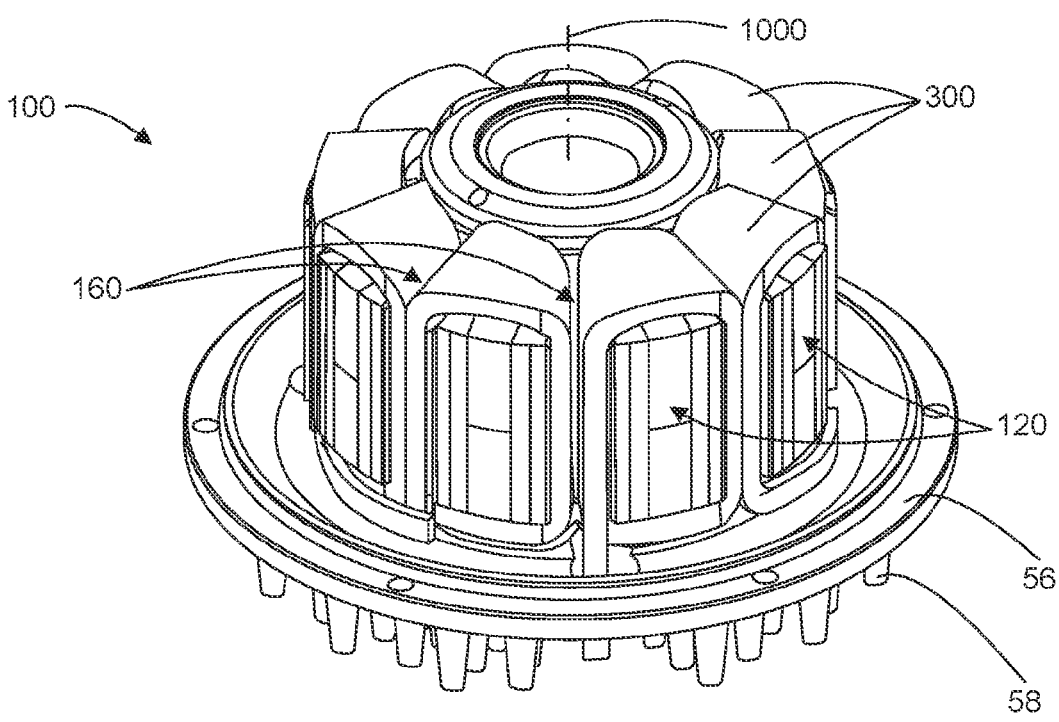
FIGS. 4A-4C illustrate differing perspective views of an exemplary stator of the electric machine of FIG. 1.
Figure 4B:
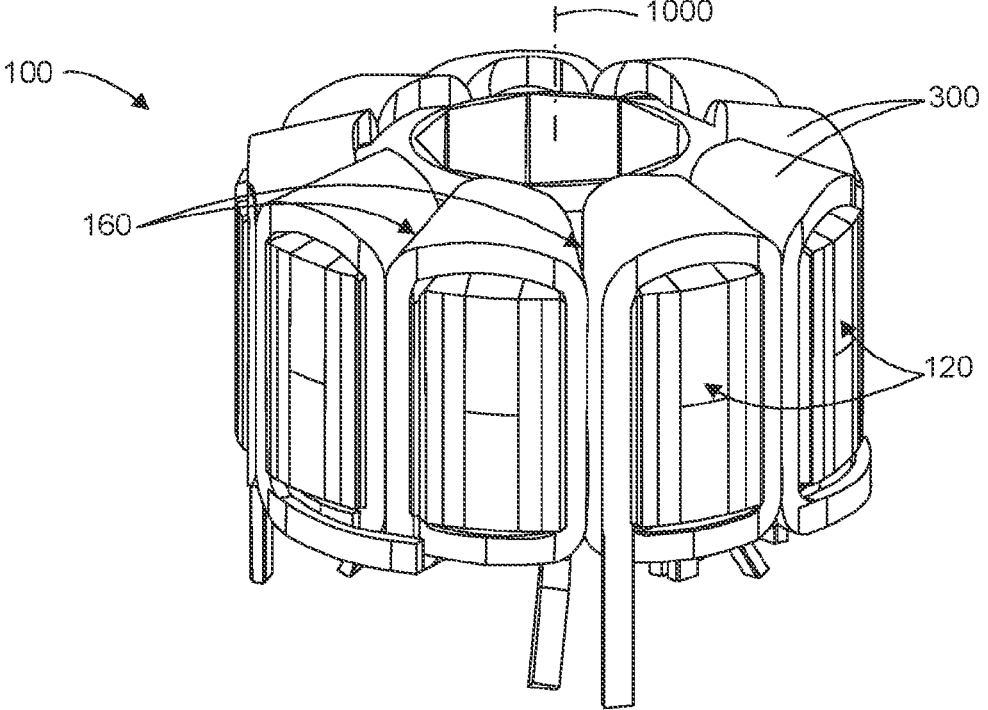
Figure 4C:
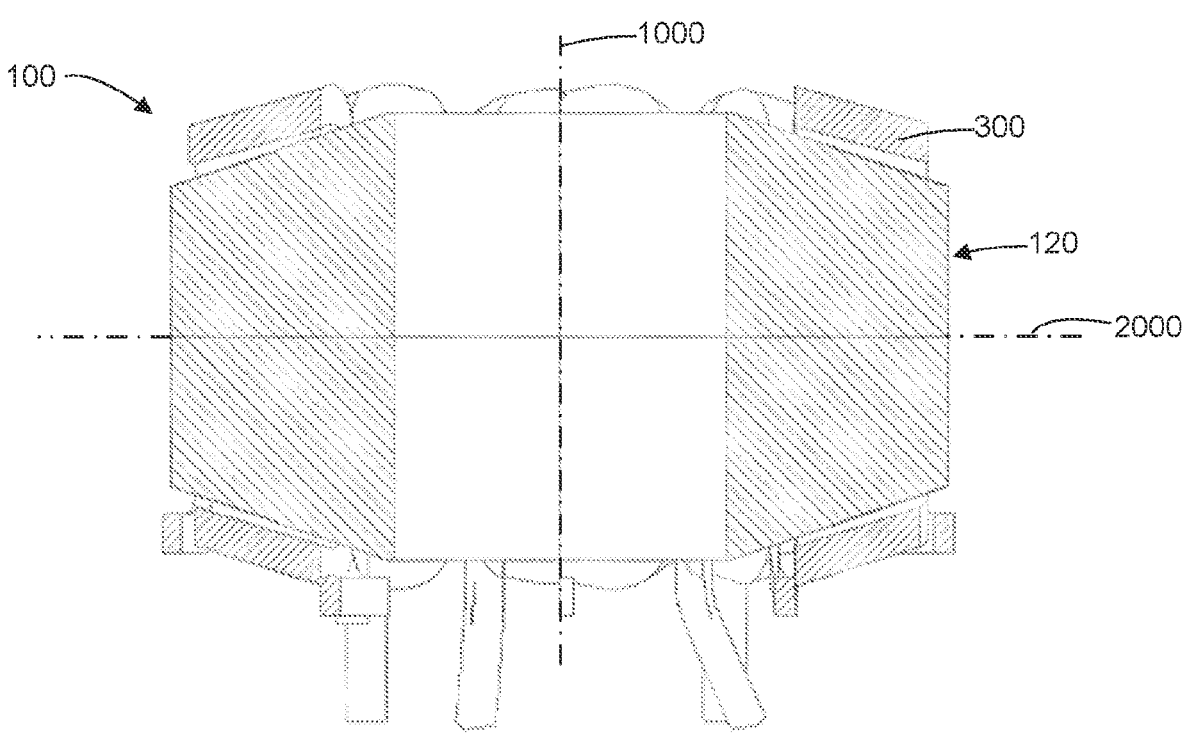
Figure 5:
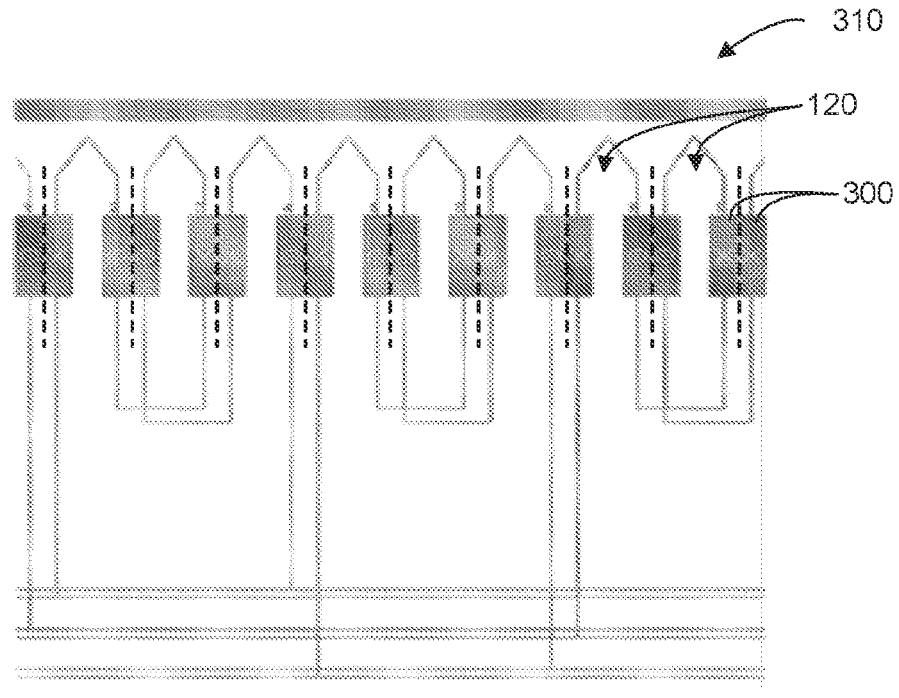
FIG. 5 is an exemplary schematic electrical representation of the stator of the electric machine of FIG. 1.

FIGS. 4A-4C illustrate different views of the stator 100 separated from other components of electric machine 10 of FIGS. 2 and 3. FIGS. 4A and 4B illustrate perspective views of the stator 100, and FIG. 4C illustrates a cross-sectional view of the stator 100 in the axial plane. Each coil 300 is mounted, or installed, on a tooth 120. In some embodiments, a coil may be installed on a tooth such that the inner surface of the coil 300 fits snugly against the outer surface of the tooth 120. In some such embodiments, the external shape (or profile) of the coil 300 may be substantially the same as the external shape of the tooth 120 that it is mounted on. FIG. 5 illustrates an electrical connection diagram of an exemplary 3-phase winding 140 of electrical machine 10. As best seen in FIGS. 4A-4B, each tooth 120 of stator 100 is separated from an adjacent tooth 120 by a slot 160 that accommodates the coils 300 mounted on the adjacent teeth 120. As illustrated in FIG. 5, the coils 300 mounted on the teeth 120 of the electric machine 10 collectively form a 3-phase winding 310. It should be noted that, although the stator 100 is described as including teeth 120, in some embodiments, the rotor 200 may alternatively or additionally include teeth 120.

FIGS. 6A-6D and 7A-7E illustrate different aspects of an electromagnetic coil 300 that may be mounted on a tooth 120. In the embodiments illustrated in FIGS. 6A-6D, the coil 300 is made, or formed of, a foil 312 of an electrically conductive material, and in the embodiments illustrated in FIGS. 7A-7E, the coil 300 is made of an electrically conductive wire 314. As would be recognized by a person skilled in the art, a foil is a strip of electrical conductor having a thickness and a width. The width of the foil will typically be larger than its thickness. That is, a foil is a thin strip of an electrically conductive material. In general, any type of an electrical conducting material may be used to form the coil 300. In some embodiments, copper may be used. In some embodiments, the foil 312 may be coated with an electrically insulating material.

Figure 6A:
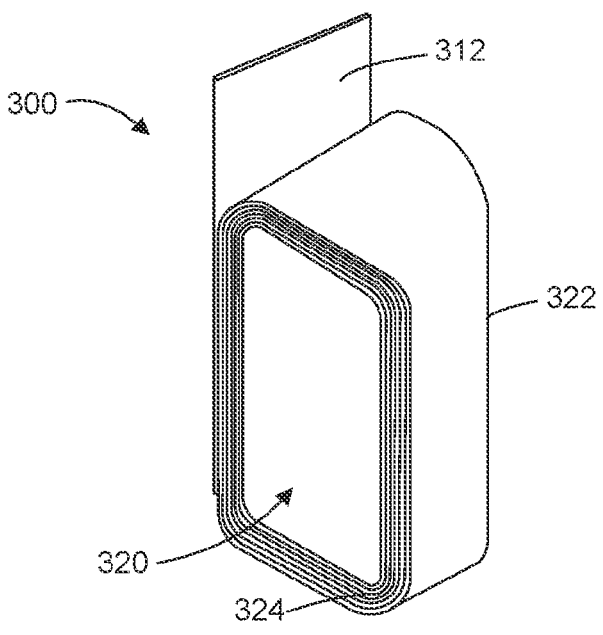
FIGS. 6A-6D illustrate exemplary coils of the electric machine of FIG. 1 formed of foils.
Figure 6B:
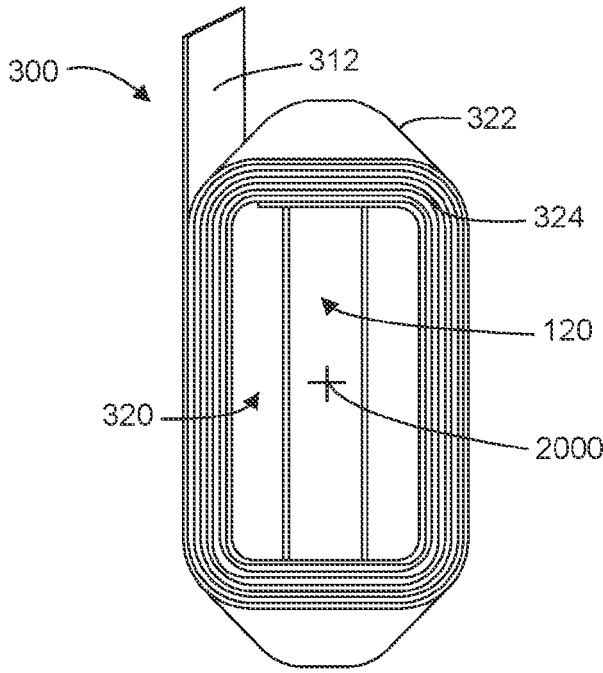
Figure 6C:
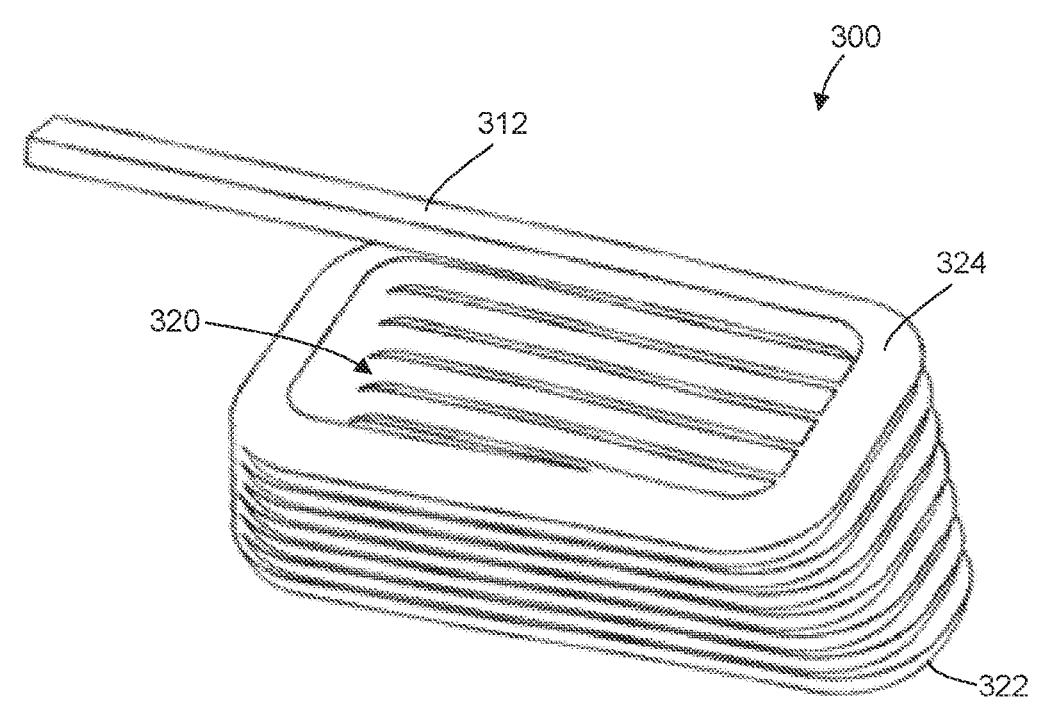
Figure 6D:
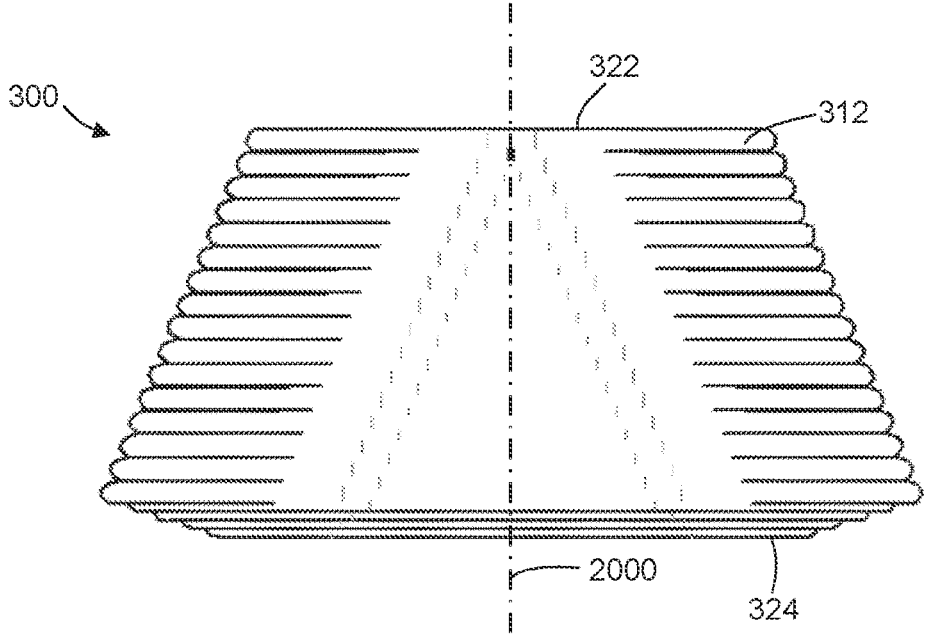

In the exemplary embodiments of coil 300 illustrated in FIGS. 6A and 6B, the coil 300 comprises multiple turns of foil 312 surrounding a central cavity 320 that extends from a first end 322 to a second end 324 of the coil 300. As illustrated in FIG. 6B, the coil 300 is mounted on a tooth 120 such that the tooth 120 extends through the cavity 320. In some embodiments, as shown in FIGS. 6A and 6B, the width of the foil 312 (i.e., the width along the flat side of the foil) may extend the entire width of a tooth 120 in the radial direction of the tooth (i.e., along the radial axis 2000). In some embodiments, as illustrated in FIGS. 6C and 6D, a rib of foil 312 (i.e., a strip of foil 312 having a width smaller than the width of the tooth 120) may be wound, e.g., in the form of a spiral, in the radial direction along the tooth 120 to form a coil 300 (see, e.g., FIGS. 6C, 6D).

Figure 7A:
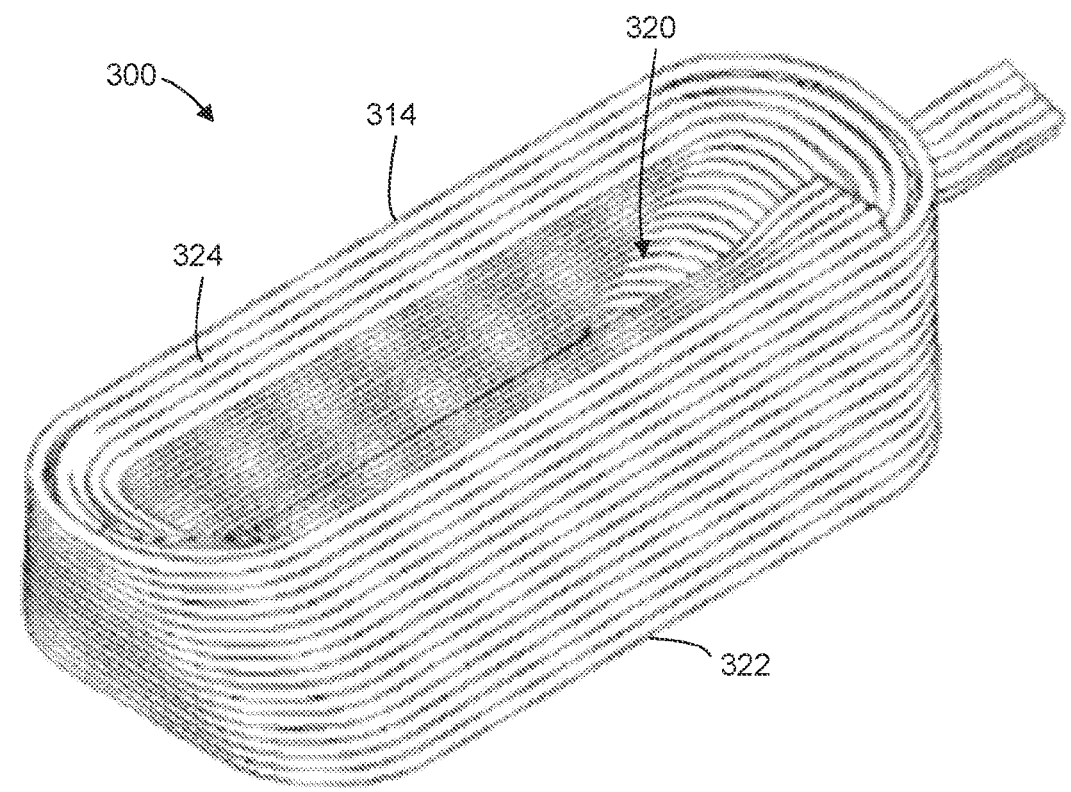
FIGS. 7A-7E illustrate exemplary coils of the electric machine of FIG. 1 formed of wire.
Figure 7B:
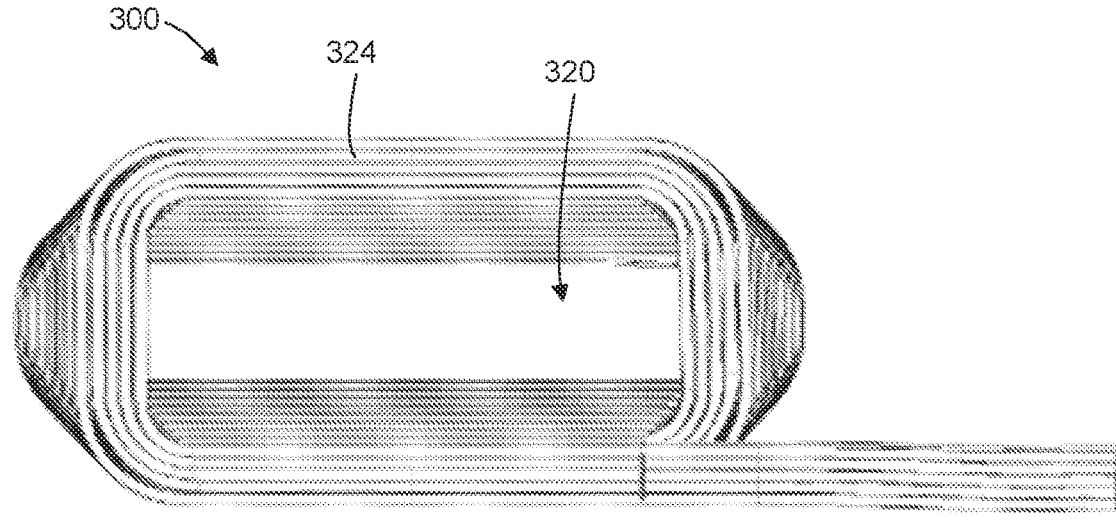
Figure 7C:
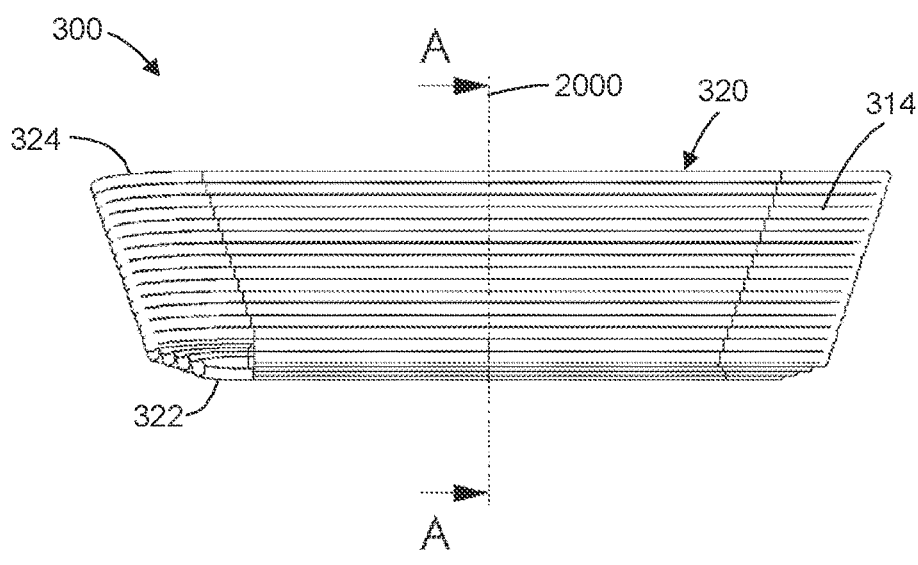
Figure 7D:
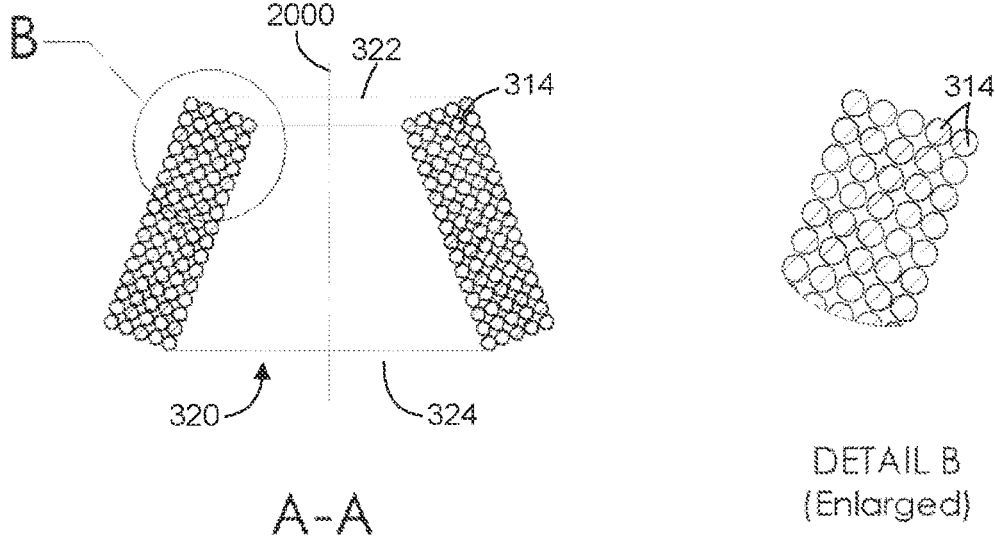
Figure 7E:
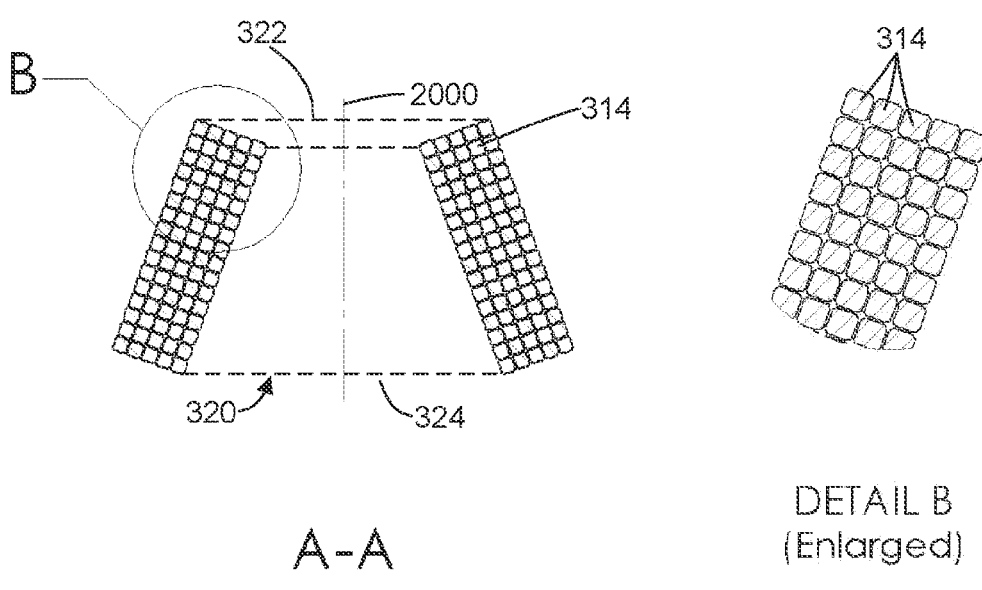

In some embodiments, as illustrated in FIGS. 7A-7E, the coil 300 may be made using one or more strands of an electrically conductive (e.g., copper) wire 314. In some embodiments, the wire 314 may be coated with an electrically insulating material. In some embodiments, as shown in FIGS. 7A-7C, the wire 314 may be wound in the form of a spiral to define the central cavity 320 of coil 300. The spirally wound wire 314 may extend from the first end 322 to the second end 324 of the coil 300. The wire 314 may have any cross-sectional shape. In some embodiments, as illustrated in FIG. 7D, the wire 314 may have a circular cross-sectional shape. In some embodiments, as illustrated in FIG. 7E, the wire 314 may have a square or rectangular cross-sectional shape. It should be noted that these illustrated cross-sectional shapes are only exemplary. In general, the wire 314 may have any cross-sectional shape. In some embodiments, to reduce eddy current losses, multiple wires 314 may be twisted together in the form of a Litz wire. As would be recognized by a person skilled in the art, a Litz wire consists of multiple wire strands, individually insulated, and twisted or woven together, arranged in one of several patterns. These patterns may serve to equalize the proportion of the overall length over which each strand is at the outside of the conductor. The use of stranded wires or Litz wire may be beneficial to reduce eddy current losses and increase the efficiency of the electrical machine. An exemplary method of forming the coil 300 using the foil 312 or the wire 314 will be described later with reference to FIGS. 45-47.

In various embodiments, each coil of the disclosed electric machine may have a non-uniform trapezoidal cavity therethrough. Non-uniform trapezoidal cavity refers to a cavity that has a non-uniform cross-sectional shape along a length portion thereof. In non-uniform cavity, a parameter related to a cross-sectional dimension of the cavity varies over at least a portion of the length of the cavity. Any parameter related to the dimension (e.g., width, height, length, area, perimeter, or another measure related to a dimension) may vary over (i.e., not be a constant over) a portion of the length of the cavity. In some embodiments, in a non-uniform cavity, an area (or another measure related to dimension) of the cavity may not be uniform along a portion of the cavity length. In some embodiments, the area (or another dimensional measure) of the cavity may not be uniform over the entire length (i.e., from one end of the cavity to the other end) of the cavity. In some embodiments, in a non-uniform cavity, one parameter (e.g., perimeter) may be uniform while another parameter (e.g., area) may be non-uniform over a portion of the cavity or the entire cavity.

As explained previously (with reference to FIGS. 6A-7E), whether made of foil 312 or wire 314, the coil 300 may include a cavity 320 that extends from its first end 322 to second end 324. In various embodiments, cavity 320 may be a non-uniform trapezoidal cavity. That is, a cross-sectional dimension related parameter of the cavity may vary at least over a portion of the length between the first and second ends 322, 324. With reference to FIG. 6B, coil 300 is mounted on a tooth 120 such that the interior surfaces of its cavity 320 mates closely with, or is snug against, the exterior surfaces of the tooth 120. As a consequence of such mounting, the internal shape of the cavity 320 of coil 300 may be substantially the same as (or similar to) the external shape of the tooth 120. With reference to FIGS. 2 and 3, the cross-sectional shape of each tooth 120 in the radial and axial plane may be trapezoidal. In other words, the tooth 120 may be trapezoidal shaped. The width and length of each tooth 120 varies in the radial direction. That is, as illustrated in FIG. 2, the length 13 of tooth 120 varies from $l_1$ to $l_2$ in the radially outward direction of tooth 120 (along radial axis 2000), and as illustrated in FIG. 3, the width w of tooth 120 varies from $w_1$ to $w_2$ in the radially outward direction of tooth 120. As will be explained later (with reference to 26A-26D), the perimeter of the cross-section of the tooth 120 in a plane perpendicular to the radial direction may be substantially a constant in its radial direction while the area of the cross-section varies in the radial direction. In some embodiments, each tooth 120 may have a trapezoidal cross-sectional shape that is non-uniform in the radial direction. The cavity 320 of coil 300 may also have a similar trapezoidal cross-sectional shape that is non-uniform in the radial direction.

In various embodiments, each cavity of the coil may be configured to contain therein one tooth of the plurality of teeth. In general, the tooth may be contained or disposed in the coil cavity in any manner. That is, in some embodiments, each tooth may be snugly received in a coil cavity, while in other embodiments, the tooth may be loosely received in cavity. In some embodiments, portions of the external surface of the tooth may contact portions of the internal surface of the cavity that contains the tooth. In some embodiments, an interfacial material may be disposed between the mating surfaces of the cavity and the coil. With reference to FIG. 6B, in some embodiments, a tooth 120 is snugly contained in cavity 320 of coil 300 such that at least some portions of the outer surface of the tooth contact portions of the inner surface of the cavity 320. However, this is not required, and tooth 120 may be contained in cavity 320 in any manner. That is, in some embodiments, the outer surface of tooth 120 in the cavity 320 may not make physical contact with the inner surface of the cavity 320. In some embodiments, the outer surface of the tooth 120 and the inner surface of the cavity 320 may be separated by another material.

In various embodiments, each tooth may be formed of multiple pieces that, when assembled together correspond to a shape of the non-uniform trapezoidal cavity of the coil. As used herein, a piece refers to a portion or a part of the whole. A piece may have any size and shape. The tooth may be formed of any number of pieces or parts and these multiple parts may have any shape and may be assembled together in any manner. For example, in some embodiments, the multiple parts may be glued or secured together in another manner. In some embodiments, the multiple parts may be merely loosely or tightly placed together. In the embodiment of electric machine 10 of FIGS. 2 and 3, the non-uniform trapezoidal cavity 320 of the coil 300 is configured to contain the multiple parts that form a multi-piece tooth 120.

The size and shape of the cavity 320 is configured to receive the multi-part tooth 120 therein. In some embodiments, the size of cavity 320 of coil 300 may be substantially the same as the size of tooth 120. In some embodiments, the cavity 320 may be sized slightly smaller than the tooth 120 such that, when the multi-part tooth 120 is assembled (as will be described later with reference to FIGS. 45-47), the coil 300 expands to snugly receive the tooth 120 in cavity 320.

Figure 23A:
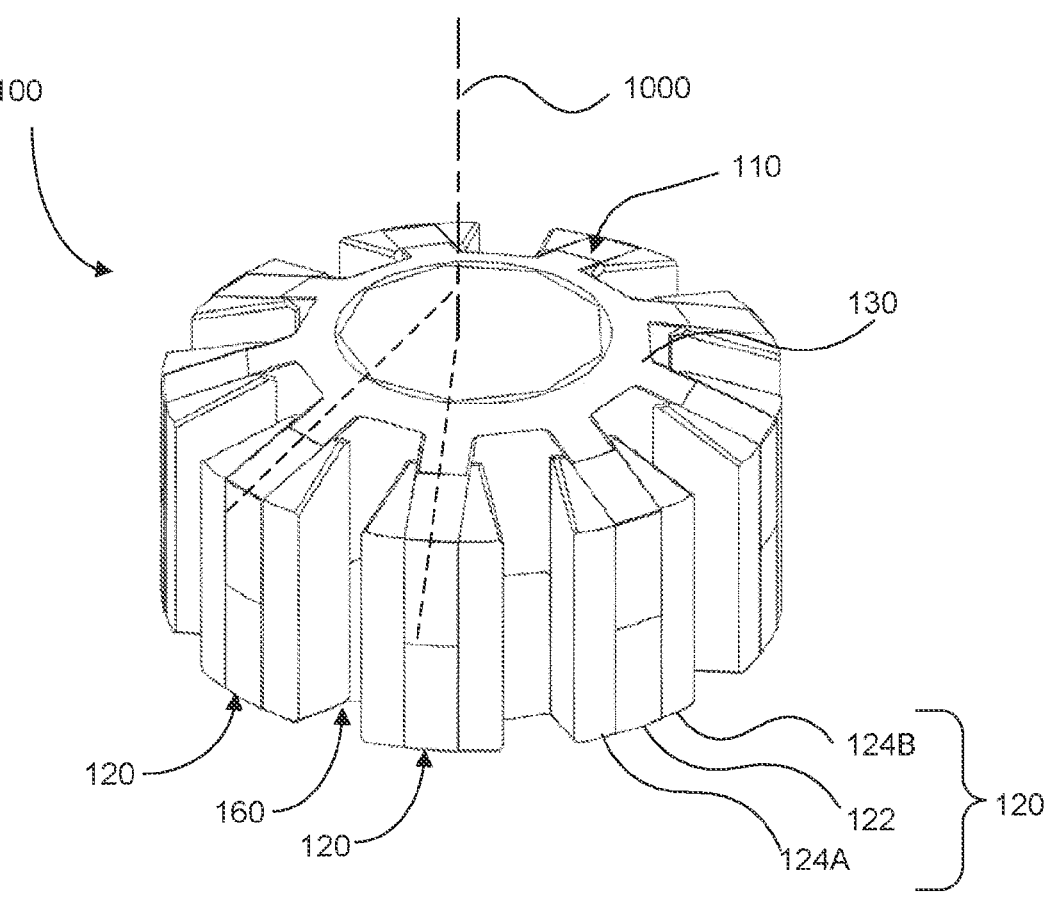
FIGS. 23A-23N illustrate different aspects of exemplary teeth of electric machines consistent with the current disclosure.
Figure 23B:
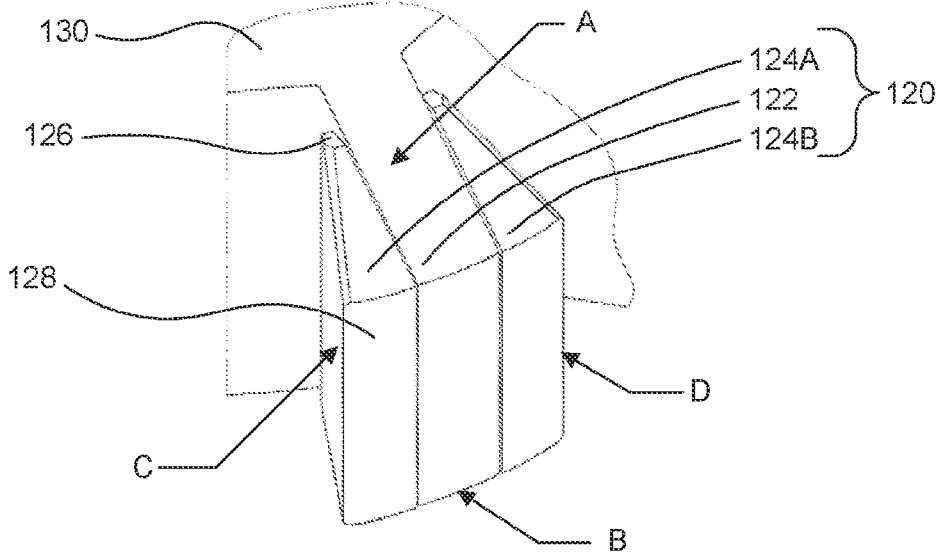
Figure 23C:
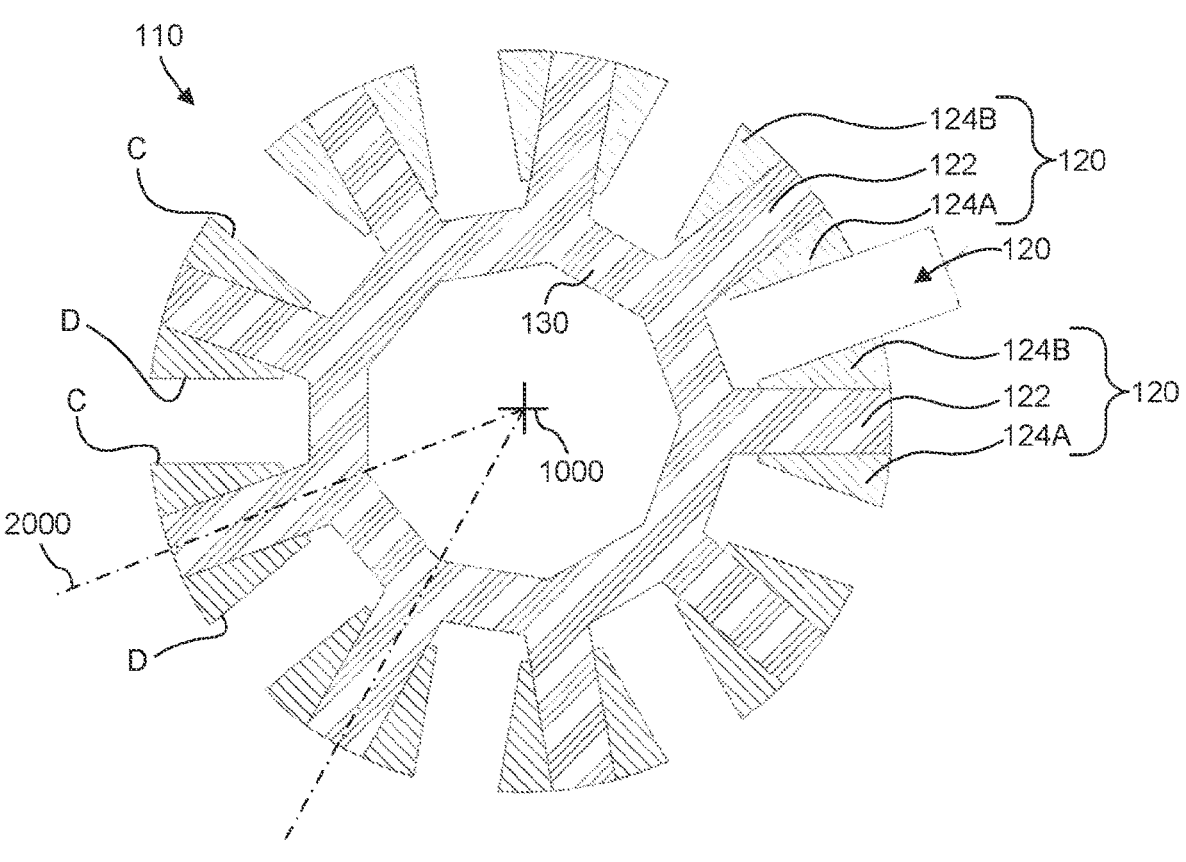
Figure 23D:
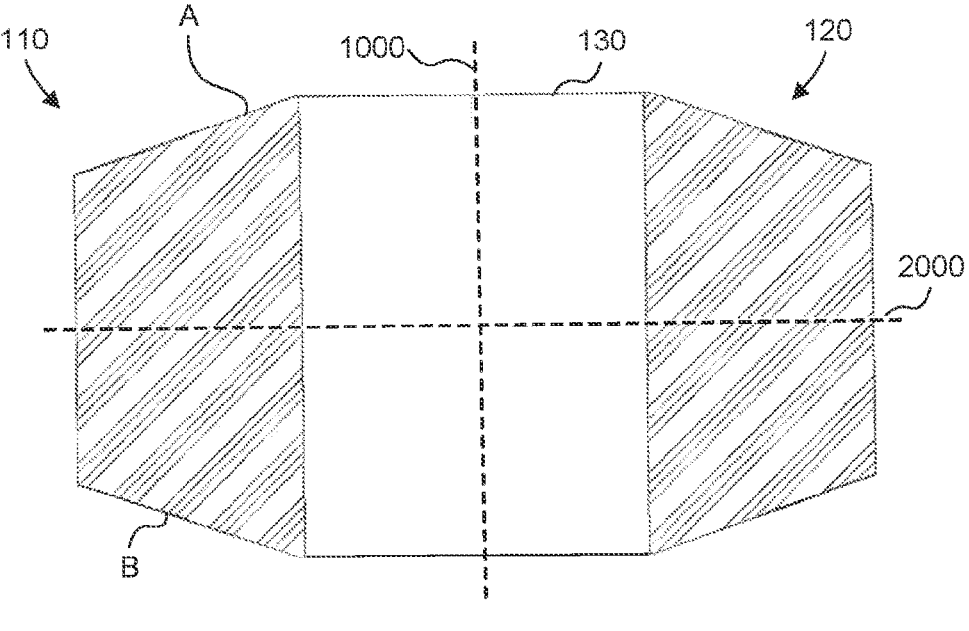
Figure 23E:
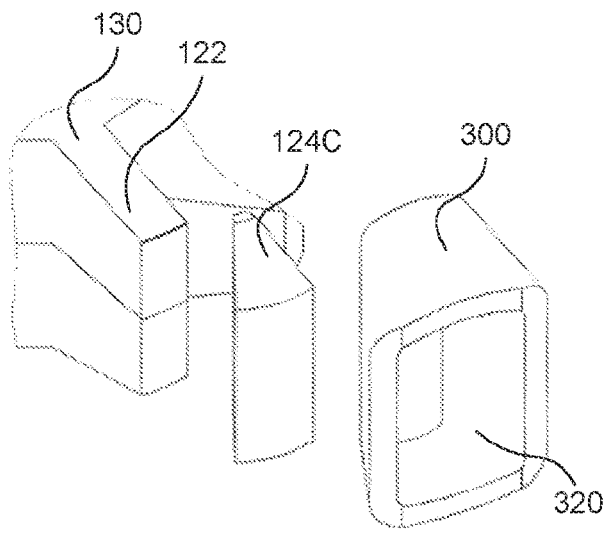
Figure 23F:
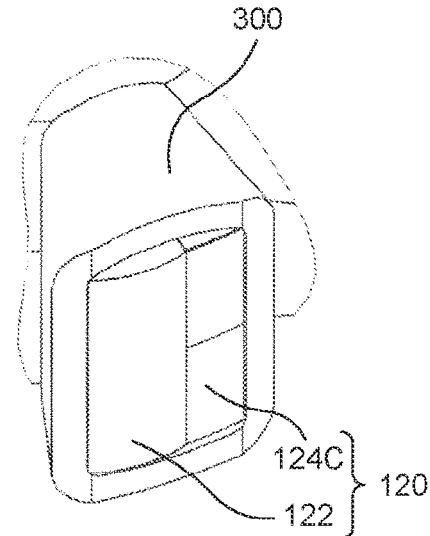
Figure 23G:
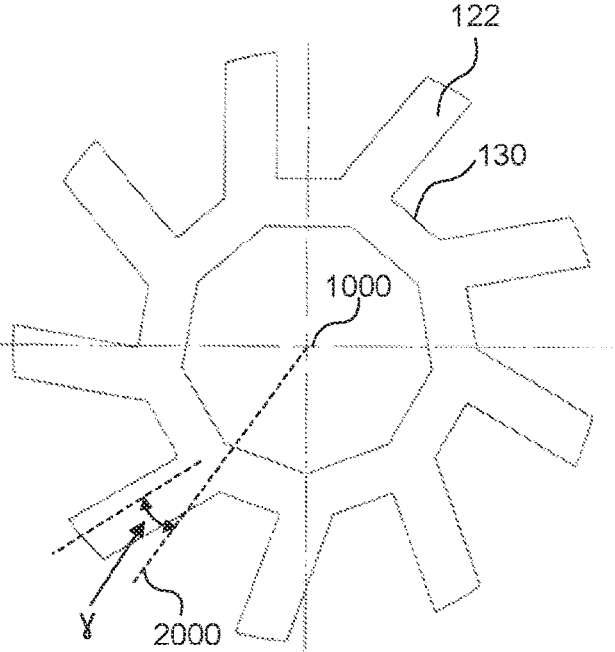
Figure 23H:
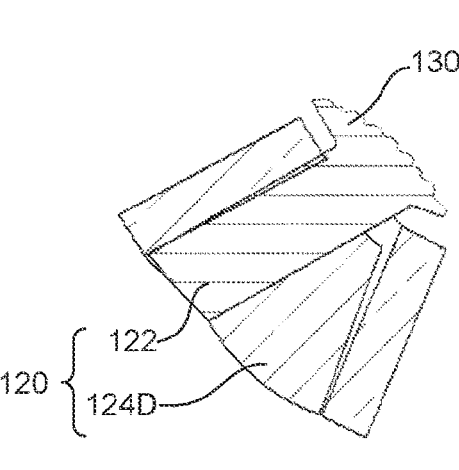
Figure 23I:
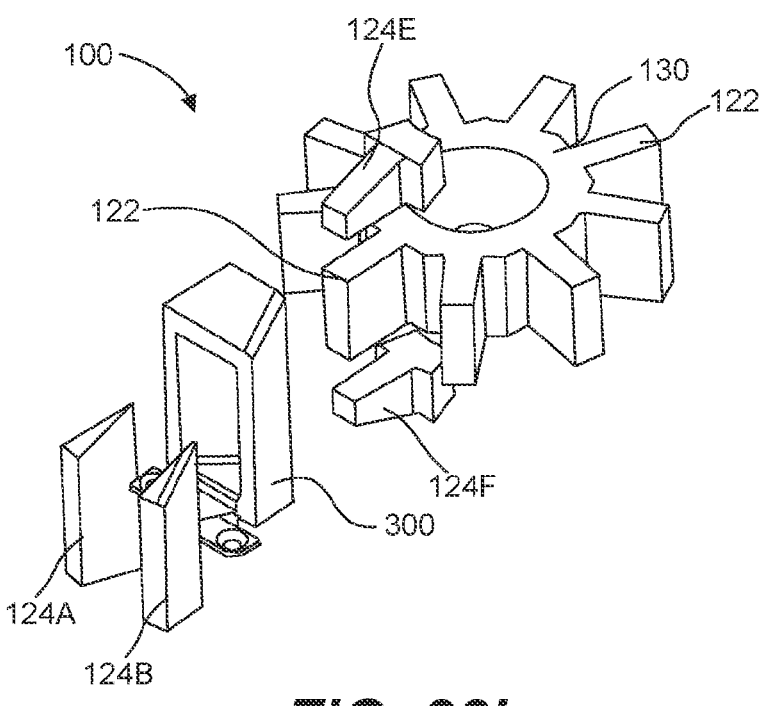
Figure 23J:
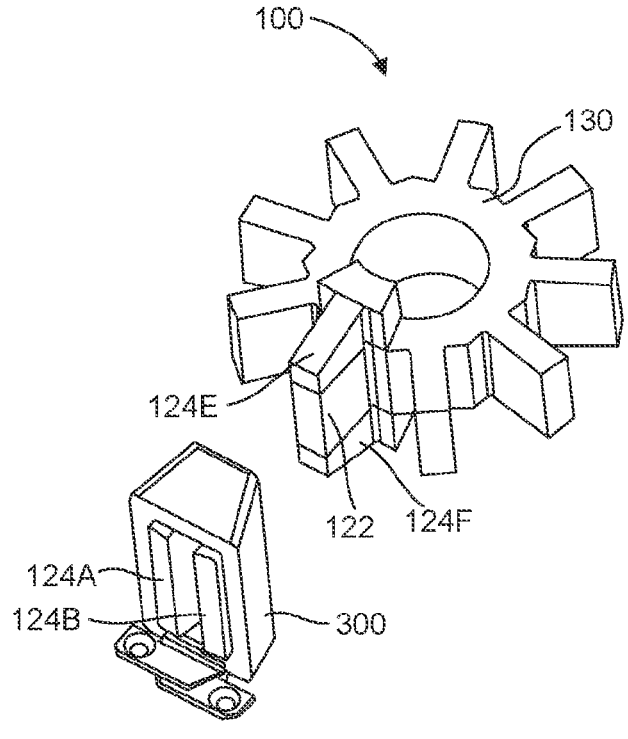
Figure 23K:
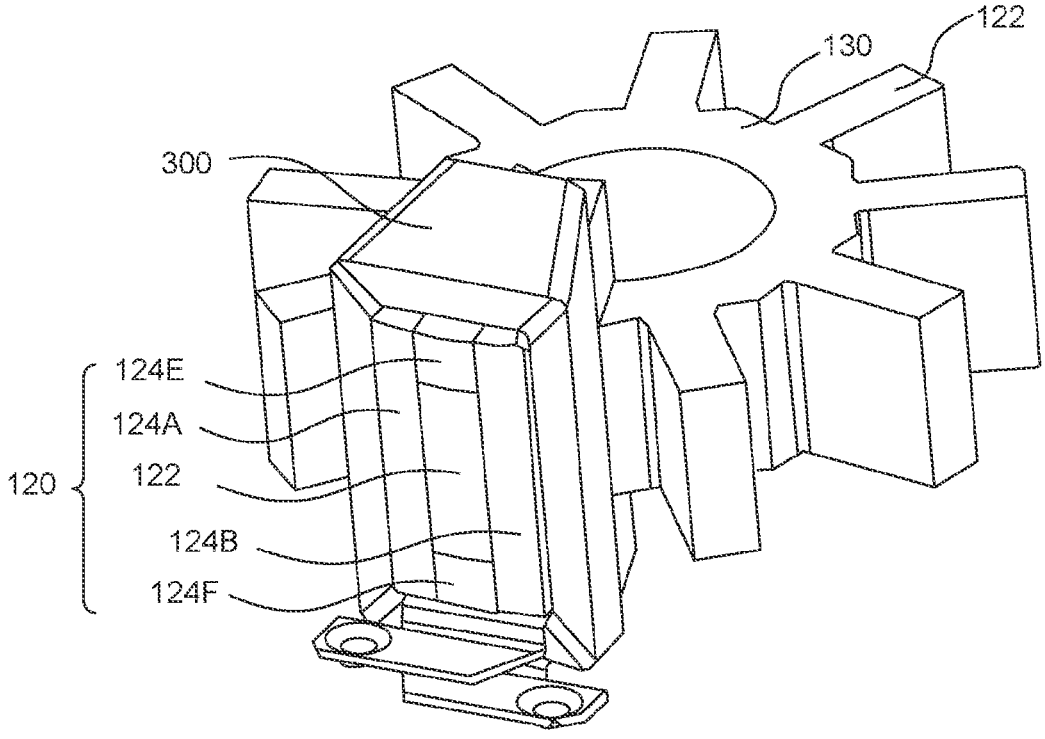

FIGS. 23A-23K illustrate different exemplary embodiments of teeth 120 of electric machine 10 arranged on the core 110 of its stator 100. In these embodiments, each tooth 120 includes multiple pieces or parts arranged together to form the complete multi-part tooth 120. FIGS. 23A-23D illustrate one exemplary embodiment of multi-part teeth 120, FIGS. 23D-23H illustrate other exemplary embodiments of teeth 120, and FIGS. 23I-23K illustrate further exemplary embodiments of multi-part teeth 120. In should be noted that these illustrated embodiments are only exemplary and electric machines of the current disclosure may include other types of multi-part teeth in the stator and/or the rotor.

FIG. 23A illustrates a perspective view and FIG. 23B illustrates an enlarged portion of FIG. 23A showing the structure of a single tooth 120. FIGS. 23C and 23D illustrate cross-sectional views of FIG. 23A in the radial and axial planes, respectively. Stator core 110 includes a ring-shaped or annular part 130. Each multi-part tooth 120 of the stator 100 extends in a radially outward direction from the annular part 130. When stator 100 and rotor 200 are assembled to form an electric machine 10, each tooth 120 extends radially outwards towards the air gap 250 (see FIGS. 2 and 3). As explained previously, tooth 120 has a multi-part construction. In the exemplary embodiment of tooth 120 illustrated in FIGS. 23A-23D, each tooth 120 has a core tooth-portion 122 and two additional tooth-portions 124A, 124B assembled together to form the tooth 120.

Core tooth-portion 122 is integral with the annular part 130 of stator core 110, and each additional tooth-portion 124A, 124B is installed on an opposite side face of the core tooth-portion 122. The terms "integral with" and "integrally formed," are used to indicate that two parts are connected to form a single part that practically cannot be dismantled without destroying the integrity of the part. In some cases, the two integrally formed parts may be formed as a single part. In some embodiments, one or more of the additional tooth-portions may be shaped like a wedge. As used herein, a wedge-shaped portion is part with a narrower end and a broader end. With reference to FIG. 23B, each additional tooth-portion 124A, 124B is a wedge-shaped component that extends from a narrower first end 126 to a broader second end 128. Although the first and second additional tooth-portions 124A, 124B are illustrated as identical components in this embodiment, this is not a requirement.

FIGS. 23E-23H illustrate exemplary embodiments of tooth 120 having a core tooth-portion 122 and one additional tooth-portion 124C or 124D that are assembled to form the tooth 120. In these embodiments, the core tooth-portion 122 is integral with the annular part 130 of core 110, and the additional tooth-portion 124C, 124D is wedge-shaped. The additional tooth-portion 124C or 124D is installed on one side face of the core tooth-portion 122 to form the tooth 120. While the core-tooth portion 122 (of the tooth 120) of FIGS. 23E (and 23A) extends radially outward from the annular part 130 along the radial axis 2000, the core tooth-portion 122 of the tooth of FIG. 23G extends radially outwards from its annular part 130 inclined at an angle γ with the radial axis 2000. The core tooth-portion 122 may be inclined at any angle γ. In some embodiments, the angle of inclination γ will be similar to that described with reference to FIGS. 28A and 28B. It should be noted that, in some embodiments (e.g., the embodiment of FIG. 23E), the angle of inclination γ may be zero. That is, the core tooth-portion 122 may extend radially outward along the radial axis 2000 and a single additional tooth-portion may be installed on one side face of the core tooth-portion 122 to form the tooth 120. In the embodiment of FIGS. 23I-23K, each tooth 120 has a core tooth-portion 122 and four additional tooth-portions 112a, 124A, 112e, and 112f that are assembled to form the tooth 120. Core tooth-portion 122 is integral with the annular part 130 of core 110, a first pair of additional tooth-portions 124A and 124B are positioned on opposite side faces of the core tooth-portion 122, and a second pair of additional tooth portions 112e and 112f are arranged on top and bottom faces of the core tooth-portion 12a. It should be noted that the embodiments of tooth 120 discussed above are only exemplary, and the electric machines of the current disclosure may include other configurations (e.g., having a different number and other shapes of additional tooth-portions) of tooth 120. It should also be noted that the illustrated shapes of the different parts (i.e., core tooth-portion and the additional tooth portion(s)) of tooth 120 are also exemplary. In general, the constituent parts of a tooth 120 may have any suitable shape such that, when they are assembled, the external shape of the tooth 120 corresponds to the shape of the non-uniform trapezoidal cavity 320 of the coil 300.

Figures 23L, 23M, 23N:
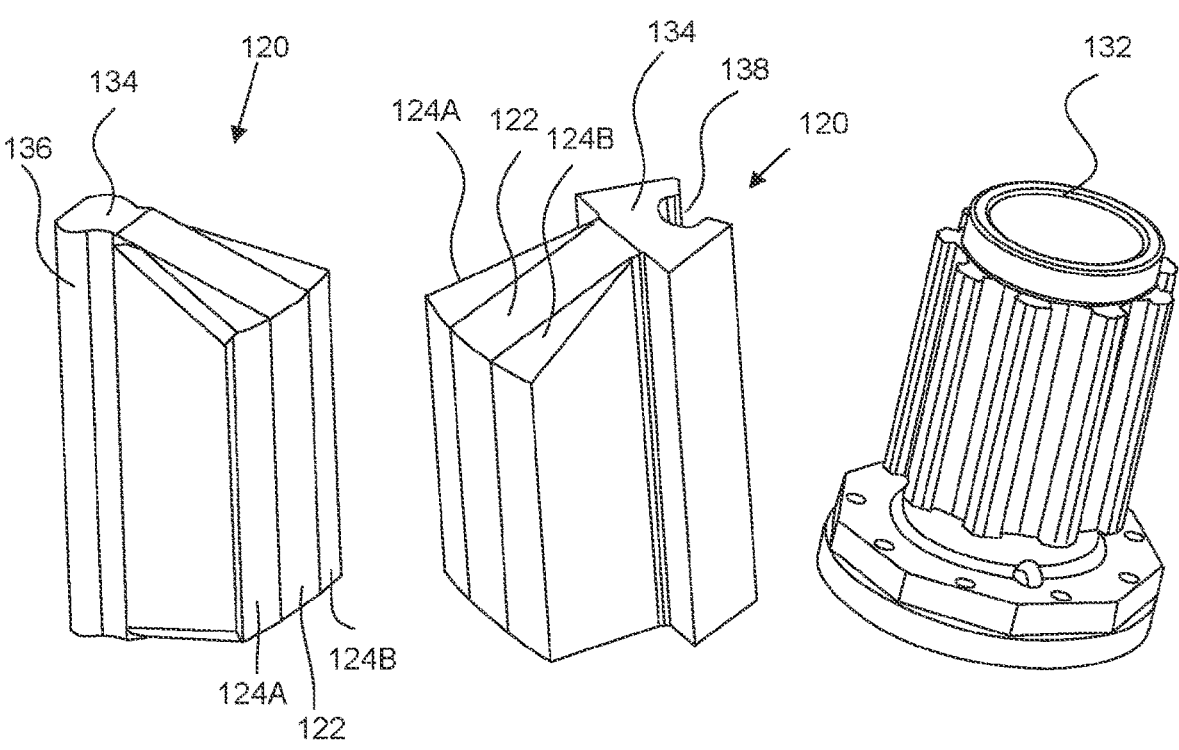

In the embodiments of multi-part teeth described above with reference to FIGS. 23A-23K, one part (i.e., core tooth-portion 122) of each tooth 120 is formed integral with the annular part 130 of the stator core 110 and at least one additional tooth-portion is formed separate from (i.e., not integrated with) the core 110. However, such a configuration is not required. In some embodiments, all parts of the tooth may be separate from the stator core 110. These separate parts may be assembled to form the tooth 120. FIGS. 23L and 23M illustrate exemplary embodiments of a tooth 120 formed as separate components assembled on a hub 132 (see FIG. 23N) to form the stator 100. In the embodiment of FIG. 23L, at its base 134 the core tooth-portion 122 includes a rib 136 configured to be inserted into a correspondingly shaped groove in the hub 132 when assembling the stator 100. In the embodiment of FIG. 23M, the base 134 of the core tooth-portion 122 includes a groove 138 that fits on a correspondingly shaped rib on the hub 132 when assembling the stator 100 (see FIG. 24B). When all teeth 120 are assembled on the hub 132, the bases 134 of the teeth 120 may collectively form the annular part 130 of the stator 100 (see FIG. 24D).

Figure 24A:
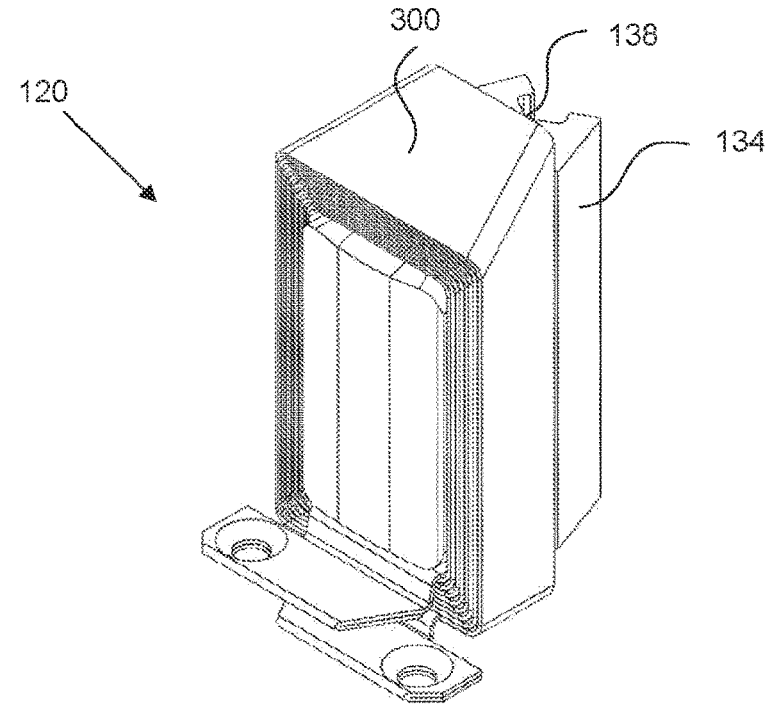
FIGS. 24A-24D illustrate the assembly of an exemplary stator of an electric machine consistent with the current disclosure.
Figure 24B:
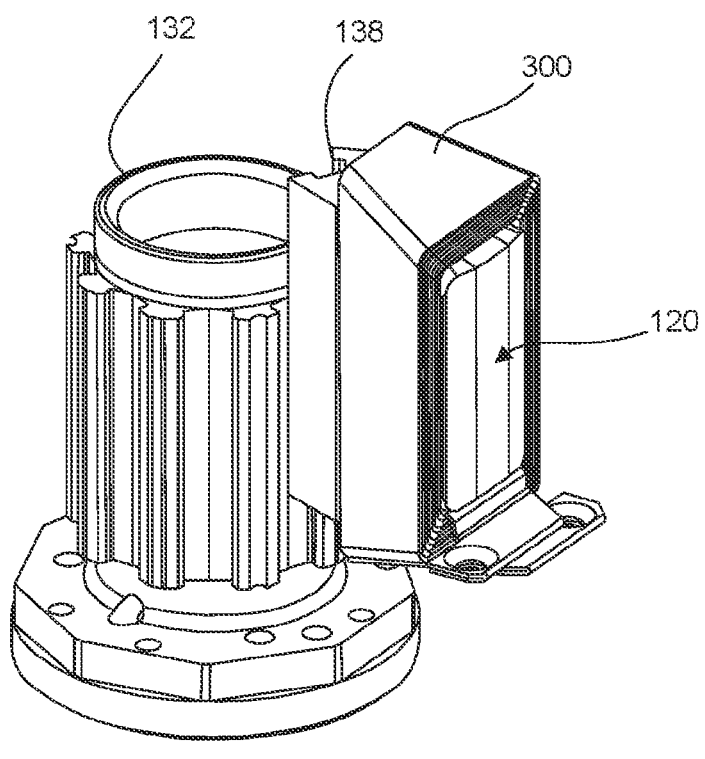
Figure 24C:
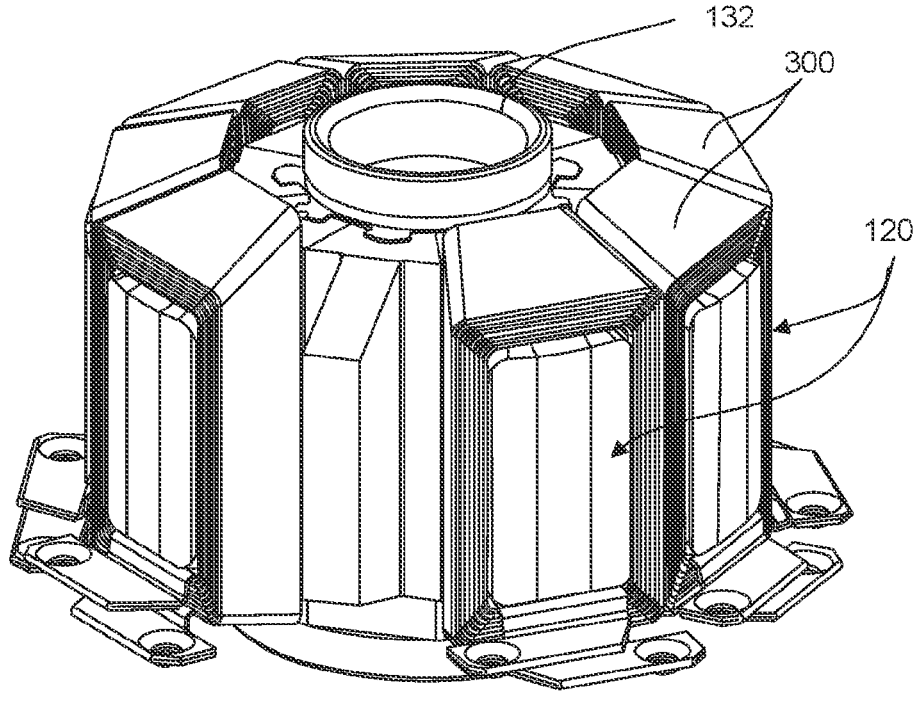
Figure 24D:
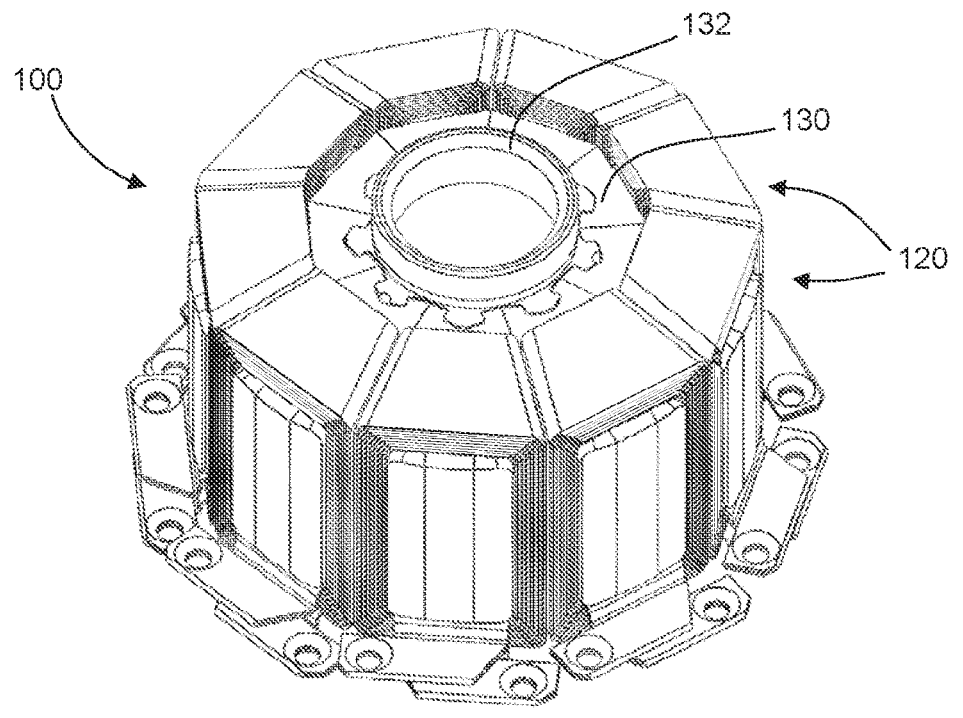

FIGS. 24A-24D illustrate the installation of an exemplary tooth 120 (of the type illustrated in FIG. 23M) on the hub 132 to form the stator 100. As illustrated in FIG. 24A, the coil 300 is first mounted on the multi-part tooth 120. An exemplary method of mounting a coil 300 on a tooth 120 is described later. As illustrated in FIG. 24B, the tooth 120 with the coil 300 mounted thereon is installed on the hub 132 by inserting the groove 138 on the base 134 of the core tooth-portion 122 into the correspondingly shaped rib on the hub 132. Additional teeth 120 are then mounted on the hub 132 as illustrated in FIGS. 24C and 24D to complete the assembly of the stator 100.

In some embodiments, the multiple parts of the tooth 120 (core tooth-portion 122 and additional tooth portions 124A-124F) and the coil 300 may be coupled together using an adhesive material (e.g., a high temperature glue). In some embodiments, the adhesive material may be filled with a filler material (e.g., to impart desirable properties to the adhesive). Any type of adhesive material may be used. In some embodiments, the coefficient of thermal expansion (CTE) of the adhesive material may be such that, when the tooth 120 heats up during operation of the electric machine, the thermo-mechanical stresses (induced due to CTE mismatch) induced in the tooth 120 and the coil 300 are within acceptable limits (i.e., the stresses are below a value that may cause failure). In some embodiments, the CTE of the adhesive material may be within about 20% of the CTEs of the tooth components (e.g., steel laminations, SMC, etc.). In some embodiments, the CTE of the adhesive material may be within about 20% of the CTEs of the tooth components and the coil 300.

Figure 25A:
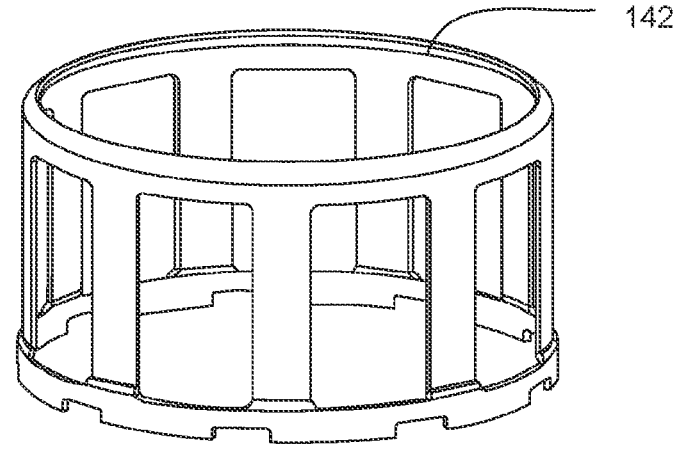
FIGS. 25A-25B illustrate different aspects of an exemplary stator of an electric machine consistent with the current disclosure.
Figure 25B:
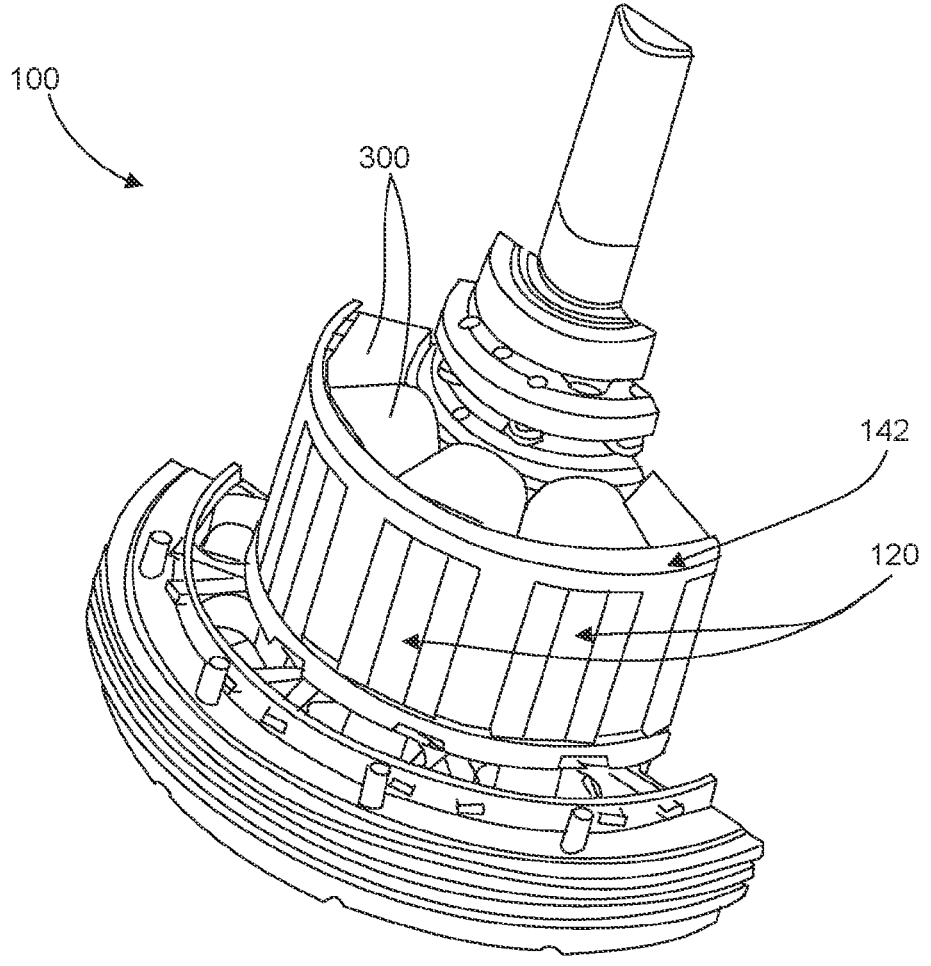

In some embodiments, as illustrated in FIGS. 25A and 25B, a cage 142 (or circumferentially wrapped bandage) may be installed on the stator 100. The cage 142 (or bandage) may assist in keeping the parts of the tooth 120 (and/or coil 300) from protruding into the air gap 250 between the stator 100 and the rotor 200 (see FIG. 3) during operation. In some embodiments, windows may be provided on the surface of the cage 142 the faces the rotor 200. In some embodiments, the cage 142 may also be attached to the teeth 120 using an adhesive material. In embodiments of tooth 120 where the core tooth-portion 122 is integral with the annular part 130 of the stator core 110 (see, e.g., FIGS. 23A-23K), the coil 300 and the additional tooth-portions 124A-124F are installed on the core tooth-portion 122 integrated with the core 110, as is described later. After all teeth 120 and the coils 300 are installed, in some embodiments, the cage 142 may be installed on the stator 100. The cage 142 may be made of a non-magnetic material with low electrical conductivity or of a soft magnetic material with a relative magnetic permeability of greater than or equal to about 10 with low electrical conductivity. Making the cage 142 from a soft magnetic material results in suppression of high harmonics of the pulsating magnetic field, which leads to a decrease in vibration and noise.

Because of the configurations of the core tooth-portion 122 and the additional tooth-portion(s), each tooth 120 may have a trapezoidal cross-sectional shape in both the radial plane (see, e.g., FIGS. 3, 23C) and the axial plane (see, e.g., FIGS. 2, 23D). In some embodiments, as illustrated in FIG. 23B, the opposite side faces C and D of each tooth 120 are not parallel to each other, and the opposite top and bottom faces A and B of a tooth 120 are also not be parallel to each other (see, e.g., FIG. 23D). The opposite side faces C, D of adjacent teeth 120 may however be parallel to each other such that the slot 160 formed between the adjacent teeth 120 has a constant width in the radial direction (see, e.g., FIG. 23C). That is, side face C of one tooth 120 may be parallel to side face D of the adjacent tooth 120.

In an embodiment where the rotor 200 is positioned outwards of the stator 100 (see FIGS. 2 and 3), the opposite side faces C and D of each tooth 120 may diverge from each other in the radially outward direction (see, e.g., FIG. 23C), and the top and bottom faces A and B may converge towards each other in the radially outward direction (see, e.g., FIG. 23D). In an embodiment of an electric machine with an outer rotor 200 and an inner stator 100 (FIGS. 2, 3) the width of each tooth 120 in the radial plane (FIG. 3) may increase in the radial direction (e.g., increases from $w_1$ to $w_2$ in FIG. 3) towards the rotor 200, and a length of each tooth 120 in an axial plane (FIG. 2) may decrease in the radial direction towards the rotor 200 (e.g., decreases from $l_1$ to $l_2$ in FIG. 2). The coil 300 may be mounted on each multi-part tooth 120 of the stator 100 with its inner surface snug against the outer surface of the tooth 120 (i.e., faces A, B, C, and D of FIGS. 23C and 23D) such that the outer surface of the coil 300 has substantially the same shape as the underlying surface of the tooth 120. In some embodiments, the coil 300 may be mounted on tooth 120 such that its radially outward end is positioned close to the air gap 250 and the poles (of the permanent magnets) of rotor 200 (see, e.g., FIG. 3). It should be noted that although the discussion above makes specific reference to features (faces A, B, C, D, etc.) identified in the tooth 120 of FIGS. 23A-23D, the discussion above is equally applicable to all embodiments of tooth 120 (in stator and/or rotor).

An electric machine 10 of the current disclosure may include a stator 100 and a rotor 200 that is configured to rotate with respect to the stator 100 about an axis of rotation 1000. At least one of the stator 100 or the rotor 200 may include a plurality of teeth 120 that are annularly arranged about the axis of rotation 1000. An electromagnetic coil 300 may be mounted on each tooth 120. Each coil 300 may have a non-uniform trapezoidal cavity 320, and each tooth 120 may be formed of multiple pieces. When the multiple pieces are assembled, the external shape of the tooth 120 may correspond to the shape of the coil cavity 320 that receives the tooth 120. In some embodiments, as will be described later with reference to FIGS. 26A-26D, the external perimeter of each tooth 120 may correspond to an internal perimeter of the cavity 320. In some embodiments, after a coil 300 is mounted on a multi-part tooth 120, the external perimeter of the tooth 120 may correspond to the internal perimeter of the cavity 320 at each point in the radial direction of the tooth 120.

In some embodiments, the multiple pieces of each tooth 120 may include a core tooth-portion 122 and at least one additional tooth-portion 124A-124F (see, e.g., FIGS. 23A-23M). In some embodiments, each tooth 120 may include a core tooth-portion 122 and two additional tooth-portions 124A, 124B disposed on opposite sides of the core tooth-portion 122 (see, e.g., FIGS. 23A, 23K-23M). In some embodiments, the additional tooth-portions 1124A, 124B may be wedge-shaped. That is, these tooth-portions may extend from a narrower first end 126 to a broader second end 128.

In some embodiments, each tooth 120 may only include a core tooth-portion 122 and a single additional tooth portion 124C positioned on one side surface of the core tooth-portion 122 (see, e.g., FIG. 23H). In some embodiments, each tooth 120a may include a core tooth-portion 122 and a pair of wedge-shaped additional tooth-portions 124A, 124B disposed on opposite sides of the core tooth-portion 122 and another pair of additional tooth-portions 112e, 112f disposed on the top and bottom surfaces of the core tooth-portion 122 (see, e.g., FIG. 23K). Each additional tooth-portion of a pair may be substantially identical. In some embodiments, after a tooth 120 is assembled, in a plane perpendicular to the axis of rotation 100, the entire multi-part tooth 120 may have a trapezoidal cross-sectional shape, the core tooth-portion 122 (or tooth 120) may have a substantially rectangular cross-sectional shape and each additional tooth-portion 124A, 124B, 124C may have a substantially triangular cross-sectional shape (see, e.g., FIG. 23C, 23H). And in a plane perpendicular to a radial direction, the multi-part tooth, the core tooth-portion 122, and the additional tooth-portions 124A, 124B, 124C may each have a substantially rectangular cross-sectional shape (see, e.g., FIGS. 23A, 23F).

Regardless of how many parts a multi-part tooth 120 is made of, and the specific shape of these parts, after a tooth 120 is assembled, a cross-section of each tooth 120 in the radial plane (see, e.g., FIGS. 3, 23C, 23H) and the axial plane (see, e.g., FIGS. 2, 23D) may have a trapezoidal shape (and in some embodiments, an isosceles trapezoidal shape). In some embodiments, as will be explained later with reference to FIGS. 26A-26D, the perimeter of the cross-section of a tooth 120 in a plane perpendicular to the radial direction of the tooth 120 is substantially a constant in the radial direction, and the area of the cross-section varies in the radial direction. In an embodiment of the electric machine with an inner stator 100 and an outer rotor 200 (see, FIGS. 2, 3), or an external stator 100 and internal rotor 200 (see, FIGS. 8B, 8C) the cross-sectional area increases in the radial direction towards the rotor 200. In some embodiments, the cross-sectional area of a tooth 120 in a plane perpendicular to the axis of rotation 1000 may decrease in the axial direction from the center to the sides of the tooth 120 (see, e.g., FIGS. 27A-27D).

When the multiple pieces of each tooth 120 are assembled, each tooth 120 may define external surfaces having two sets of opposing faces. For example, in the embodiment of tooth 120 illustrated in FIG. 23B, opposing side surfaces C and D form one set of opposing faces and the opposing top and bottom surfaces A and B form another set of opposing faces. The opposing faces C, D (and A, B) of each set are non-parallel to each other. Each face of the two sets is inclined in the radial direction of the tooth 120 (see FIGS. 23C, 23D). In some embodiments (e.g., in an embodiment with an outer rotor 200 and an inner stator 100), the opposing faces (A, B) of one set may converge towards each other in a radially outward direction (see, e.g., FIG. 23D) towards the air gap 250 (see FIG. 2), and the opposing faces (C, D) of the other set may diverge from each other in the radially outward direction towards air gap 250 (see FIGS. 3, 23C). In some embodiments (e.g., in an embodiment with an inner rotor 200 and an outer stator 100), the top and bottom opposing faces may diverge from each other towards the air gap 250 (see FIG. 6B) and the opposing side faces may converge towards each other towards air gap 250 (see FIG. 6C).

The different parts of tooth 120 (i.e., core tooth-portion and additional tooth-portions) may be made of any suitable material (e.g., steel laminations, Soft Magnetic Composite (SMC), etc.). In some embodiments, both the core tooth-portion 122 and the additional tooth-portions 124A-124F of each tooth 120 may be made of the same material (e.g., SMC). In some embodiments, core tooth-portion 122 may be made of a first material and the additional tooth-portions 124A-124F may be made of a second material. For example, in some embodiments, the core tooth-portion 122 may be made of an SMC and the additional tooth portions 124A-124F may be made from another isotropic material, for example another SMC). This is due to the passage through core tooth-portion 122 and the additional tooth portions 124A-124F magnetic flux, which changes in 3 directions and not in a plane. In embodiments where the core tooth-portion 122 is formed integrally with the annular part 130 of the stator core 110 (see, e.g., FIGS. 23A, 23G), both the core tooth-portion 122 and the annular part 130 may be made of the same material (e.g., SMC).

In various embodiments of the current disclosure, each tooth of the plurality of teeth of the electric machine extends in a radial direction such that a plurality of cross-sectional areas of each tooth in a plurality of planes perpendicular to the radial direction vary, and perimeters of the plurality of cross-sections are substantially the same across the plurality of perpendicular planes. Any direction that extends perpendicular (or substantially perpendicular) to the axis of rotation of the electric machine is a radial direction of electrical machine. For example, in the embodiment illustrated in FIGS. 1 and 2, any direction that generally extends perpendicular to the axis or rotation 1000 is a radial direction. In some embodiments, the radial direction may extend along, or be coincident with, a radial axis of the tooth of the electric machine. As explained previously, in some embodiments, each tooth 120 (of the stator 100 and/or the rotor 200) has a trapezoidal cross-sectional shape in both the radial plane (see FIG. 3) and the axial plane (see FIG. 2), and the width of tooth 120 in the radial plane (see FIG. 3) increases in a radially outward direction (i.e., towards the rotor 200), while the length of the tooth 120 in the axial plane (see FIG. 2) decreases in that same direction.

Figures 26A, 26B, 26C, 26D:
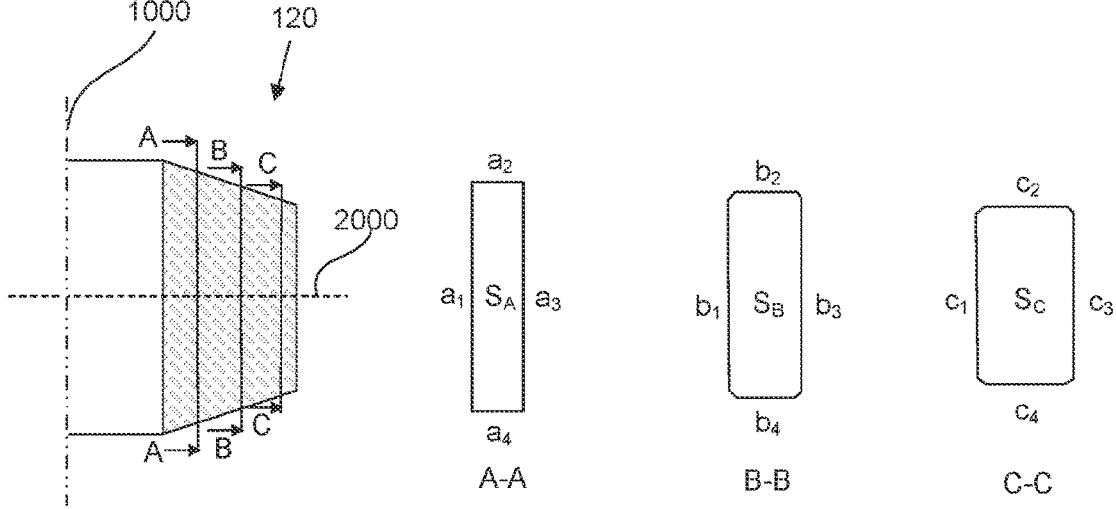
FIGS. 26A-26D illustrate cross-sectional views of an exemplary tooth in different planes.

FIGS. 26A-26D are cross-sectional images of a tooth 120 along different planes. FIG. 26A illustrates the cross-sectional image of a single tooth 120 in the axial plane (compare with FIG. 2). The tooth 120 is shown hatched in FIG. 26A. As evident from FIG. 26A, the cross-sectional shape of tooth 120 in the axial plane is trapezoidal (i.e., a quadrilateral with one pair of opposing parallel sides and another pair of opposing non-parallel sides). In some embodiments, as will be explained with reference to FIGS. 31A and 31B, the cross-sectional shape of tooth 120 in the axial and/or the radial planes is an isosceles trapezoid (i.e., a trapezoid where the length of the opposite sides are equal). As also evident from FIG. 26A, the length of tooth 120 decreases with increasing distance in the radial direction, that in this embodiment, is coincident with the radial axis 2000. FIGS. 26B-26D illustrate cross-sections of tooth 120 at different planes (A-A, B-B, and C-C) perpendicular to the radial direction. FIG. 26B is the cross-sectional view of teeth 120 along plane A-A, FIG. 26C is the cross-sectional view of teeth 120 along plane B-B, and FIG. 26D is the cross-sectional view of teeth 120 along plane C-C. As can be seen from FIGS. 26B-26D, in planes perpendicular to the radial direction of the tooth 120, the tooth 120 has a rectangular cross-sectional shape.

In should be noted that, although, perfect rectangles with square corners (i.e., 90° corners) are illustrated in FIGS. 26B-26D, this is only exemplary. As previously explained, in some embodiments, these cross-sectional shapes may not be perfect rectangles. As would be recognized by a person skilled in the art, in some embodiments, the opposite sides of the rectangles may not be perfectly parallel, the adjacent sides may not be perfectly perpendicular, and the corners may be rounded and/or chamfered. As illustrated in FIGS. 26B-26D, in embodiments of electric machines with an inner stator 100 and outer rotor 200 (see FIGS. 2-3), the rectangular shape gets shorter and wider as the distance in the radial direction increases. That is, as the distance in the radial direction increases from the axis of rotation 1000, the length of the tooth 120 decreases (i.e., $a_1 > b_1 > c_1$ and $a_3 > b_3 > c_3$), and the width of the tooth 120 increases (i.e., $a_2 < b_2 < c_2$ and $a_4 < b_4 < c_4$). Although not required, in some embodiments, the opposite sides of the cross-sectional shape may be equal. That is, $(a_1 = a_3) > (b_1 = b_3) > (c_1 = c_3)$, and $(a_2 = a_4) < (b_2 = b_4) < (c_2 = c_4)$. In other words, tooth 120 gets progressively shorter and wider in the radially outward direction from the axis of rotation 1000. The cross-sectional area of tooth 120 (i.e., the cross-sectional area in the plane perpendicular to the radial direction) also varies in the radially outward direction. In an embodiment where the rotor 200 is outside the stator 100 (e.g., FIGS. 2, 3), the cross-sectional area may increase in the radially outward direction (i.e., $S_A < S_B < S_C$). In other embodiments of electric machines, the area may vary in a different manner along the radial direction. For example, in electric machines with an inner rotor and outer stator (see FIG. 8B-8C), the cross-sectional area may increase in the radially inward direction.

With reference to FIGS. 26A-26D, the perimeter of each tooth 120 in the radial direction may be substantially a constant, while the cross-sectional area of each tooth 120 in the radial direction may vary. That is, the perimeter of the cross-sections of tooth 120 along planes A-A, B-B, and C-C (see FIGS. 26B-26D) may be substantially the same, while its cross-sectional area in these planes may not be a constant (or may vary). That is, $(a_1+a_2+a_3+a_4) \approx (b_1+b_2+b_3+b_4) \approx (c_1+c_2+c_3+c_4)$, and $S_A$ $S_B$ $S_C$. Irrespective of the configuration of the electric machine, in all embodiments, the perimeter of each tooth (in a cross-section perpendicular to the radial direction) may remain substantially a constant along the radial direction while its cross-sectional area may vary in this direction.

Figures 27A, 27B, 27C, 27D:
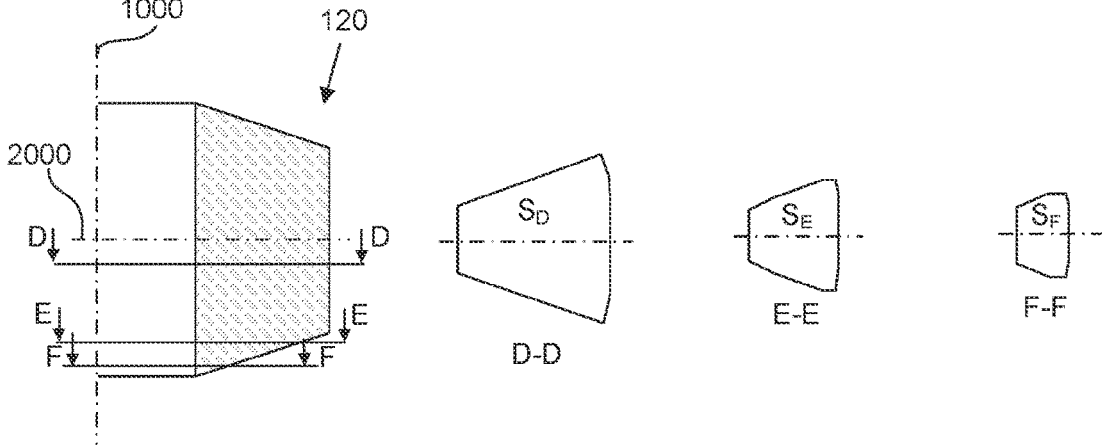
FIGS. 27A-27D illustrate cross-sectional views of an exemplary tooth in different planes.

FIGS. 27A-27D are cross-sectional views of a tooth 120 along different planes. Like FIG. 24A, FIG. 27A illustrates the cross-sectional image of a tooth 120 in the axial plane. FIGS. 27B-27D illustrate cross-sections of tooth 120 at different planes (D-D, E-E, and F-F) perpendicular to the axis of rotation 1000 (or parallel to the radial direction) along the axial direction of tooth 120 (i.e., along the axis of rotation 1000). FIG. 27B is the cross-sectional view of tooth 120 along plane D-D, FIG. 27C is the cross-sectional view of tooth 120 along plane E-E, and FIG. 27D is the cross-sectional view of tooth 120 along plane F-F. As illustrated in these figures, in the axial direction from the middle to the end of the tooth 120, the cross-sectional area of the tooth 120 decreases. That is, $S_D > S_E > S_F$. In other words, the cross-sectional area of the tooth 120 in a plane perpendicular to radial direction (and the radial axis 2000 in some embodiments) varies in the radial direction (see FIGS. 26B-26D), and the cross-sectional area of the tooth in a plane perpendicular to the axis of rotation 1000 (or parallel to the radial direction) varies in the axial direction (see FIGS. 27B-27D). In an embodiment of electric machine 100 where the rotor 200 is outside the stator 100 (FIGS. 2, 3), the cross-sectional area of each tooth 120 increases in the radial direction (see FIGS. 26B-26D) and decreases in the axial direction (see FIGS. 27B-27D).

Figure 28A:
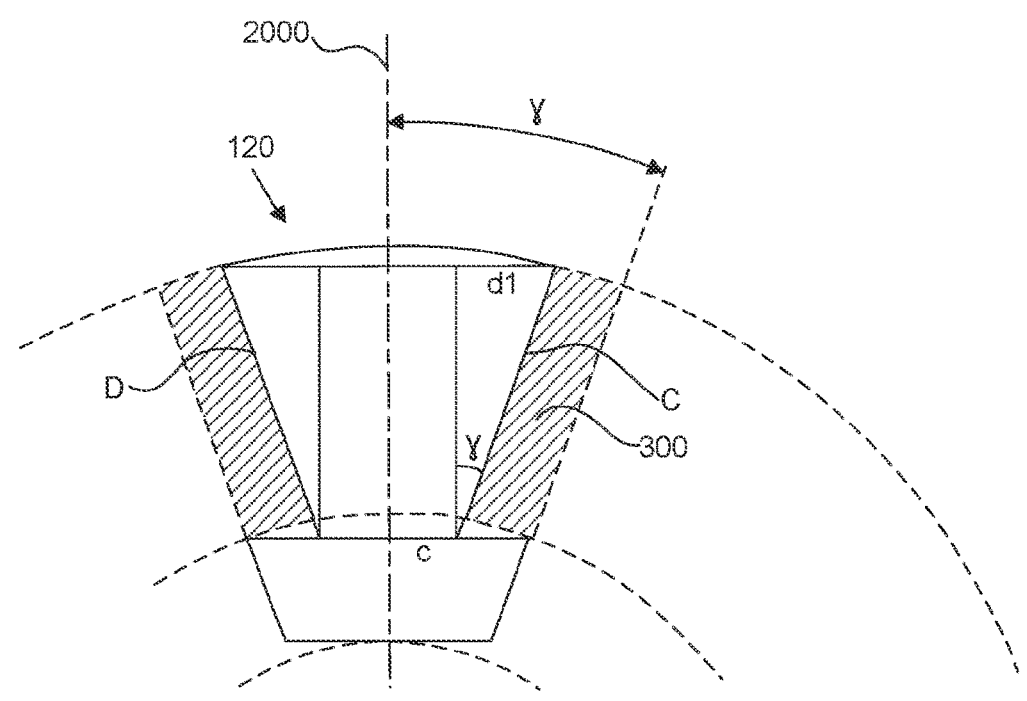
Figure 28B:
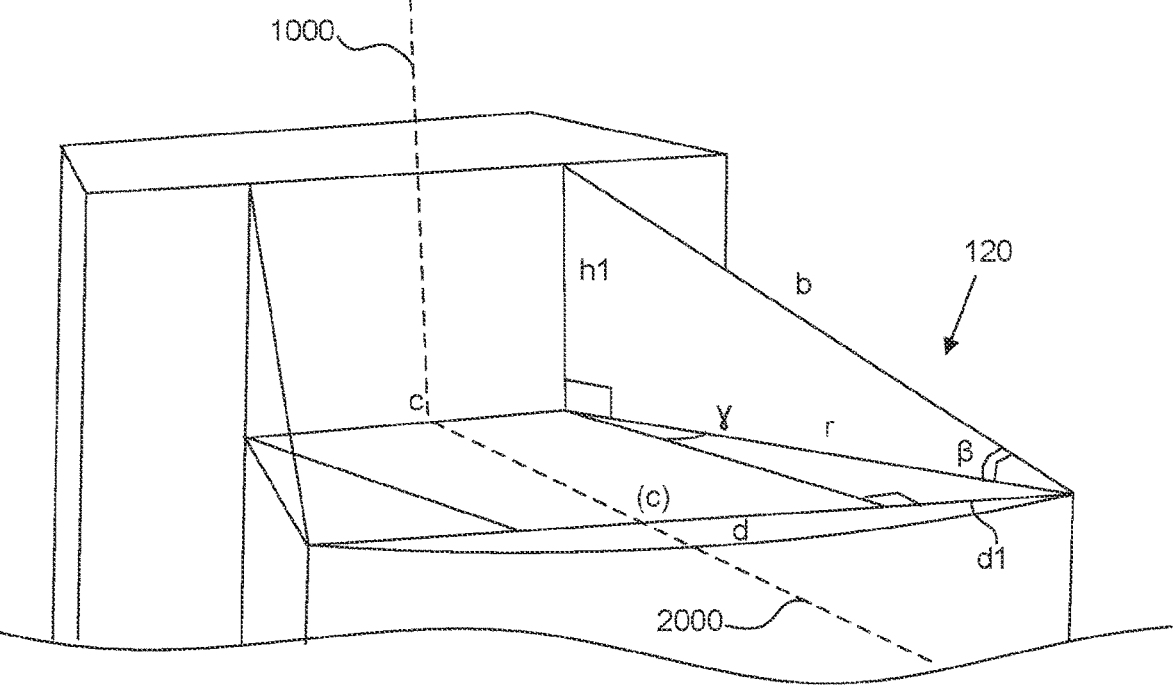

FIGS. 28A and 28B illustrate geometrical details of an exemplary tooth 120 (of electric machine 10 of FIG. 2, 3). FIG. 28A is a cross-sectional view of the tooth 120 in the radial plane and FIG. 28B is a perspective view of the tooth 120 (looking down on the tooth). As explained previously, in embodiments of an electric machine with an inner stator 100 and outer rotor 200, each tooth 120 becomes wider in the radial plane as it extends radially outward (see FIG. 3). As shown in FIG. 28A, the opposite side surfaces C, D of tooth 120 forms an angle γ with the radial direction (and the radial axis 2000 in some embodiments) of the tooth 120. The value of angle γ may be determined by the number of teeth 120 in electric machine 100. In general, angle 2γ (which is the angle between the opposite side surfaces C, D of tooth 120) equals about 360 degrees divided by the number of teeth 120. That is, $2\gamma \approx 360°/n$, where n is the number of teeth. For example, for an electric machine 10 with nine teeth 120 (see FIG. 3), the angle $2\gamma \approx 360/9=40°$. Thus, each side surface C, D of tooth 120 is inclined by about 20° from the radial axis 2000. With reference to FIG. 28B, the front and back surfaces of tooth 120 makes an angle β in the axial plane of the tooth 120. Angle β is also determined by the number of teeth of the electric machine (100). A tooth 120 having a substantially constant perimeter in the radial direction leads to the correlations (see FIG. 28B): $h_1=d_1$; $d_1=r*Sin(\gamma)$; $h_1=r*Tan(\beta)$; $r*Sin(\gamma)=r*Tan((3)$; $Sin(\gamma)=Tan(\beta)$; $\beta=Arctan(Sin(\gamma))$, or $\beta=1/Tan(Sin(\gamma))$.

Figure 29A:
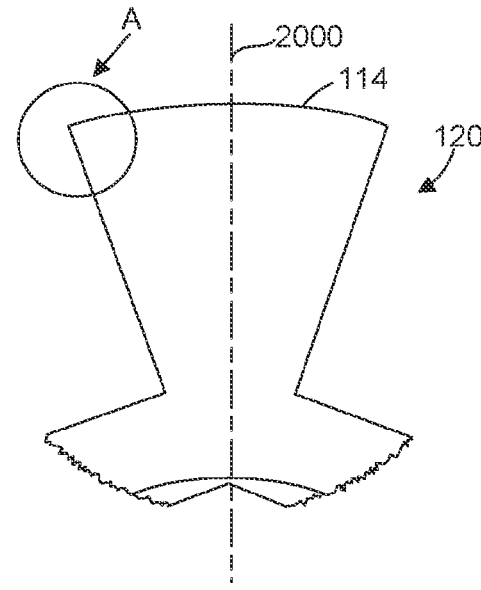
Figure 29B:
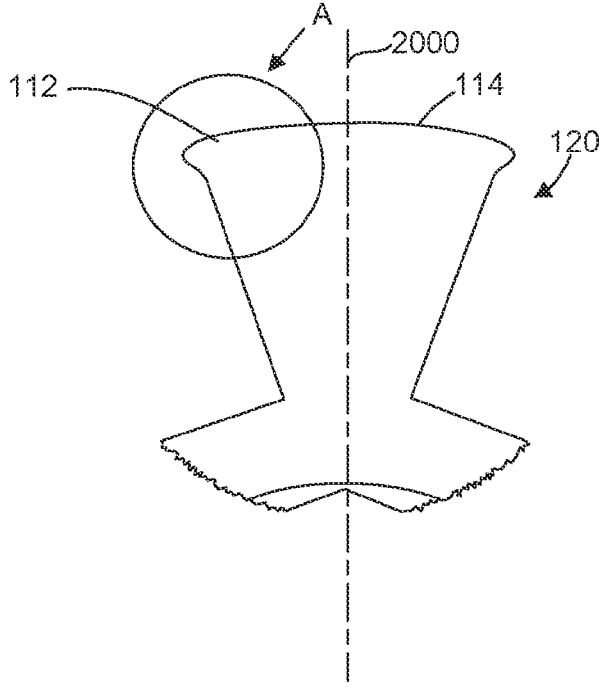

FIGS. 29A and 29B illustrate the cross-sectional view of an exemplary tooth 120 in the radial plane. Tooth 120 of FIG. 29B includes a pole piece or a shoe 112, while tooth 120 of FIG. 29A does not. As shown in these figures, the width of tooth 120 increases in the radial direction (along radial axis 2000) (i.e., towards air gap 250, see FIGS. 2, 3). As explained with reference to FIGS. 26A-26D, the geometrical dimensions of the tooth 120 are such that the cross-sectional area of the tooth 120 increases in the radial direction. In both an embodiment of the tooth 120 with a shoe 112 (FIG. 29B) and without (FIG. 29A), the increase in cross-sectional area ($S_A < S_B < S_C$) along the radial direction may be smooth. In some embodiments, the increase in cross-sectional area may be monotonic. In some embodiments, the rate of variation (increase or decrease) of the cross-sectional area may be a constant. A smooth variation (increase or decrease) in cross-sectional area towards the air gap 250 enables the use of the radially outermost end 114 (or tip) of the tooth 120 and the shoe 112 (if a shoe is used) as a magnetic conductor (or a magnetic field concentrator) even when a large current is flowing through the coil 300 mounted on the tooth 120.

FIG. 30 is a schematic illustration of a tooth 120 and a portion of the rotor 200 of the electric machine 10 of FIGS. 2 and 3. As can be seen in FIG. 30, the air gap 250 that exists between the stator 100 and the rotor 200 is formed between the radially outermost end 114 of the tooth 120 and the rotor 200 (the permanent magnets of the rotor). As illustrated in FIG. 30, in some embodiments, the coil 300 may be mounted on the tooth 120 such the radially outermost end 316 of the coil 300 is positioned as close as possible to the air gap 250. The radial distance y between the radially outermost end 316 of the coil 300 and the radially outermost end 114 of the tooth 120 may depend on the application and fabrication methods used. In some embodiments, the distance y may be less than or equal to about 20% of the air gap 250. In some embodiments, the distance y may be between 0-20% of the air gap 250. In some embodiments, the radially outermost end 316 of the coil 300 may be substantially coincident with the radially outermost end 114 of the tooth 120 (i.e., y≈0). In other words, the radially outermost end 316 of the coil 300 may not protrude beyond the radially outer-most end 114 of the tooth 120.

As also illustrated in FIG. 30, in some embodiments, the radially outermost end 114 of the tooth 120 may be rounded or curved such that the radially outermost ends 114 of all the teeth 120 have a substantially circular profile. The cross-sectional shape of the tooth 120 in the axial plane and the radial plane may be an isosceles trapezoid or non-isosceles trapezoid. FIGS. 31A and 31B are schematic illustrations (in the radial plane or the axial plane) of a tooth 120 having an isosceles trapezoidal shape and a tooth 120A having a non-isosceles trapezoidal shape. It should be noted that the teeth of an electric machine of the current disclosure may have an isosceles or a non-isosceles trapezoidal shape in the radial plane (see FIG. 3) and/or the axial plane (see FIG. 2). The trapezoidal geometry of tooth 120, as well as a smooth increase in the cross-sectional area of the tooth in the radial direction and the location of the coil on the tooth close to the gap may assist in reducing leakage fluxes of the electrical machines and thereby assist in increasing its efficiency and power output.

As explained above, in some embodiments, the electric machines of the current disclosure may include a stator 100 and a rotor 200 configured to rotate with respect to the stator 100 about an axis of rotation 1000 (see, e.g., FIGS. 2, 3, 8A-22). At least one of the stator 100 or the rotor 200 may include a plurality of teeth 120 that are annularly arranged about the axis of rotation 1000. The plurality of teeth 120 may be annularly arranged on the stator 100 or on the rotor 200. Each tooth 120 may extend in a radial direction such that the cross-sectional areas (e.g., $S_A$, $S_B$, $S_C$) of each tooth 120 in a plurality of planes (e.g., A-A, B-B, C-C) perpendicular to the radial direction varies (see, e.g., FIGS. 26A-26D). The perimeters of the plurality of cross-sections may be substantially a constant across the plurality of perpendicular planes. That is, the cross-sectional area of each tooth in a plane perpendicular to the radial direction may vary along the radial direction while the perimeter of the cross-sections remains substantially a constant in this direction (see, e.g., FIGS. 26A-26D).

In some embodiments, the cross-sectional area of each tooth 120 in a plane perpendicular to the axis of rotation 1000 varies along the axial direction (see, e.g., FIGS. 27A-27D). As explained previously, based on the configuration of the rotor 200 and the stator 100, the cross-sectional area may increase or decrease towards the rotor 200 when a plurality of teeth are located on the stator. The cross-sectional shape of each tooth 120 in both the radial plane and the axial plane may be trapezoidal (see, e.g., FIGS. 2, 3, 6A-22). In some embodiments, the cross-sectional shape of each tooth 120 in the radial and/or axial plane is a non-isosceles trapezoid (see, e.g., FIG. 31A). While in some embodiments, the cross-sectional shape of each tooth 120 in the radial and/or axial plane is an isosceles trapezoid (see, e.g., FIG. 31B). In embodiments where the rotor 200 is disposed radially outwards of the stator 100 (see, e.g., FIGS. 2, 3), a width of each tooth in a radial plane (see FIG. 3) increases in the radial direction towards the rotor 200, and a length of each tooth in an axial plane (see FIG. 2) decreases in the radial direction towards the rotor 200.

As explained previously, the electric machine may also include a plurality of electromagnetic coils 300. The method of forming a coil 300 is described later with reference to FIGS. 48-52. Each coil 300 may be mounted on, and extend around, a separate tooth 120 of the electric machine (see, e.g., FIGS. 8A-22). The method of mounting a coil 300 on a multi-part tooth 120 is described later with reference to FIGS. 45-47. Each coil 300 may include an electrical conductor (e.g., copper wire) in the form of a wire 314 having any cross-sectional shape or a flat foil 312. In some embodiments, the wire 314 may have one of a square, rectangular, or circular cross-sectional shape (see, e.g., FIGS. 7D, 7E). Any type of wire 314 may be used to form the coil 300. The wire may include a single strand or multiple strands (e.g., twisted together). In some embodiments, the wire may be a multi-strand wire (see, e.g., FIGS. 7A, 7B). In some embodiments, each coil 300 may be wound in the form of a spiral in the radial direction along a tooth 120 (see, e.g., FIG. 7B). In some embodiments, in place of a wire, a foil 312 (e.g., a copper foil) may be used to form the coil 300 (see, e.g., FIGS. 6A-6D). The foil 312 may be wound around a tooth 120 such that a width of the foil extends over the entire length of the tooth 120 in the radial direction (see, e.g., FIG. 6A). Alternatively, in some embodiments, a thinner foil (e.g., a foil having a width less than the length of the tooth 120 in the radial direction) may be wound (e.g., on a rib) in the form of a spiral in the radial direction along the tooth 120 (see, e.g., FIGS. 6C, 6D).

As explained previously, teeth 120 may include multiple parts (core tooth-portion 122 and one or more additional tooth-portions 124A-124F) coupled together (see, e.g., FIGS. 23A-23M). As also explained previously, these multiple parts may be made of the same material or of different materials (SMC, etc.). In some embodiments, the core tooth-portion 122 may be integrally formed with an annular ring 130 of the stator core 110 that extends around the axis of rotation 1000. In some embodiments, one or more of the additional tooth-portions (e.g., 124A, 124B, 124E, 124F) may be wedge-shaped and disposed on opposite sides of the core tooth-portion 122. Each tooth 120 extends in the radial direction such that the cross-sectional area of the tooth 120 in a plane perpendicular to the radial direction may vary in the radial direction toward the rotor. In embodiments where the rotor 200 is positioned radially outwards of the stator 100, the cross-sectional area of the tooth 120 increases in the radial direction towards the rotor 200.

In various embodiments of electric machines of the current disclosure, the stator may include an annular stator ring extending about the axis of ROTATION. As used herein, an annular stator ring is a ring-shaped structure associated with the stator. The ring-shaped structure may be disposed about the axis of rotation of the electric machine. With reference to FIGS. 23A-23K, for example, stator 100 of electric machine 10 includes an annular part 130 that extends around the axis of rotation 1000. Various embodiments of the electric machines of the current disclosure may also include a plurality of multi-part teeth circumferentially arranged on the stator ring. In other words, the plurality of teeth may each include multiple parts and they may be positioned on or near the circumference of the annular stator ring. As best seen in FIGS. 23A and 23C, in embodiments of the current disclosure, a plurality of multi-part teeth 120 are circumferentially arranged on the annular part 130 of stator 100.

In various embodiments, each multi-part tooth of the plurality of multi-part teeth may include a core tooth-portion integrally formed with the stator ring and at least one additional tooth-portion separate from the stator ring. That is, the core tooth-portion may be connected to the stator ring such that they form a single component and the at least one additional tooth-portion forms one or more additional components. In some embodiments, core tooth-portion and the stator ring may be formed as a single part and the additional tooth-portion(s) may be formed as separate parts. In some embodiments, the core tooth-portion and the stator ring may be formed as separate parts but may be attached together (e.g., fused or otherwise irremovably attached) to form a single part that may not be easily disassembled without destroying the integrity of the part, while the additional tooth-portion(s) may be attached together in a way that they may be easily separated from the stator ring.

As explained previously with reference to FIGS. 23A-23M, each tooth 120 of electric machine 10 may include multiple parts (e.g., core tooth-portion 122 and additional tooth-portions 124A-124F) arranged together. In the exemplary embodiments of the tooth 120 discussed with reference to FIGS. 23A-23K, the core-tooth portion 122 of each tooth 120 is integrally formed with the annular part 130 (of the stator core 110) that extends around the axis of rotation 1000, and one or more additional tooth-portions 124-124K positioned on the side surfaces and/or the top and bottom surfaces of the core tooth-portion 120 to form the tooth 120.

Figure 32A:
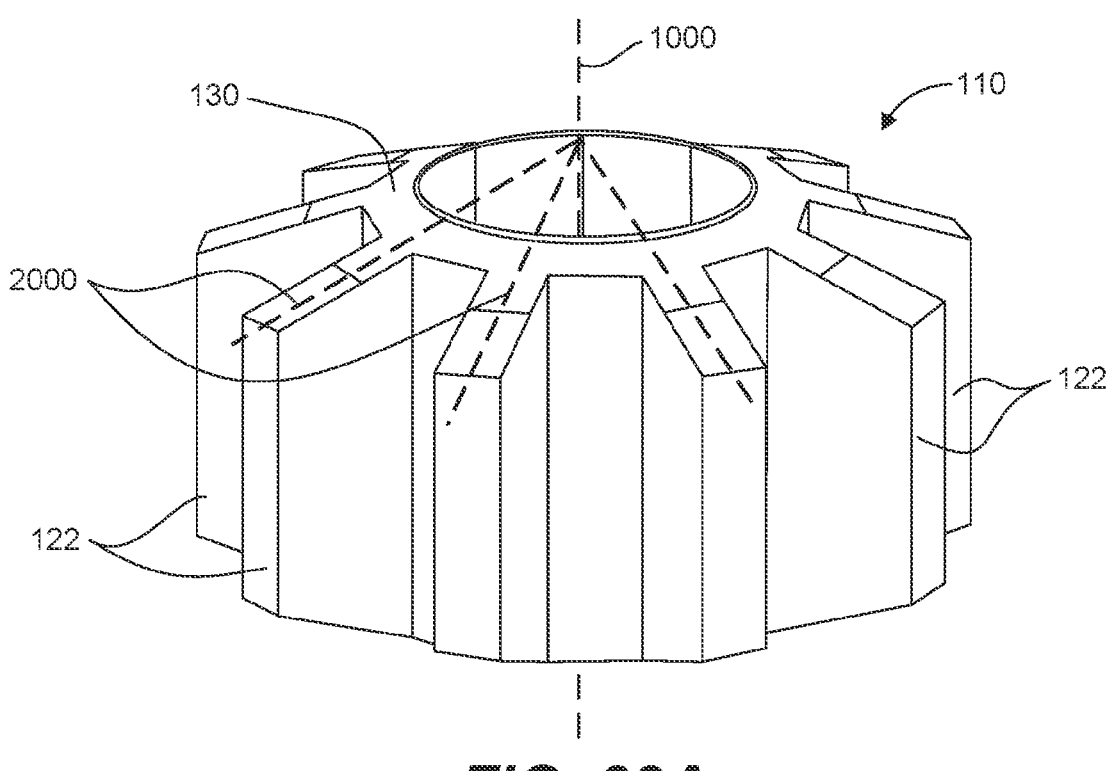
FIGS. 32A-32E illustrate exemplary embodiments of a stator core of the current disclosure.

FIG. 32A illustrates an exemplary embodiment of the annular part 130 of the stator core 110 with a plurality of core tooth-portions 122 arranged annularly on the annular part 130. Each core tooth-portion 122 extends radially outwards from the annular part 130 and includes a part of a multi-part tooth 112 (see FIG. 23A). In the embodiment of annular part 130 illustrated in FIG. 32A, each core tooth-portion 122 extends radially outwards from the annular part 130 along the radial axis 2000. However, as explained with reference to FIG. 23G, this is not a requirement. That is, in some embodiments, the core tooth-portion 122 may extend radially outwards from the annular part 130 but may be inclined with respect to the radial axis 2000.

The stator core 110 that forms the annular part 130 may be formed as a single part (i.e., not multiple parts that are joined together) as illustrated in FIG. 32A. In some embodiments (e.g., when the stator core 110 is made of SMC or another brittle material), fabricating a stator core 110 as a single part may be difficult and/or expensive. During fabrication of the stator core 110 and the operation of the electric machine, the parts of the core 110 may experience significant stresses (e.g., compression during fabrication, alternating pulsating loads, and thermo-mechanical forces, etc. during operation, etc.). These large stresses may limit the size of the stator core 110 that may be fabricated as a single part. For example, in some embodiments, the ratio of the thickness (e.g., thickness of the core-tooth portion 122) to the axial length (i.e., the height along the axis of rotation 1000) of the stator core 110 that may be reliably fabricated as a single part may be less than or equal to about 1:6. Larger sized stator cores 110 may be fabricated as multiple parts in some embodiments.

Figure 32B:
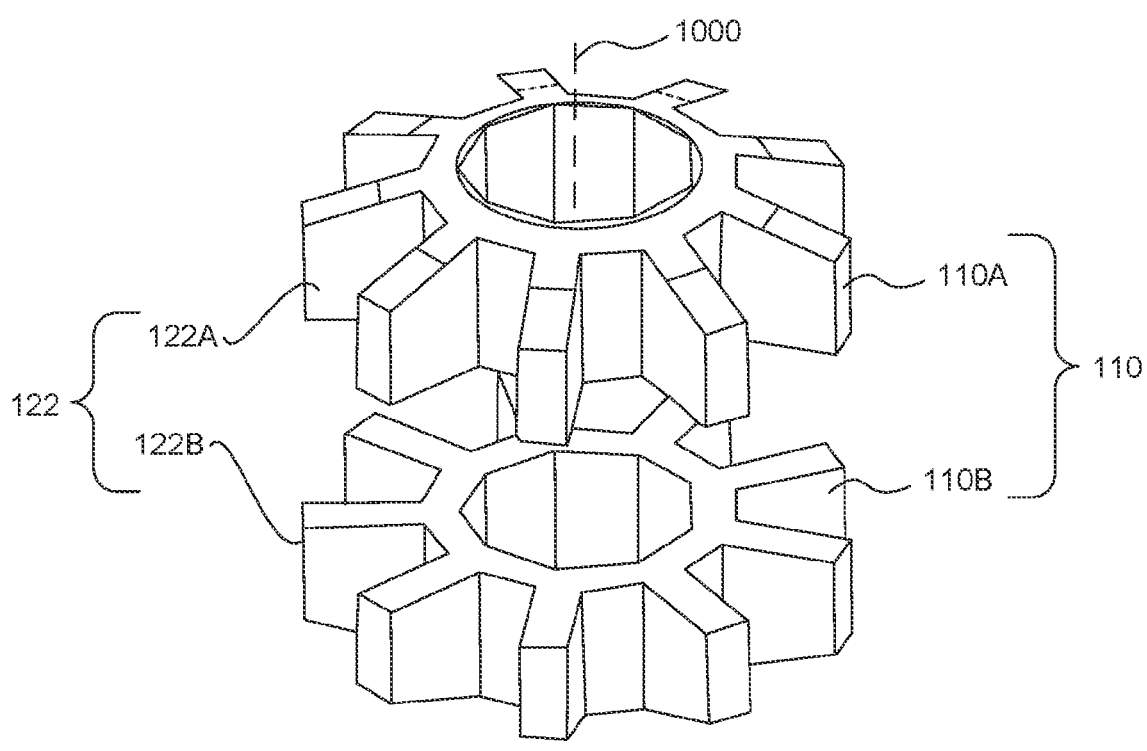
Figure 32C:
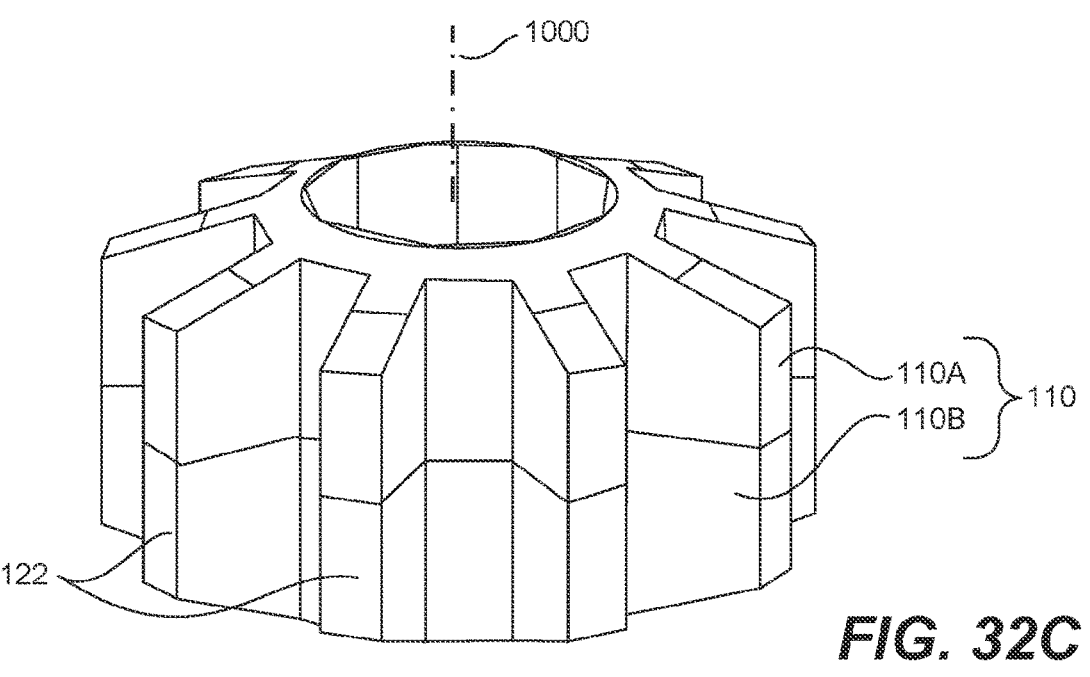
Figure 32D:
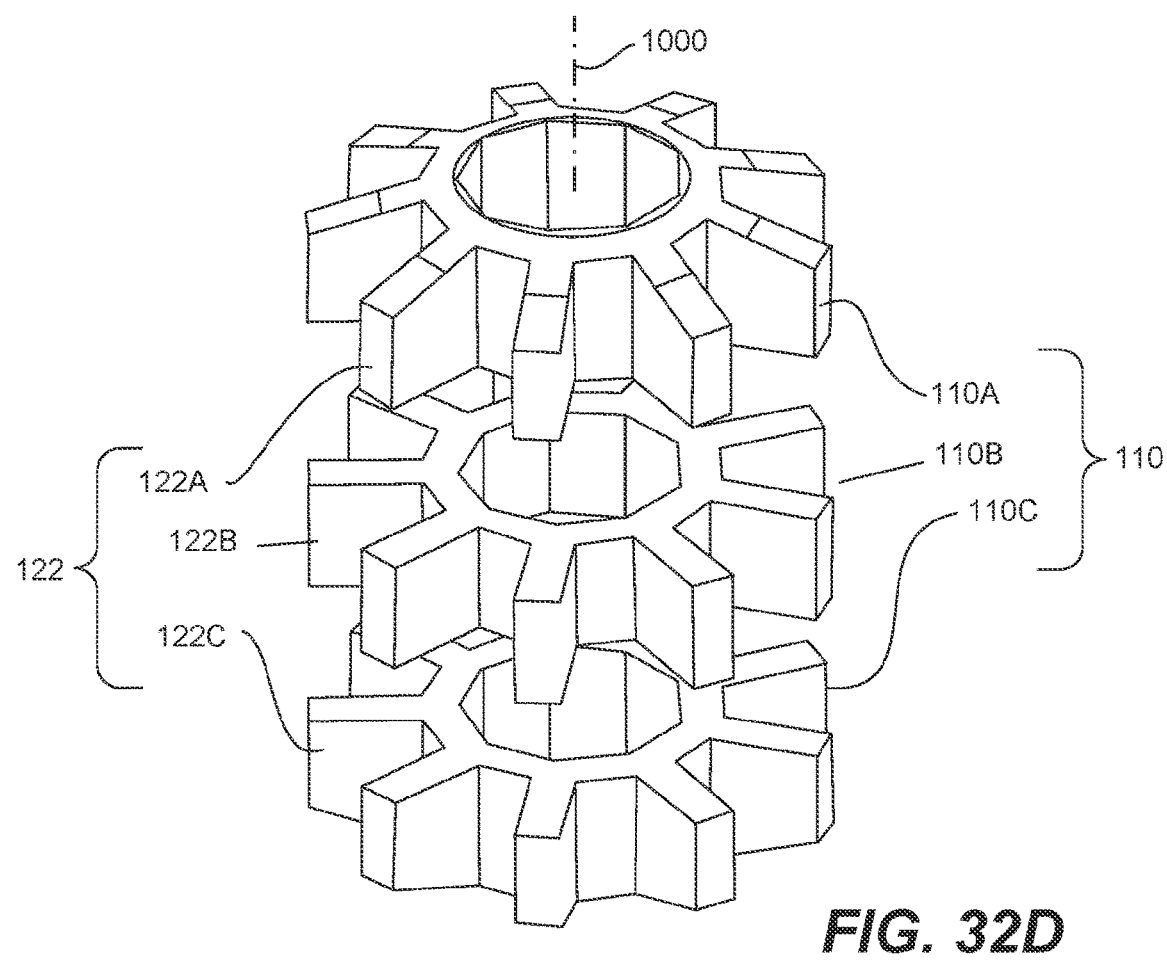
Figure 32E:
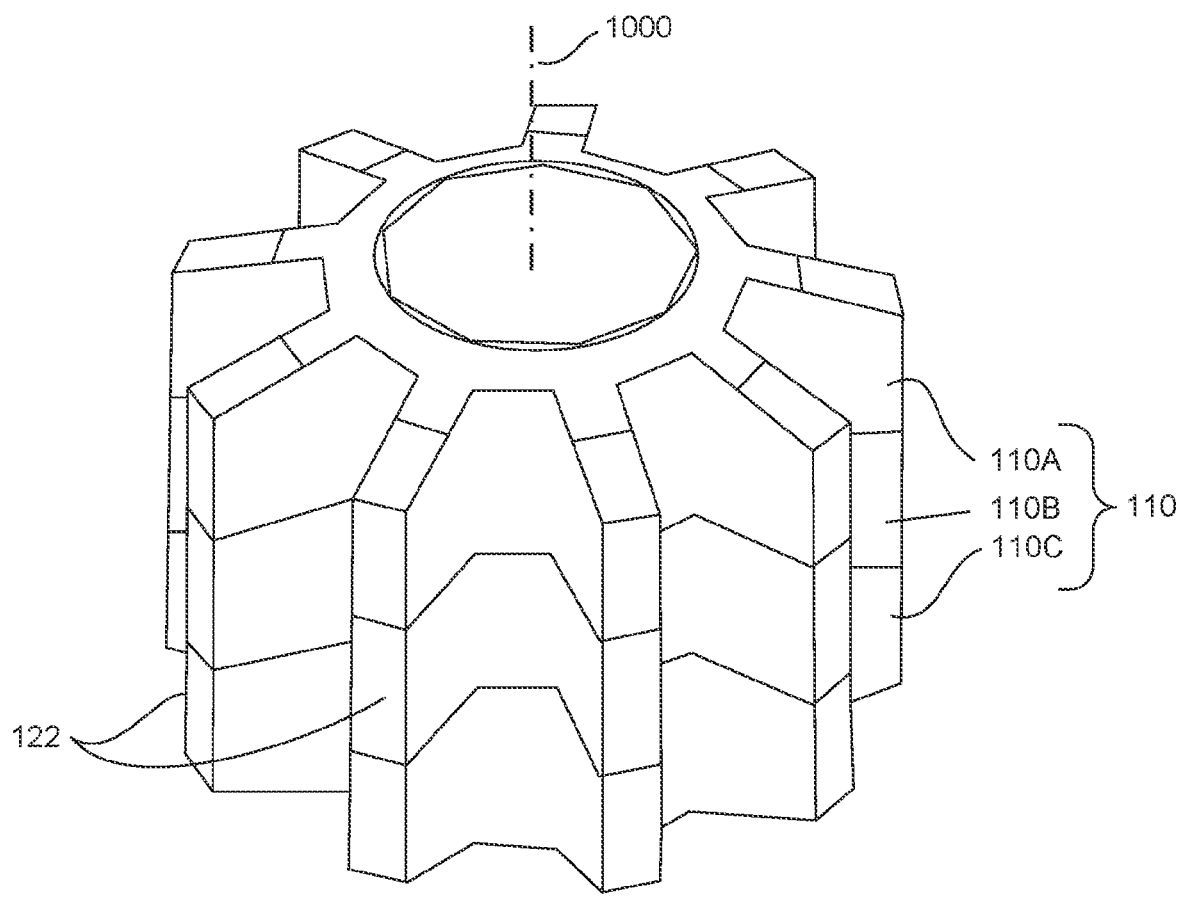

As illustrated in FIGS. 32B-32E, a stator core 110 may be made of multiple parts and then attached together. FIGS. 32B and 32C illustrate an exemplary stator core 110 made of two mirror-symmetric halves 110A, 110B that are attached together along the plane of symmetry to form the stator core 110. As illustrated in these figures, each half of the core 110A, 110B includes a half 122A, 122B of the core tooth-portion 122. The two halves 110A, 110B may be attached together using any type of adhesive material. In some embodiments, a permanent adhesive (e.g., an adhesive that cannot be removed easily without destroying the integrity of the part) may be used to attach the two halves 110A, 110B of the core 110 together. The CTE of the adhesive material used to attach the two halves 110A, 110B of the core 110 may within about 20% of the CTE of the material that forms the core 110 to reduce CTE mismatch induced thermo-mechanical stresses. In general, the stator core 110 may be formed by any number of parts that are joined together. FIGS. 32D and 32E illustrate an exemplary stator core 110 made of three parts 110A, 110B, 110C that are joined together (e.g., using the adhesive material discussed above).

To increase the strength of the stator 100, one or more parts of the stator core 110 may be made of laminated electric steel sheets assembled together. In some embodiments, multiple laminated steel sheets (e.g., silica-steel sheets) between, e.g., about 0.014" to 0.018" (29 to 26 gauge) thick and coated with a very thin layer of insulation (e.g., about 0.001" thick insulation layer) may be attached together to form a laminated steel part of the stator. In some such embodiments, a multi-part tooth 120 of the type described with reference to FIG. 23K may be used. The annular part 130 and the core tooth-portion 122 can be made of laminated steel or an isotropic material (SMC), and the additional portions 124A-124F may be made of isotropic material such as SMC. Due to the three-dimensionality of the magnetic fields, using a pair of additional tooth-portions 124A, 124B on the opposite side surfaces of the core tooth-portion 122 and another pair of additional tooth-portions 124E, 124F on the opposite top and bottom surfaces of the core tooth-portion 122 may provide suitable magnetic performance.

Figure 33A:
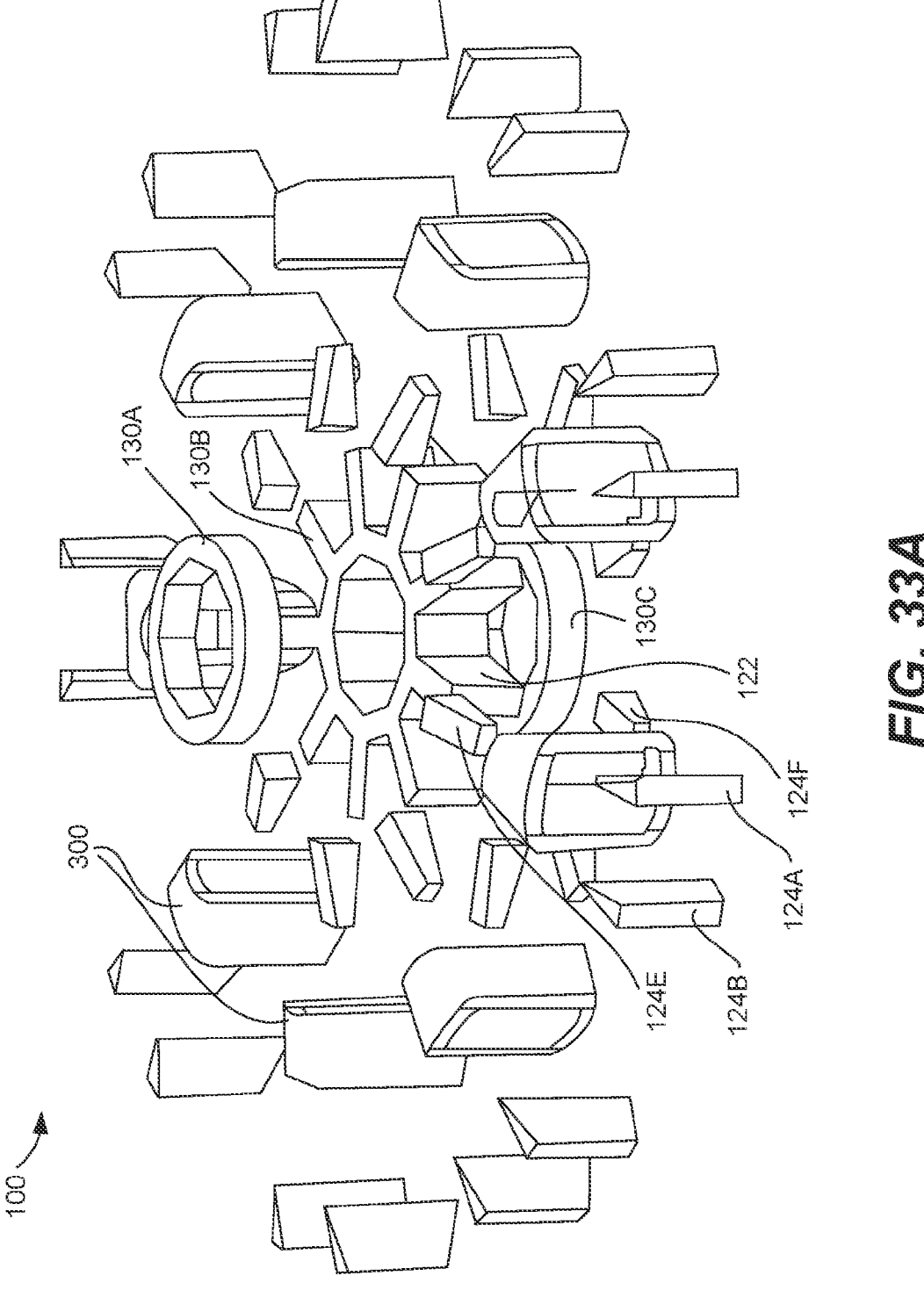
FIGS. 33A-33C illustrate different portions of an exemplary stator.
Figure 33B:
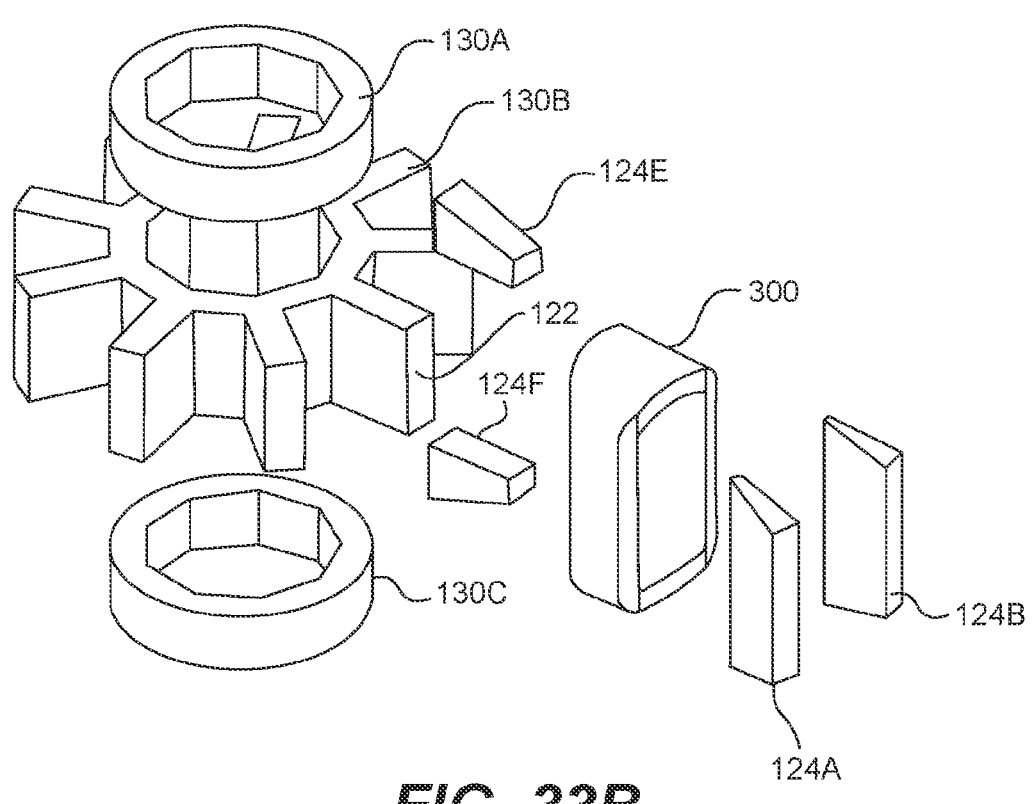
Figure 33C:
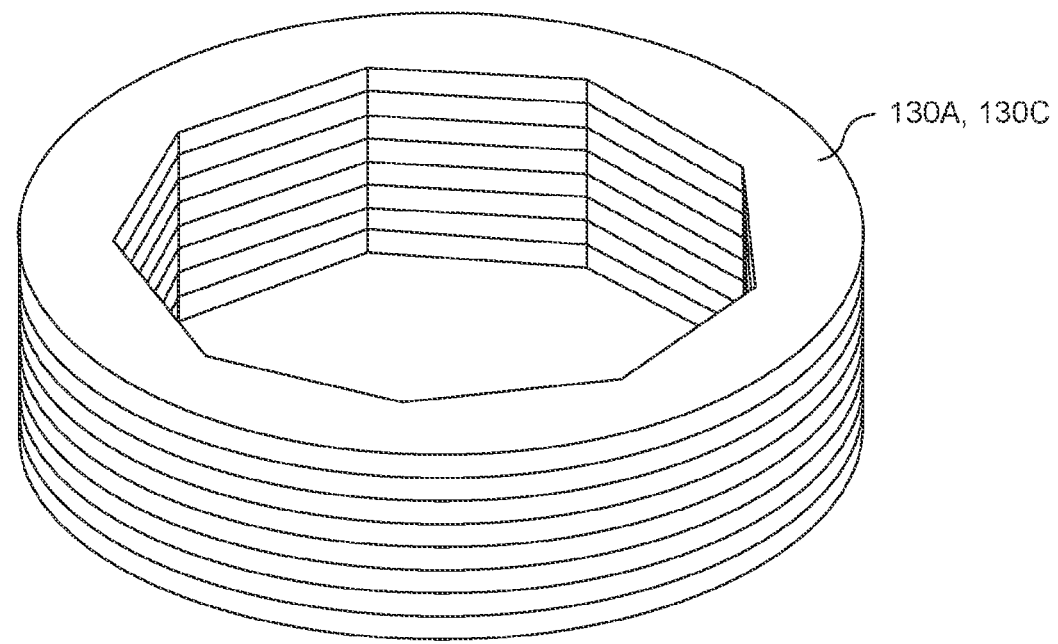

FIGS. 33A-33C illustrate an exemplary stator core 110 made of multiple materials. With reference to these figures, the stator core 110 includes upper and lower annular parts 130A, 130C attached to a central annular part 130B to form the annular part 130 of core 111. As shown in FIG. 33C, the upper and lower annular parts 130A, 130C may be identical components. In general, annular parts 1300A, 130B, and 130C may be made of any material (e.g., SMC, laminated steel, etc.) The upper and lower annular parts 130A, 130C may be made by attaching rings made of laminated steel together. The central annular part 130B may be made of SMC. In some embodiments, as best seen in FIG. 33B, core tooth-portion 122 may extend radially outwards from the central annular part 130B, and the upper and lower additional tooth-portions 124E and 124F may be attached to the upper and lower annular parts 130A, 130C and the top and bottom surfaces of the core-tooth portion 122 The additional toothed portions 124A, 124B, 124E, and 124F may be made of an isotropic material (SMC), and the upper and lower annular portions 130A, 130C, the central annular portion 130B, and the core tooth portion 122 may be made of laminated steel or isotropic material (SMC).

In various embodiments of the current disclosure, each coil of the plurality of electromagnetic coils is mounted on a different multi-part tooth of the plurality of multi-part teeth such that each coil surrounds a corresponding core tooth-portion of the multi-part tooth with a gap between the coil and the core tooth-portion, and the at least one additional tooth-portion is disposed in the gap. Each multi-part tooth may be associated with a separate electromagnetic coil. The coil may extend around the core-tooth portion of that multi-part tooth such one or more spaces or gaps are formed between the coil and the core tooth-portion. And the additional tooth-portions are positioned in these spaces or gaps. In some embodiments, as illustrated (for example) in FIGS. 4A, 23F, 23H, 23J, 23K, the core tooth-portion 124 of each multi-part tooth 120 is mounted on a coil 300 such that the coil 300 extends around the core tooth-portion 124 with one or more gaps formed between the outer surfaces of the core tooth-portion 124 and the inner surface of the coil 300. In the embodiment of FIG. 4 and FIG. 23A, where the multi-part tooth 120 is formed of a core tooth-portion 122 and a pair of additional tooth-portions 124A, 124B positioned on opposite side surfaces of the core tooth-portion 122, two gaps are formed between the opposite side surfaces of the core tooth-portion 124 and the inner surface of the coil 300 when the coil 300 is mounted on the core tooth-portion 122. One of the additional tooth-portions 124A, 124B is positioned in one gap and the other additional tooth-portion 124B is positioned in the other gap. In the embodiment of FIG. 23F where the multi-part tooth 120 is formed of a core tooth-portion 122 and a single additional tooth-portion 124C, this additional tooth-portion 124C is positioned in the gap formed between the side surface of the core tooth-portion 122 and the coil 300. And, in the embodiment of FIG. 23K, four gaps are formed between the external surfaces of the core tooth-portion 122 and the inner surface of the coil 300, and each addition tooth-portion 124A, 124B, 124E, 124F is positioned in a separate gap.

In some embodiments, electric machines (electric motor or generator) of the current disclosure may include a stator 100 and a rotor 200 configured to rotate with respect to the stator 100 about an axis of rotation 1000 (see, e.g., FIGS. 2, 3, 8A-22). At least one of the stator 100 or the rotor 200 may include a plurality of multi-part teeth 120 that are arranged about the axis of rotation 1000. The stator 100 may include an annular stator ring or part 130 extending about the axis of rotation 1000 (see, e.g., 23A, 23G, 23K, etc.). In some embodiments, the plurality of multi-part teeth 120 may be circumferentially arranged on the stator ring 130. Each multi-part tooth 120 may include a core tooth-portion 122 integrally formed with the stator ring 130 and at least one additional tooth-portion (e.g., additional tooth-portions 124A, 124B, 124E, 124F) formed separate from the stator ring 130. The electric machine may also include a plurality of electromagnetic coils 300. And each coil 300 may be mounted on a separate tooth 120 such that the coil 300 surrounds the core tooth-portion 122 of the multi-part tooth 120 with gap(s) formed between the coil 300 and the core tooth-portion 122 (see, e.g., 23E-23F, 23I-23K, 24A, etc.), and the additional tooth-portion may be disposed in the gap(s).

In some embodiments, the annular part (or ring) 130 may be formed of SMC. In some embodiments, the annular part 130 may be formed of laminated steel. In some embodiments, one portion of the annular part 130 may be formed of one material (e.g., laminated steel) while another portion is made of another material. In some embodiments, the annular part 130 may be formed as a single part (see, e.g., FIG. 32A). In other embodiments, the annular part 130 may be made of multiple parts (see, e.g., FIGS. 32B-32E). In some embodiments, the annular part 130 of the stator 100 may include two minor-symmetric halves coupled together along a plane of symmetry perpendicular to the axis of rotation 1000 (see, e.g., 32B-32C). The annular part 130 may include two or more substantially identical parts attached together (see, e.g., FIG. 32B-32E). Any type of adhesive material may be used to attach the parts of the stator ring 114 together. The CTE of the adhesive material may be within about 20% of the CTE of the attached components.

The annular stator ring 130 may include multiple (two, three, four, etc.) axially stacked annular parts (see, e.g., FIGS. 32B-33C). In some embodiments, each of the stacked annular parts may be made of the same material (e.g., SMC, laminated steel), while in other embodiments, the stacked annular parts may be made of different materials. For example, with reference to the annular part 130 of FIG. 33B, the top and bottom annular parts 130A, 130C may be made of one of laminated steel or SMC, and the central annular part 130B may be made of the other of laminated steel or SMC.

The core tooth-portion 122 of each multi-part tooth 120 may extend outward in a radial direction from the annular stator ring 114 (see, e.g., FIGS. 23C, 23G). In some embodiments, the core tooth-portion 122 extends radially outward from the annular stator ring 130 along the radial axis 2000 of the stator ring 130 (see, e.g., FIG. 23C). In some embodiments, the core tooth-portion 122 extends radially outward from the annular stator ring 130 inclined from the radial axis 2000 (see, e.g., FIG. 23G).

A cross-section of each of the core tooth-portion 122 and the at least one additional tooth-portion 124A-124F along a plane perpendicular to the radial direction has a substantially rectangular shape (see, e.g., FIG. 23A, 23F, 23K). In some embodiments, a cross-section of the core tooth-portion 112*a* along a plane perpendicular to the axis of rotation has a substantially rectangular shape and a cross-section of the at least one additional tooth-portion along the plane perpendicular to the axis of rotation has a substantially triangular shape (see, e.g., FIGS. 23C, 23H). In some embodiments, a cross-section of each multi-part tooth 120 in the radial plane has a trapezoidal shape (see, e.g., FIGS. 3, 23C, 23H). In some embodiments, the cross-sectional shape of each multi-part tooth 112 in the axial plane is also trapezoidal (see, e.g., FIGS. 2, 23D). In some embodiments, the cross-sectional shape of the tooth 120 in the radial and/or the axial plate is an isosceles trapezoid (see, e.g., FIGS. 31A, 31B). In some embodiments, the perimeter of the cross-sectional area of each multi-part tooth 120 in a plane perpendicular to the radial direction of the tooth is substantially a constant in the radial direction while the area of the cross-sectional are varies in the radial direction (see, e.g., FIGS. 26A-26D). Each tooth 120 may include a pair of additional tooth-portions 124A, 124B, 124E, 124F arranged symmetrically on opposite sides of the core tooth-portion 124 (see, e.g., FIGS. 23C, 23K). In some embodiments, each tooth 120 includes a first pair of additional tooth-portions 124A, 124B arranged symmetrically on a first pair of opposite sides (e.g., opposite side surfaces) of the core tooth-portion 122 and a second pair of additional tooth-portions 124E, 124F arranged symmetrically on a second pair of opposite sides (e.g., top and bottom surfaces) of the core tooth-portion 122 (see, e.g., FIG. 23K).

The core tooth-portion 122 and the additional tooth-portions of each multi-part tooth 120 may be coupled together using an adhesive material. In some embodiments, the multiple parts of the mule-part tooth 120 and the coil 300 may be attached together by the adhesive material. Any suitable type of adhesive material (e.g., glue) may be used. In some embodiments, the adhesive material may include a filler material to modify the properties of the adhesive material. In some embodiments, the CTE of the adhesive material may be within about 20% of the CTE of the materials of the tooth 120. In some embodiments, the CTE of the adhesive material may be within about 20% of the CTE of the materials of the tooth 120 and the coil 300.

At least one additional tooth-portion of each multi-part tooth 120 may be wedged between an internal surface of the coil 300 and an external surface of the core tooth-portion 122 (see, e.g., FIGS. 23F, 23K, 24A). In some embodiments, the coil 300 surrounds the core tooth-portion 122 of each tooth 120 such that at least two gaps are formed between an inner surface of the coil 300 and opposite sides of the core tooth-portion 122, and each additional tooth-portion is disposed in a different gap (see, e.g., FIGS. 23K, 24A). In some embodiments, each tooth 120 includes a single wedge-shaped additional tooth-portion disposed in a gap between the coil 300 and the core tooth-portion 122 (see, e.g., FIG. 23F).

Various embodiments of the electric machines of the current disclosure may include a stator having an annular stator ring and a plurality of core tooth-portions extending in a radial direction. As used herein, an annular stator ring is a ring-shaped component of the stator. Further, teeth are a series of projections that protrude from the annular stator ring. Each projection form a tooth. Core tooth-portion is a portion of the tooth that is attached to the stator core. As explained previously, with reference to FIGS. 23A-23K and 32A-32E, in some embodiments, stator 100 of electric machine 10 includes a stator core 110 with an annular part 130 that extends around the axis of rotation 1000. As can also be seen in these figures, a core tooth-portion 124 extends in a radial direction from the annular part 130 of the stator core 110. The core tooth-portion 124 forms a part of the multi-part teeth 120 of the stator 100.

In various embodiments, the annular stator ring and the plurality of core tooth-portions are integrally formed of a Soft Magnetic Composite (SMC). As used herein, the term "integrally formed" indicates that the stator ring and the core tooth-portion are connected to form a single part that practically cannot be dismantled without destroying the integrity of the part. In some cases, the stator ring and the core tooth-portion are formed as a single part. In some embodiments, the core tooth-portion and the stator ring may be formed as separate parts but may be attached together (e.g., fused or otherwise irremovably attached) to form a single part that may not be easily disassembled without destroying the integrity of the part. Soft magnetic composites (SMC) may include ferromagnetic powder particles, which in some embodiments, are coated with a layer of electrical insulating film. In some embodiments, the SMCs may include ferromagnetic powder particles surrounded by an electrical insulating film. The components made of SMC may be manufactured by conventional powder metal compaction techniques. In some case, an integrally formed SMC stator core may offer several advantages over traditional laminated steel cores. For example, these stator cores may exhibit one or more of three-dimensional (3D) isotropic ferromagnetic behavior, very low eddy current losses, relatively low total core loss at medium and high frequencies, improved thermal characteristics, and a reduced weight. Any now-known or later-developed SMC may be used in embodiments of the current disclosure. In some embodiments, a commercially available SMC (e.g., Sintex® SMC, Somaloy 130i, Somaloy 500, Somaloy 700 IP, Somaloy 700 3P, Somaloy 700 5P, or another suitable SMC) may be used.

As explained previously with reference to FIGS. 23A-23M, each tooth 120 of electric machine 10 includes multiple parts (e.g., core tooth-portion 122 and additional tooth-portions 124A-124F) arranged together. In the exemplary embodiments of the tooth 120 discussed with reference to FIGS. 23A-23K (and FIGS. 32A-32E), the core-tooth portion 122 of each tooth 120 that extends radially outward from the annular part 130 of the stator core 110 is integrally formed with the annular part 130. One or more additional tooth-portions 124-124K are positioned on the side surfaces and/or the top and bottom surfaces of the core tooth-portion 122 to form the multi-part tooth 120. In the embodiment of tooth 120 illustrated in FIG. 23A (and FIGS. 21A-32E), each core tooth-portion 124 extends in a radial direction outwards from the annular part 130 along the radial axis 2000 of a tooth 120. However, as explained with reference to FIG. 23G, this is not a requirement. That is, in some embodiments, the core tooth-portion 122 may extend radially outwards from the annular part 130 inclined with respect to the radial axis 2000.

The integrally formed core tooth-portion 122 (of a tooth 120) and the annular part 130 may be made of the same material. In some embodiments, the integrally formed annular part 130 and core tooth-portion 122 may be formed of an SMC. The additional tooth-portions 124A-124F that are assembled with the core tooth-portion 122 to form a complete tooth 120 may be formed of SMC or another isotropic material ( ). In some embodiments, both the core tooth-portion 122 and the additional tooth-portions 124A-124F may be formed of SMC. In some embodiments, the core tooth-portion 122 (and annular part 130) may be made of SMC It is also contemplated that, in some embodiments, the core tooth-portion 122 (and annular part 130) may be made of steel laminations while some or all of the additional tooth-portions 124A-124F are formed of SMC.

In some embodiments, as described with reference to FIGS. 33A-33C, the stator core 110 may include upper and lower annular parts 130A, 130C attached to a central annular part 130B to form the annular part 130 of core 110. In some such embodiments, as best seen in FIG. 33B, the core tooth-portion 122 may be integrally formed with the central annular part 130B and extend outward in a radial direction from the central annular part 130B. In general, annular parts 130A, 130B, and 130C may be made of any material (e.g., SMC, laminated steel, etc.). In some embodiments, the central annular part 130B and the core tooth-portion 122 may be formed of SMC and the upper and lower annular parts 130A, 130C may with laminated steel.

As explained previously, any suitable SMC may be used to fashion the integrally formed annular stator ring 130 and the plurality of core tooth-portions 122. In various embodiments of the current disclosure, the SMC may include one or more isotropic ferromagnetic materials, a magnetic saturation induction of at least 1.6 Tesla, and an electrical resistivity over 10 micro-ohm/m. A ferromagnetic material is a substance that conducts a magnetic field well. Examples of ferromagnetic materials include iron, cobalt, nickel, gadolinium, chromium dioxide ($CrO_2$), and others. In some embodiments of the current disclosure, the ferromagnetic material may be an iron-based material. An isotropic material has one or more properties that are the same value in different directions. Any property of the material may be the same in different directions. In some embodiments, one or more magnetic properties of the isotropic ferromagnetic material may be the same in different directions. In some embodiments, the magnetic saturation induction and/or the electrical resistivity of the material may be the same in all directions. Magnetic saturation induction is an indicator or how much magnetism can be induced in a material or a component made of the material. Because of magnetic saturation, there is a point of diminishing returns beyond which applying an increased magnetic field will give rise to minimal additional magnetic induction. Magnetic saturation induction characterizes the saturation of the soft magnetic material to a state in which the induction does not increase with a further increase in the magnetic field strength. Electrical resistivity is a fundamental property of a material that indicates how strongly the material resists electric current. It is the inverse of electrical conductivity that quantifies how well a material conducts electricity. A low value of electrical resistivity indicates that a material readily allows electric current to pass through.

In some embodiments, the SMC material used to fashion the integrally formed annular stator ring 130 and the plurality of core tooth-portions 122 may be an isotropic ferromagnetic material having a magnetic saturation induction greater than or equal to ($\geq$) about 1.6 Tesla and an electrical resistivity greater than about 10 micro-ohm/m. In some embodiments, the SMC may have a magnetic saturation induction $\geq$about 2.4 Tesla. In some embodiments, the magnetic saturation induction of the SMC may be $\geq$about 2.5 Tesla. In some embodiments, the magnetic saturation induction of the SMC may be between about 2.4-2.6 Tesla. The electrical resistivity of the SMC may be $\geq$about 10 micro-ohm/m ($\mu\Omega$/m). In some embodiments, the electrical resistivity of the SMC may be $\geq$about 100 $\mu\Omega$/m ($\geq$about 150 $\mu\Omega$/m, $\geq$about 300 $\mu\Omega$/m, $\geq$about 400 $\mu\Omega$/m, or $\geq$about 500 $\mu\Omega$/m). In some embodiments, the electrical resistivity of the SMC may be within about 10-600 $\mu\Omega$/m. The isotropy of the properties of the SMC may assist in generating a three-dimensional magnetic field in the volume of the tooth 120. A magnetic saturation induction $\geq$about 1.6 Tesla of the SMC may help to maintain the properties of a magnetic conductor or a magnetic field concentrator and, accordingly, reduce leakage fluxes and increase torque values and the power of the electric machine 10. Electrical resistivity of the SMC$\geq$about 100 $\mu\Omega$/m may assist in reducing eddy current losses at a wide range of speeds and frequencies of operation of the electric machine 10. Thus, fashioning the integrally formed annular stator ring 130 and the plurality of core tooth-portions 122 of an SMC may result in an increase in the efficiency of electric machine by increasing the magnetic flux density and reducing the magnetic losses.

In some embodiments, a radial flux electric machine of the current disclosure may be an electric motor or an electric generator. The electric machine may include a rotor 200 configured to rotate about an axis of rotation 1000, a plurality of electromagnetic coils 200, and a stator 100 (see, e.g., FIGS. 8A-22). In some embodiments, the stator 100 may have an annular stator ring 130 and a plurality of core tooth-portions 122 extending from the stator ring 130 in a radial direction (see, e.g., 23A-23K). The annular stator ring 130 and the plurality of core tooth-portions 122 may be integrally formed of a Soft Magnetic Composite (SMC). In some embodiments, the SMC may include one or more isotropic ferromagnetic materials and have magnetic saturation induction $\geq$about 1.6 Tesla and an electrical resistivity $\geq$about 10 $\mu\Omega/m$. The stator 100 may include a plurality of multi-part teeth 120 symmetrically arranged on the annular stator ring 130, and each tooth 120 may include one of the plurality of core tooth-portions 122 and at least one additional tooth-portion 124A, 124B, 124E, 124F that are non-integrally formed with the core tooth portion 122 (see, e.g., 23A, 23B, 23I-23K). One pair of additional tooth portions 124A, 124B may be positioned on opposite side surfaces of the core tooth-portion 122 to form a tooth 120 (see, e.g., FIGS. 23A-23C). One pair of additional tooth portions 124A, 124B may be positioned on opposite side surfaces of the core tooth-portion 122 and another pair of additional tooth-portions 124E, 124F may be positioned on oppositely positioned top and bottom surfaces of the core tooth-portion 122 (see, e.g., FIGS. 23I-23K). In some embodiments, only a single wedge shaped portion may be used as the additional-tooth portion.

In some embodiments, a cross-section of the core tooth-portion 122 of each tooth 120 along a plane perpendicular to the axis of rotation 1000 of the electric machine may have a substantially rectangular shape and the cross-section of each additional tooth portion may have a substantially triangular shape (see, e.g., FIGS. 23, 23H, 23I). In some embodiments, a cross-section of each of the core tooth-portions 122 and at least one pair of additional tooth-portions 124A-124F along a plane perpendicular to the radial direction may have a substantially rectangular shape. A cross-section of each multi-part tooth 120 in a radial plane, or in a plane perpendicular to the axis of rotation 1000, may have a trapezoidal shape. The cross-sectional area of each tooth 120 in a plane perpendicular to the radial direction of the tooth 120 may vary in the radial direction while the perimeter of the cross-sectional area remains substantially a constant in the radial direction (see, e.g., FIGS. 26A-26D). In embodiments where the rotor 200 is disposed radially outwards of the stator 100 to form an air gap 250 between the rotor 200 and the stator 100 (see, e.g., FIGS. 2, 3), the cross-sectional area may increase in the radial direction toward the air gap 250. The cross-sectional area of a tooth 120 in a plane perpendicular to the axis of rotation 1000 may decrease in the axial direction from the center of the tooth 120 towards its sides (see, e.g., FIGS. 27A-27D).

In some embodiments, each multi-part tooth 120 defines external surfaces having two sets of opposing faces (e.g., faces A, B and faces C, D of FIG. 23B). The opposing faces of each set of the two sets may be non-parallel to each other. That is, faces A and B may be non-parallel to each other and faces C, D may be non-parallel to each other. In some embodiments, each face of the two sets of opposing faces may be inclined in a radial direction. The opposing faces of one set of opposing faces may converge towards each other in a radially outward direction (e.g., faces A, B of FIG. 23D) and the opposing faces of the other set of opposing faces diverge from each other in the radially outward direction (e.g., faces C, D of FIG. 23C). Adjacent side faces of adjacent teeth may be parallel to each other. That is, side face C of one tooth 120 may be parallel to side face D of the adjacent tooth 120 (see, e.g., FIGS. 23A-23C).

In some embodiments, the annular stator ring 130 of the electric machine may include two mirror-symmetric bodies 130A, 130B coupled together along a plane of symmetry perpendicular to the axis of rotation 1000 (see, e.g., FIGS. 32B, 32C). The annular stator ring 130 may include multiple substantially annular components attached together. The two mirror-symmetric bodies 130A, 130B may be attached together along the plane of symmetry using an adhesive material. In some embodiments, the difference between the coefficients of thermal expansion of materials of the two mirror-symmetric bodies (or the SMC) and the adhesive material may be less than about 20%.

Any now-known or later-developed SMC may be used to fashion the integrally formed annular stator ring 130 and the plurality of core tooth-portions 122. In some embodiments, a commercially available SMC (e.g., Sintex® SMC, Somaloy 130i, Somaloy 500, Somaloy 700 IP, Somaloy 700 3P, Somaloy 700 5P, or another suitable SMC) may be used. The magnetic saturation induction of the SMC may be $\geq$about 2.4 Tesla or $\geq$about 2.5 Tesla. In some embodiments, the resistivity of the SMC may be $\geq$about 100 $\mu\Omega/m$ or $\geq$about 150 $\mu\Omega/m$.

Various embodiments of the electric machines of the current disclosure may include an inner stator and an outer rotor configured to rotate about the inner stator. As explained previously, electric machines of the current disclosure may have different configurations (see, e.g., FIGS. 8A-22). In some embodiments, the electric machine may include an inner stator 100 and an outer rotor 200 (see, e.g., FIGS. 2, 3) that rotates with respect to the stator 100 around the axis of rotation 1000. The electric machines of the current disclosure may include a rotor base. The rotor base may be part of the rotor. The rotor base refers to any component of the rotor that allows for the coupling of the permanent magnets of the rotor to the shaft (e.g., shaft 20) of the electric machine. The electric machine may also include a plurality of annularly arranged permanent magnets axially extending from the rotor base parallel to an axis of rotation of the rotor. A permanent magnet may be a magnet that retains its magnetic properties in the absence of an inducing magnetic field or current. Permanent magnet may be object made from a material that is magnetized and creates its own persistent magnetic field. The material from which permanent magnets are made is called magnetically hard. It differs from a soft magnetic material by an increased hysteresis loop. In general, any type of a permanent magnet known in the art (now known or later developed) may be used to form the permanent magnets. In some embodiments, the permanent magnets may be made of a rare earth (RE) material, such as, for example, neodymium-iron-boron (NdFeB), samarium-cobalt (SmCo), etc. Given the high cost and relative scarcity of RE materials, in some embodiments, the permanent magnets may be non-RE magnets (e.g., ferrite magnets). It is also contemplated that, in some embodiments, the permanent magnets may be hybrid magnets, where a combination of RE magnets and ferrite magnets are used.

In some embodiments, the electric machine may also include a cylindrical core extending from the rotor base. In some embodiments, the core may be configured to conduct magnetic fluxes. The core may also provide structure for fixing the permanent magnets of the rotor. In some embodiments, the core may extend from the rotor base such that it encircles the plurality of permanent magnets. Although not a requirement, in some embodiments, the core may be formed of a SMC. A SMC cylindrical core may exhibit one or more of three-dimensional (3D) isotropic ferromagnetic behavior. It may also exhibit very low eddy current losses and relatively low total core loss at medium and high frequencies. Additionally, a SMC core may also exhibit improved thermal characteristics and a reduced weight. Thus, there may be distinct advantages for using a SMC core in some disclosed electric machines.

The electric machine may also include a sleeve that encircles the rotor. The sleeve may be a structure that protects the rotor and/or increases the strength of the rotor. In some embodiments, the sleeve may be a bandage. The sleeve may be in the form of a ring, belt, or another annular structure that extends around some or all rotor components. In some embodiments, the sleeve may protect the rotor components against the influence of centrifugal (or centripetal) forces when the rotor rotates. In some embodiments, the sleeve may support the cylindrical core and the cylindrical core may support the plurality of permanent magnets. For example, the sleeve may provide structural support for the core and the core may provide structural support for the plurality of permanent magnets. In some embodiments, the cylindrical core may be positioned radially between the sleeve and the plurality of magnets.

Figure 34A:
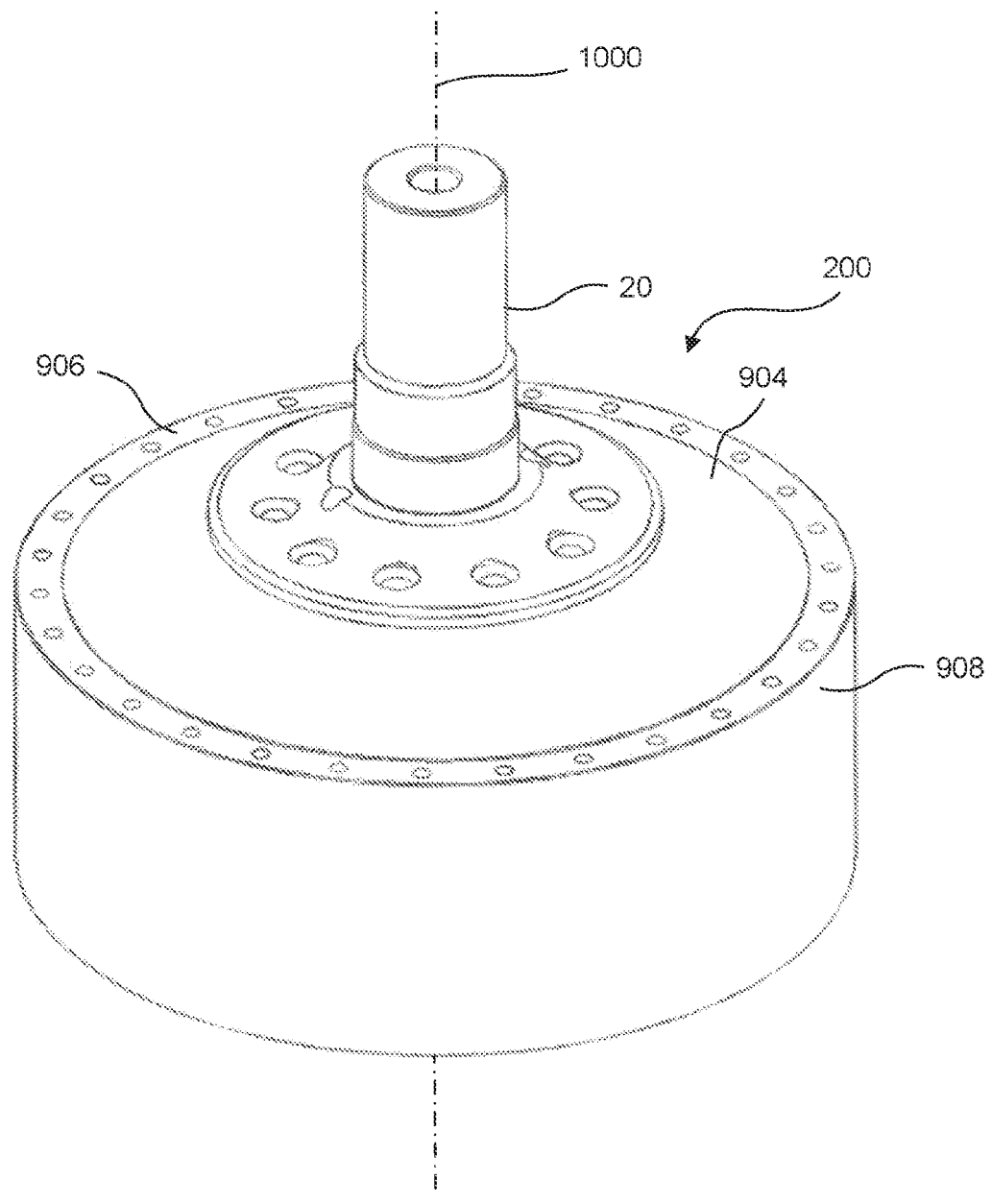
FIGS. 34A-34B illustrate an exemplary outer rotor.

FIG. 34A is an illustration of an exemplary rotor 200 coupled to the shaft 20 of the electric machine 10 (see also FIGS. 2-3). As explained previously with reference to FIGS. 1-3, during operation of the electric machine 10, the rotor 200 is positioned radially outwards of the stator 100, and it rotates with respect to the stator 100 about the axis of rotation 1000. The rotor 200 may include a rotor base 904. As illustrated in FIG. 34A, in some embodiments, rotor base 904 may have a disk-like structure. However, a disk-like structure is not a requirement, and the rotor base 904 may have any suitable shape and configuration. The rotor base 904 may be fastened (or coupled) to the shaft 20 such that they rotate as one. That is, when the electric machine 10 operates, both the rotor base 904 and the shaft 20 rotates.

Figure 34B:
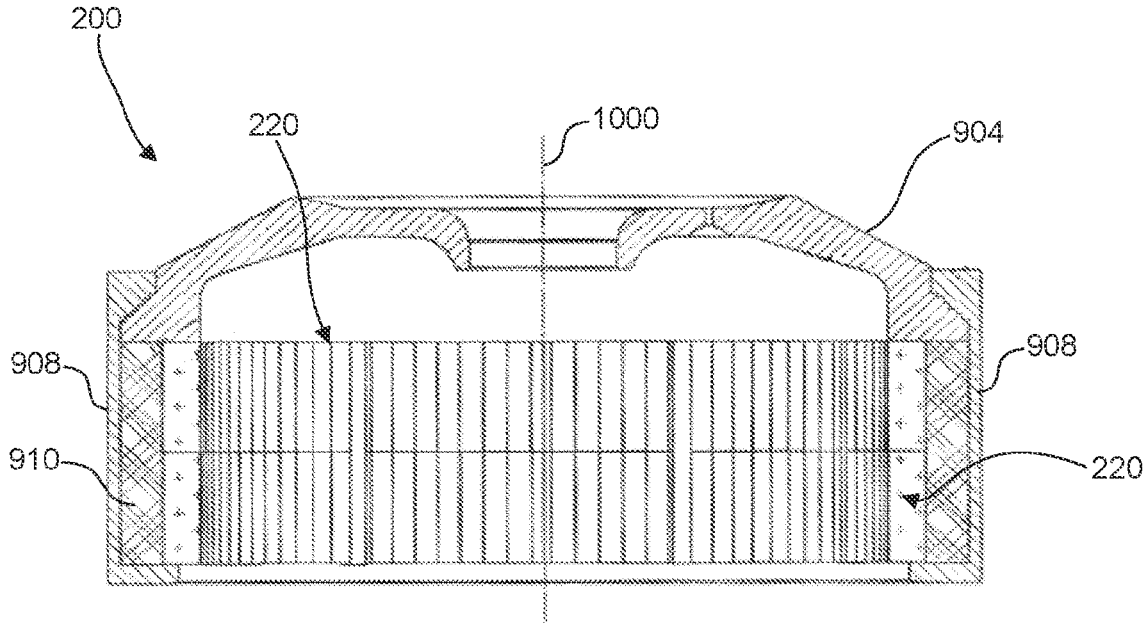
Figure 36:
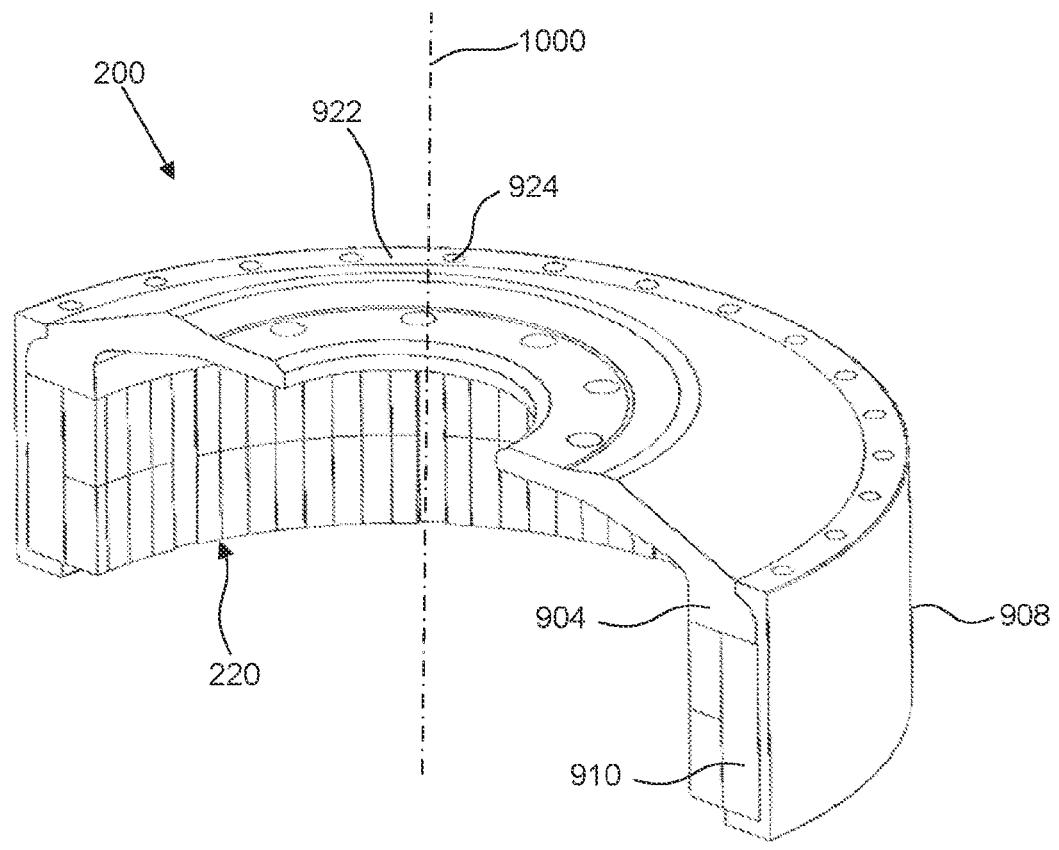
FIGS. 36-37 illustrate an exemplary outer rotor.

As explained previously (e.g., with reference to FIGS. 1-3), one or more permanent magnets may be suspended from the rotor base 904 (e.g., see permanent magnets 220 of FIG. 2). FIG. 34B is a cross-sectional view and FIGS. 36 and 37 sectional views of the rotor 200 of FIG. 34A. As can be seen in these figures, the permanent magnets 220 may be arranged to form an annular ring around the axis of rotation 1000. Rotor 200 may also include a rotor core 910 and a sleeve 908 that both extend around the axis of rotation 1000. The core 910 may extend around the permanent magnets 220, and the sleeve 908 may extend around the core 910. Thus, the plurality of permanent magnets 220, the core 910, and the sleeve 908 may form three concentric annular rings around the axis of rotation 1000. The core 910 may be a cylindrical component with the permanent magnets 200 mounted on its inner cylindrical wall. The sleeve 908 may be a cylindrical component with the core abutting its inner cylindrical wall. In some embodiments, the core 910 may be mounted on the inner cylindrical wall of the sleeve 908. As best seen in FIGS. 34B and 36, the core 910 may be sandwiched between the plurality of permanent magnets 220 and the sleeve 908.

Rotor 200 may also include one or more balancing rings. The term "balancing ring" refers to a structure that assists in the balancing of the rotor. In some embodiments, the balancing rings allow for the dynamic balancing of the rotor by redistributing the weight of the rotor. For example, in some embodiments, the balancing ring may support weights (e.g., screws) that can be manipulated (e.g., screwed in or out) to redistribute the weight of the rotor. In some embodiments, a balancing ring 922 may be provided at one end (e.g., top end) of sleeve 908 (see FIG. 36). Alternatively, or additionally, in some embodiments, a balancing ring 926 may be provided at the bottom end of sleeve 908 (see FIG. 37). In some embodiments, only one of balancing rings 922, 926 may be provided while in other embodiments, both balancing rings 922, 926 may be provided. Providing both balancing rings 922, 926 may enable two-plane balancing or rotor 200. It should be noted that the structure and location of balancing rings 922, 926 illustrated in these figures in only exemplary. In general, one or more balancing rings may be provided at any location of the rotor 200.

Figure 37:
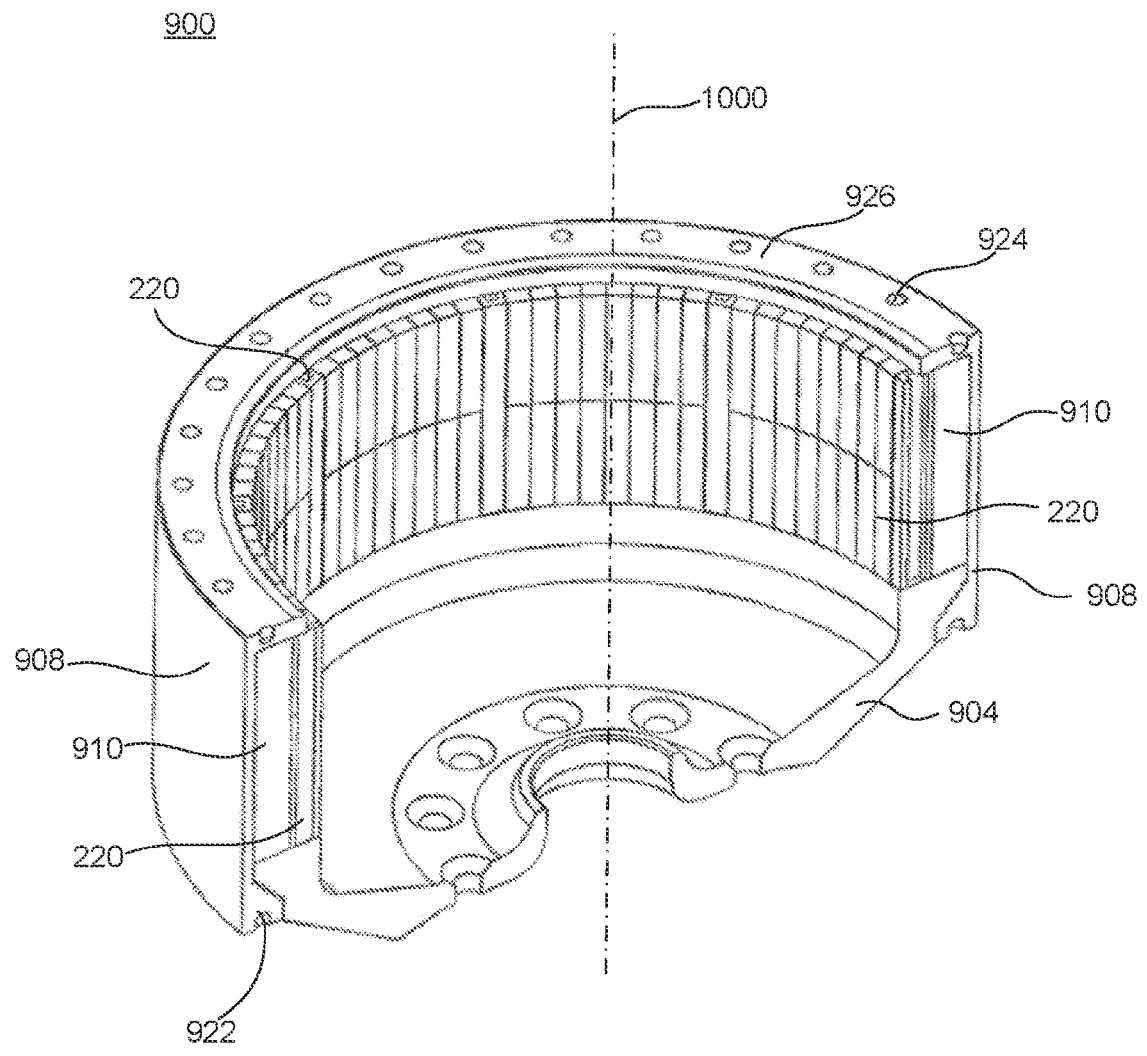

With specific reference to FIG. 34B, in some embodiments, a plurality of permanent magnets 220 may be annularly arranged on rotor base 904 such that they extend axially from the rotor base 904 parallel to the axis of rotation 1000 of the rotor 200. The permanent magnets 220 may be radially magnetized and segmented to reduce eddy current losses. The term "magnetic axis" indicates an axis of permanent magnet magnetization of the permanent magnets. The domains are oriented with respect to this axis when the magnets are magnetized. As a result, two opposite poles (e.g., north and south poles) of a permanent magnet 220 are formed along this magnetic axis. In a permanent magnet, the magnetic axis extends between its north and south poles. In some embodiments, when the permanent magnets 220 are arranged in a cylindrical pattern as shown in FIGS. 36 and 37 (and FIG. 3), the magnetic axis of the individual permanent magnet 220 may extend in a radial direction. In some embodiments, the magnetic axes of the plurality of permanent magnets 220 may intersect each other at (or near) the axis of rotation 1000.

Figure 38A:
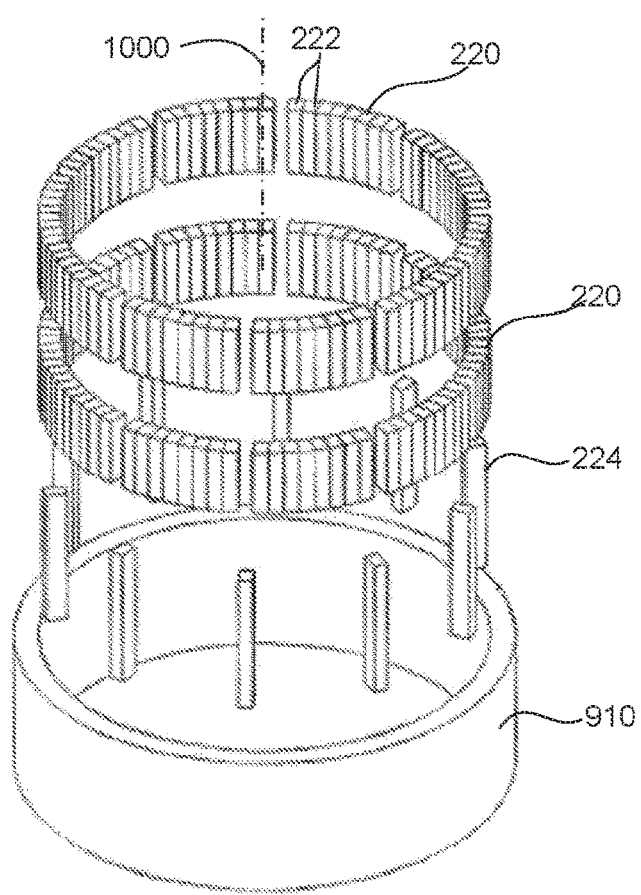
FIGS. 38A-38D illustrate exemplary portions of an exemplary outer rotor.
Figure 38B:
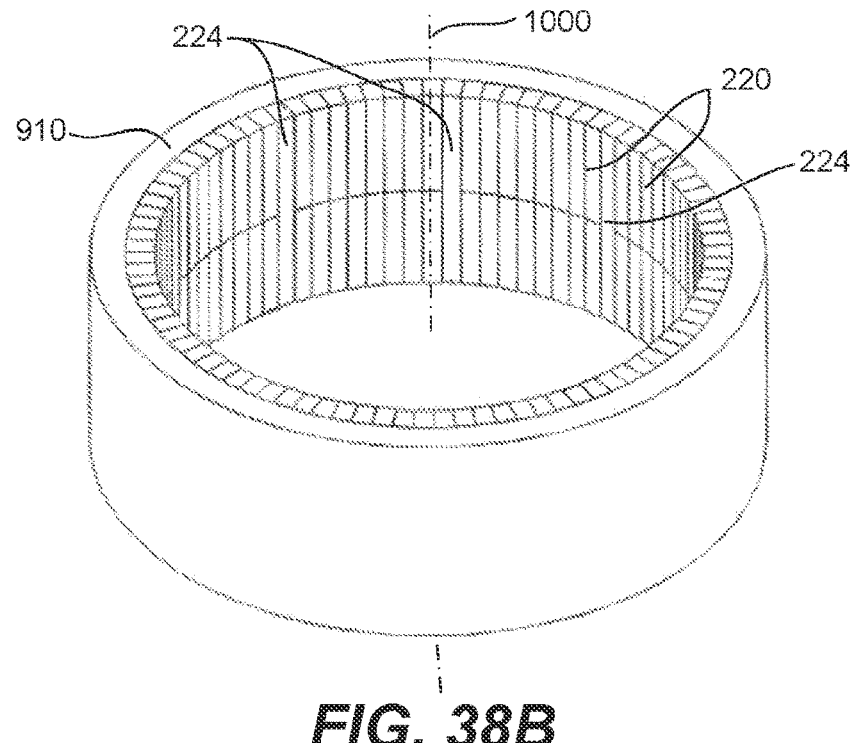
Figure 38C:
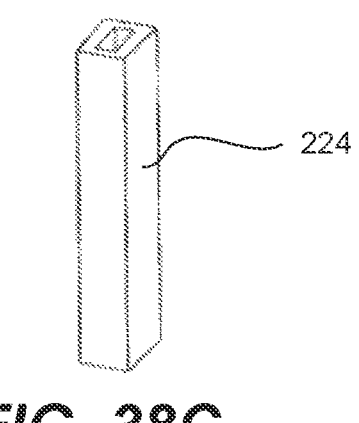

FIGS. 38A and 38B illustrates the core 910 and the permanent magnets 220 of the rotor 200. In some embodiments, permanent magnets 220 with radial magnetization and alternating polarity are fixed or mounted on the inner surface of the cylindrical core 910, for example, using an adhesive (e.g., see also FIG. 3). The permanent magnets 220 may be positioned such that the north pole of one permanent magnet 220 faces radially inwards (i.e., towards the axis of rotation 1000) while the south pole of its adjacent magnets 220 faces radially inwards. In some embodiments, as explained previously (with reference to FIGS. 2-3), each permanent magnet 220 may be made of multiple permanent magnet segments 222 attached together. That is, the permanent magnets 220 may be segmented about the axis of rotation 1000. In some embodiments, as best seen in FIGS. 38A and 38B, the permanent magnets 220 may also be segmented along the axis of rotation (i.e., lengthwise along the axis of rotation 1000). The plurality of the permanent magnets 220 may be annularly arranged about the axis of rotation 1000 such that adjacent permanent magnets 220 are spaced apart from each other by a spacer 224 (or a gap). FIG. 38C illustrates an exemplary spacer 224. The spacer 224 may be a solid or a hollow component that separates the adjacent permanent magnet segments 220. In some embodiments, the spacer 224 may be made of a non-conductive material. Although not a requirement, in some embodiments, the spacer 224 may extend the entire length of the core 910. Segmenting the permanent magnets 220 may assist in the reduction of eddy current losses. As explained previously, the permanent magnets 220 may be rare earth (RE) magnets (e.g., NdFeB, SmCo, etc.), ferrite magnets, or other known types of magnets.

Outer rotor 200 may also include a cylindrical core 910. The cylindrical core 910 may extend from rotor base 904 to encircle the plurality of permanent magnets 220. In some embodiments, cylindrical core 910 may be formed of a SMC. The cylindrical core 910 may support one side (e.g., radially outer side) of the plurality of permanent magnets 220. In some embodiments, the permanent magnets 220 may be mounted on the cylindrical core 910 (e.g., on the radially inner side of the cylindrical core 910). The permanent magnets 220 may be attached to the core 910 using, for example, an adhesive material. For example, an adhesive layer may bond the radially outer side of the permanent magnets 220 with the radially inner side of the core 910.

Sleeve 908 may encircle the cylindrical core 910. In some embodiments, as illustrated in FIGS. 36 and 37, the sleeve 908 may extend around the radially outer side of the cylindrical core 910. The sleeve 908 may physically contact and support the cylindrical core 910. In some embodiments, an adhesive material may attach the radially inner side of the sleeve 908 to the radially outer surface of the core 910. The sleeve 908 may support the plurality of permanent magnets 220 (via the core 910). Since the sleeve 908 supports the radially outer surface of the core 910, it may protect the core 910 from cracking due to centrifugal forces during rotation of rotor 200. The core 910 may be positioned radially between sleeve 908 and plurality of permanent magnets 220. In some embodiments, the sleeve 908 may be attached to the rotor base 904 using an adhesive material. In some embodiments, the sleeve 908 may be integrated with, or made integral with, the rotor base 904 (e.g., the sleeve 908 and the rotor base 904 may be formed as a single part of the same material).

In some embodiments, the sleeve 908 and/or the rotor base 904 may be made of aluminum or a non-magnetic composite material like carbon fiber, glass fiber, and/or an aramid fiber like Kevlar. A non-magnetic composite material is a multicomponent material, non-conductive for magnetic flux and made of two or more components with significantly different physical and/or chemical properties. In general, the sleeve 908 and the rotor base 904 may be made of a magnetic material or a non-magnetic material. The non-magnetic material (of the sleeve 908 and/or the rotor base 904) may be a composite material. In some embodiments, the composite non-magnetic material may include at least one of carbon fiber, glass fiber, aramid fiber, Kevlar, or another suitable fiber. For example, fibers (carbon, glass, aramid, Kevlar, etc.) may be weaved together to form the sleeve 908. In some such embodiments, the sleeve 908 may be in the form of a bandage. The bandage may be flexible, semi-flexible, or rigid. In some embodiments, the fibers may be embedded in a matrix of another material (e.g., an epoxy, etc.) to form the composite non-magnetic material. In some embodiments, the non-magnetic material (of the sleeve 908 and/or the rotor base 904) may include (or be) at least one of stainless steel or aluminum. In some embodiments, the sleeve 908 and/or the rotor base 904 may be made of a magnetic material. The magnetic material may include a soft magnetic material, such as, for example, laminated electrical steel sheets. In some embodiments, the magnetic material may be steel. In some embodiments, the sleeve 908 and the rotor base 904 may be a single integrated part made of, for example, steel.

In some embodiments, the sleeve 908 may be assembled as a package with the core 910 and the permanent magnets 220. In some embodiments, sleeve 908 may include a stiffening rib disposed on a recess formed on an external surface of the cylindrical core 910. The term "stiffening ribs" indicates elements or features configured to increase the strength of the rotor structure. In some embodiments, sleeve 908 may extend over the balancing ring 926 and the free end of the plurality of permanent magnets 220. In some embodiments, the sleeve 908 may extend over the balancing ring 922. In some embodiments, the cylindrical core 910 may extend from a first end coupled to rotor base 904 to a second end. See, for example, FIGS. 34A-34B. In some embodiments, the balancing rings 922, 926 may extend around a free end of the cylindrical core 910.

Figure 35:
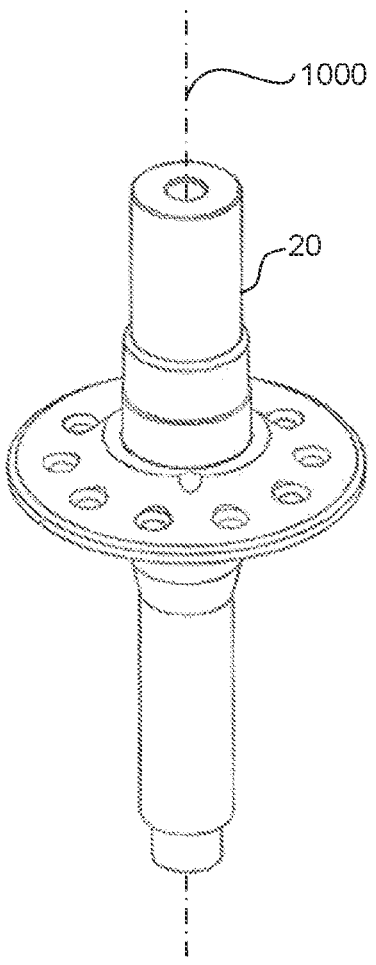
FIG. 35 illustrates an exemplary shaft.

FIG. 35 illustrates an exemplary shaft 20 that is configured to rotate about the axis of rotation 1000 of FIGS. 2, 3). FIGS. 36-37 illustrate partial views of exemplary outer rotor 200. Outer rotor 200 includes first balancing ring 922 and second balancing ring 926. The first balancing ring 922 may be disposed at a first end of cylindrical core 910 coupled to rotor base 904. The second balancing ring 926 may be disposed at a second end of cylindrical core 910 opposite rotor base 904. In some embodiments, the second balancing ring 926 may provide dynamic balancing of the rotor 200, and the first balancing ring 922 may provide a static balancing. First and second balancing rings 922, 926 may be configured to be attached to sleeve 908 and/or the cylindrical core 910. One or both of the balancing rings 922, 926 may include holes 924.

Cylindrical core 910 together with the permanent magnets 220 may be attached to rotor base 904, which couples rotor 200 to shaft 20. In some embodiments, the sleeve 908 may be folded around the end of cylindrical core 910 and permanent magnets 220, clamping them on both end sides of outer rotor 200 (see, e.g., FIG. 36). In some embodiments, the sleeve 908 may be made of a non-conductive material, or a material with a low electrical conductivity, or a non-magnetic non-conductive composite material. In some embodiments, cavities or holes may be drilled in these weights during precise static and dynamic balancing. In some embodiments, the required weight changes may be made in two planes (e.g., using the two balancing rings 922 and 926). Weights may be installed into balancing ring holes 924. In some embodiments, second balancing ring 926 may be located at the first end of cylindrical core 910 (the end that is coupled to rotor base 904). In some embodiments, the first and/or second balancing rings 922, 926 may be formed of a non-magnetic composite material. In some embodiments, the first and/or second balancing rings 922, 926 may be formed of a non-magnetic material. In some embodiments, the first and/or second balancing rings 922, 926 may include one or more screws for balancing the outer rotor 200.

In some embodiments, plurality of permanent magnets 220 may be arranged on rotor base 904 in a substantially circular pattern around the axis of rotation 1000 (see, e.g., FIGS. 3, 36-38B). Adjacent magnets 220 are separated by a spacer 224, made of non-magnetic material or any soft magnetic material like a SMC. In some embodiments, plurality of permanent magnets 220 are arranged on rotor base 904 such that a magnetic axis of each permanent magnet of plurality of permanent magnets 220 extend towards the axis of rotation (e.g., axis of rotation 1000). In some embodiments, the plurality of permanent magnets 220 are arranged on rotor base 904 such that a magnetic axis of each permanent magnet of plurality of permanent magnets 220 intersect at (or proximate to) the axis of rotation.

In some embodiments, rotor base 904 may be formed of aluminum or steel. In some embodiments, the rotor base 904 may be integral with sleeve 908 and one or more balancing ring (e.g., 922, 926). The plurality of permanent magnets 220 may be attached to cylindrical core 910 using an adhesive. In some embodiments, a difference between coefficients of thermal expansion (CTE) of materials of plurality of permanent magnets 220, cylindrical core 910, and the adhesive may be less than about 20% to reduce CTE mismatch induced thermo-mechanical stresses during thermal excursions. The cylindrical core 910 may be attached to rotor base 904 using an adhesive. The electric machine may be an electric motor or an electric generator. In some embodiments, cylindrical sleeve 910 may be made in the form of a package assembled from laminated sheets of electrical steel.

Figure 38D:
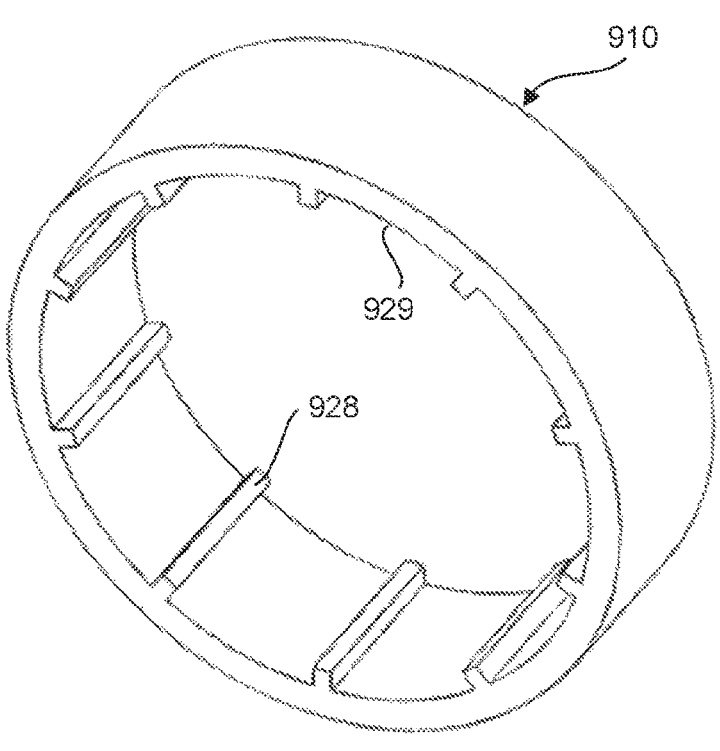
Figures 42A, 42B:
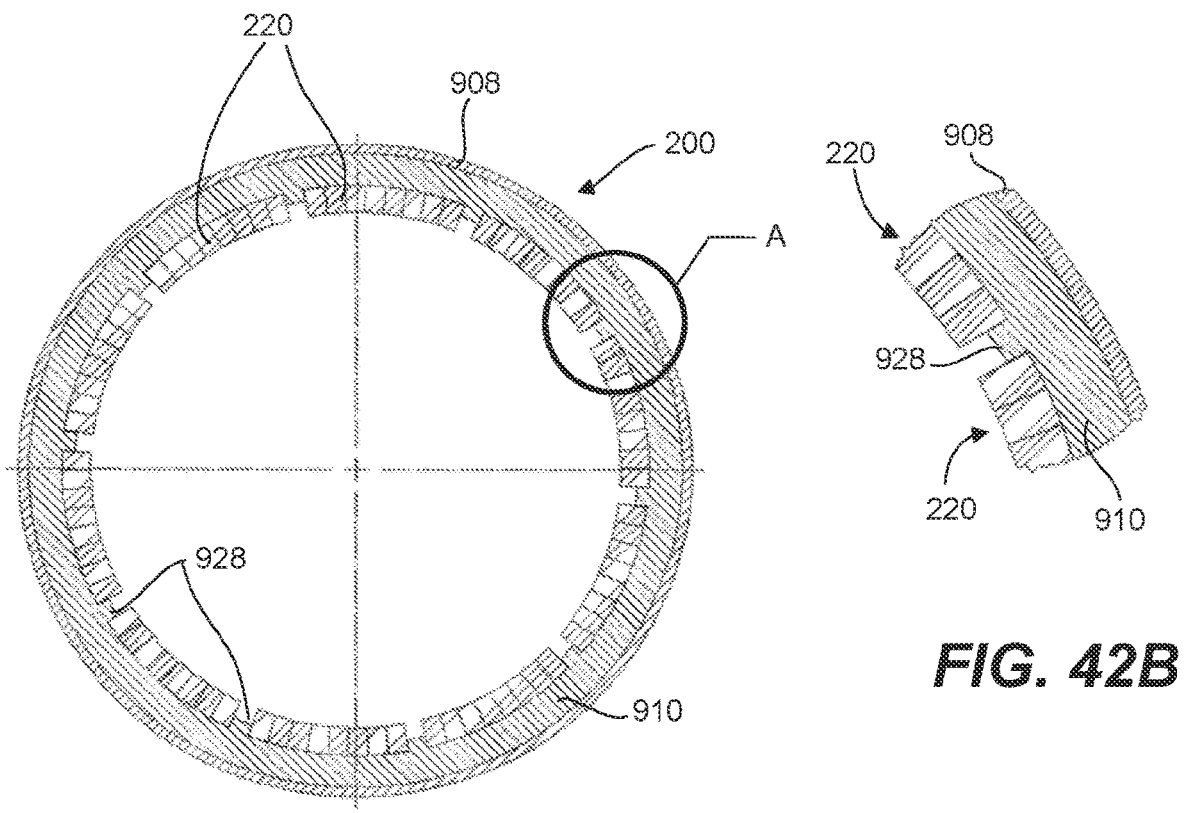
FIGS. 42A-42B illustrate a cross-sectional view of an exemplary outer rotor.

FIG. 38D illustrates a view of exemplary cylindrical rotor core 910. As explained previously, in rotor 200, spacers 224 separate adjacent permanent magnets 220 in the plurality of permanent magnets 200 mounted on the inside surface of the cylindrical core 910 (see FIG. 38A-38C). As an alternative to (or in addition to) spacers 224, in some embodiments, the cylindrical core 910 may include integrated spacers 928. These spacers 928 may protrude inward in a radial direction from the inside cylindrical surface of the core 910. The integrated spacers 928 may define slots 929 therebetween to house the permanent magnets 220 therein. When the permanent magnets 220 are mounted on these slots 929, the spacers 928 separate adjacent permanent magnets 220 in the plurality of permanent magnets 200 mounted on the inside surface of the cylindrical core 910. FIGS. 42A-42B illustrate cross-sectional views of exemplary outer rotor 200 in the radial plane. As illustrated in these figures, when the permanent magnets 220 are disposed in the slots 929 (see FIG. 38D) between the spacers 928 on the inside surface of the rotor core 910, the spacers 928 separate adjacent permanent magnets 220 from each other in the circumferential direction. The spacers 928 may have any thickness in the radial direction. In some embodiments, the thickness of the spacers 928 may not exceed the thickness of the permanent magnets 220 (in the radial direction) so that the spaces 928 do not protrude into the air gap 250 between the outer rotor 200 and the inner stator 100 (see FIG. 3). In some embodiments, to limit the pulsating moment, the thickness of each spacer 928 may be such that it is less than or equal to about half the thickness of a permanent magnet 220.

Figure 39:
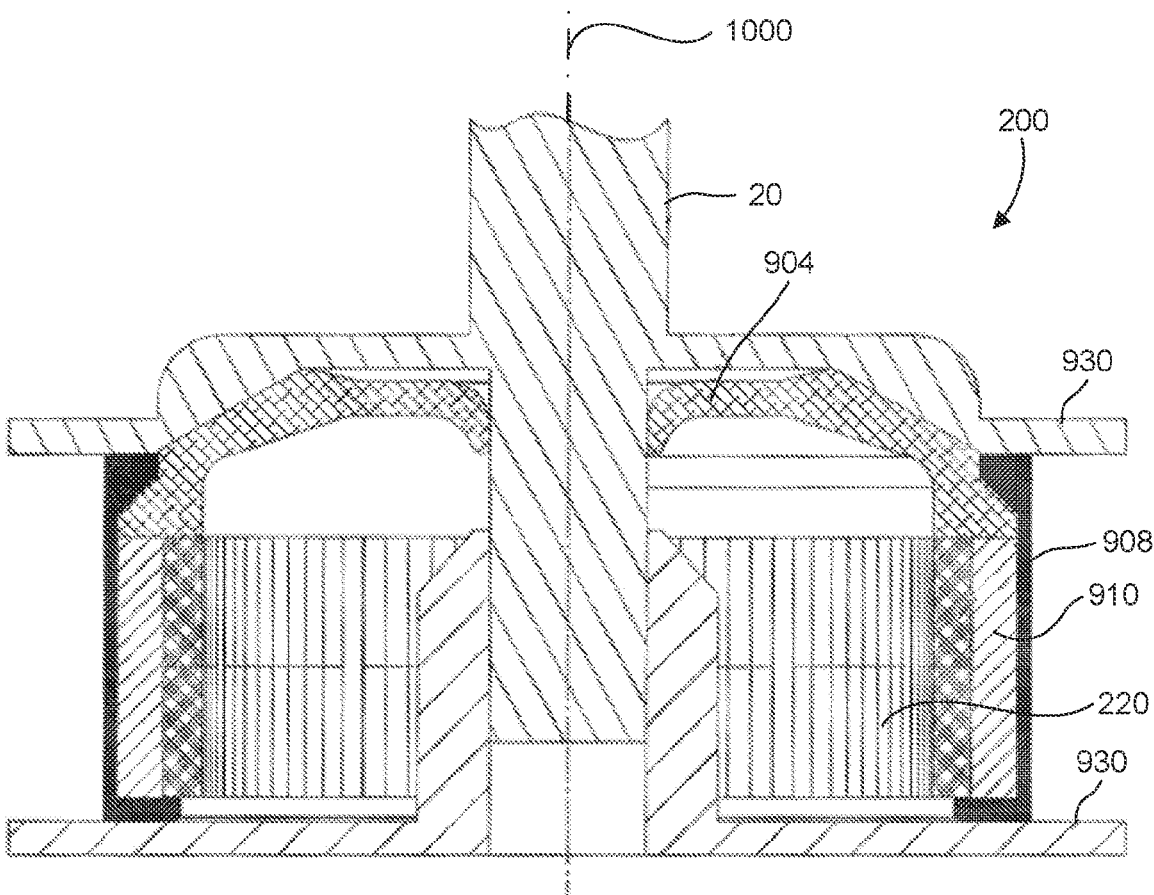
FIG. 39 illustrates an exemplary outer rotor assembly.
Figure 40:
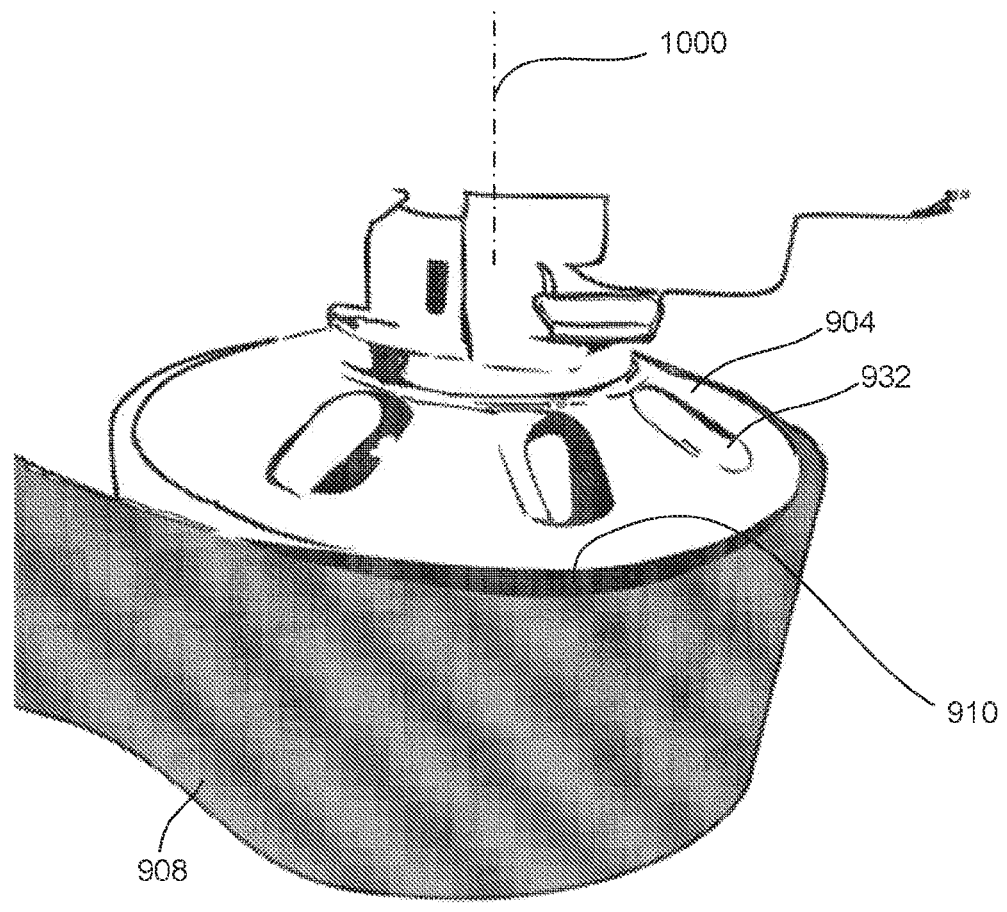
FIG. 40 illustrates an exemplary outer rotor.

FIG. 39 illustrates a cross section view of the rotor 200. Sleeve 908 may be installed in rotor 200 by any method. In some embodiments, to install the sleeve 908, stops 930 may be provided on the two ends (e.g., top and bottom ends) of the rotor 200 (e.g., on either side of sleeve 908). In embodiments where sleeve 908 is in the form of a bandage, the sleeve 908 may be installed on the rotor 200 by winding (or wrapping) the sleeve material around the outer surface of rotor core 910 (see FIG. 40). The winding may be performed such that each protrusion and each depression on a surface of core 910 (or the outer surface of the rotor) are filled in one operation. This winding may serve to increase the strength and rigidity of rotor 200 during operation and to reduce vibration and noise. The winding (as shown in FIG. 40) may be done with a composite tape, with a composite thread (not shown), or a combination of both. Although the use of stops

930 to form the sleeve 908 is described, this is only exemplary. The winding may also be accomplished without the stops 930.

In some embodiments, the rotor base 904 the sleeve 908 may be an integrated component. In such cases, the rotor base 904 and the sleeve 908 may be formed together as one integrated part, for example, of a composite material. In some embodiments, an adhesive material may be used to secure the permanent magnets 220 and/or the spacers 224 on cylindrical core 910, the rotor base 904, the sleeve 908, and the balancing rings 922, 926. The adhesive material may be selected such that its coefficient of thermal expansion (CTE) is close (e.g., about 20%) to the CTEs of the materials to be bonded in order to reduce stress during heating of the bonded elements.

As best seen in FIG. 40, rotor base 904 may include one or more ventilation holes 932. Ventilation holes 932 may be configured to direct air flow along the axis of rotation 1000 (i.e., parallel to the axis of rotation 1000). In some embodiments, this air is directed into the rotor (towards the stator positioned within the rotor) when the rotor 200 rotates (see, e.g., FIG. 2). In some embodiments, the ventilation holes 932 may be configured to operate as fan blades when rotor 200 rotates to cool one or more components of an electric machine. In some embodiments, blades, vanes, or other air-moving features may be provided around (or proximate) the ventilation holes 932 to direct air along the axis of rotation 1000 (or into holes 932 and towards the stator during rotor rotation).

Figure 41:
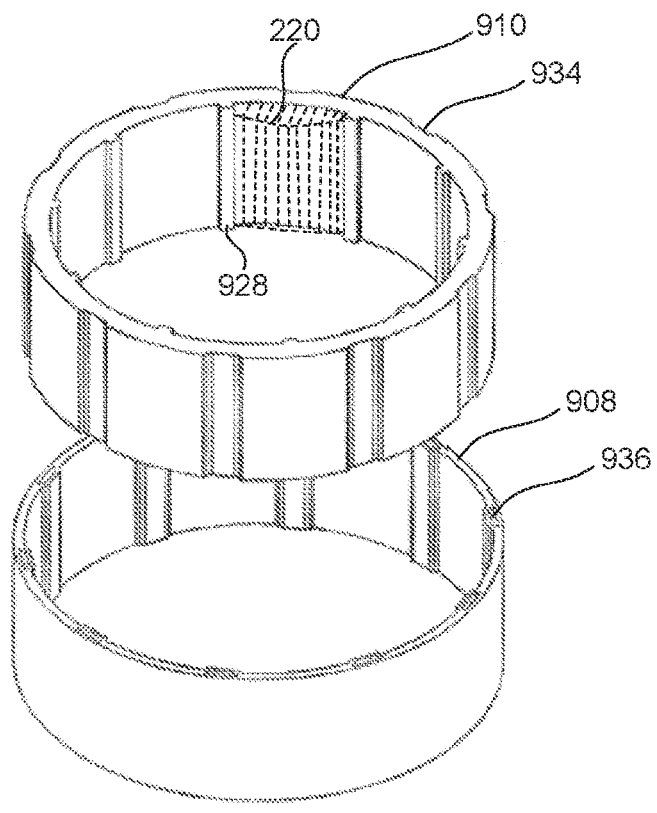
FIG. 41 illustrates portions of an exemplary outer rotor.

FIG. 41 illustrates a view of exemplary outer rotor 200. In some embodiments, to increase the permissible maximum rotational speed of the rotor 200, one or more slots 934 may be provided on the outer surface (e.g., radially outer surface) of the cylindrical core 910. As can be understood from FIG. 41, each slot 934 may be positioned opposite the middle of each of permanent magnet 220 (one permanent magnet 220 is shown using dashed lines in FIG. 41). In some embodiments, the inner mating surface of the sleeve 908 includes corresponding ribs 936 that are received in the slots 934 when the core 910 is mounted within the sleeve 908. In embodiments where the sleeve 908 is a bandage that is wrapped around the core 910 (as described with reference to FIG. 40), the slots 934 may be configured to receive the material of sleeve 908 and form stiffening ribs 936. That is, the portion of the sleeve 908 that is received in the slots 934 when the sleeve 908 is mounted or wrapped around the core 910 forms stiffening ribs 936. The stiffening ribs 936 increase the strength of the rotor core 910 without increasing its size (e.g., thickness). The middle of each permanent magnet 220 corresponds to the location of the lowest magnetic flux density. Therefore, positioning the slots 934 opposite the middle of the permanent magnets 220 assists in reducing leakage flux and increasing the strength of the core 910 without increasing its size. In some embodiments, the rotor 200 may be made without a sleeve 908.

Figure 43:
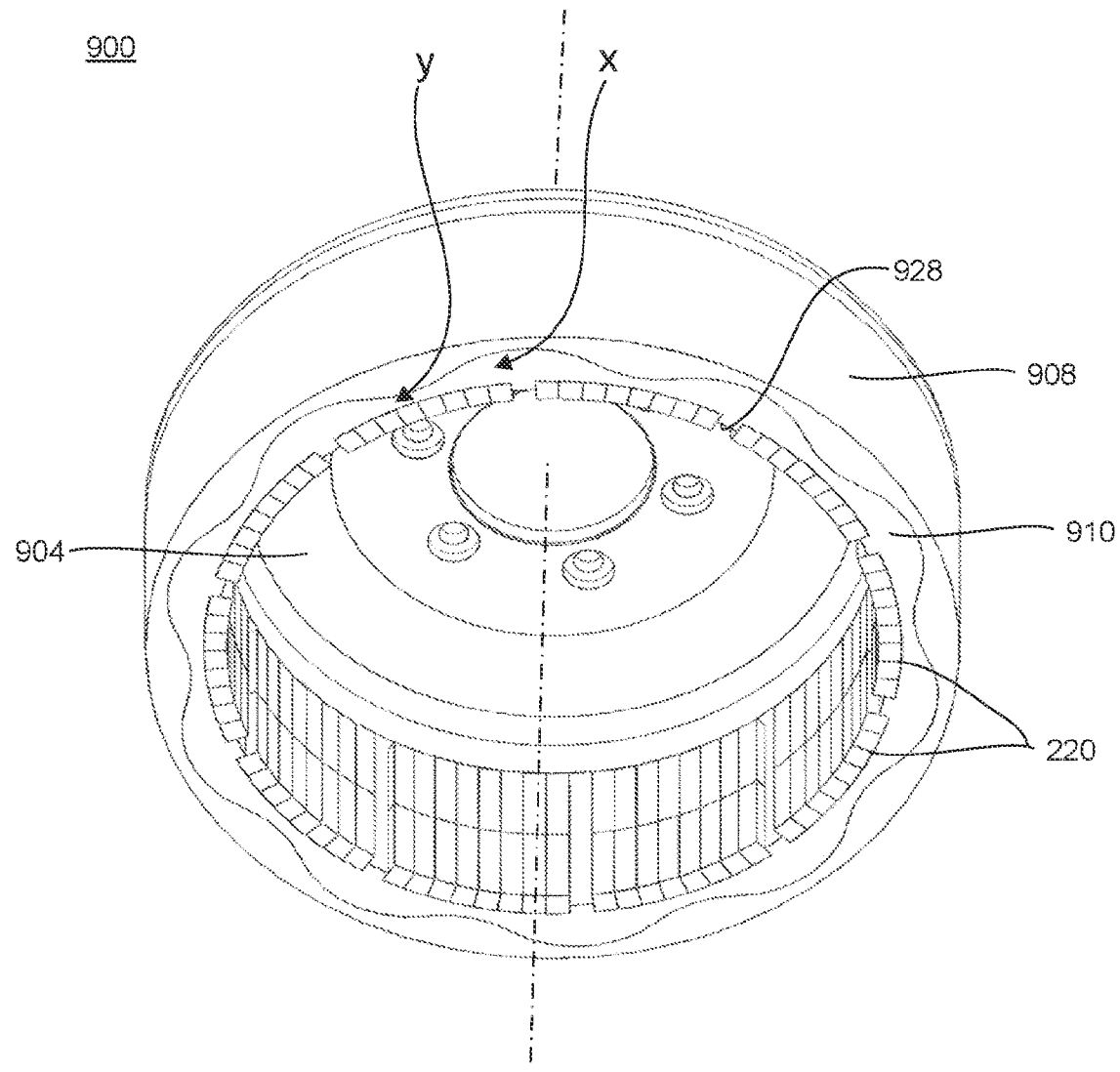
FIG. 43 illustrate another exemplary outer rotor.

FIG. 43 illustrates a view of exemplary outer rotor 200 having a rotor base 904, a cylindrical core 910, a plurality of permanent magnets 220, and a sleeve 908. As illustrated in FIG. 43, the cylindrical core 910 may have a non-uniform thickness (in the radial plane) about the axis of rotation 1000. In the illustrated embodiment, the outer surface of the cylindrical core 910 forms an undulating surface (with its radius varying, or increasing and decreasing, about the axis of rotation 1000) and the outer surface of the core 910 is a cylindrical surface. The non-uniform thickness of the core 910 occurs as a result of the different types of inner and outer surfaces. In the illustrated embodiment, the outer surface of the sleeve 908 is cylindrical and its inner surface (that mates with undulating outer surface of the core 910) is a corresponding undulating surface. Thus, the sleeve 908 also has a non-uniform thickness (i.e., a varying thickness about the axis of rotation 1000) as a result of the difference between its inner and outer surfaces.

As can be seen in FIG. 43, a thicker region X (or a location of higher thickness) of cylindrical core 910 corresponds to the thinner region (or the location of lower thickness) of the sleeve 908, and thinner region Y of the core 910 corresponds to a thicker region of the sleeve 908. As can be seen in FIG. 43, the thicker region X of core 910 is positioned between adjacent permanent magnets 220 and the thinner region Y of the core 910 is positioned adjacent to the middle of each permanent magnet 220. Also, the thicker region of the sleeve 908 is positioned adjacent to the middle of each permanent magnet 220 and its thinner region is positioned between two permanent magnets 220. The middle of a permanent magnet 220 corresponds to the location of the lowest magnetic flux density. Positioning the thicker regions of the sleeve 908 adjacent to (or proximate) the middle of each permanent magnet 220 increases the strength of the rotor 200 without increasing its size. It should be noted that the undulating outer surface of the core 910 and the inner surface of the sleeve 908 in exemplary embodiment of rotor 200 discussed with reference to FIG. 43 is only exemplary. In general, a non-uniform thickness of the core 910 and/or sleeve 908 may be provided in any manner. In some embodiments, the thickness of the core 910 and/or sleeve 908 may vary, for example, in a step-wise manner in the circumferential direction (i.e., about the axis of rotation 1000).

Figure 44:
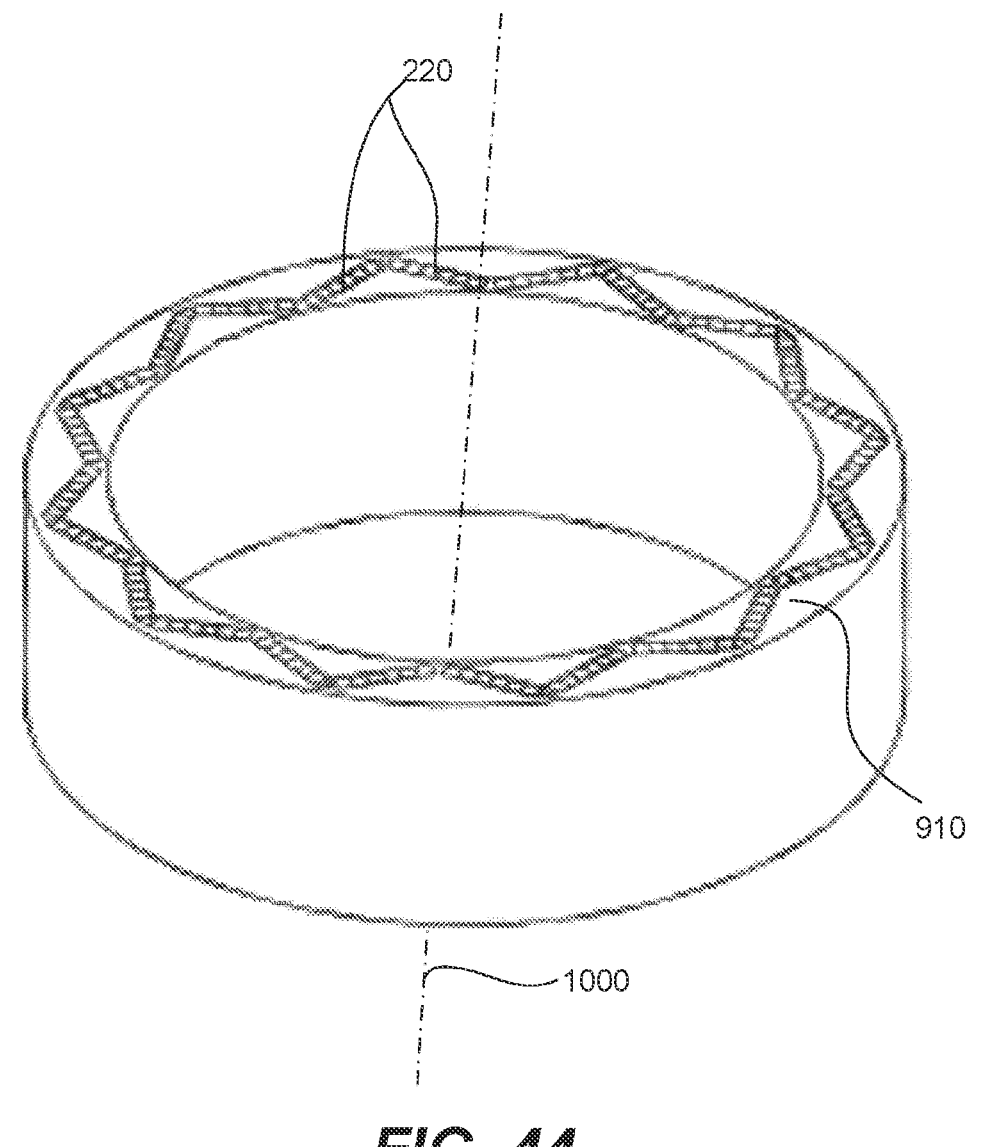
FIG. 44 illustrates an exemplary rotor core.

FIG. 44 illustrates an exemplary core 910 of a rotor 200. In the illustrated embodiment, permanent magnets 220 are disposed (or embedded) in the core 910. In some embodiments, the permanent magnets 220 may be disposed in a star pattern in the core 910. The core 910 may include slots in a corresponding star pattern to receive the permanent magnets 220. It should be noted that the star pattern is only exemplary, and in general, the permanent magnets 220 may be disposed in any pattern (e.g., circular, etc.) in the core 910. In some embodiments, the core 910 may include circumferentially spaced-apart slots to receive permanent magnet segments.

With reference to FIGS. 4A-4C and FIGS. 6A-7C, for efficient operation of the electric machine, it is preferable that the inner surface of the electromagnetic coil 300 that is mounted on a multi-part tooth 120 contacts, or is snug against, the outer surface (surface A, B, C, D of FIG. 23B) of the tooth 120. Because of the trapezoidal shape (or the varying cross-sectional area of the tooth 120 in the radial direction) of the tooth 120, it is difficult to mount a prefabricated coil 300 on the tooth 120 such that the mating surfaces of the cavity 320 of the coil 300 (see, e.g., FIGS. 6A-7C) and the external surface of the tooth 120 contact along the entire radial direction of the tooth. While it may be possible to wind a wire (or a foil) directly onto the tooth 120 (or on a pre-assembled core 110 with teeth 112) to form a coil 300, such a process would increase manufacturing cost. Winding a wire on the tooth 120 would also decrease the filling density of the slot 160 between the teeth 120 (see, e.g., FIGS. 4A-4B) and result in a low fill factor of the electric machine. Forming the tooth 120 of multiple parts (as discussed above) enables a prefabricated coil 300 to be installed, or mounted, on the tooth 120 while maintaining a high fill factor value. The parts of the multi-part tooth 120 are assembled inside the coil 300 to form the trapezoidal shape of the tooth 120 inside the cavity 320 (or the opening) of the coil 300.

FIGS. 45A-45F illustrate an exemplary method of mounting (or installing) a coil 300 on an exemplary multi-part tooth 120. FIGS. 46A-46C are simplified schematic illustrations depicting different stages during mounting a coil 300 on tooth 120. In the discussion below, reference will also be made to FIGS. 46A-46C. In the discussion below, the method of installing the coil 300 on the embodiment of tooth 120 described with reference to FIG. 24A will be described. Coils 300 can also be installed in other embodiments of teeth 120 in a similar manner. In the illustrated embodiment, the multi-part tooth 120 that includes a discrete core tooth-portion 122 (i.e., a core tooth-portion 122 which is not integrated with the annular part 130 of core 110 as in the embodiment of FIG. 23A) with a groove 138 on its base 134, and two additional tooth-portions 124A and 124B. A prefabricated (pre-formed, pre-wound, etc.) coil 300 may be installed on the multi-part tooth 120 formed of these multiple tooth portions 122, 124A, 124B. Although not a requirement, in the illustrated embodiment, the two additional tooth-portions 124A, 124B are identical.

The tooth 120 is made of multiple parts such that the previously formed coil 300 can be mounted on the tooth 120 such that the multiple parts of the tooth 120 fits within the cavity 320 of the coil 300. With reference to FIG. 45A, the pre-formed coil 300 includes an electrical conductor (wire, foil, etc.) that extends around a central cavity 320 (or opening) of the coil 300. The cavity 320 extends from a first end 322 to a second end 324 of the coil 300. In some embodiments, each additional tooth-portion 124A, 124B may be identical in structure and may be wedge-shaped. Each additional tooth-portion 124A, 124B may extend from a broader end 128 to a narrower end 126. After assembly, the first end 322 of coil 300 will be positioned proximate the stator core 110 and its second end 324 will be positioned proximate the air gap 250 (see FIG. 2).

In some embodiments, the method for installing the coil 300 on the multi-part tooth 120 incudes inserting at least one additional tooth-portion 124A, 124B of the multi-part tooth 120 into the cavity 320 of the coil 300 such that a broader second end 128 of the inserted additional tooth-portion(s) 124A, 124B extends out of the cavity 320. For example, as best seen in FIG. 46A, the two additional tooth-portions 124A, 124B are inserted into the cavity 320 of the coil 300 such that the broader second ends 128 of the two additional tooth-portions 124A, 124B extents (or protrudes) from the cavity 320 through its second end 324. In embodiments where the tooth 120 includes only a single additional tooth-portion (e.g., tooth portions 124C, 124D of FIGS. 23E and 23H), this single tooth portion will be inserted into the cavity 320 of the coil 300 such that its broader end protrudes out from one end of the cavity 320. In embodiments where the tooth 120 includes multiple additional tooth-portions (see FIGS. 23A, 23I-23K), one or more of these multiple additional tooth-portions will be inserted into the cavity 320.

In some embodiments, as illustrated in FIG. 45A-46C, both the additional tooth-portions 124A, 124B are inserted into the cavity 320. The two additional tooth-portions 124A, 124B may be pressed against the opposite side walls of the cavity 320 (i.e., against the inner walls of the coil 300) such that a gap is formed in the cavity 320 between the two additional tooth-portions 124A, 124B. That is, as can be seen in FIGS. 45D and 46A, the two additional tooth-portions 124A and 124B are placed in the cavity 320 such that a side surface of each additional tooth-portion 124A, 124B contacts (or is pressed against) an opposite surface on the inside of the cavity 320 to form a gap between the two additional tooth-portions 124A, 124B.

As best seen in FIGS. 45D and 46A, the additional tooth-portions 124A, 124B are inserted into the cavity 320 such that the broader second end 128 of the inserted tooth portion 124A, 124B extends out (or protrudes from) of the cavity 320 at its second end 324. As best seen in FIG. 46B, the coil 300 (with the inserted additional tooth-portions 124A, 124B is then mounted on the core tooth-portion 122 of the multi-part tooth 120 such that the broader second end 128 of the inserted additional tooth-portion 124A, 124B remains extended out of the cavity 320 of the coil 300. As illustrated in FIG. 46C, a force F is applied on the protruding second ends 128 of the additional tooth-portion 124A, 124B to push the additional tooth-portions further into the cavity 320 (i.e., towards the first end 322 of the cavity 320). As the additional tooth-portion 124A, 124B enters further into the cavity 320, they press against the sides of the core tooth-portion 122 and the inner walls of the cavity 320 to tighten the coil on the multi-part tooth 120 (see, e.g., FIG. 45E, 46C). In some embodiments, as illustrated in FIG. 45F, an adhesive material (or a glue) may then be applied to couple the multiple parts of the multi-part tooth 120 together and to the inner walls of the coil cavity 320.

It should be noted that the embodiment discussed above is only exemplary. There may be many variations to the described method based on the configuration of coil and the tooth. FIGS. 23E-23F and FIG. 23H also depict an exemplary method of installing a coil 300 on some other configurations of multi-part tooth 120. As explained previously, additional tooth-portion 124C (of FIG. 23E) or 124D (of FIG. 23H) may first be inserted into cavity 320 of coil 300 such that the broader end of the additional tooth-portion 124C or 124D extends out of opening 320. The coil 300 with the additional tooth-portion 124C or 124D may then be positioned over the core tooth-portion 122 such that broader end of the additional tooth-portion 124C or 124D remains extended out of the cavity 320. A force may then be applied to the broader end of the additional tooth-portion 124C or 124D to push it further into the cavity 320 thereby snugly fitting the coil 300 around the multi-part tooth 120. Application of the force may drive the broader end of the additional tooth-portion 124C or 124D further into coil 300 towards the annular part 130 of core 110 to tighten the coil 300 on the multi-part tooth 120 (see, e.g., FIG. 23F). In some embodiments, adhesive material may then be applied to couple the multiple parts of the multi-part tooth 120 together.

FIGS. 23I-23J illustrate another exemplary method of installing a coil 300 on a multi-part tooth 120. As in the embodiment described with reference to FIG. 45A-46C, a pair of additional tooth-portions 124A and 124B may first be positioned in the cavity 320 of coil 300 (see FIG. 23J). In this configuration, the broader end of the two additional tooth-portions 124A and 124B may protrude or extend out of the cavity 320 (see, FIG. 23J). The core tooth-portion 122 with the additional tooth-portions 124E, 124F positioned on its opposite sides (e.g., top and bottom sides, see FIG. 23J) may then be inserted into the cavity 320 of the coil 300 through the space between the two additional tooth-portions 124A, 124B. When the core tooth-portion 122 is inserted into the cavity 320, the broader ends of one or both of the additional tooth-portions 124A, 124B may remain protruded out of the cavity 320. A force may then be applied to push at least a portion of the protruding broader end(s) into the cavity 320. As the additional tooth-portion(s) 124A, 124B enters further into the cavity 320, they press against the sides of the core tooth-portion 122, the additional tooth-portions 124E, 124F, and the inner walls of the cavity 320 to tighten the coil 300 on the multi-part tooth 120 (see, e.g., FIG. 23K). In some embodiments, an adhesive material may then be applied to couple the parts together with the coil. Any type of adhesive material may be used to couple the parts of the multi-part tooth 120 together. In some embodiments, the adhesive material may have a coefficient of thermal expansion close to the coefficient of thermal expansions of the tooth and/or the coil materials to reduce the CTE mismatch induced thermo-mechanical stresses when the parts heat up during operation. In some embodiments, the CTE mismatch between the adhesive material and the different parts of the multi-part tooth 120 may be below about 20%.

The described methods of mounting the coil 300 on a multi-part tooth 120 is applicable to embodiments of tooth 120 where the core tooth-portion 122 is separate from the core 110 (e.g., the embodiments of FIGS. 23L and 23M) and to embodiments of tooth 120 where the core tooth-portion 122 is integrated with the core 110 (e.g., the embodiments of FIGS. 23A-23K). In general, the method of assembling a coil on an irregular-shaped multi-part tooth of an electric machine may include inserting at least one additional tooth portion (e.g., a wedge-shaped tooth portion or a wedge-portion) of the multi-part tooth into an opening of the coil such that a broader end of the at least one wedge-portion extends out of the cavity (or opening) in the coil. As used herein, the term "irregular-shaped" refers that the cross-section that varies along the length. In some embodiments, irregular-shaped volume may best be described by a geometric figure other than regular or simple figures (circle, cylinder, cube, parallelepiped, etc.). The term "wedge-portion" indicates a part having a broader end and a narrower end. In some embodiments, the wedge-portion may be in the form of a wedge. The term "cavity" or "opening" refers to an inner hollow part of the coil. The coil with the inserted at least one wedge-portion is positioned on a core tooth portion of the multi-part tooth such that the broader end of the at least one wedge-portion remains extended out of the cavity in the coil. The method may also include exerting a force on the broader end of the at least one wedge-portion to tighten the coil on the multi-part tooth.

In some embodiments, exerting a force on the broader end of the at least one wedge-portion may include pushing the broader end of the at least one wedge-portion into the cavity of the coil (i.e., the coil opening). In some embodiments, the opening in the coil may extend from a first end to a second end. And inserting the at least one wedge-portion may include inserting the at least one wedge-portion into the opening such that the broader end extends out of the second end of the opening. In some embodiments, exerting the force may include pushing the broader end towards the first end of the opening. The opening or the cavity in the coil may extend from a first end to a second end. In some embodiments, a width of the opening at the first end may differ from the width of the opening at the second end, and a length of the opening at the first end may differ from a height of the opening at the second end. In some embodiments, a shape of the opening at the first end and the shape of the opening at the second end may be rectangular (see, e.g., FIG. 7B). Since the electromagnetic coil fits snugly on the surface of a tooth, in some embodiments, the shape of the coil cavity or opening may correspond to (or may be substantially similar to) the shape of the tooth. Therefore, a perimeter of the opening at the first end of the coil cavity may be substantially the same as the perimeter of the opening at the second end of the coil cavity (see, e.g., discussion of the shape of tooth 120 with reference to FIGS. 26A-26B). In some embodiments, an area of the coil opening at the first end may vary from the area of the opening at the second end. In some embodiments, the area of the coil opening may increase from the first end to the second end. In some embodiments, inserting at least one wedge-portion into the coil opening may include inserting at least two wedge-portions into the opening.

Mounting the coil on a tooth may include mounting the coil on the core tooth portion such that the core tooth portion is disposed between the at least two wedge-portions. In some embodiments, an adhesive material may be used to attach the at least two wedge portions and the core tooth-portion of the multi-part tooth together. The multi-part tooth may be a part of a stator of the electric machine. In some embodiments, the core tooth portion of the multi-part tooth may be one of a plurality of core tooth portions symmetrically arranged on an annular stator ring that extends around a central axis of the electric machine. The core tooth portion may extend outward in a radial direction from the annular stator ring. In some embodiments, the plurality of core tooth-portions are integrally formed with the annular stator ring. In some embodiments, in a plane perpendicular to the central axis, the core tooth portion may have a substantially rectangular cross-sectional shape and the at least one wedge-portion may have a substantially triangular cross-sectional shape (see, e.g., FIG. 23B, 23F, 23K). In some embodiments, in a plane perpendicular to the radial direction, the core tooth portion and the at least one wedge-portion may have a substantially rectangular cross-sectional shape. In some embodiments, the coil may include a winding of a copper wire around the coil opening or cavity (see, e.g., 7A-7C). The wire may have one of a square, rectangular, or circular cross-sectional shape (see, e.g., 7D, 7E). In some embodiments, the coil may include a winding of a copper stranded wire in a spiral configuration around the opening. In some embodiments, the electric machine may be an electric motor. In some embodiments, the method wherein the electric machine may be an electric generator.

An exemplary method of assembling a coil on an irregular-shaped multi-part tooth of an electric machine may include a step of inserting at least one wedge-portion of the multi-part tooth into an opening of the coil such that a broader end of the at least one wedge-portion extends out of the opening in the coil. The method may include a step of mounting the coil with the inserted at least one wedge-portion on a core tooth portion of the multi-part tooth such that the broader end of the at least one wedge-portion remains extended out of the opening in the coil. The method may include a step of exerting a force on the broader end of the at least one wedge-portion to tighten the coil on the multi-part tooth.

FIG. 47 illustrates a flow chart of an exemplary method of installing a coil on a multi-part tooth. With additional reference to FIGS. 45A-46C, the method may include a step of inserting at least one wedge-portion (e.g., additional tooth-portion 124A, 124B) of a multi-part tooth 120 into an opening (e.g., cavity 320) of a coil 300 such that a broader end (second end 128) of the at least one wedge-portion extends out of the opening in the coil (step 810). The method may also include a step of mounting the coil 300 with the inserted at least one wedge-portion 124A, 124B on a core tooth portion 122 of multi-part tooth 120 such that the broader end of the at least one wedge-portion remains extended out of the opening in the coil (step 820). The method may further include exerting a force (e.g., Force F of FIG. 46C) on the at least one wedge-portion 124A, 124B to push its broader end 128 into the opening in the coil. In method of assembling outer rotor assembly, the opening in the coil may extend from a first end to a second end, wherein inserting the at least one wedge-portion includes inserting the at least one wedge-portion into the opening such that the broader end extends out of the second end of the opening and the step of exerting the force includes pushing the broader end towards the first end of the opening (step 830).

Exemplary methods of forming coils 300 for electric machines of the current disclosure are described below. In some embodiments, the coils may be irregular shaped coils. As used herein, the term irregular shaped coil indicates that the cross-section of the coil varies along its length. As explained previously with reference to FIGS. 6A-7C, coils 300 of the current disclosure may include a cavity 320 that extends from a first end 322 to a second end 324. In some embodiments, a dimension related to the cross-section of the cavity 320 of an irregular shaped coil varies along at least a portion of the distance (e.g., length) between the first and second ends 322, 324. In some embodiments, the cross-sectional area varies from the first to the second end 322, 324. Various embodiments of forming irregularly shaped coils of the current disclosure may include forming a coil, winding a wire around a mandrel to form the coil in the shape of the mandrel, removing the coil from the mandrel, and exerting a mechanical force on the coil to change the shape of the coil to correspond to the shape of a tooth. The tooth may be part of the stator or the rotor or the electric machine. In some embodiments, the coil may then be mounted on the tooth.

As used herein, the term "mandrel" refers to a device (shaft, spindle, or workpiece) upon which the wire or foil that forms the coil is supported or wound to form a coil of the first shape. In some embodiments, the mandrel may be a shaft or a rod (e.g., a cylindrical shaft). Any type of mechanical force (compressive force, tensile force, pulling, pushing, etc.) may be applied to the coil to change its shape. In some embodiments, the mechanical force may result in deformation of the coil. As explained previously with reference to FIGS. 6A-7E, the coils 300 of the current disclosure may be made of wires or foils. In some embodiments where the coil is made of a wire, the wire may include a single-strand wire or a multi-strand wire. The term "strand" refers to a current or electrical conductor isolated from other current conductors of the wire. The term current or "electrical conductor" refers to a material or an object that allows for the flow of charge or current in one or more directions. In some embodiments, the wires that form a coil may be twisted together. That is, the strands of the wires may be twisted together. In some cases, twisting the strands together may assist in reducing eddy current losses.

Figure 48A:
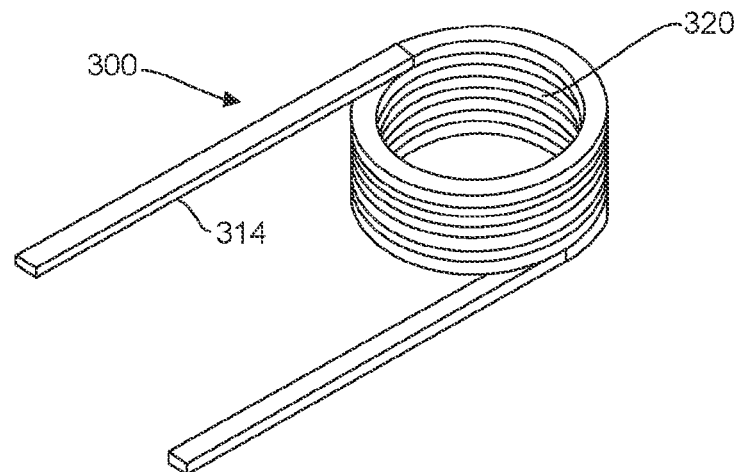
FIGS. 48A-48D are schematic illustrations of an exemplary method of forming a coil of an electric machine of the current disclosure.

FIGS. 48A-48D illustrate the steps of fabricating a coil 300 in an exemplary embodiment. As shown in FIG. 48A, coil 300 may be made from a wire 314. Wire 314 may be single-strand wire or a multi-strand wire 314. Coil 300 may be wound in a form of a spiral in the radial direction. In some embodiments, coil 300 may be wound around a cylindrical mandrel to form spiral shaped winding. As such, a first shape of coil 300 after winding on a cylindrical mandrel may correspond to the shape of the mandrel. The cylindrical cavity of the coil 300 that results after winding on the cylindrical mandrel may have a constant perimeter and a constant cross-sectional area along the length of the cavity. It should be noted that the cylindrical mandrel and the resulting cylindrical shape are only exemplary. In general, the mandrel may have any shape (i.e., a rod of any cross-sectional shape), and the coil that results from winding on that mandrel may have a corresponding cross-sectional shape. For example, if the mandrel used to wind the wire has a rectangular cross-sectional shape, the cavity of the coil that results from that winding operation will also have a substantially similar rectangular cross-sectional shape.

Figure 48B:
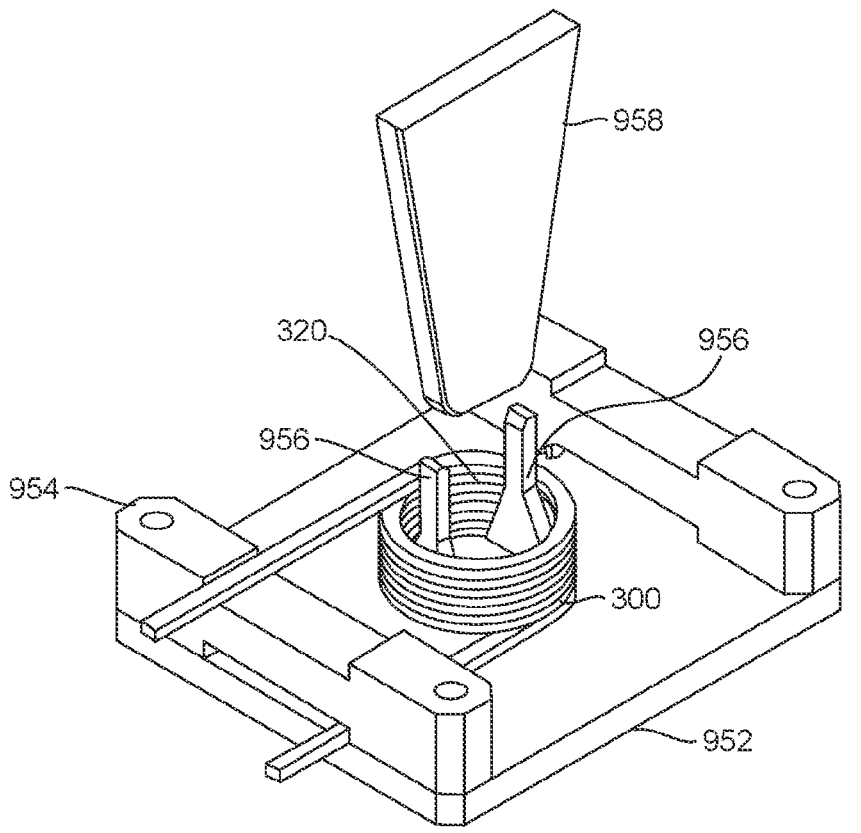
Figure 48C:
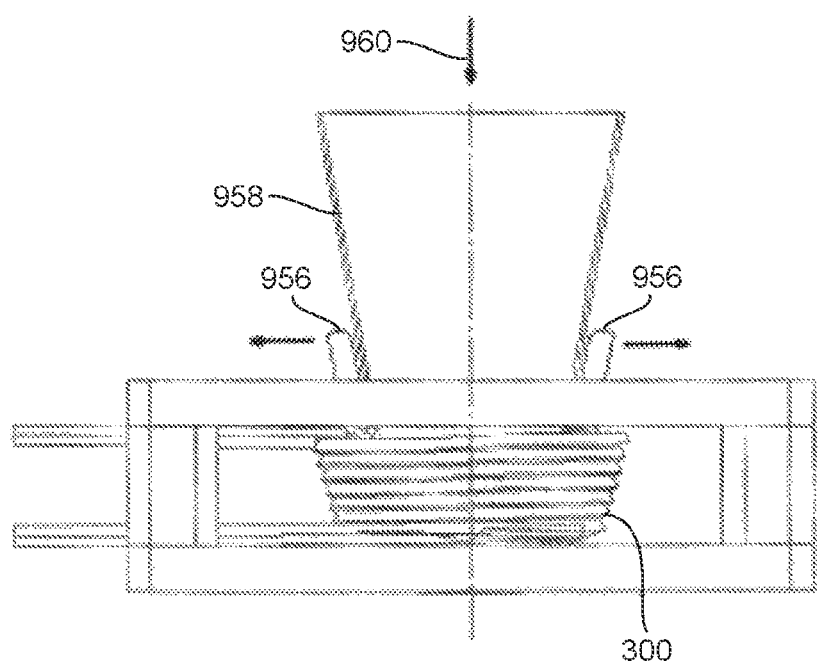
Figure 48D:
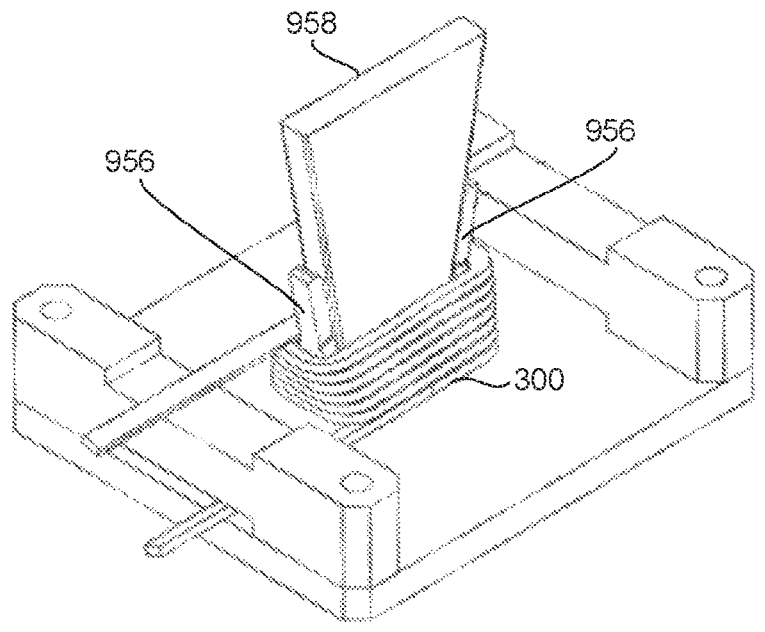

As shown in FIG. 48B, coil 300 may be placed on a fabrication station 952 using one or more separation mandrels 956. The separation mandrels 956 may support the coil during application of mechanical force to change the shape of the coil cavity from the first to the second shape. In some embodiments, a mount 954 may affix a portion of coil 300 to the station 952 so that coil 300 may not move during fabrication. As shown in FIG. 48C, a wedge mandrel 958 may be driven between the separation mandrels 956 to change the shape of coil 300. The wedge mandrel 958 may be pushed into the cavity of the coil through the gap between the two separation mandrels 956 (see FIGS. 48B and 48C) to push diametrically opposite ends of the internal cavity walls outward. Force may be applied to wedge mandrel 958, for example, in a downward direction 960 as shown in FIG. 48C to push the wedge mandrel 958 into the space between the separation mandrels 956. As the wedge mandrel 958 moves downward into the coil cavity, the separation mandrels 956 may be driven outwards (shown using arrows in FIG. 48C) by the wedge faces of wedge mandrel 958. As the separation mandrels 956 moves outward, the internal walls of the coil cavity may also be pushed outward. As a result of this force in the radially outward direction on diametrically opposite ends of the coil cavity, as shown in FIG. 48D, a second shape of coil 300 may be formed. The second shape may correspond to a shape of a tooth 120. That is, after application of the force (as shown in FIGS. 48B-49D), similar to the external shape of a tooth 120 (explained with reference to FIGS. 48A-49D), the cavity 320 of the coil 300 that snugly fits on the surface of the tooth 120 may have a substantially constant perimeter along its length from the first end 322 to the second end 324 while its cross-sectional area along the length varies. The second shape may be rectangular or trapezoidal. In some embodiments, the cavity 320 may have a trapezoidal 3-dimensional shape with a rectangular cross-sectional area in planes perpendicular to an axis that extends between the first and second ends 322, 324 of the coil 300 (see, e.g., FIGS. 6C, 7A, 48B-48D). In some embodiments, at least one end of the internal cavity of coil 300 may expand (or plastically deform) as a result of the force applied by wedge mandrel 958. An exemplary embodiment of a coil 300 with its cavity 320 in the second shape is shown in FIGS. 6A-6D and 7A-7B. As explained previously, although a wire 314 is used to form the coil 300 in the method described above, a coil 300 may also be similarly formed using a foil 312.

Figure 49A:
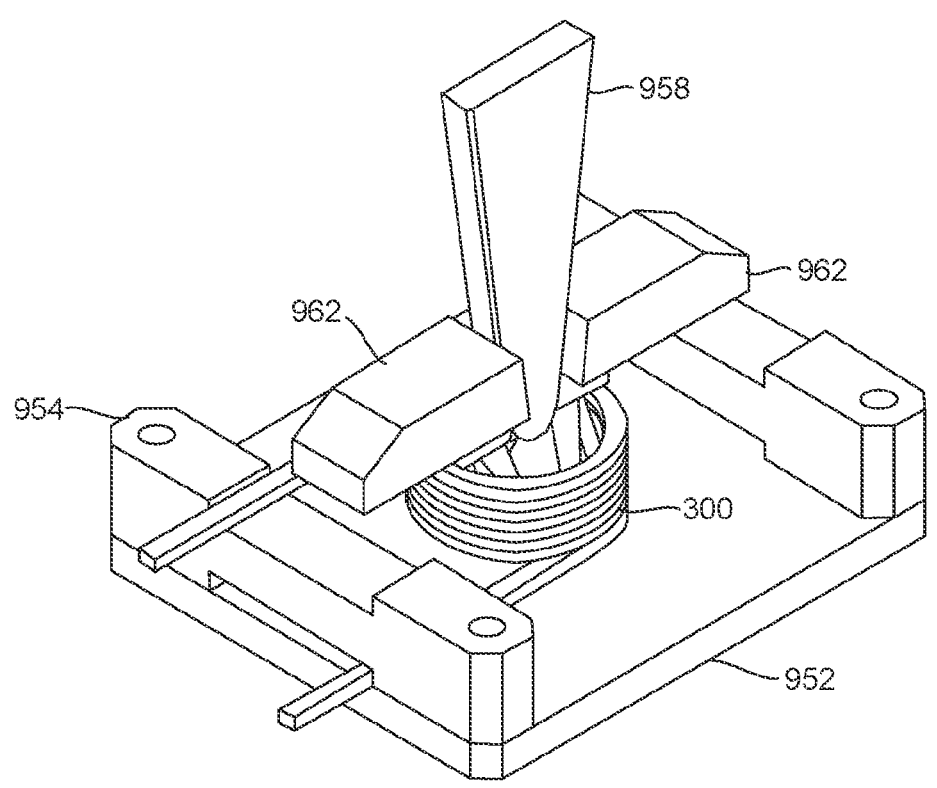
FIGS. 49A-49D are simplified schematic illustrations of an exemplary method of forming a coil of an electric machine of the current disclosure.
Figure 49B:
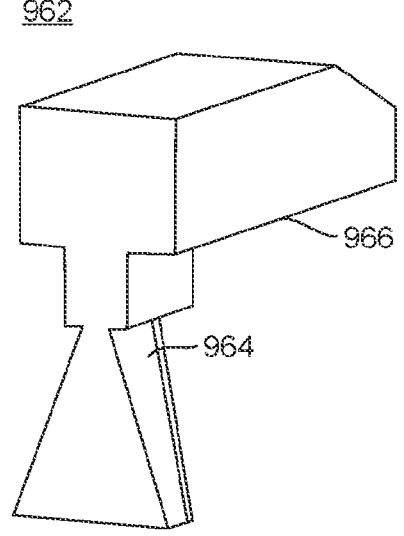
Figure 49C:
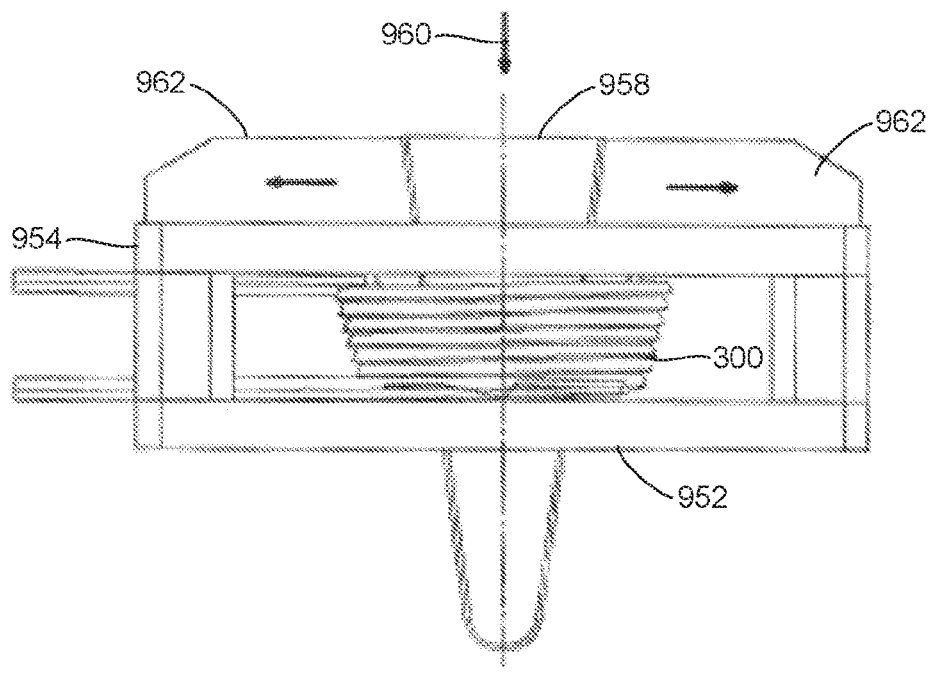
Figure 49D:
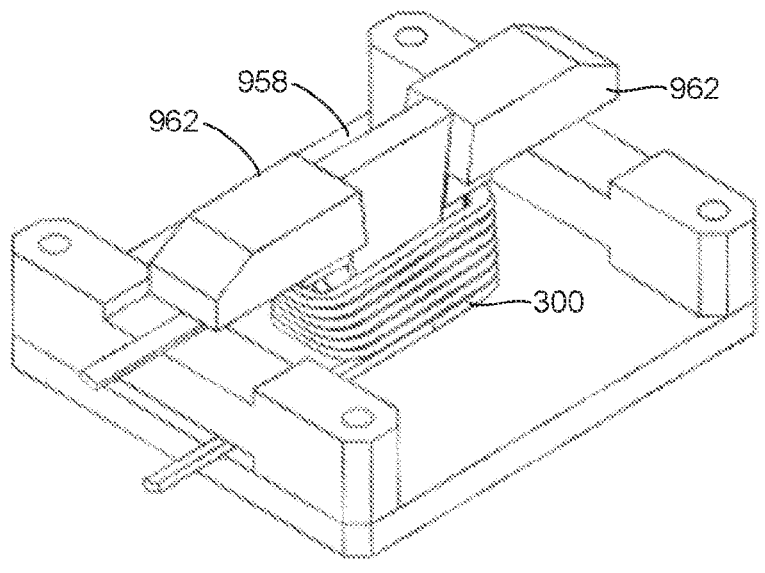

FIGS. 49A-49D illustrate another exemplary method of fabricating a coil. As shown in FIG. 49A, coil 300 may be placed on fabrication station 952 using one or more guide separation mandrels 962. Mount 954 may affix a portion of coil 300 so that coil 300 may not move during fabrication. As shown in FIG. 49B, separation mandrel 962 may include lower portion 964 and upper portion 966. Lower portion 964 may be driven inside of a coil to shape the coil and upper portion 966 may be configured to restrict movement of separation mandrel 962 such as to keep separation mandrel 962 against mount 954. As shown in FIG. 49C, wedge mandrel 958 may be driven between guide separation mandrels 962 to change a shape of coil 300. Force may be applied to mandrel 958 opposite fabrication station 952 (e.g., in direction 958 downward as shown), and separation mandrels 962 may be driven by the wedge faces of wedge mandrel 958. As shown in FIG. 49D, a second shape of coil 300 may be formed. The second shape may correspond to a shape of a tooth 120. The second shape may be similar to that described above. In some embodiments, at least one end of the internal cavity of coil 300 may expand as a result of the force applied by wedge mandrel 958. The resulting second shape of coil 300 may be similar to that shown relative to coil 300 shown in FIGS. 6A-6D and 7A-7B.

Figure 50A:
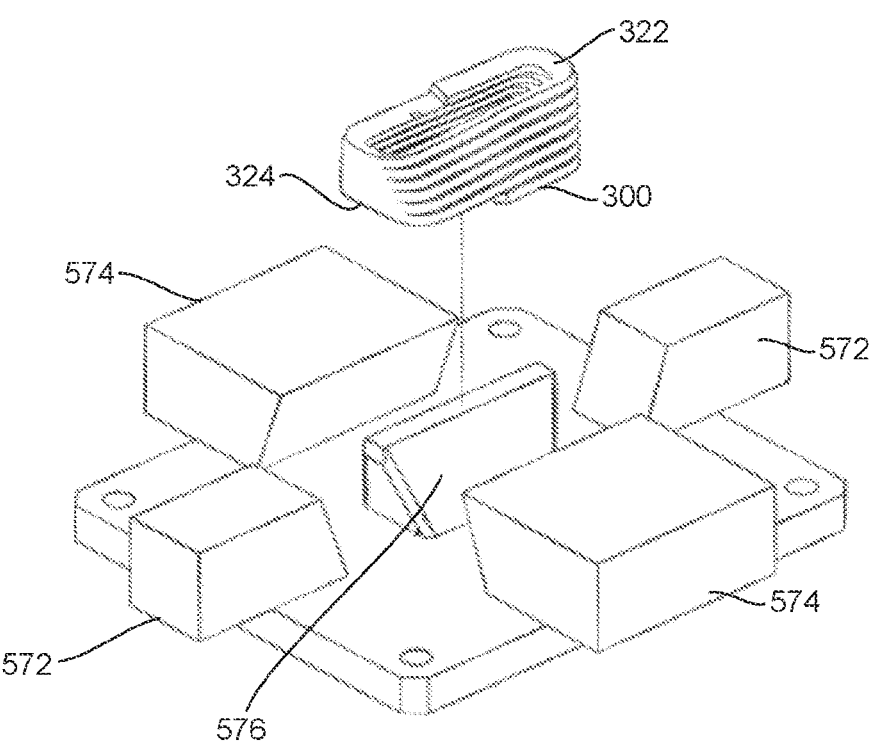
FIGS. 50A-50D are simplified schematic illustrations of an exemplary method of forming a coil of an electric machine of the current disclosure.
Figure 50B:
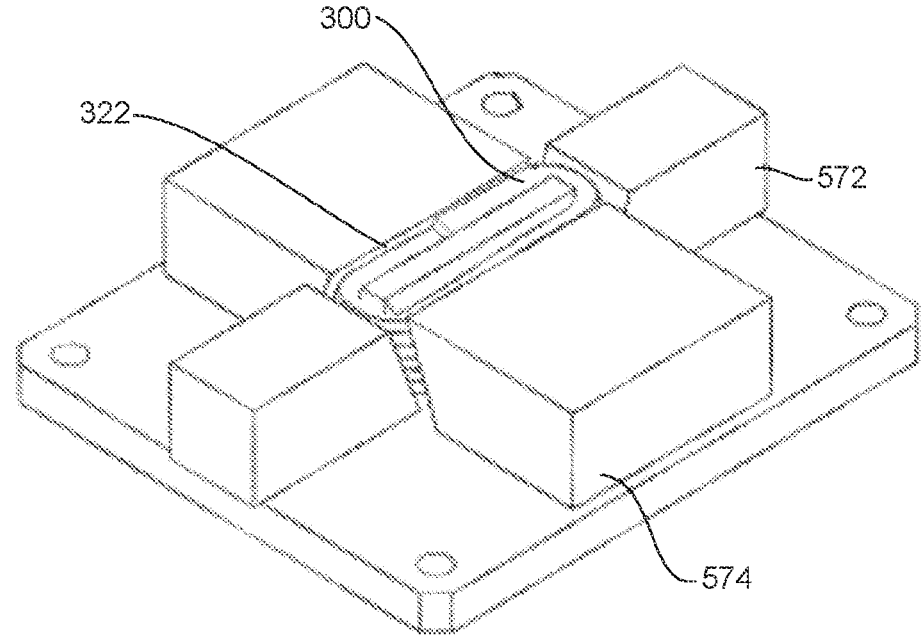
Figure 50C:
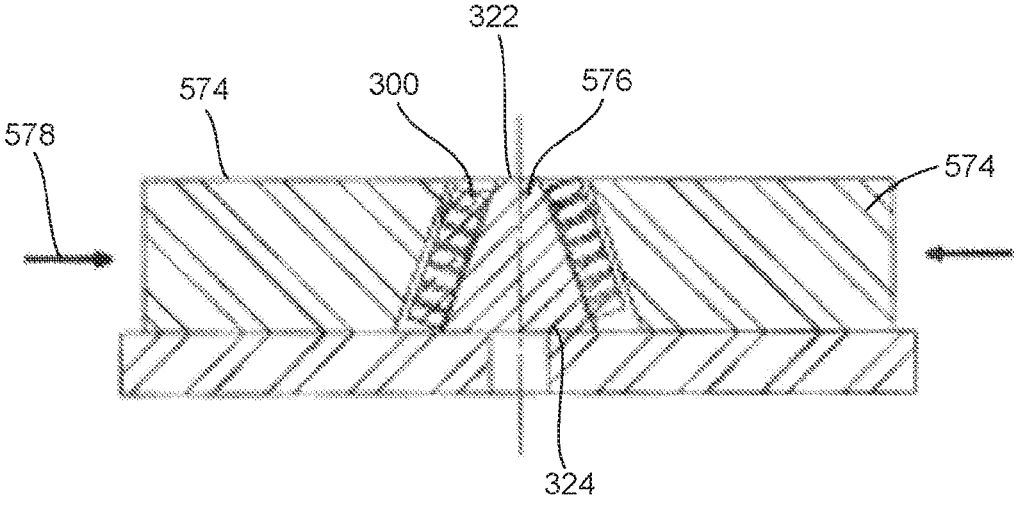
Figure 50D:
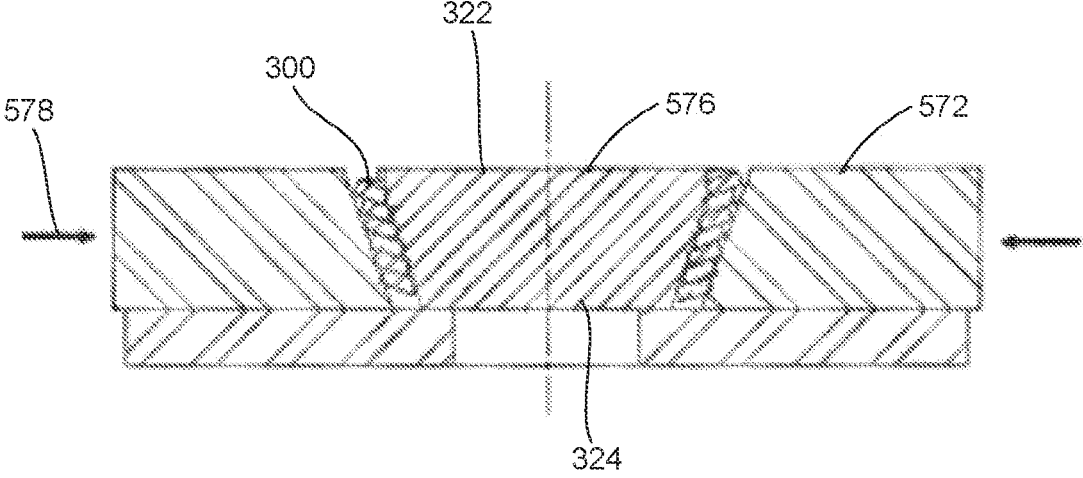

As explained previously (with reference to FIGS. 45A-46C), a coil 300 is mounted on a tooth 120 of a rotor or a stator such that the cavity 320 of the coil 300 fits snugly on the tooth 120. In some embodiments, after a coil 300 is formed as described above (e.g., with reference to FIG. 48A-48D or 49A-49D), the shape of its cavity 320 may not sufficiently correspond to the shape of the tooth 120. In some such embodiments, after the coil 300 is formed as described above, a force may be applied to the external surfaces of the coil 300 and/or the internal walls of its cavity 320 to finish (or fine-tune) the shape the cavity 320 to the shape of the tooth 120. FIGS. 50A-50D illustrate views of an exemplary method of fabricating a coil. As shown in FIGS. 50A-50B, a coil 300 (after changing the shape of its cavity to the second shape as described with reference to 48A-48D and 49A-49D) may be placed on protrusion 576 with its cavity around the protrusion. Forming blocks 572, 574 may contact and apply a mechanical force (e.g., a compressive force) on the external surfaces of the coil 300 to change a shape of coil 300 once coil 300 is positioned on protrusion 576. As shown in FIGS. 50C-50D, forming blocks 572, 574 may be driven inwards (e.g., with force 578) towards protrusion 576 to change the shape of the coil cavity to final desired shape. The resulting shape of coil 300 may be trapezoidal and correspond to the shape of the multi-part tooth 120 (described with reference to 48A-49D). In some embodiments, only one pair of oppositely positioned blocks 574 (or 572) may apply a compressive force on the coil 300 mounted on the protrusion 576. In some embodiments, a first pair of oppositely positioned blocks 574 may apply a compressive force on the coil 300 while a second pair of oppositely positioned blocks 572 may merely rest on the coil surface, for example, to prevent it from bulging in the direction of blocks 572 as a result of the force application.

Figure 51A:
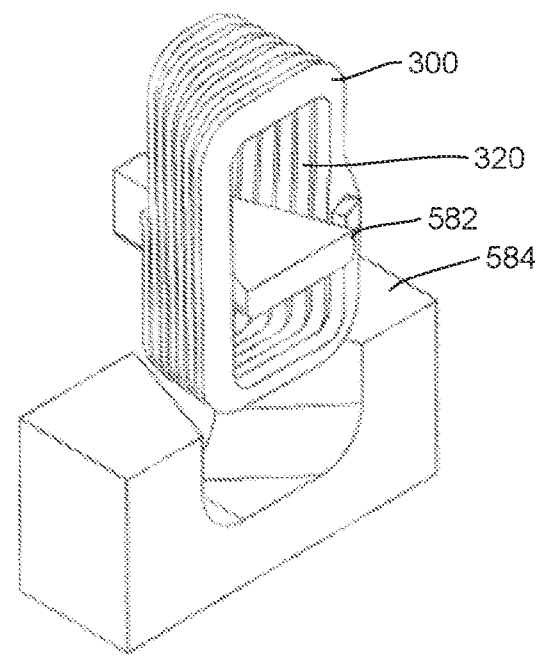
FIGS. 51A-51B are simplified schematic illustrations of an exemplary method of forming a coil of an electric machine of the current disclosure.
Figure 51B:
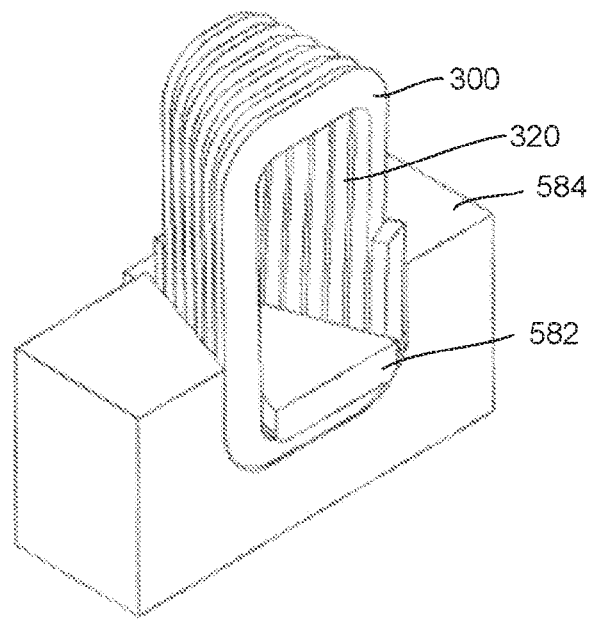

In some embodiments, a wedge piece may be used to finish the shape of the coil cavity to the final desired shape. FIGS. 51A-51B illustrate view of a method of fabricating a coil. As shown in FIGS. 51A-51B, a wedge mandrel 582 and base 584 may be used to finish the shape of the cavity 320 of the coil 300. In some embodiments, the wedge mandrel 582 may be moved (e.g., up and down in FIG. 51A) in the cavity 320 of the coil 300 to finish (or fine-tune) the inner walls of the cavity 320 to the final desired shape. In some embodiments, as illustrated in FIG. 51B, wedge mandrel 582 may be pressed to one side of coil 300 against base 584 to finish the shape of one side of the coil cavity to the final desired shape. In some embodiments, coil 300 may be flipped and the process repeated to form or finish the other side. Mandrel 582 may be wedge shaped so as to form a trapezoidal inside of coil 300. In some embodiments, a mechanical force may be used to decrease the size of the internal cavity at the other end (e.g., a clamp) while mandrel 582 is pressed against base 584. In such embodiments, mandrel 582 may be acting in a direction away from a central axis of coil 300 (e.g., axis 2000 shown in FIG. 6D), and the mechanical force to decrease the size of the internal cavity at the other end may be acting in a direction towards the central axis of coil 300.

FIG. 52 illustrates a method 910 of fabricating a coil for mounting on a tooth 120 of a stator or a rotor of an electric machine. Steps of method 910 may include a step 920 of winding a wire (or a foil) about a mandrel to form a coil having a first shape corresponding to the shape of the mandrel. For example, in some embodiments, a wire 314 (or foil 312) may be wound around a circular rod or a shaft to form (or deform) a cylindrical winding of the wire 314 with a cylindrical cavity therethrough. Steps of method 910 may include a step 930 of removing the coil having the first shape from the mandrel. For example, in an embodiment where a wire is wound on a circular shaft to form a circular coil, the coil may be removed from the shaft. In step 920, the material of the wire may be plastically deformed such that the coil retains its circular shape when it is removed from the mandrel in step 930. Steps of the method may include step 930 of applying a mechanical force on the coil to change the shape of the coil from the first shape to a shape that corresponds to the tooth. For example, if the tooth has a rectangular shape, in this step, a mechanical force is applied to the circular coil of wire so that the shape of its cylindrical cavity changes to a cavity having a rectangular cross-sectional shape. Steps of the method may include step 940 of mounting the coil of the second shape on the tooth.

In some embodiments, coil the wire may be formed of a number of strands of an electrical conductor. The wire may have any number (e.g., 2-3000) of strands. In some embodiments, wire 314 may be formed by twisting together an electrical conductor or made in the form of a Litz wire. A Litz wire is made of many wire strands which may be individually insulated and twisted or woven together. In some cases, a Litz wire may assist in distributing a current equally among the multiple wire strands and thereby reducing its resistance.

Wire 314 may have a circular cross-sectional shape or a rectangular cross-sectional shape. As previously explained, the coils 300 of the current disclosure may be made using a wire 314 or a foil 312. It should be noted that although the above described coil fabricating method 810 is described using a wire 314, this is only exemplary. The method 910 can also be performed using a foil 312. For the sake of brevity, the method of fabricating a coil 300 will be described with reference to a wire 314. The coil 300 can also be formed using a foil 312 in a similar manner.

With reference to step 920, the wire 314 may be wound on a mandrel to form a coil having any shape (i.e., any first shape). In some embodiments, the first shape of coil may be a cylindrical shape or a trapezoidal shape. That is, the coil formed as a result of winding the wire 314 on the mandrel may have a cylindrical (or trapezoidal) cavity 320 that extends along its length. In some embodiments, the step of winding wire 314 about mandrel (i.e., step 920) includes forming a coil having an internal cavity 320 extending from a first end 322 to a second end 324. In some embodiments, the step of applying mechanical force (i.e., step 940) on the coil includes selectively increasing a size of the internal cavity 320 at one of the first end 322 or the second end 324. In some embodiments, the step of applying the mechanical force (i.e., step 940) on the coil may include changing a shape of the internal cavity 320. For example, the cross-sectional shape of the internal cavity 320 may be changed from one shape (e.g., circular cross-sectional shape) to a different shaped (e.g., rectangular cross-sectional shape). In some embodiments, changing the shape of the internal cavity may include changing a cross-sectional shape of the internal cavity along a plane perpendicular to a central axis of the internal cavity from a circular shape (see, e.g., FIG. 49A) to a trapezoidal shape (see, e.g., FIGS. 50C-50D).

In some embodiments, a width and a height of the trapezoidal shape both may vary from the first end to the second end (see, e.g., FIGS. 7B, 48A-48D). In some embodiments, a perimeter of the trapezoidal shape may be substantially a constant from the first end to the second end and an area of the trapezoidal shape varies from the first end to the second end. In some embodiments, the area of the trapezoidal shape increases from the first end to the second end. In some embodiments, the step of applying a mechanical force 930 on the coil may include inserting a second mandrel into the internal cavity of the coil to change a shape of the first end of the internal cavity compared to a shape of the second end of the internal cavity. The term "second mandrel" indicates a solid material configured to change the shape of the coil from cylindrical to trapezoidal.

The step of applying a mechanical force 930 on the coil may include applying a first mechanical force (e.g., mechanical force in direction 960) to increase a dimension of the internal cavity at one of the first end or the second end and a second mechanical force to decrease a dimension of the internal cavity at the other of the first end or the second end. In some embodiments, the first mechanical force may act towards a central axis of the internal cavity and the second mechanical force acts away from the central axis. In some embodiments, the step of applying a mechanical force 930 on the coil includes stretching the wire of the coil that defines at least one of the first end or the second end of the internal cavity. In some embodiments, the wire may be made of copper.

Various embodiments of the current disclosure include an electric machine. As used herein, an electric machine (or electrical machine) may be device that operates based on electromagnetic forces. In general, any type of electromechanical energy converter that operates on, or generates, electricity may be an electric machine. Although not required, in some embodiments, the electric machine may be an electric motor or an electric generator. During operation, an electric machine generates magnetic flux. In a radial flux electric machine, at least some portions of the generated magnetic flux may extend perpendicular to the axis of rotation of the machine. Electric machines may include a stator and a rotor separated by an air gap. In a radial flux electric machine, the working (or main) magnetic flux may extend between the rotor and the stator through the air gap in the radial plane.

Figure 53:
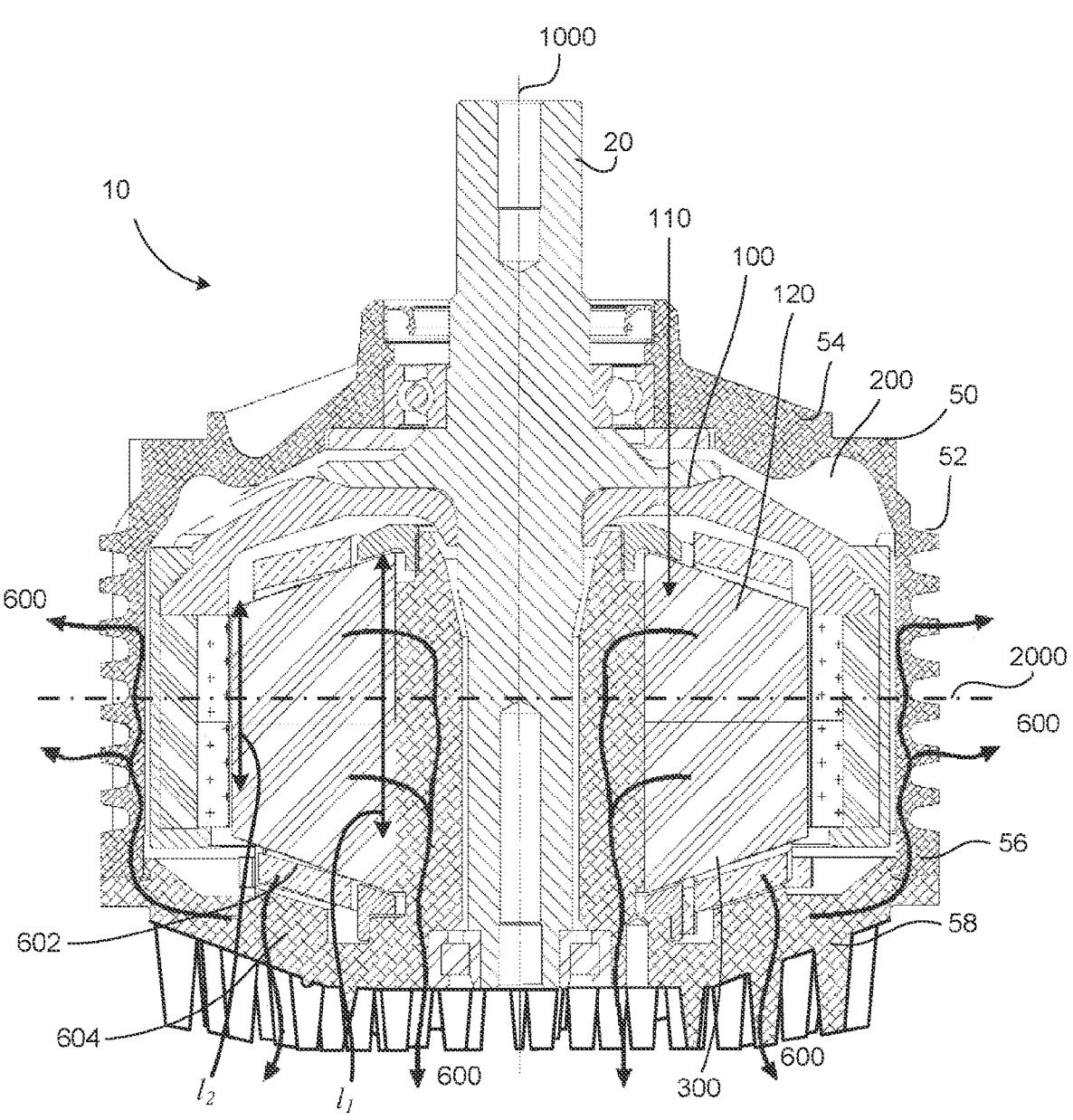
FIG. 53 illustrates a cross-sectional view of an electric machine in an axial plane, consistent with disclosed embodiments.
Figure 54:
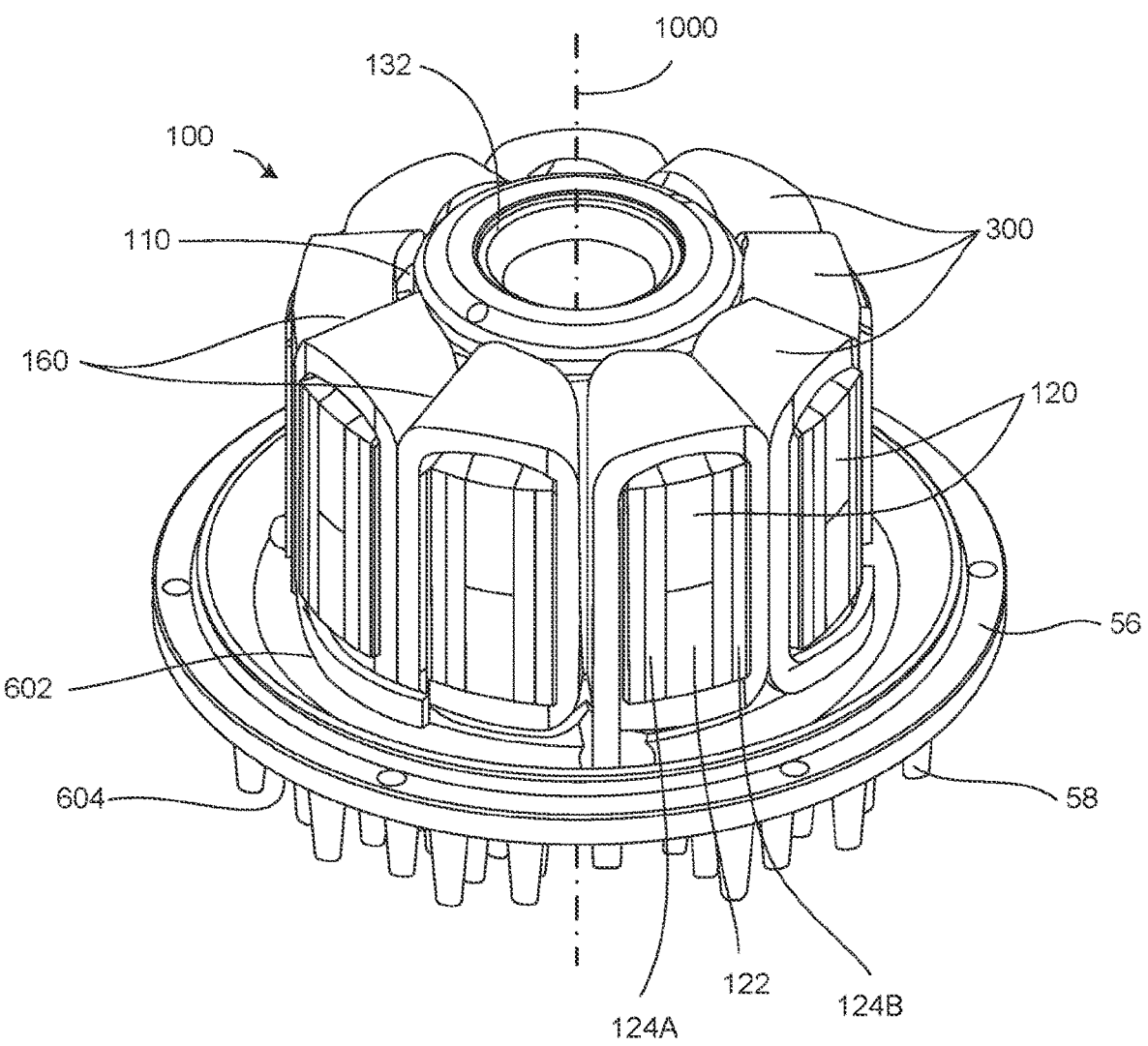
FIG. 54 illustrates a perspective view of a stator of the electric machine of FIG. 53, consistent with disclosed embodiments.
Figure 55:
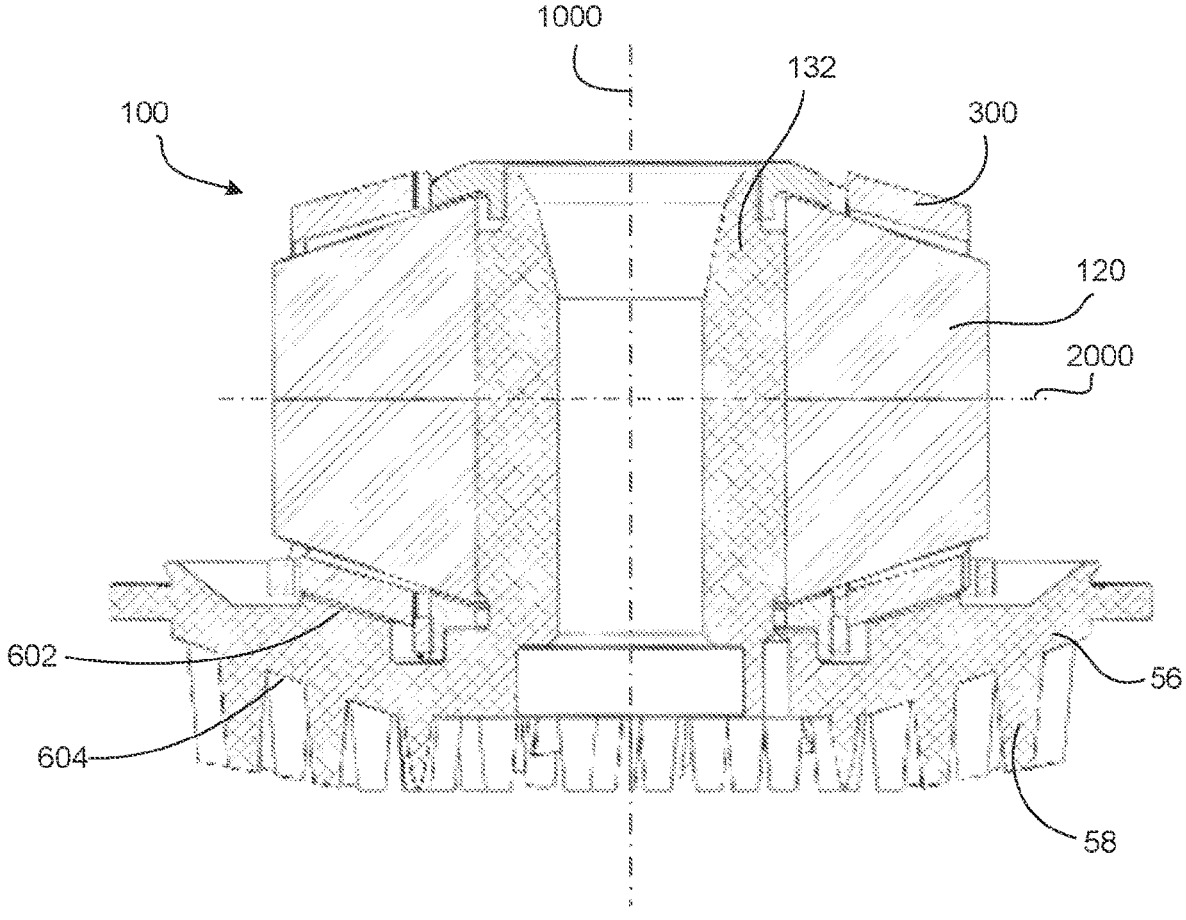
FIG. 55 illustrates a cross-sectional view of a stator of the electric machine of FIG. 53 in an axial plane, consistent with disclosed embodiments.

FIGS. 53, 54, and 55 depict different views of an exemplary electric machine 10. Exemplary electric machine 10 may include a stator 100, a rotor 200, a base plate 56, a plurality of teeth 120, and electromagnetic coils 300. Electric machine 10 may be an air-cooled system with a housing 50. External ribs 52 may be positioned on the surface of the housing 50 between an end shield 54 and a stator base plate 56. As illustrated in FIG. 53, the stator base plate 56 may include a plurality of pins 58 extending therefrom. The external ribs 52 and the pins 58 may assist in transferring the heat generated by the electric machine 10 during operation to the surrounding air. In the discussion below, electric machine 10 in the form of an electric motor will be described. However, the description is equally applicable to other types of electric machines, such as, for example, an electric generator. When electric machine 10 operates, its shaft 20 may rotate. The components of electric machine 10 will be described in greater detail below.

Electric machines of the current disclosure may include a rotor configured to rotate about an axis of rotation and a stator having a plurality of teeth annularly arranged on a stator core about the axis of rotation. In general, a stator may be any stationary component (or assembly of components) of an electric machine and a rotor may be any electric machine component (or assembly of components) that is configured to move with respect to the stator. In some embodiments, the stator may be fixedly positioned with respect to the rotor. In some embodiments, the rotor may be configured to rotate about an axis of rotation with respect to the stator. The rotor may be coupled to a shaft (rotor shaft) that rotates with the rotor. The axis about which the rotor (and the shaft) rotates may be referred to as the "axis of rotation." As used herein, a plurality of teeth may refer to projections that protrude from a body. The teeth may include a series of substantially similar projections that protrude from the body. For example, in embodiments where the stator includes teeth, a series of substantially similar projections that protrude from a body or core of the stator may include the teeth. Additionally, or alternatively, in embodiments where the rotor includes teeth, a series of substantially similar projections that protrude from a body or core of the rotor may include the teeth. In a radial flux electric machine, the teeth may protrude in the radial plane. In other words, the teeth in the radial plane may protrude (inward or outward) in the radial direction. Each projection may form a tooth. Typically, the projections (or teeth) may be configured or shaped to direct a substantial portion of the magnetic flux between the stator and the rotor.

A stator core may refer to a main body of the stator which may be made of a single or multiple parts and may support and protect the rotating magnetic field. The stator core may be made of soft magnetic material for conducting the magnetic flux of an electric machine. A plurality of teeth annularly arranged on the stator core about an axis of rotation may refer to the teeth protruding from the core in a radial plane about the axis of the rotor shaft of the rotating electric machine. In some embodiments, a stator core may include an annular stator ring that extends around the axis of rotation and each tooth of the plurality of teeth may include a core tooth-portion integral with the annular stator ring. An annular stator ring may refer to a ring-shaped structure. The ring-shaped structure may be disposed around the axis of rotation of the electric machine. A core tooth-portion may refer to the part protruding from the annular stator ring of the stator ring in the radial plane. The term "integral" may be used herein to indicate that two parts are connected to form a single part that practically cannot be dismantled without destroying the integrity of the part. In some cases, the two integrally formed parts may be formed as a single part. Additionally, or alternatively, each tooth of the plurality of teeth may include one or more additional tooth-portions non-integrally formed with the core tooth-portion. The one or more additional tooth-portions being non-integrally formed with the core tooth-portion may refer to the one or more additional tooth-portions being attached together in a way that they may be easily separated from the annular stator ring. In some embodiments, the additional tooth-portions may be wedge-shaped. In some embodiments, a pair of additional tooth-portions may include tooth-portions arranged on opposite sides of the core tooth-portion. As another example, a pair of additional tooth-portions may also include tooth-portions arranged on the top and bottom surfaces of the core tooth-portion.

In certain embodiments, when all the tooth parts are assembled together, each tooth may define external surfaces having two sets of opposing faces, the opposing faces of each set of the two sets being non-parallel to each other, and wherein each face of the two sets of opposing faces may be inclined in a radial direction. That is, for example, for a tooth having faces A-D, a pair of faces A and B may be non-parallel to each other and another pair of faces C and D may be non-parallel to each other. Additionally, or alternatively, the opposing faces of adjacent teeth may be substantially parallel to each other. That is, for example, face C of one tooth may be parallel to face D of an adjacent tooth. The opposite side faces may be parallel to each other such that a slot formed between the adjacent teeth has a constant width in the radial direction. In some embodiments, a cross-section of each tooth in a plane perpendicular to the radial direction may have a rectangular shape, and a perimeter of the cross-section may be substantially a constant in the radial direction and an area of the cross-section may vary in the radial direction.

FIG. 53 illustrates a cross-sectional view of electric machine 10 along an axial plane of the electric machine 10. In FIG. 53, the axis of rotation 1000 of electric machine 10 lies in the axial plane, and the axial plane bisects the electric machine 10 into two symmetric halves. The radial plane extends perpendicular to the axis of rotation, and the axis of rotation 1000 extends perpendicular (e.g., into and out of the paper) to the radial plane. Electric machine 10 may include a stator 100 and a rotor 200. The rotor 200 may be configured to rotate about the axis of rotation 1000 with respect to the stator 100. The stator 100 may include a stator core 110 including a plurality of teeth 120, and the rotor 200 may include a rotor core 210 which is installed a plurality of permanent magnets 220. Electromagnetic coils 300 may be annularly mounted on the teeth 120 of the stator 100. The rotor 200 may be connected to the shaft 20 that may be configured to rotate about the axis of rotation 1000. When electric power is provided to the electromagnetic coils 300, a magnetic field may be generated. Based on the generated magnetic field, magnetic flux may flow between the rotor 200 and the stator 100, thereby providing a rotary force to the rotor 200. Electric machine 10 may be used as a power source in any appropriate application. For example, in an automobile, the electric machine 10 may drive the wheels of the automobile.

The stator 100 of electric machine 10 may include a plurality of teeth 120 arranged annularly and symmetrically about the axis of rotation 1000 on a stator core 110 of the stator 100. Each tooth 120 may include multiple pieces or parts that may be arranged together to form a composite or a multi-part tooth 120. Each tooth 120 may have a rectangular or trapezoidal cross-sectional shape in both the axial plane and the radial plane. The width and length of each tooth 120 may vary in the radial direction. That is, as illustrated in FIG. 53, the length l of tooth 120 may vary from $l_1$ to $l_2$ in the radially outward direction of tooth 120 (along radial axis 2000) and the width of tooth 120 may vary in the radially outward direction of tooth 120 (not shown). In some embodiments, such as the electric machine 10 depicted in FIG. 54, a tooth may include a core tooth-portion 122 and a pair of additional tooth-portions 124A and 124B positioned on opposite side surfaces of the core tooth-portion 122.

The electric machines of the current disclosure may include a plurality of electromagnetic coils. An electromagnetic coil (or an electric coil) may include one or more turns (or a winding) of an electrical conductor that may generate a magnetic field when an electric current is passed through the conductor (e.g., in electric motors), or that may generate a voltage across the conductor when a magnetic field passes over the coil. In some embodiments, the turns of an electrical conductor may be configured or shaped like a coil. In some embodiments, an electromagnetic coil may be an electrical conductor that contains a series of conductive wires that may be configured to be wrapped around a ferromagnetic core. In general, electromagnetic coils of the current disclosure may be associated with the stator or the rotor of the electric machine. That is, in some embodiments, the plurality of coils may be coupled to (e.g., mounted, installed, wound on) the rotor and in other embodiments, the plurality of coils may be coupled to the stator. In some embodiments, each coil of the plurality of electromagnetic coils may be mounted on a separate tooth of the plurality of teeth. In these embodiments, each tooth of the plurality of teeth protruding from the stator core may include an electromagnetic coil including one or more turns of an electrical conductor.

FIG. 54 depicts a perspective view of the stator 100 of the exemplary electric machine 10 of FIG. 53 and FIG. 55 depict a cross-sectional view of the stator 100 in the axial plane. Each electromagnetic coil 300 may be mounted, or installed, on a tooth 120. In some embodiments, an electromagnetic coil 300 may be installed on a tooth 120 such that the inner surface of the electromagnetic coil 300 fits snugly against an outer surface of the tooth 120. In some such embodiments, an external shape (or profile) of the electromagnetic coil 300 may be substantially the same as the external shape of the tooth 120 that it is mounted on. Each tooth 120 of the stator 100 may be separated from an adjacent tooth 120 by a slot 160 that may accommodate the electromagnetic coils 300 mounted on the adjacent teeth 120. In embodiments where the tooth includes the core tooth-portion 122 and the additional tooth-portions 124A and 124B, the core tooth-portion 122 of each multi-part tooth 120 may be mounted on an electromagnetic coil 300 such that the electromagnetic coil 300 extends around the core tooth-portion 122 with one or more gaps forming between the outer surfaces of the core tooth-portion 122 and the inner surface of the electromagnetic coil 300. In such embodiments, two gaps may be formed between the opposite side surfaces of the core tooth-portion 122 and the inner surface of the electromagnetic coil 300, and one of the additional tooth-portions 124A or 124B may be positioned in one gap and the other additional tooth-portion 124B or 124A may be positioned in the other gap. It should also be noted that, although the stator 100 is described as including teeth 120, in some embodiments, the rotor 200 may alternatively or additionally include teeth 120.

Electric machines of the current disclosure may include a base plate located adjacent the plurality of electromagnetic coils and the stator core. A base plate may refer to a piece or combination of parts attached to the stator such that it may assemble the stator core and electromagnetic coils on it. The base plate may be made of heat-conducting materials to conduct and remove heat from its sources. For example, the base plate may be formed of aluminum. The base plate may be in thermal contact with the plurality of electromagnetic coils and the stator core such that as the plurality of electromagnetic coils and the stator core heat during operation, the base plate may be configured to serve as a common heat sink for the plurality of electromagnetic coils and the stator core. Thermal contact (or thermal connection) refers to the proximity between the base plate and the plurality of electromagnetic coils such that good heat exchange occurs between them. In some embodiments, when two bodies are in thermal contact, or is thermally connected, heat exchange between the two bodies occur by conduction heat transfer mechanism. That is, the two bodies may be in physical contact. Although the two bodies may be in direct physical contact when they are thermally connected (or are in thermal contact), they do not have to be. For example, the two bodies in thermal contact may be in physical contact with each other via a thermal interfacial material (e.g., thermally conductive grease, etc.) disposed between the two bodies. If a thermal interface material is thus disposed, conductive heat transfer occurs between the two bodies (in thermal contact) through the thermal interface material between them. A common heat sink may refer to a passive heat exchanger which may transfer the heat generated by the plurality of electromagnetic coils and the stator core to a fluid medium, for example, air or a liquid coolant, where it may dissipate away from the electric machine, allowing regulation of the electric machine's temperature.

In some embodiments, each coil of the plurality of electromagnetic coils and/or the stator core may be in contact with the base plate directly or through a thermally-conductive material disposed therebetween. A thermally-conductive material may refer to a material which improves the exchange and transfer of heat energy between systems. The above described thermal interface material may be a thermally-conductive material. The thickness of the thermally-conductive material and its thermal conductivity may impact the exchange and transfer of heat energy. As such, in some embodiments, the thermally-conductive material disposed between the plurality of electromagnetic coils and the stator core and the base plate may be a thin layer of the thermally-conductive material to reduce its thermal resistance. The thickness of the thermally-conductive material depends on the application. In applications were the thermal conductivity of the thermally-conductive material is high, the thickness of the thermally-conductive material may be higher.

In some embodiments, the electric machine may further include a motor housing thermally connected to the base plate to enable heat generated by the plurality of electromagnetic coils and stator core to be dissipated through the base plate and the motor housing. A motor housing may refer to a casing which may be configured to accommodate the stator and rotor of the electric machine inside. A motor housing may be made of heat-conducting material and contain ribs to increase the heat transfer surface. In some embodiments, the base plate may include a first side and a second side opposite the first side, wherein the plurality of electromagnetic coils and the stator core may be in thermal contact with the first side of the base plate and the motor housing may be in thermal contact with the second side of the base plate. A side may refer to a surface of the base plate which may be upright, the top, the bottom, the front, or the back of the base plate. In certain embodiments, the second side of the base plate may include cooling fins that extend therefrom. Cooling fins may refer to surfaces extending from an object which increase the rate of heat transfer to or from the environment by increasing convection. Cooling fins increase the surface area of an object, which may result in an economical and satisfactory solution to heat transfer problems. Cooling fins may be made of a heat-conducting material to increase the heat transfer surface. The cooling fins may have any shape and configuration. In some embodiments, the cooling fins may include plate-like structures that protrude from the base plate. In some embodiments, the cooling fins may include a plurality of pins. Pins may have any cross-sectional shape (e.g., circular, square, rectangular, etc.) and may enhance heat transfer from the surface by increasing the area from which heat can be removed. In some embodiments, the pins may represent an efficient cooling solution as they may have a large surface area in relation to other heat-sink methods. In addition, the spacing between the pins may allow air to flow through these spaces and create turbulence at the surface. The turbulence may assist in breaking up any boundary layers that may exist at the surface of the fins (and increase the convective heat transfer coefficient of the surface). Pin heat sinks may consist of a base and an array of embedded pins, whose dimensions (e.g., length, thickness, density, material) may be customized to fit various applications depending on heat loads involved, available space, and airflow.

In some embodiments, the base plate may include a cylindrical hub portion extending around the axis of rotation. As used herein, a cylindrical hub portion may refer to a portion of the base plate having a cylindrical configuration which serves to fix the stator core. The cylindrical hub portion may be made of heat-conducting material for conducting and removing heat from its sources. Additionally, the stator core may include an annular stator ring that extends around the cylindrical hub portion of the base plate. As used herein, an annular stator ring may be a ring-shaped structure. The ring-shaped structure may be disposed around the axis of rotation of the electric machine. The annular stator ring extending around the cylindrical hub portion may refer to the annular stator ring completely or partially covering the cylindrical hub portion in such a way which surrounds the sides of the cylindrical hub portion. In some embodiments, an inner annular surface of the annular stator ring may be in contact with an outer annular surface of the cylindrical hub portion of the base place directly or through a thermally-conductive material disposed therebetween. In some embodiments, the base plate may include air vents configured to direct air to the plurality of electromagnetic coils when the rotor rotates. Air vents may refer to pathways, openings, cavities, or outlets that allow entry of air therethrough. In some embodiments, the air vents may be associated with vanes that operate similar to fan blades to blow air through the air vents. The air vents (and vanes if any) may be designed and configured to direct air flow to cool the electrical machine.

Figure 56:
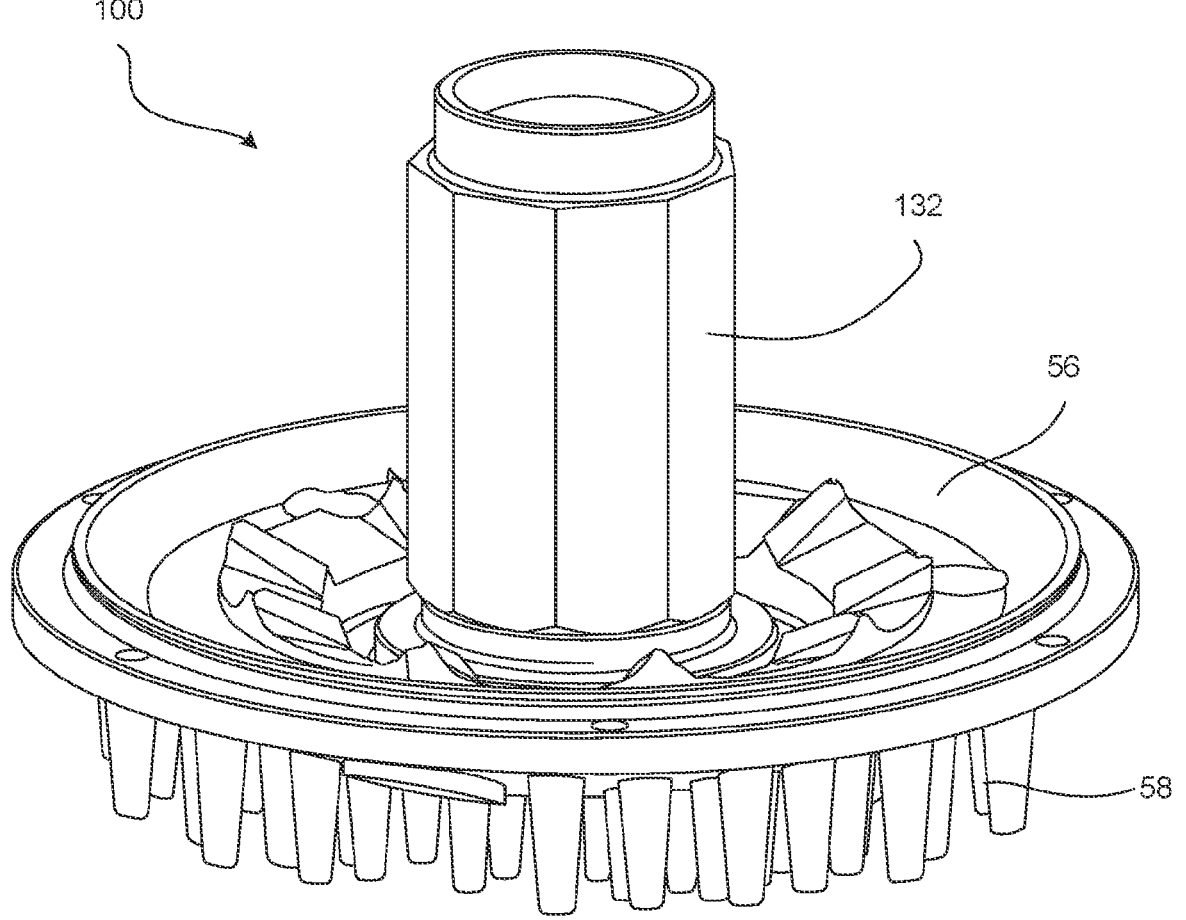
FIG. 56 illustrates a perspective view of a base plate 56 and its cylindrical hub portion 132 of the stator of the electric machine of FIG. 53, consistent with disclosed embodiments.

In FIGS. 54, 55, and 56, electromagnetic coils 300 are shown to fit tightly between the base plate 56 and teeth 120 of the stator 100. The electromagnetic coils 300 may be in direct contact with a first side 602 of the base plate 56 and teeth 120 or may be in thermal contact with the first side 602 of the base plate 56 and teeth 120 via a thermally conductive filler material. The stator core 110 may fit snugly against a cylindrical hub portion 132 of the stator 100. The hub portion 132 may be connected to the stator base plate 56. The base plate 56 and its cylindrical hub portion 132 may be made in the form of one single piece or two separate parts and made of a heat-conducting material, for example, aluminum. A second side 604 of the stator base plate 56 may be equipped with cooling fins made in the form of pins 58, which may significantly increase the cooling surface of the second side 604 of the stator base plate 56. The electromagnetic coils 300 may also fit tightly or contact the teeth 120 of the stator core 110 on which they are mounted with the help of a thermally conductive filler. During operation of the electric machine, as schematically illustrated in FIG. 53, portion of the heat generated in the electromagnetic coils 300 (e.g., due to electric current passing through the coils) may conduct through the teeth 120 and the cylindrical hub portion 132 to the base plate 56.

As also illustrated in FIG. 53, a portion of the heat generated in the coils 300 may conduct directly to the base plate 56 that is in thermal contact therewith. In embodiments where the coils 300 are thermal contact with the base plate 56 due to direct physical contact (between the coils 300 and the base plate 56), heat from the coils 300 may conduct directly into the base plate 56. In embodiments, where a thermally-conductive material (or thermally conductive filler) is provided between the coils 300 and the base plate 56, the heat from the coils 300 may conduct into the base plate 56 through the thermally-conductive material. Thus, thermal contact between the coils 300 and the base plate 56 provides an additional and shorter pathway for the heat to conduct out of the coils 300. Since the coils 300 are in thermal contact with the base plate 56, heat may readily pass from the coils 300 to the base plate 56 through this path. That is, as opposed to the heat passing from the coils 300 into the base plate 56 via the tooth 120 and the cylindrical hub portion 132, thermal contact between the coils 300 and the base plate 56 provides a more direct heat conduction pathway to the base plate 56. Air flow across the pins 58 on the second side 604 of the base plate 56 may then remove the heat from the base plate 56.

Thus, it may be appreciated from the discussion above that the heat generated by the electromagnetic coils 300 and the stator core 110 with teeth 120 may be conducted through the stator base plate 56 and its cylindrical hub portion 132 and released into the environment. In addition, as illustrated in FIG. 53, a portion of the heat from the stator base plate 56 may pass through the housing 50 connected to it and may also be released into the environment through its outer ribbing 52. The housing 50 may be made of a thermally conductive material. The stator base plate 56 may act as an air-cooled radiator for the electrical machine 10. In addition, FIG. 53 depicts exemplary heat conduction paths 600 from the coil 300 to the base plate 56.

The inner surface of the housing 50 and/or the outer surface of the rotor 200 may also have internal ribbing or fins (not shown). These fins for an electric machine 10, much like ventilation holes, may be intended to stir the air when the rotor 200 rotates. This may allow heat to be removed from heating sources in the form of magnets and a rotor core and be transferred to the housing 50 and further into the environment.

In the discussion above, electric machine 10 is described as being an air-cooled machine. However, this is only exemplary. In some embodiments, electric machine 10 may be liquid cooled. Electric machines of the current disclosure may include a liquid-coolant channel configured to direct a cooling liquid therethrough. The cooling liquid (or coolant) may remove the heat generated by the coils 300 from the electric machine. In some embodiments, the liquid-coolant channel may be defined on the second side of the base plate such that as the coils and the stator core heats during operation, the base plate is configured to transfer the heat to a liquid coolant in the liquid-coolant channel to dissipate heat from the plurality of electromagnetic coils and the stator core. In some embodiments, the liquid-coolant channel may be defined through the base plate. A liquid-coolant channel refers to a cavity or a passageway that is configured to allow the flow of a liquid therethrough. The liquid may be configured to remove the heat from the walls of the channel. Any liquid that is configured to flow through the liquid-coolant channel may serve as the coolant. When the temperature of the liquid flowing through the channel is lower than the parts to be cooled, the liquid removes the heat from the parts and thereby cools the parts. Any known liquid coolant (e.g., water, oil, glycol mixtures, dielectric fluid, etc.) may be directed through the liquid-coolant channel.

In some embodiments, a wall of the liquid-coolant channel may be a portion of the second side of the base plate directly opposite a portion of the first side of the base plate that is in thermal contact with the plurality of electromagnetic coils. The liquid-coolant channel may extend around the axis of rotation such that an annular region on the second side of the base plate may serve as a wall of the liquid-coolant channel. Additionally, or alternatively, the annular region on the second side of the base plate may include a plurality of fins that extend into the liquid-coolant channel. The plurality of fins may be arranged about the axis of rotation. The fins may increase the surface area from which heat can be removed by the liquid coolant flowing in the liquid-coolant channel. In some embodiments, the fins may be in the form of pins. As explained previously, the pins may be columnar projections (of any cross-sectional shape) that project into the liquid-coolant channel from the second side of the base plate. In some embodiments, the liquid-coolant channel may have a coolant inlet and a coolant outlet. The coolant inlet may be configured to direct the coolant into the liquid-coolant channel and the coolant outlet may be configured to direct the coolant out of the liquid-coolant channel. Any aperture that is configured to direct the coolant therethrough (e.g., into or out of the channel) may serve as the coolant inlet and the coolant outlet.

In some embodiments, the coolant intel and the coolant outlet may have fluid fittings (couplings, etc.) or may be otherwise configured to direct the coolant into and out of the channel in a hermetic manner. In some embodiments, the coolant inlet and/or coolant outlet may be fluidly connected to a radiator or a heat exchanger. The heat exchanger may be configured to remove heat from the coolant. In some embodiments, the coolant inlet, heat exchanger, and the coolant outlet may form a closed loop such that heated coolant from the coolant outlet is cooled in the heat exchanger and directed back into the electric machine through the coolant inlet. Any type of heat exchanger may be used. In some embodiments, the coolant outlet may be fluidly connected to a common heat exchanger (or radiator) of the system that the electric machine is a part of. For example, in embodiments where the electric machine is part of an electric vehicle (e.g., used to power the wheels of the electric vehicle), the coolant outlet may be connected to common radiator of the electric vehicle. In some such embodiments, the liquid coolant used to cool the electric machine may be a coolant that is used to cool other components of the electric vehicle (or other system that the electric machine is a part of). It should be noted that although a liquid coolant is described above, in general, and fluid coolant (liquid or gas) may be used to cool the electric machine. In embodiments where a gas coolant is used to cool the electric machine, the coolant gas may be directed through the coolant channels in the base plate.

Figure 57:
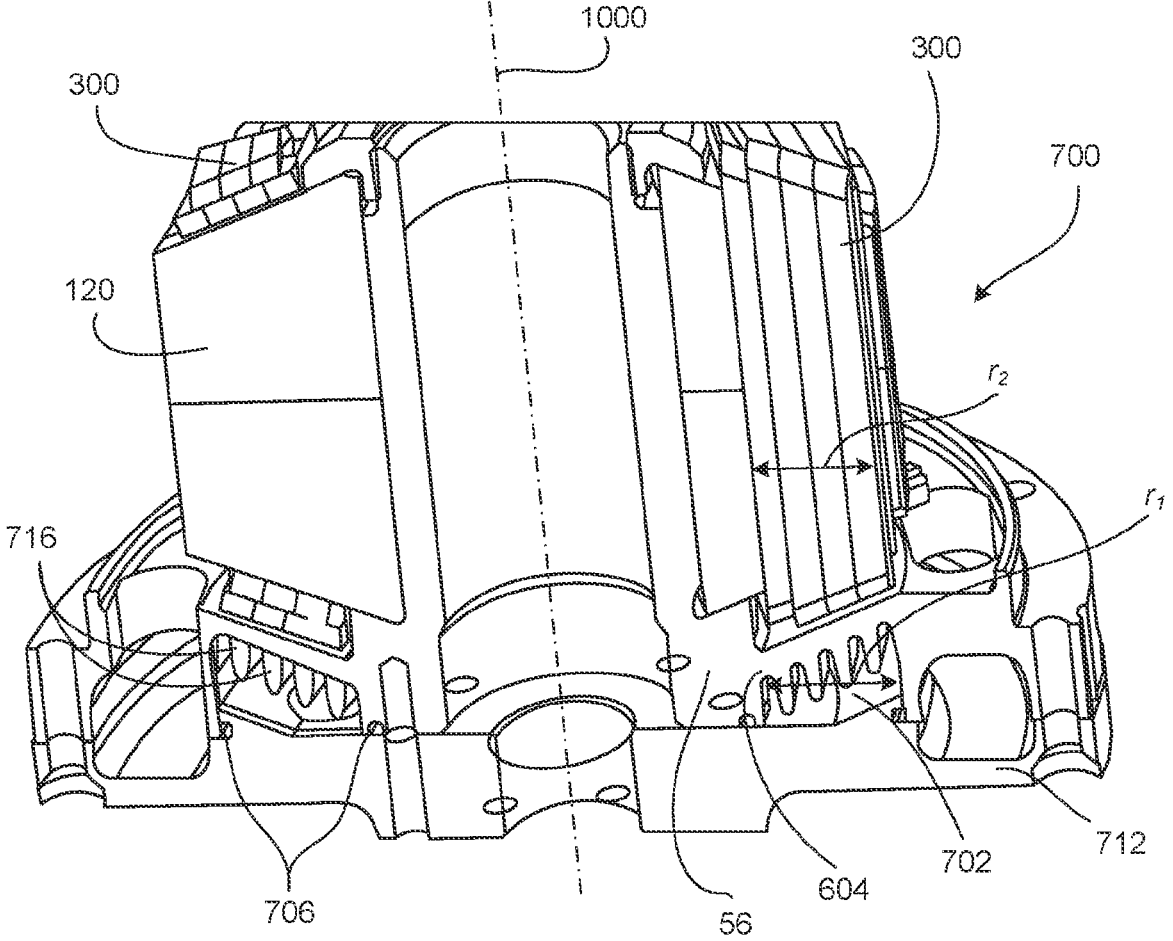
FIG. 57 illustrates a cross-sectional view of an electric machine cooled by a liquid-coolant in an axial plane, consistent with disclosed embodiments.
Figure 58:
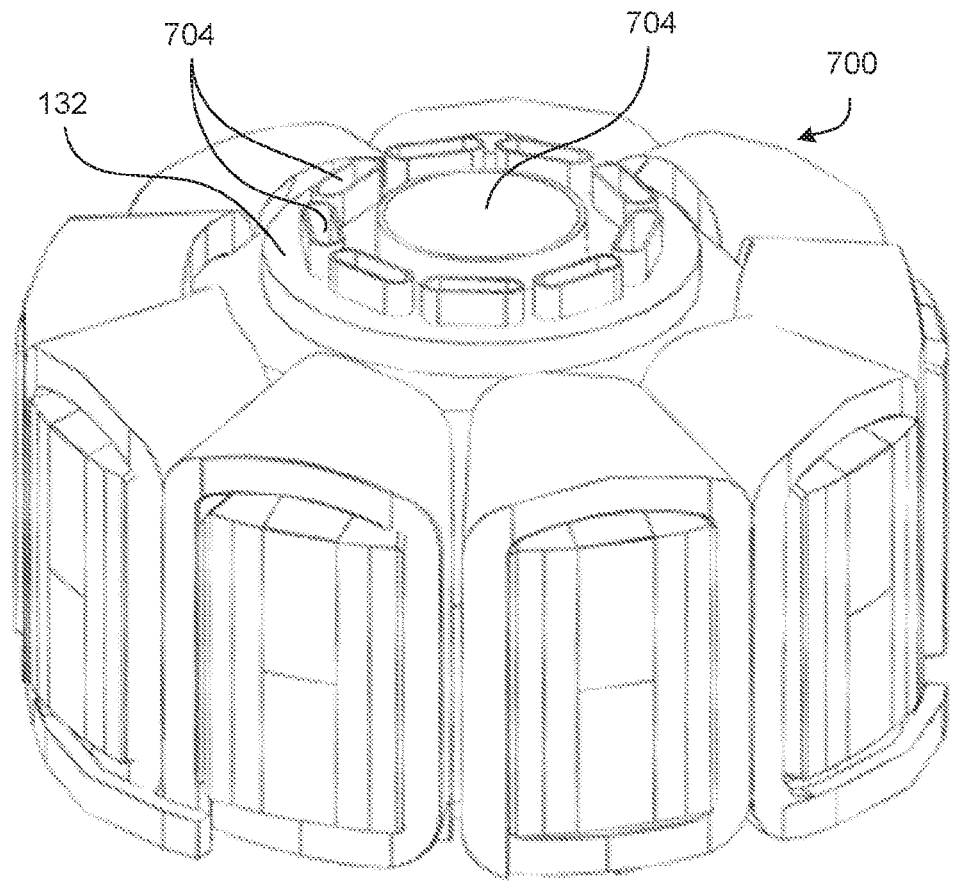
FIGS. 58-60 illustrate different views of the electric machine of FIG. 57, consistent with disclosed embodiments.
Figure 59:
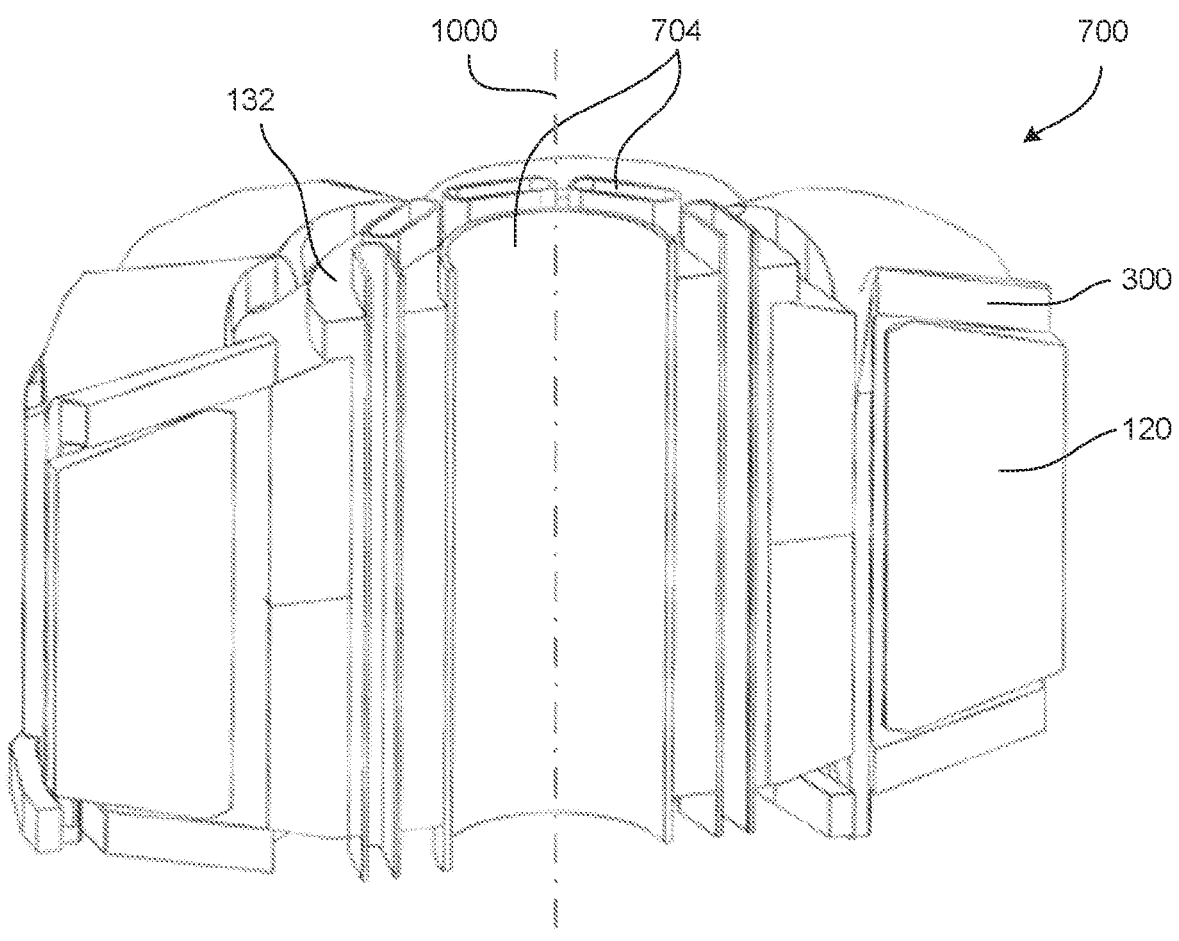
Figure 60:
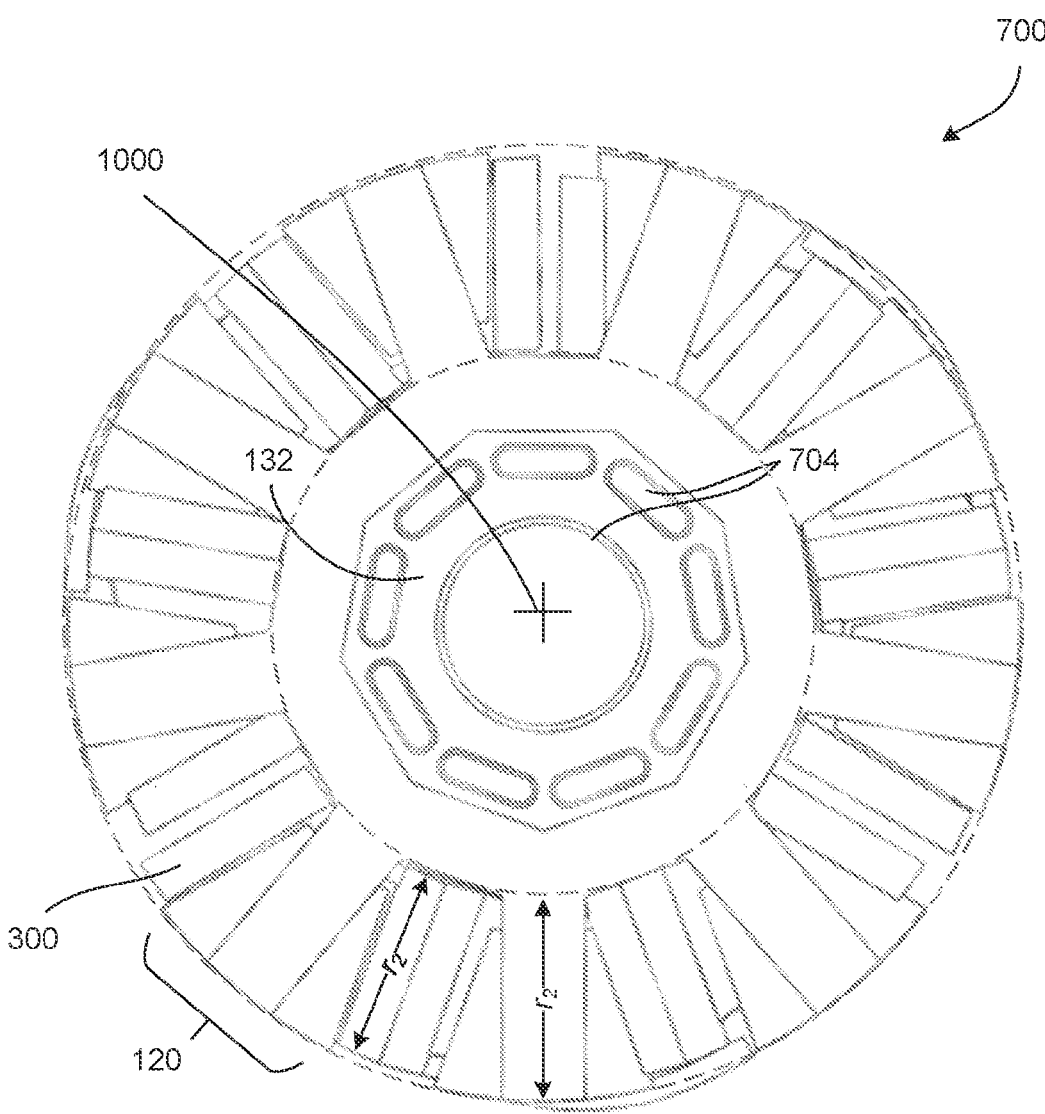

FIGS. 57-60 illustrate different views of exemplary liquid cooled electric machines 700 of the current disclosure. FIG. 57 depicts an exemplary liquid-coolant channel 702 defined on the second side 604 of the stator base plate 56. Liquid-coolant channel 702 may be a cavity defined between the second side 604 of the stator base plate 56 and a casing cover 712 of the housing 50. Channel 702 may extend around the axis of rotation 1000 of the electric machine 700 to form an annular passage that extends around the electric machine (see, e.g., FIG. 60). In some embodiments, as best seen in FIGS. 57 and 60, the channel 702 may be positioned directly below (or adjacent to) the coils 300 that are mounted on the multi-part teeth 120. The radial position (or the radial distance from the axis of rotation 1000) of the channel 702 may be substantially the same as that of the coils 300. As illustrated in FIG. 57, a radial dimension (e.g., radial width $r_1$) of the channel 702 may also be substantially the same as (or correspond to) the radial dimension (e.g., radial width $r_2$) of the coils 300. That is, the annular channel 702 may trace a path that has substantially the same radial size as the coils 300 around the axis of rotation 1000 (see, e.g., FIG. 60). Although a single channel 702 is illustrated and described, this is only exemplary. In some embodiments, multiple coolant channels (e.g., multiple radially spaced apart channels) may be provided. It should also be noted that although the channel 702 of FIG. 57 is defined between the second side 604 of the base plate 56 and the casing cover 712, this is only exemplary. Many variations are possible. In some embodiments, the channel 702 may extend through the base plate 56.

As shown in FIG. 57, gaskets 706 may be provided between the base plate 56 and the casing cover 712 to seal the channel 702 and prevent leaks. As shown in FIG. 57, fins 716 may extend from second side 604 of the base plate 56 into the channel 702 to increase the heat transfer surface of the base plate 56. The fins 716 may extend around the axis of rotation 1000 to form radially spaced apart annular plates that project into the channel 702 from the base plate 56. As explained previously, the illustrated pattern of fins 716 is merely exemplary. Many other patterns are possible. In some embodiments, the fins 716 may be configured as pins. That is, multiple columnar projections may protrude into the channel 702 from the base plate 56. Although not visible in FIG. 57, base plate 56 (and/or casing cover 712) may also include a coolant inlet that is configured to direct a coolant into the channel 702 and a coolant outlet that is configured to direct the coolant out of the channel 702. In some embodiments, multiple coolant inlets and/or outlets may be provided.

In some embodiments, liquid coolant channels may also extend through other components of electric machine 700. FIGS. 58-60 illustrate exemplary liquid-coolant channels 704 through the cylindrical hub portion 132 of the stator 100. In some embodiments, channels for the passage of liquid may also extend through stator core 110 and/or the housing 50. The heat generated by the electromagnetic coils 300 and the stator core 110 (and/or other components) may pass (e.g., by conduction) through the stator base plate 56 and its cylindrical hub portion 132 into liquid-coolant channels 702 and 704. The liquid flowing through the channel 702, 704 may then transfer the heat to a radiator (not shown) for cooling. The cooled liquid from the radiator may be directed back to the channels 702 and/or 704. In some embodiments, the liquid may flow through the channels 702 and/or 704 under pressure. In some embodiments of an electric machine with an internal rotor 200, coolant channels for removing heat may be located in the middle part of the housing 50 and its bearing parts.

Directly cooling the coils 300 of the electric machine by keeping the coils 300 in thermal contact with the rotor base provide an additional easier path to cool the coils 300. That is, rather than relying on the heat form the coils 300 to be transferred to the external environment via the tooth 120, hub portion 132, and the base plate 56, keeping the coils 300 in thermal contact with the base plate 56 enables easier and more effective cooling of the coils 300. Improving the cooling of electric machines results in improvements in efficiency and power of the electric machines.

The above-described embodiments of electric machine and related methods are only exemplary. Many variations are possible. Some possible variations are described in U.S. Pat. Nos. 9,502,951 and 10,056,813, which are incorporated by reference in their entirety herein. The methods described above need not be performed in the order discussed or indicated. Further, several steps may be omitted, combined, and/or some steps added. Furthermore, although some aspects of the electric machine are described with reference to an electric machine of a particular configuration, the described aspects may be used in an electric machine having any configuration. Other embodiments of the electric machine and related methods will be apparent to those skilled in the art from consideration of the disclosure herein.

What is claimed is:

1. A radial flux electric machine, comprising:
a rotor configured to rotate about an axis of rotation;
a plurality of electromagnetic coils;
a stator including an annular stator ring extending about the axis of rotation, wherein the annular stator ring is a ring-shaped structure that extends about the axis of rotation as a singular structure; and
a plurality of multi-part teeth circumferentially arranged on the annular stator ring, each multi-part tooth of the plurality of multi-part teeth including a core tooth-portion integrally formed with and extending radially from the annular stator ring and at least one additional tooth-portion separate from the annular stator ring,
wherein core tooth-portions of the plurality of multi-part teeth are circumferentially spaced apart from each other and the at least one additional tooth-portion of each multi-part tooth is disposed on an external surface of the core tooth-portion of that multi-part tooth, the core tooth-portion and the at least one additional tooth-portion being coupled together using an adhesive, wherein a difference between coefficients of thermal expansion of materials of the core tooth-portion, the at least one additional tooth-portion, and the adhesive is less than about 20%, and
wherein each coil of the plurality of electromagnetic coils is mounted on a different multi-part tooth of the plurality of multi-part teeth such that each coil surrounds a corresponding core tooth-portion of the multi-part tooth with a gap between the coil and the core tooth-portion, and the at least one additional tooth-portion is disposed in the gap.

2. The electric machine of claim 1, wherein the annular stator ring includes two mirror-symmetric halves coupled together along a plane of symmetry perpendicular to the axis of rotation.

3. The electric machine of claim 2, wherein the two mirror-symmetric halves are attached together along the plane of symmetry using an adhesive material.

4. The electric machine of claim 2, wherein the annular stator ring includes a soft magnetic composite (SMC).

5. The electric machine of claim 1, wherein the at least one additional tooth-portion includes a pair of additional tooth portions.

6. The electric machine of claim 1, wherein the annular stator ring includes multiple axially stacked annular rings, and wherein at least two of the stacked annular rings are made of a soft magnetic composite (SMC).

7. The electric machine of claim 1, wherein the stator is positioned radially inwards of the rotor and the core tooth-portion of each multi-part tooth extends radially outward from the annular stator ring.

8. The electric machine of claim 1, wherein the stator is positioned radially outwards of the rotor and the core tooth-portion of each multi-part tooth extends radially inward from the annular stator ring.

9. The electric machine of claim 1, wherein a cross-sectional shape of the core tooth-portion and the at least one additional tooth-portion of each multi-part tooth along a plane perpendicular to a radial direction is substantially rectangular.

10. The electric machine of claim 9, wherein a cross-sectional shape of the at least one additional tooth-portion along a plane perpendicular to the axis of rotation is substantially triangular.

11. The electric machine of claim 9, wherein a cross-sectional shape of each multi-part tooth of the plurality of multi-part teeth along a plane perpendicular to the axis of rotation is substantially trapezoidal.

12. The electric machine of claim 1, wherein the at least one additional tooth-portion includes a pair of additional tooth-portions arranged symmetrically on opposite sides of the core tooth-portion.

13. The electric machine of claim 12, wherein the pair of additional tooth-portions are arranged symmetrically about a plane perpendicular to the axis of rotation.

14. The electric machine of claim 1, wherein the at least one additional tooth-portion of each multi-part tooth is wedged between an internal surface of a coil of the plurality of electromagnetic coils and an external surface of the core tooth-portion.

15. The electric machine of claim 1, wherein a coil of the plurality of electromagnetic coils surrounds the core tooth-portion of each multi-part tooth such that at least two gaps are formed between an inner surface of the coil and opposite sides of the core tooth-portion, and wherein the at least one additional tooth-portion includes at least two additional tooth-portions disposed in a different gap of the at least two gaps.

16. The electric machine of claim 1, wherein a cross-section of each multi-part tooth of the plurality of multi-part teeth in a plane perpendicular to a radial direction has a rectangular shape.

17. The electric machine of claim 1, wherein the electric machine is an electric motor or an electric generator.

18. A radial flux electric machine, comprising:
a rotor configured to rotate about an axis of rotation;
a plurality of electromagnetic coils; and
a stator having an annular stator ring extending about the axis of rotation as a singular structure and a plurality of core tooth-portions integrally formed with and symmetrically arranged on the annular stator ring about the axis of rotation to define a circumferential gap between adjacent core tooth-portions and extending in a radial direction,
wherein the stator includes a plurality of multi-part teeth with each tooth of the plurality of multi-part teeth including one core tooth-portion of the plurality of core tooth-portions and a pair of additional tooth-portions non-integrally formed with and attached to opposite external surfaces of the one core tooth-portion using an adhesive, wherein a difference between coefficients of thermal expansion of materials of the one core tooth-portion, the additional tooth-portions, and the adhesive is less than about 20%, and
wherein a cross-sectional shape of each tooth of the plurality of multi-part teeth in a plane perpendicular to the axis of rotation is substantially trapezoidal.

19. The electric machine of claim 18, wherein the pair of additional tooth-portions are symmetrically positioned about a plane perpendicular to the axis of rotation.

* * * * *